(12) United States Patent
Pulitzer

(10) Patent No.: US 10,176,486 B2
(45) Date of Patent: Jan. 8, 2019

(54) SYSTEM AND METHOD FOR USING A MOBILE DEVICE AS AN INPUT DEVICE FOR SURVEYS AT A LIVE EVENT

(71) Applicant: TESLA LABORATORIES, LLC, Jackson, WY (US)

(72) Inventor: Jovan Hutton Pulitzer, Frisco, TX (US)

(*) Notice: Subject to any disclaimer, the term of this patent is extended or adjusted under 35 U.S.C. 154(b) by 0 days.

(21) Appl. No.: 15/453,226

(22) Filed: Mar. 8, 2017

(65) Prior Publication Data
US 2017/0249651 A1 Aug. 31, 2017

Related U.S. Application Data

(63) Continuation-in-part of application No. 15/402,738, filed on Jan. 10, 2017, which is a continuation-in-part of application No. 15/360,697, filed on Nov. 23, 2016, which is a continuation-in-part of application No. 15/146,464, filed on May 4, 2016, now Pat. No. 9,959,689.

(60) Provisional application No. 62/258,988, filed on Nov. 23, 2015, provisional application No. 62/258,982, filed on Nov. 23, 2015, provisional application No.
(Continued)

(51) Int. Cl.
G06Q 30/02 (2012.01)
H04W 4/04 (2009.01)
H04W 4/21 (2018.01)
H04L 29/08 (2006.01)
G06F 17/30 (2006.01)
G06Q 10/02 (2012.01)
H04W 4/021 (2018.01)

(52) U.S. Cl.
CPC ..... *G06Q 30/0203* (2013.01); *G06F 17/3087* (2013.01); *G06F 17/30879* (2013.01); *G06Q 10/02* (2013.01); *H04L 67/306* (2013.01); *H04W 4/021* (2013.01); *H04W 4/043* (2013.01); *H04W 4/21* (2018.02)

(58) Field of Classification Search
CPC .......... G06F 17/3087; G06F 17/30879; G06Q 30/0203; H04M 3/42357; H04W 4/043; H04W 60/00; H04W 4/21; H04L 67/306
USPC ....................................................... 235/379
See application file for complete search history.

(56) References Cited

U.S. PATENT DOCUMENTS 5,226,177 A 7/1993 Nickerson
5,273,437 A 12/1993 Caldwell
(Continued)

OTHER PUBLICATIONS

PCT: International Search Report and Written Opinion of PCT/US16/31015; dated Aug. 23, 2016 dated Aug. 23, 2016.

*Primary Examiner* — Claude J Brown
(74) *Attorney, Agent, or Firm* — Gregory M. Howison

(57) ABSTRACT

A method is provided for interacting with audience members in an event, each of the potential attendees having available thereto a unique identifier. The method comprises creating, for an attendee, a unique ID (UID) on a mobile wireless device (MWD) by the steps of inputting to the MWD one of the unique identifiers, combining the obtained unique identifier with a UID time stamp at the time of creation of the UID; receiving with a server on a first wireless channel communications from the MWD; registering the UID at the physical location of the event; generating a visual query; displaying on the MWD response indicators; receiving at the server from the registered attendee a response, to the query
(Continued)

over the first wireless channel; and storing in a database on the server the received response in association with the displayed query.

20 Claims, 62 Drawing Sheets

Related U.S. Application Data

62/258,983, filed on Nov. 23, 2015, provisional application No. 62/258,985, filed on Nov. 23, 2015, provisional application No. 62/258,987, filed on Nov. 23, 2015, provisional application No. 62/258,994, filed on Nov. 23, 2015, provisional application No. 62/258,996, filed on Nov. 23, 2015, provisional application No. 62/258,989, filed on Nov. 23, 2015, provisional application No. 62/258,997, filed on Nov. 23, 2015, provisional application No. 62/258,990, filed on Nov. 23, 2015, provisional application No. 62/277,888, filed on Jan. 12, 2016, provisional application No. 62/277,941, filed on Jan. 12, 2016, provisional application No. 62/277,899, filed on Jan. 12, 2016, provisional application No. 62/277,903, filed on Jan. 12, 2016, provisional application No. 62/277,914, filed on Jan. 12, 2016, provisional application No. 62/277,917, filed on Jan. 12, 2016, provisional application No. 62/277,943, filed on Jan. 12, 2016, provisional application No. 62/277,918, filed on Jan. 12, 2016, provisional application No. 62/277,270, filed on Jan. 11, 2016, provisional application No. 62/305,345, filed on Mar. 8, 2016, provisional application No. 62/305,354, filed on Mar. 8, 2016, provisional application No. 62/305,349, filed on Mar. 8, 2016, provisional application No. 62/305,408, filed on Mar. 8, 2016, provisional application No. 62/305,417, filed on Mar. 8, 2016, provisional application No. 62/305,420, filed on Mar. 8, 2016, provisional application No. 62/305,427, filed on Mar. 8, 2016, provisional application No. 62/305,431, filed on Mar. 8, 2016, provisional application No. 62/316,745, filed on Apr. 1, 2016, provisional application No. 62/319,161, filed on Apr. 6, 2016.

(56) References Cited

U.S. PATENT DOCUMENTS

| | | |
|---|---|---|
| 5,801,754 A | 9/1998 | Ruybal |
| 5,993,314 A | 11/1999 | Dannenberg |
| 6,760,595 B2 | 7/2004 | Inselberg |
| 8,229,093 B2 | 7/2012 | Martin |
| 8,391,825 B2 | 3/2013 | Arseneau |
| 9,160,692 B2 | 10/2015 | Socolof |
| 2004/0158865 A1 | 8/2004 | Kubler et al. |
| 2007/0028272 A1 | 2/2007 | Lockton |
| 2007/0112648 A1 | 5/2007 | Martin |
| 2010/0306064 A1 | 12/2010 | Inselberg |
| 2011/0028213 A1 | 2/2011 | Dusenberry |
| 2011/0271295 A1 | 11/2011 | Redmann et al. |

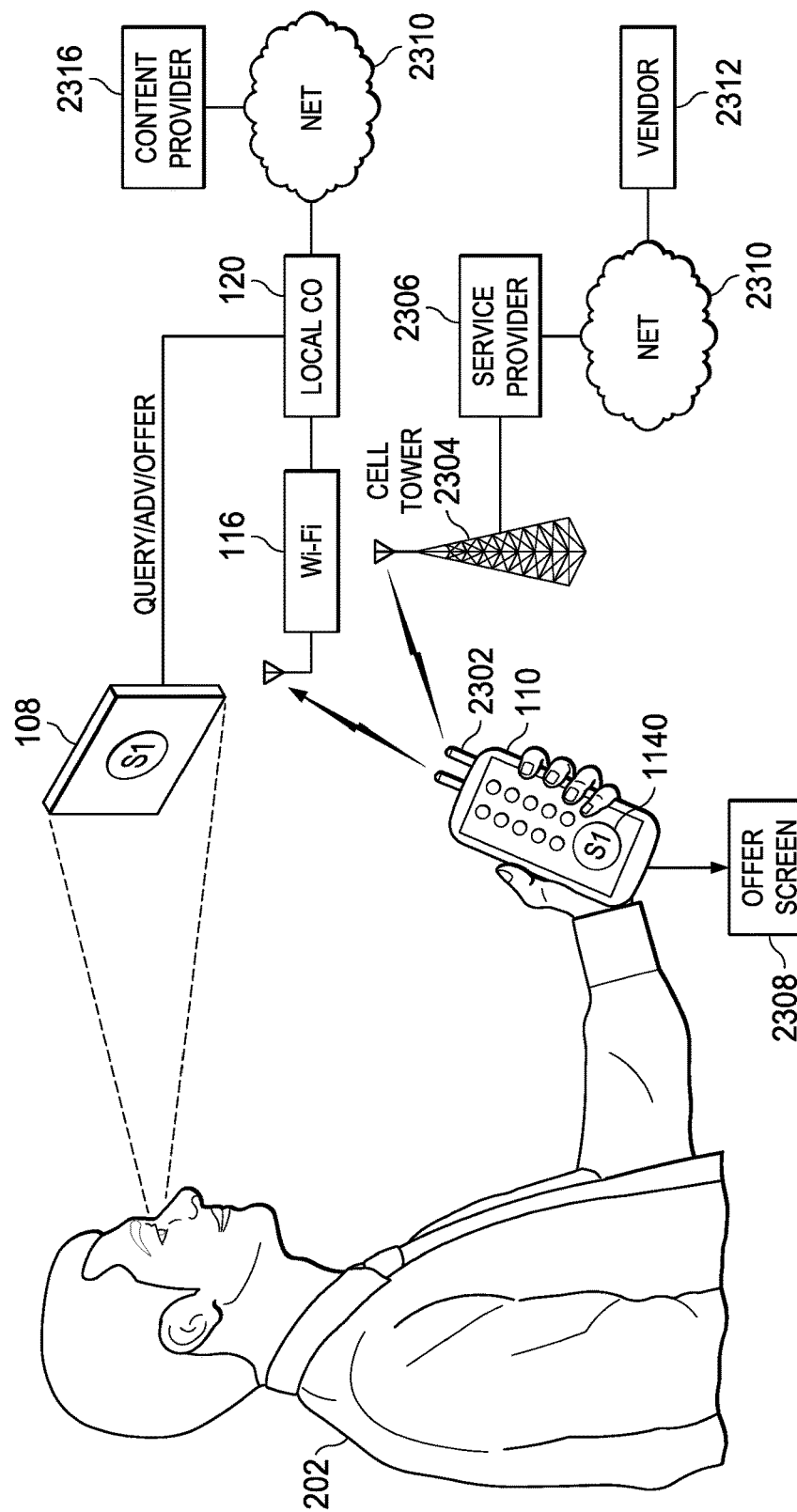

|  | REPORT: FEMALE TRENDS 6204 | | | |
|---|---|---|---|---|
|  | QUERY P1 6206 | QUERY P2 6206 | QUERY P3 6206 | RESULT IN % 6208 |
| 6210 | QID(SCID:GENDER) + RID(R2:FEMALE) | QID(SCID:POLITICAL AFFILIATION) + RID(R3:DEMOCRAT) | TS(2015-10-30 T xx:xx) | 67% |
| 6212 | QID(SCID:POLITICAL AFFILIATION) + RID(R3:DEMOCRAT) | QID(SCID:GENDER) + RID(R2:FEMALE) | TS(2015-10-30 T xx:xx) | 80% |
| 6214 | QID(SCID:GENDER) + RID(R2:FEMALE) | QID(SCID:POLITICAL AFFILIATION) + RID(R3:DEMOCRAT) |  | 75% |
| 6216 | QID(SCID:GENDER) + RID(R2:FEMALE) | QID(SCID:SOFT DRINK) + RID(R3:PEPSI) |  | 14.5% |

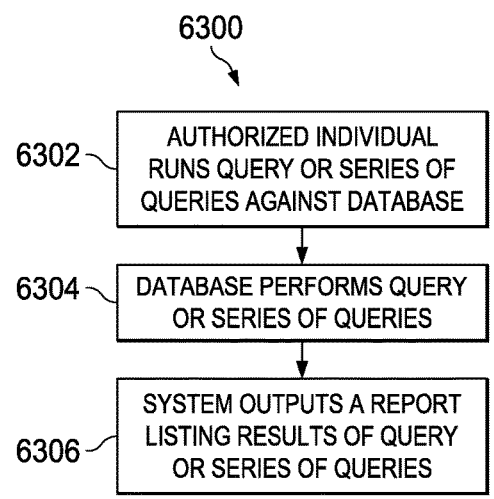

FIG. 63

| REPORT: MALE TRENDS | | | |
|---|---|---|---|
| QUERY P1<br>6406 | QUERY P2<br>6406 | QUERY P3<br>6406 | RESULT IN %<br>6408 |
| QID(SCID:GENDER) +<br>RID(R1:MALE) | QID(SCID:POLITICAL<br>AFFILIATION) +<br>RID(R1:REPUBLICAN) | TS(2015-04-05 T 00:00 -<br>2015-11-02 T 00:00) | 65% |
| QID(SCID:POLITICAL<br>AFFILIATION) +<br>RID(R1:REPUBLICAN) | QID(SCID:GENDER) +<br>RID(R1:MALE) | TS(2015 MLB SEASON) | 78% |
| QID(SCID:GENDER) +<br>RID(R1:MALE) | QID(SCID:SOFT DRINK)<br>+ RID(R2:COCA COLA) | TS(2015 MLB<br>REGULAR SEASON) | 45% |

FIG. 64

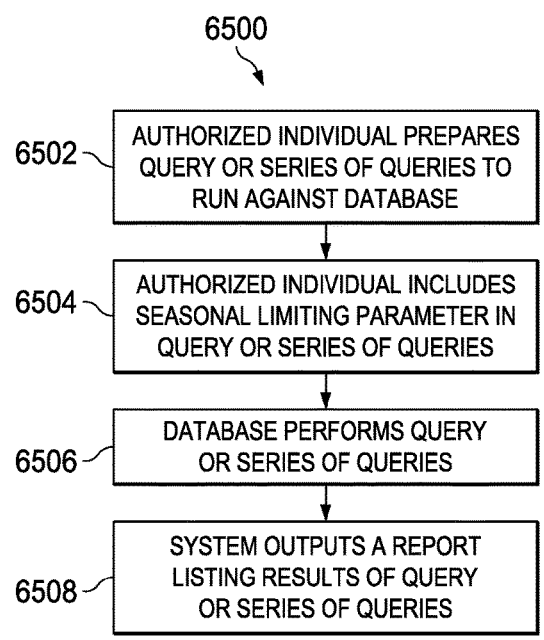

FIG. 65

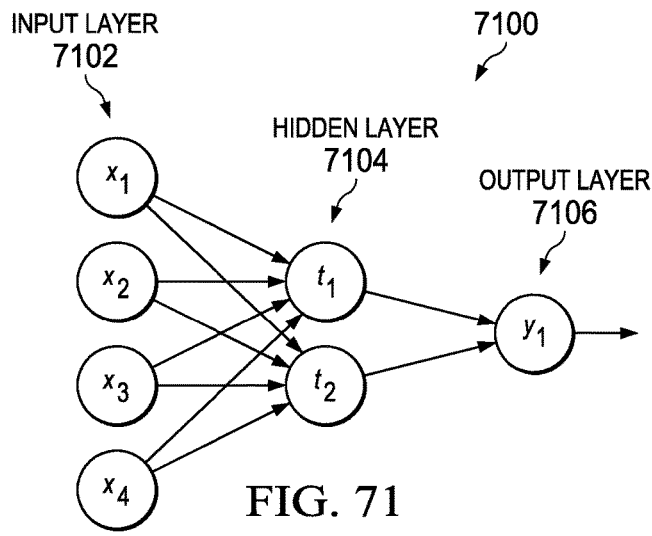
FIG. 71
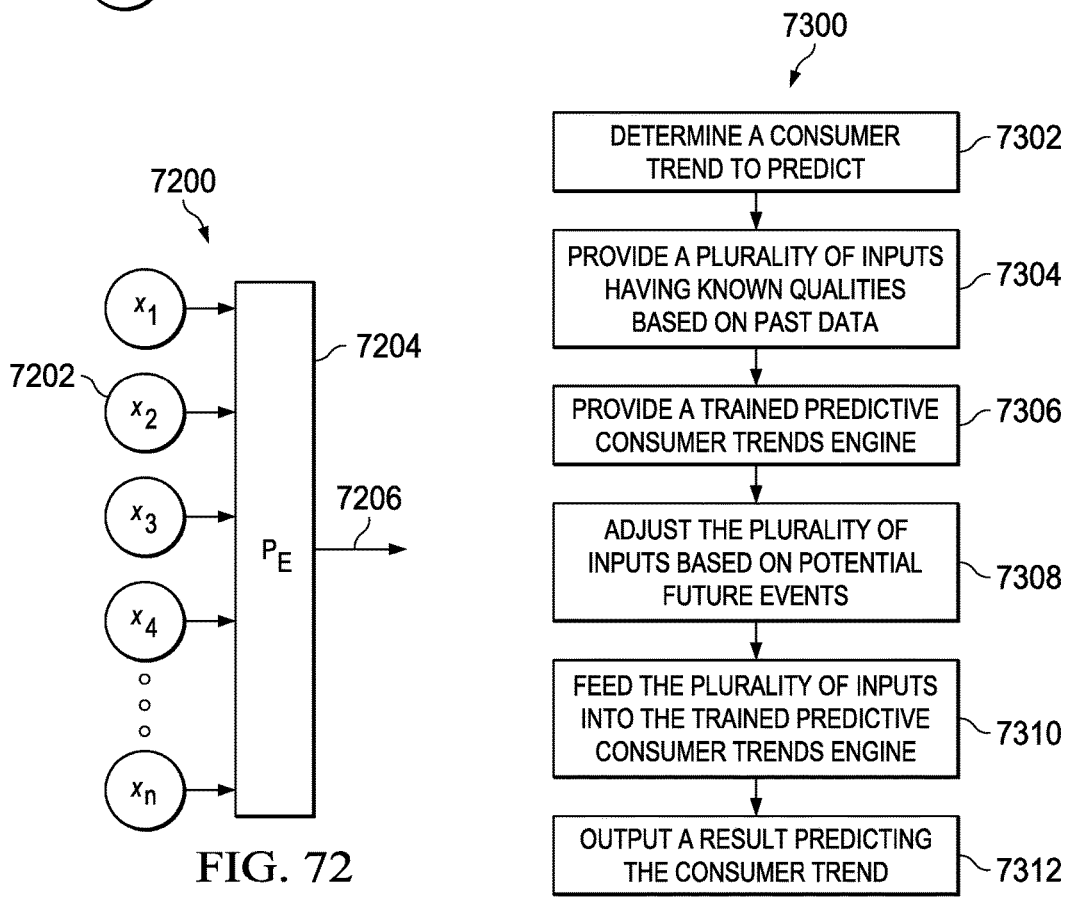
FIG. 72
FIG. 73

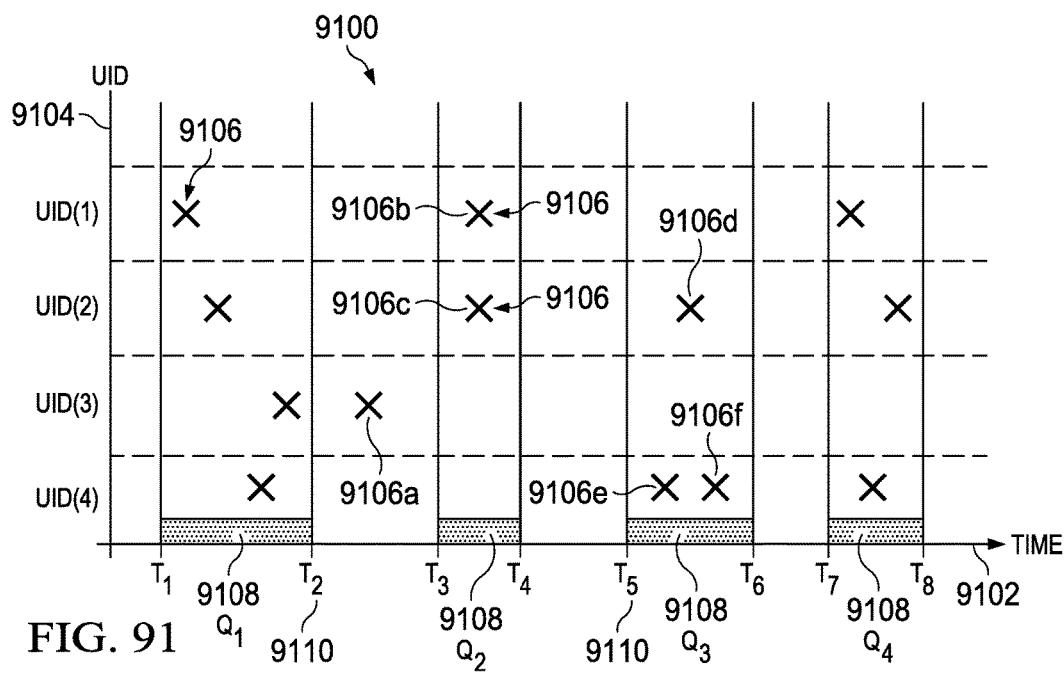

SYSTEM AND METHOD FOR USING A MOBILE DEVICE AS AN INPUT DEVICE FOR SURVEYS AT A LIVE EVENT

CROSS-REFERENCE TO RELATED APPLICATIONS

This application is a Continuation-in-Part of U.S. application Ser. No. 15/402,738, filed on Jan. 10, 2017, entitled SYSTEM AND METHOD FOR USING A MOBILE DEVICE AS AN INPUT DEVICE FOR SURVEYS AT A LIVE EVENT. U.S. application Ser. No. 15/402,738 is incorporated by reference herein in its entirety. U.S. application Ser. No. 15/402,738 is a Continuation-in-Part of U.S. patent application Ser. No. 15/360,697, filed on Nov. 23, 2016, entitled SYSTEM AND METHOD FOR USING A MOBILE DEVICE AS AN INPUT DEVICE FOR SURVEYS AT A LIVE EVENT, which is incorporated by reference herein in its entirety. U.S. patent application Ser. No. 15/360,697 is a Continuation-in-Part of U.S. patent application Ser. No. 14/146,464, filed on May 4, 2016, entitled SYSTEM AND METHOD FOR CREATION OF UNIQUE IDENTIFICATION FOR USE IN GATHERING SURVEY DATA FROM A MOBILE DEVICE AT A LIVE EVENT, which claims the benefit of U.S. Provisional Application No. 62/258,988, filed on Nov. 23, 2015, entitled SYSTEM AND METHOD FOR EXTRAPOLATING STATISTICAL DATA GENERATED FROM A MOBILE DEVICE AT A LIVE EVENT, which is incorporated by reference herein in its entirety. U.S. patent application Ser. No. 15/146,464 also claims the benefit of U.S. Provisional Application No. 62/258,982, filed on Nov. 23, 2015, entitled SYSTEM AND METHOD FOR CREATION OF UNIQUE IDENTIFICATION FOR USE IN GATHERING SURVEY DATA FROM A MOBILE DEVICE AT A LIVE EVENT, which is incorporated by reference herein in its entirety. U.S. patent application Ser. No. 15/146,464 also claims the benefit of U.S. Provisional Application No. 62/258,983, filed on Nov. 23, 2015, entitled METHOD FOR TRACKING ATTENDEE PARTICIPATION IN USING A SOFTWARE APPLICATION AT A LIVE EVENT, which is incorporated by reference herein in its entirety. U.S. patent application Ser. No. 15/146,464 also claims the benefit of U.S. Provisional Application No. 62/258,985, filed on Nov. 23, 2015, entitled SYSTEM AND METHOD FOR USING A MOBILE DEVICE AS AN INPUT DEVICE FOR SURVEYS AT A LIVE EVENT, which is incorporated by reference herein in its entirety. U.S. patent application Ser. No. 15/146,464 also claims the benefit of U.S. Provisional Application No. 62/258,987, filed on Nov. 23, 2015, entitled SYSTEM AND METHOD FOR FACILITATING A PURCHASE USING CARRIER INFORMATION FOR A MOBILE DEVICE, which is incorporated by reference herein in its entirety. U.S. patent application Ser. No. 15/146,464 is incorporated by reference herein in its entirety.

U.S. patent application Ser. No. 15/360,697 also claims the benefit of U.S. Provisional Application No. 62/258,994, filed on Nov. 23, 2015, entitled SYSTEM AND METHOD FOR PROVIDING MOBILE DEVICE SURVEY INTERFACE BASED ON VISUAL INDICIA, U.S. Provisional Application No. 62/258,996, filed on Nov. 23, 2015, entitled SYSTEM AND METHOD FOR GENERATING A DIGITAL IMAGE BASED ON INPUT FROM MOBILE DEVICE TO ALLOW CROWD TO CONTROL VISUAL RESULTS OF RESPONSE, U.S. Provisional Application No. 62/258,989, filed on Nov. 23, 2015, entitled SYSTEM AND METHOD FOR SOCIAL MEASUREMENT OF INDIVIDUALS BASED ON DATA COLLECTED FROM MOBILE DEVICE, U.S. Provisional Application No. 62/258,997, filed on Nov. 23, 2015, entitled SYSTEM AND METHOD FOR CONDUCTING A CONTEST BASED ON INPUT FROM MOBILE DEVICE IN A CROWD-BASED RESPONSE SYSTEM, and U.S. Provisional Application No. 62/258,982, filed on Nov. 23, 2015, entitled SYSTEM AND METHOD FOR CREATION OF UNIQUE IDENTIFICATION FOR USE IN GATHERING SURVEY DATA FROM A MOBILE DEVICE AT A LIVE EVENT. U.S. patent application Ser. No. 15/360,697 also claims the benefit of U.S. Provisional Application No. 62/258,983, filed on Nov. 23, 2015, entitled METHOD FOR TRACKING ATTENDEE PARTICIPATION IN USING A SOFTWARE APPLICATION AT A LIVE EVENT, U.S. Provisional Application No. 62/258,985, filed on Nov. 23, 2015, entitled SYSTEM AND METHOD FOR USING A MOBILE DEVICE AS AN INPUT DEVICE FOR SURVEYS AT A LIVE EVENT, U.S. Provisional Application No. 62/258,987, filed on Nov. 23, 2015, entitled SYSTEM AND METHOD FOR FACILITATING A PURCHASE USING CARRIER INFORMATION FOR A MOBILE DEVICE, U.S. Provisional Application No. 62/258,988, filed on Nov. 23, 2015, entitled SYSTEM AND METHOD FOR EXTRAPOLATING STATISTICAL DATA GENERATED FROM A MOBILE DEVICE AT A LIVE EVENT, and U.S. Provisional Application No. 62/258,990, filed on Nov. 23, 2015, entitled SYSTEM AND METHOD FOR EXTRAPOLATING STATISTICAL DATA GENERA TED FROM A MOBILE DEVICE AT A LIVE EVENT FOR DETERMINING MERCHANTABILITY. U.S. Provisional Application No. 62/258,994 is incorporated by reference herein in its entirety. U.S. Provisional Application No. 62/258,996 is incorporated by reference herein in its entirety. U.S. Provisional Application No. 62/258,989 is incorporated by reference herein in its entirety. U.S. Provisional Application No. 62/258,997 is incorporated by reference herein in its entirety. U.S. Provisional Application No. 62/258,982 is incorporated by reference herein in its entirety. U.S. Provisional Application No. 62/258,983 is incorporated by reference herein in its entirety. U.S. Provisional Application No. 62/258,985 is incorporated by reference herein in its entirety. U.S. Provisional Application No. 62/258,987 is incorporated by reference herein in its entirety. U.S. Provisional Application No. 62/258,988 is incorporated by reference herein in its entirety. U.S. Provisional Application No. 62/258,990 is incorporated by reference herein in its entirety.

U.S. application Ser. No. 15/402,738 also claims the benefit of U.S. Provisional Application No. 62/277,270, filed on Jan. 11, 2016, entitled SYSTEM AND METHOD FOR USING DATA FROM A MOBILE DEVICE SURVEY SYSTEM FOR MESSAGE SELECTION AT A LIVE EVENT. U.S. application Ser. No. 15/402,738 also claims the benefit of U.S. Provisional Application No. 62/277,888, filed on Jan. 12, 2016, entitled SYSTEM AND METHOD FOR FACILITATING A PURCHASE FROM A VENDOR USING CARRIER INFORMATION FOR A MOBILE DEVICE. U.S. application Ser. No. 15/402,738 also claims the benefit of U.S. Provisional Application No. 62/277,941, filed on Jan. 12, 2016, entitled SYSTEM AND METHOD FOR USING DATA FROM MOBILE DEVICES WITHIN A WIRELESS MESH NETWORK. U.S. application Ser. No. 15/402,738 also claims the benefit of U.S. Provisional Application No. 62/277,899, filed on Jan. 12, 2016, entitled SYSTEM AND METHOD FOR BUILDING A SOCIAL MEASUREMENT MATRIX. U.S. application Ser. No.

15/402,738 also claims the benefit of U.S. Provisional Application No. 62/277,903, filed on Jan. 12, 2016, entitled SYSTEM AND METHOD FOR SEASONAL EVENT DEPENDENT REPORTING. U.S. application Ser. No. 15/402,738 also claims the benefit of U.S. Provisional Application No. 62/277,914, filed on Jan. 12, 2016, entitled SYSTEM AND METHOD FOR EVENT BASED INTERACTIVE POLLING. U.S. application Ser. No. 15/402,738 also claims the benefit of U.S. Provisional Application No. 62/277,917, filed on Jan. 12, 2016, entitled SYSTEM AND METHOD FOR DETERMINING COMPARATIVE LIFESTYLE TRIGGERS. U.S. application Ser. No. 15/402,738 also claims the benefit of U.S. Provisional Application No. 62/277,943, filed on Jan. 12, 2016, entitled SYSTEM AND METHOD FOR GENERATING POLLING RESULTS FROM INPUTS PROVIDED AT THE SUPER BOWL. U.S. application Ser. No. 15/402,738 also claims the benefit of U.S. Provisional Application No. 62/277,918, filed on Jan. 12, 2016, entitled SYSTEM AND METHOD FOR USING DATA FROM MOBILE DEVICES WITHIN A GEOFENCE. U.S. Provisional Application No. 62/277,270 is incorporated by reference herein in its entirety. U.S. Provisional Application No. 62/277,888 is incorporated by reference herein in its entirety. U.S. Provisional Application No. 62/277,941 is incorporated by reference herein in its entirety. U.S. Provisional Application No. 62/277,899 is incorporated by reference herein in its entirety. U.S. Provisional Application No. 62/277,903 is incorporated by reference herein in its entirety. U.S. Provisional Application No. 62/277,914 is incorporated by reference herein in its entirety. U.S. Provisional Application No. 62/277,917 is incorporated by reference herein in its entirety. U.S. Provisional Application No. 62/277,943 is incorporated by reference herein in its entirety. U.S. Provisional Application No. 62/277,918 is incorporated by reference herein in its entirety.

This application also claims benefit of U.S. Provisional Application No. 62/305,345, filed on Mar. 8, 2016, entitled SYSTEM AND METHOD FOR PREDICTIVE CONSUMER TRENDS ENGINE. This application also claims benefit of U.S. Provisional Application No. 62/305,354, filed on Mar. 8, 2016, entitled SYSTEM AND METHOD FOR GENERATING REMOTE SOCIAL ANALYTICS BASED ON REGIONALLY LOCATED INTERACTIVE SERVERS. This application also claims benefit of U.S. Provisional Application No. 62/305,349, filed on Mar. 8, 2016, entitled SYSTEM AND METHOD FOR GENERATING LIFESTYLE REPORTS BASED ON LIVE EVENTS. This application also claims benefit of U.S. Provisional Application No. 62/305,408, filed on Mar. 8, 2016, entitled SYSTEM AND METHOD FOR REAL TIME DIGITAL MEASUREMENT. This application also claims benefit of U.S. Provisional Application No. 62/305,417, filed on Mar. 8, 2016, entitled SYSTEM AND METHOD FOR GENERATING TIME SENSITIVE SOCIAL MEASUREMENT. This application also claims benefit of U.S. Provisional Application No. 62/305,420, filed on Mar. 8, 2016, entitled SYSTEM AND METHOD FOR DEVELOPING DIGITAL MEDIA PRODUCTION BASED ON POTENTIAL DECISION TREE. This application also claims benefit of U.S. Provisional Application No. 62/305,427, filed on Mar. 8, 2016, entitled SYSTEM AND METHOD FOR PROVIDING SOCIAL SENSITIVE MEDIA SERVING. This application also claims benefit of U.S. Provisional Application No. 62/305,431, filed on Mar. 8, 2016, entitled SYSTEM AND METHOD FOR DIGITAL MEDIA CREATION BASED ON DETERMINING THE MOST DESIRED PRODUCT FEATURES. This application also claims benefit of U.S. Provisional Application No. 62/316,745, filed on Apr. 1, 2016, entitled SYSTEM AND METHOD FOR SPONTANEOUS EVENT POLLING. This application also claims benefit of U.S. Provisional Application No. 62/319,161, filed on Apr. 6, 2016, entitled SYSTEM AND METHOD FOR GENERATING POLLING RESULTS FROM INPUTS PROVIDED AT A NASCAR EVENT. U.S. Provisional Application Nos. 62/305,345, 62/305,354, 62/305,349, 62/305,408, 62/305,417, 62/305,420, 62/305,427, 62/305,431, 62/316,745 and 62/319,161 are incorporated by reference herein in their entirety.

TECHNICAL FIELD

The following disclosure relates to generally to the interface between advertisers, media companies, leagues, sponsors, underwriters, partners and media partners, leagues, teams, franchises, sponsors, underwriters, media partners, conferences, venue specific messengers, and championships, as well as a target audience, and collecting statistics relating thereto.

BACKGROUND

When advertisers, media companies, leagues, sponsors, underwriters, partners and media partners, leagues, teams, franchises, sponsors, underwriters, media partners, conferences, venue specific messengers, and championships ("the messenger") distribute their advertising with respect to a particular venue, it is important that they have some type of feedback as to the effectiveness of these advertisements. The main problem that exists today in certain venues is that the advertisement is displayed on a screen at, for example, a football game, and it is expected that a certain portion of the attendees are viewing the screen. However, some attendees may have left their seats and gone for refreshments or they may actually, in the current environment, the occupied with their mobile devices. As such, it is difficult for an advertiser to have any feedback as to the "effectiveness" of a particular advertisement at reaching the eyes of the attendees.

BRIEF DESCRIPTION OF THE DRAWINGS

For a more complete understanding, reference is now made to the following description taken in conjunction with the accompanying Drawings in which:

FIG. 23 illustrate a diagrammatic view of an alternate embodiment for offering merchandise for sale;

FIG. 62 illustrates one embodiment of an example database report retrieved from a database in which query and response data is stored;

FIG. 63 illustrates a flowchart depicting one embodiment of a report generation method;

FIG. 64 illustrates one embodiment of an example seasonal database report retrieved from a database in which query and response data is stored;

FIG. 65 illustrates a flowchart depicting one embodiment of a seasonal report generation method;

FIG. 71 illustrates a diagrammatic view of another embodiment of a Predictive Consumer Trends Engine neural network;

FIG. 72 illustrates a diagrammatic view of one embodiment of a Predictive Consumer Trends Engine;

FIG. 73 illustrates a flowchart depicting one embodiment of a predictive consumer trends engine method;

FIG. 90 illustrates a relational database correlating queries with query response window times;

FIG. 91 illustrates a graph showing an example of how responses are correlated with queries;

FIG. 92 illustrates a relational database correlating query responses with response meanings;

DETAILED DESCRIPTION

Figure 1:
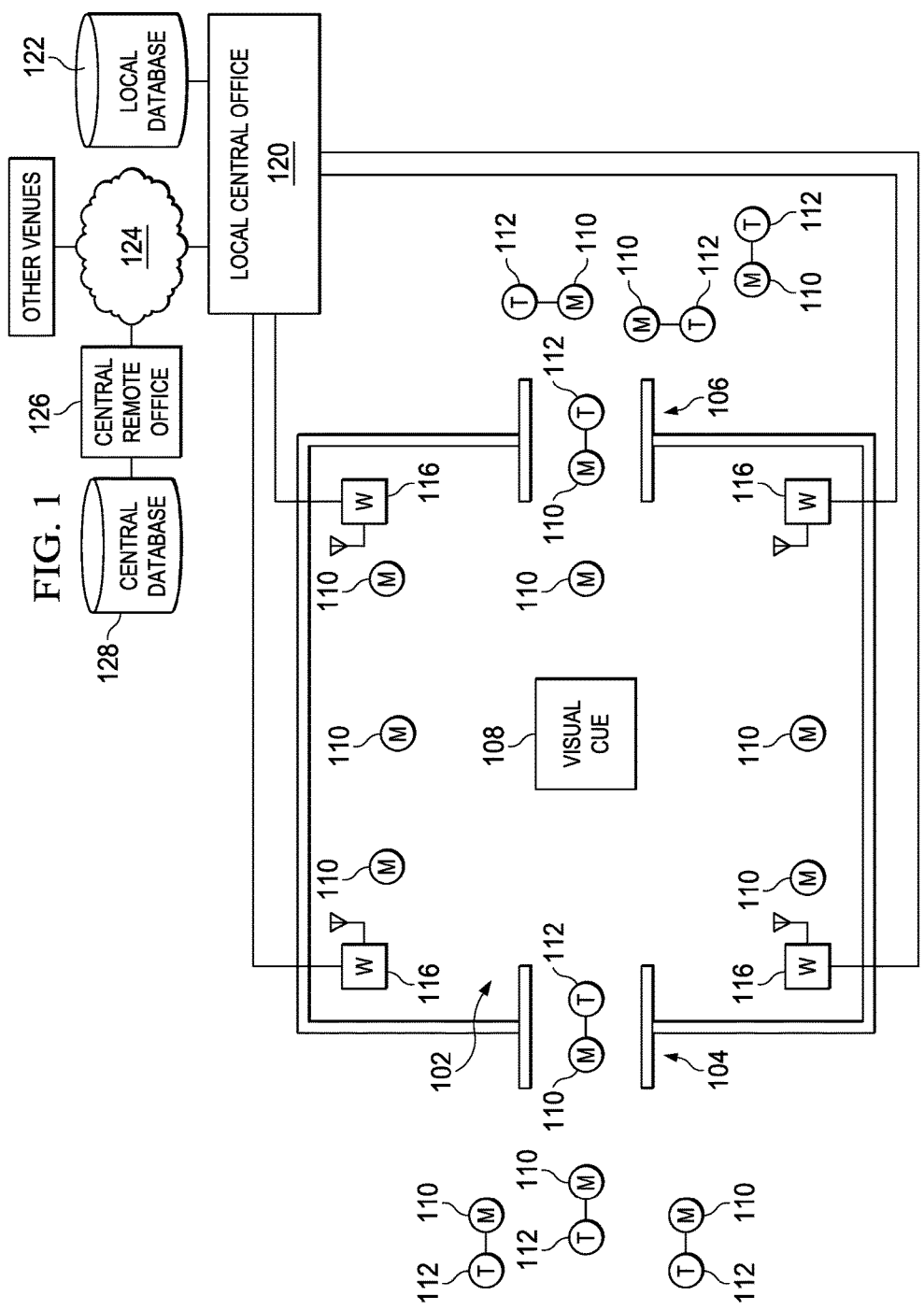
FIG. 1 illustrates an overall diagrammatic view of a venue utilizing a disclosed embodiment.

Referring now to FIG. 1, there is illustrated a diagrammatic view of the overall operation at a particular venue utilizing the disclosed embodiment. In this illustration, there is illustrated a single venue 102, such as a football stadium, a concert hall, or anything that requires a ticket to grant entrance thereto and also provide some type of seating chart such that each ticket holder has a defined seat associated therewith or assigned thereto. This venue 102 has provided therefore, by example, two gates 104 and 106. In the center of the venue 102 or disposed throughout the venue 102 there is provided some type of visual/audio interfaced 108. Throughout the following description, this will typically be referred to as a visual interface providing a visual cue of some sort. However, it should be understood that the cue is some type of information that can be transmitted from one or more locations within the venue 102 in the form of a video or an audio cue or some type of cue that can be sensed by an attendee. Although this visual cue 108 is illustrated as being in the center of the venue 102, it should be understood that it can be located at different locations throughout the venue 102. Additionally, the visual cue from multiple locations could all be the same cue, or it could actually be different cues.

There are illustrated a plurality of Mobile Units 110 labeled "M" which will be referred to hereinafter by the terminology "MU" 110. Each of these MUs 110 is associated with an individual, and that individual has associated therewith a ticket, this ticket referred to by a reference numeral 112. The only MUs that are illustrated as having a ticket 112 associated therewith are those that are entering the gate 104 or the gate 106. Each of these MUs 110 has the ability to communicate via a wireless link to one of the plurality of wireless network receivers 116 disposed throughout the venue 102. These wireless network receivers provide substantially full coverage around the venue 102, and each of the wires receivers 116 are connected directly to a local central office 120 (CO) which basically has a computer that is interfaced with a local database 122. This database 122 and local central office 120 are connected through a global network 124 (Internet) to a central remote office 126, which has associated therewith a central database 128.

The wireless receivers can be any type of wireless receiver network, for example, a Wi-Fi-based network. However, it should be understood that any other type of network could be utilized. Each of these wireless receivers 116 has associated therewith a unique ID in the form of an SSID that can be recognized by the MU 110 and, once a communication link is effected between the MU 110 and the wireless receiver 116, a physical location can be established with respect to the physical location of the venue 102. Since the local central office 120 is aware of its location and it is connected directly to the wireless receivers 116, the location of the venue 102 can be associated with any data in the local database 122. This allows any data associated with the local database 122 to also be associated with any information collected from attendees at the event occurring in the venue 102.

Additionally, the wireless interface between each of the MUs 110 and the local central office 120 could be effected with a mesh network. The communication protocol could use a Zigbee network, a Thread network, or any type of network that allows data to actually be transmitted to a master station to be transferred from one MU 110 to another MU 110.

In the overall operation, as will be described hereinbelow, a particular user will enter the venue 102 and initiate an application on their associated MU 110 which will create a unique ID (UID) associated with that particular device at that particular time based upon information contained on their individual ticket which will also identify the seat to which they are assigned. The user will then provide a response of some sort to possibly a visual cue received locally and send the UID and response to the local CO 120. This will result in a registration of that particular device with the local CO 120. Thereafter, visual cues are displayed on the display 108 with choices. These choices are associated with preset choice buttons on the MU 110 that, when selected, provide responses that are utilized by the local CO 120 for collecting statistics on the attendees.

Figure 2:
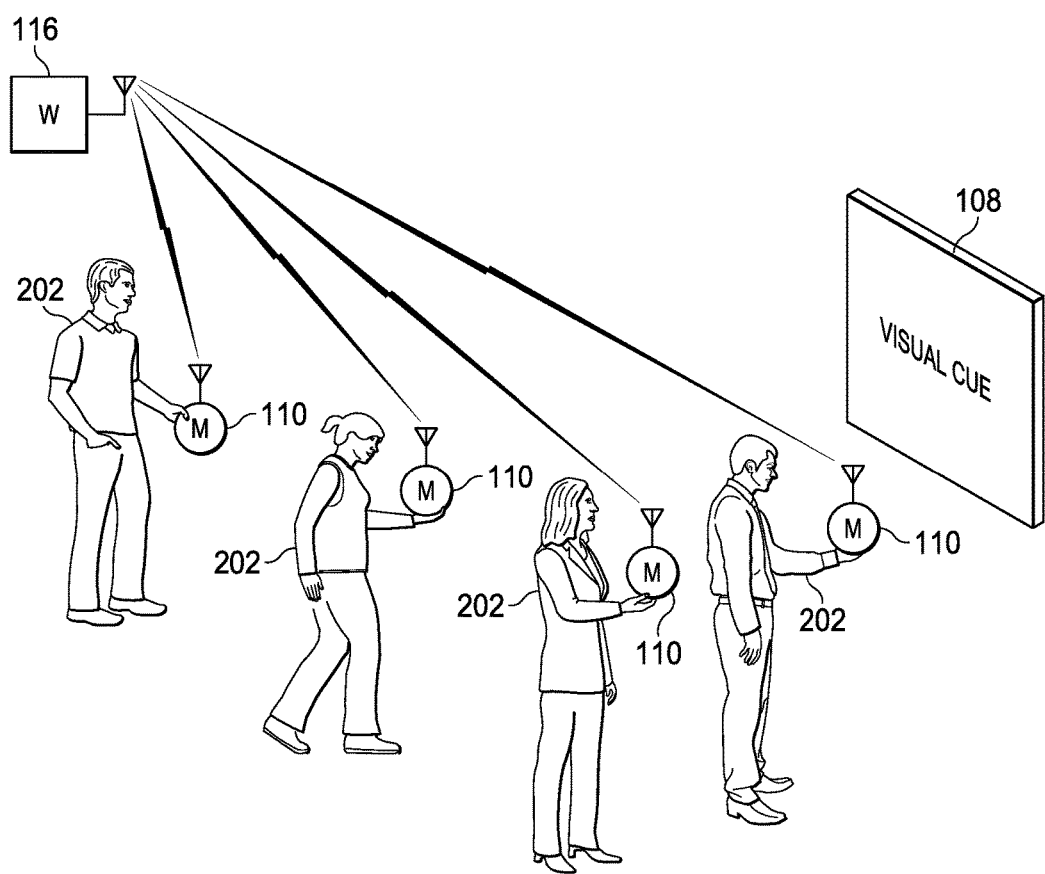
FIG. 2 illustrates a diagrammatic view of multiple attendees interfaced with a screen on which advertisements are presented.

Referring now to FIG. 2, there is illustrated a diagrammatic view of a plurality of individuals 202 with their associated MUs 110. The display 108 is illustrated as providing a visual cue in the form of some type of program, advertisement or the such that will be followed with or associated with a visual cue that, if the individual 102 is viewing the screen and is paying attention to the advertisement, will be enticed to actually make a selection and, upon making a selection, this selection or responses sent back via the wireless receiver 116 two the local CO 120.

Figure 3:
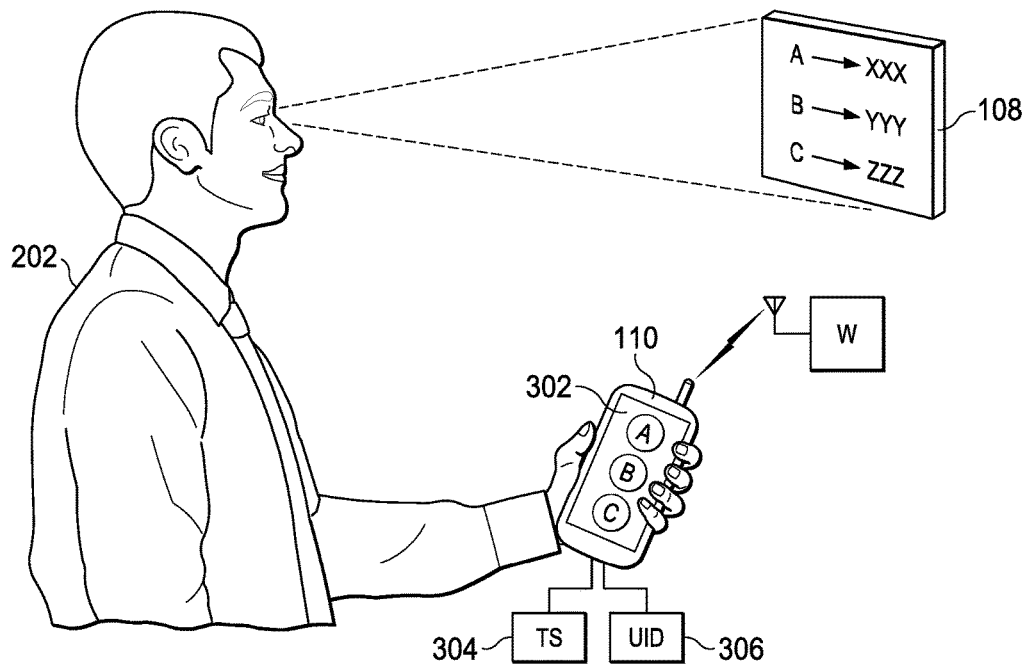
FIG. 3 illustrates a view of a single attendee interfacing with the screen and choices provided thereon and their mobile units and the selections provided thereon.

Referring now to FIG. 3, there is illustrated a diagrammatic view of a single individual presented with three responses on the display 108, these being illustrated as the letter A, the letter B, and the letter C. Each of these is associated with some type of information which allows the individual 202 to discern these particular choices. They may be some type of contest providing different selections. It may be that the particular cue requires a single response just to indicate that the user is paying attention to the screen. For example, it could be a contest that allows a responder the possibility of entering a contest, i.e., "press A on your device to enter your seat number in a lottery to win a certain prize." The MU 110 is provided thereon a screen 302 having those three selected letters available for choices. By placing their finger over one of the selections, the user creates a response that is then combined with a timestamp 304 and the created UID 306 back to the local CO 120 for processing thereof. It should be understood that, once the UID is created by the MU 110, this is now a UID that is carried temporarily in the MU 110 until the MU 110 either leaves the venue 102 or there is some type of timeout period of, for example, two hours.

The result of this overall operation is that a device, once entering the gate and initiating the application, creates a UID on the device that defines that device in a local database. Thereafter, any response can be correlated with the query in the substance of that query as long as the response is sent within a particular time window. For example, a query would be transmitted to the attendees and, during the transmission or slightly thereafter, there is a defined time window within which a response must be made. As such, even though the button associated with the letter A is selected for different queries, it is easy to discriminate in the database what information that particular response was associated with.

Figure 4:
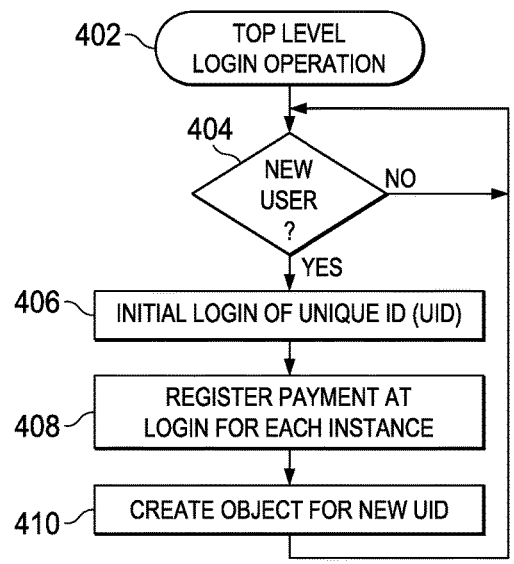
FIG. 4 illustrates a flowchart depicting the top level login operation.

Referring now to FIG. 4, there is illustrated a flowchart of the top level login operation, which is initiated at a block 402. This then proceeds to a decision block 404 to determine if a new user has entered the system. This is typically determined at the gate when the user passes through the gate or when an application is initiated. This may also be determined when a user answers an initial query, in addition to providing the user's seat number. If it is indicated that a new user is present, the program proceeds along a "Y" path to a block 406 to login an initial unique ID (UID) for that device. The program then proceeds to a function block 408 in order to register payment at the login event for each instance of a device passing through the gate or initiating their application. This payment operation will be described in more detail but, in general, the way that revenue is collected on this particular overall operation is that a flat fee is provided for each device that is registered for a particular event. The flat fee may be for any value. Thereafter, all of the data collected, whether the data is voluminous or not is immaterial to the overall revenue-generating model. Thus, then a defined amount of money can be collected depending upon the number of attendees while the advertisement level or volume has no effect on the overall revenue model. However, data is, to a large extent, owned by the central office. After registration of the login instance and the registration of the payment for that instance, a new object is created for that new UID in the local database, as indicated by a block 410. The flowchart then loops back to the beginning.

Figure 5:
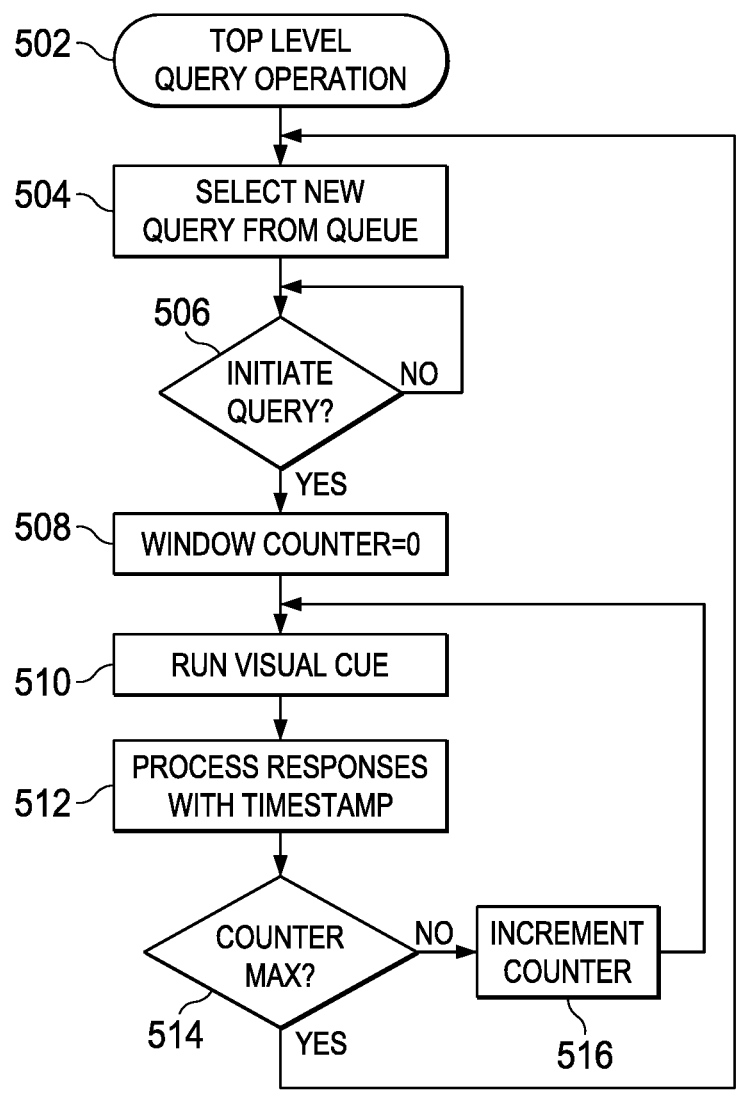
FIG. 5 illustrates a flow chart illustrating the top level query operation.

Referring now to FIG. 5, there is illustrated a flowchart for the top level query operation, which is initiated at a block 502. The program then flows to a block 504 in order to select a new query from the queue of queries. In general, when the system is set up, there will typically be some type of programming control over the information that is presented to the attendees at the event in the venue 102. This will, from overall point of view, allow each query to be independent within the database. However, they will be placed in the queue so that they can be individually selected at particular times and associated with particular advertisements. The program then flows to a block 506 to determine if the query has been initiated, which will occur at a defined time within the overall program schedule. The program then flows to a block 508 in order to set a window counter to a null value. As described hereinabove, each query requires a response to be returned within a defined time window. This actually gives context and meaning to a response. Otherwise, a simple key interface with a defined set of symbols, letters, or numbers would not be possible. In this matter, the letter A can be used multiple times for multiple queries and have a different meaning associated there with any statistical analysis of the overall data structure.

The program then flows to a function block 510 after it has been initiated and sent to a null value to run the visual cue. This way they see some type of advertisement with some type of enticing response required. The program will then flows to a function block 512 in order to process all of the responses received within the window, each of the responses having a timestamp associated therewith such that only responses received with a timestamp within the query window will be logged. The program then flows to a decision block 514 to determine if the counter is a maximum value, i.e., the end of the query time window. If not, the program flows along the "N" path to a block 516 in order to increment the counter and then back to the input of the block 510. This will occur until the counter has reached its maximum value, at which time flowchart will back around to the input of the block 504 to select the next query.

Figure 6A:
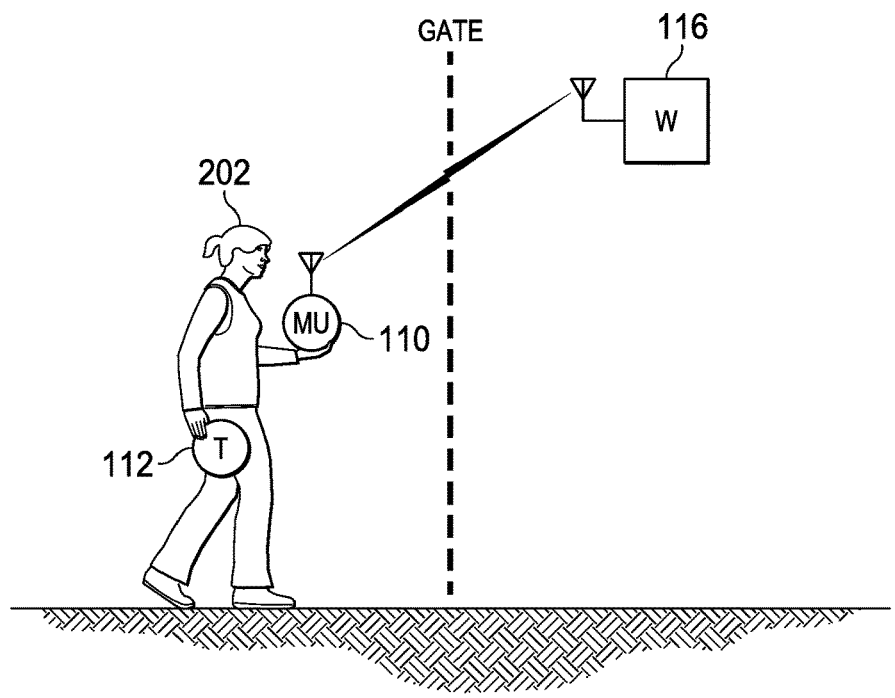
FIGS. 6A-6C illustrate examples of the initial registration when entering the venue.
Figure 6B:
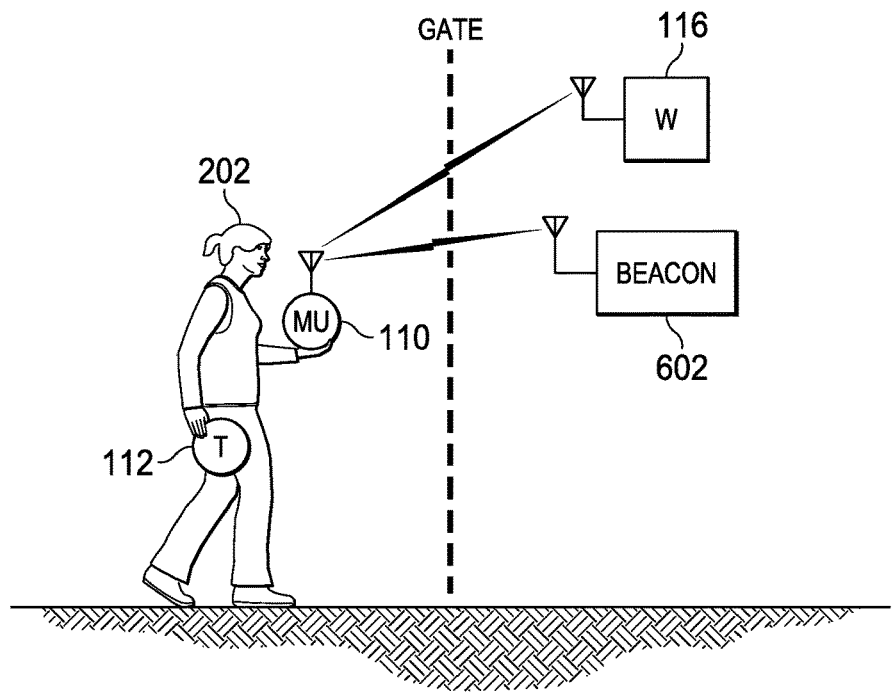
Figure 6C:
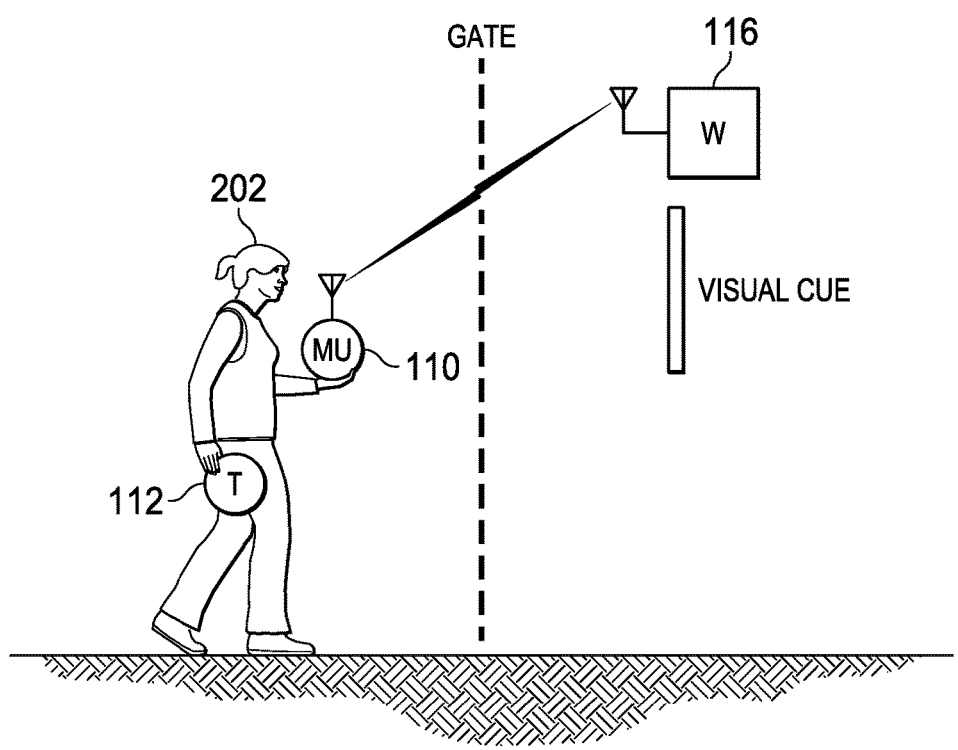

Referring now to FIGS. 6A-6C, there are illustrated three different diagrammatic views of how the presence of an individual 202 is recognized at one of the gates 104 or 106. In the embodiment of FIG. 6A, the individual 202 has the ticket 112 associated therewith, and, upon reaching gate, the individual 202 is prompted by some type of signage or the such to activate their application. Upon activating their application, the individual 202 can be presented with a screen to select a particular response which, when transmitted to the wireless device 116 with the created UID of the MU 110 and information regarding the selected response. As will be described hereinbelow, that is defined as a Response ID (RID). The second embodiment associated with FIG. 6B, the individual 202 is recognized by a beacon 602 which generates a signal that can be scanned by a separate receiver on the MU 110. These typically operate under IEEE 802.15.XX protocol, and they typically have some type of unique ID associated therewith and, in some instances, especially with the beacon, a command structure that allows more than just an ID to be sent. These can be a Bluetooth system or a BLE system or a Zigbee system or other similar systems. The point is that the application running on the MU 110 can recognize this ID and, upon recognizing this ID, can launch the full program and display the screen to the individual 202. The individual 202 then enters the ticket number and the MU 110 then creates the UID and generates a response, i.e., it answers a question which is an initial question, and then transmits this to the wireless device 116 for transmission to the local CO 120 for registration.

In the embodiment of FIG. 6C, there is illustrated an embodiment wherein the individual answers the initial question via some type of visual cue that is presented at the gate. This is a special visual cue that may be permanent. The user must answer this question in order to be registered. The screen of the user may actually display a simple display indicating to the user that they must view this visual cue at the gate and enter it in order to be eligible for a prize. This will prompt the individual 202 to input information from the ticket in additional to answering the response. Again, what is required to register the particular device with the local CO 120 is to generate UID from the ticket and then answer a question and provide one of one or more available responses to that question and forwarded the UID and RID to the local CO 120.

Figure 7:
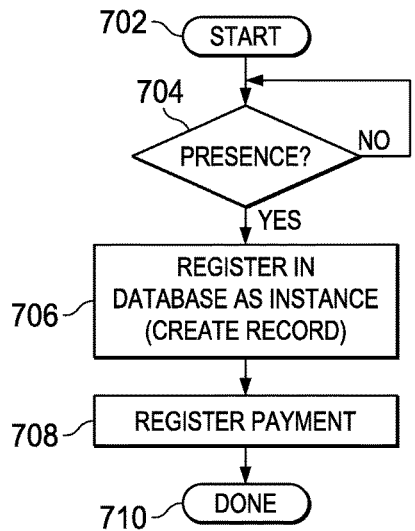
FIG. 7 illustrates a flowchart for the overall registration operation.

Referring now to FIG. 7, there is illustrated a flowchart depicting the overall detection of the presence of an individual at a gate, which is initiated at a block 702 and then proceeds to a decision block 704. This decision block 704 determines if it has detected the presence of a new device entering the venue 102 and, if so, the program proceeds to a function block 706 to register that user in the database as an instance, i.e., it creates a new record for that individual device which, thereafter, when it receives the UID from that device in associated with a response, it can recognize that a particular device has responded. This is important in that, for example, an individual might respond with multiple identical responses to a given query. What is necessary from the messenger's point of view is to know the number of separate devices, i.e., separate UIDs, that responded to a particular query. Thus, every one of the UIDs generating the responses to a particular query with a particular timestamp such that they are associated with that particular query will be logged, such that the messenger can now have a very clear and instant feedback as to the number of individuals actually paying attention to their particular advertisement. For example, if there were 10,000 attendees at an event and 5,000 responded to a particular query, this would indicate to the messenger that their advertisement actually was viewed by 5,000 attendees. Without this system, it is nothing but speculation as to how many of the attendees are actually viewing the advertisement.

The program then proceeds to a function block 708 after registration in the database to basic register a payment, as will be described hereinbelow, to indicate that a new UID has been added to the system. The program then proceeds to the "Done" block 710.

Figure 7A:
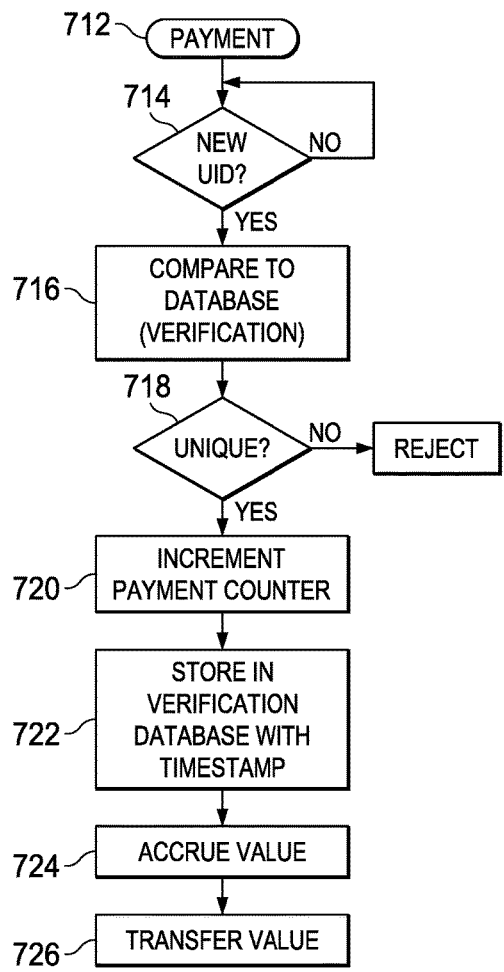
FIG. 7A illustrates a flowchart depicting the payment operation.

Referring now to FIG. 7A, there is illustrated a flowchart depicting the overall revenue model, which is initiated at a block 712 and then proceeds to a block 714 to determine if the new UID has been created. It should be understood that it is possible for an individual 202 to input the wrong seat number and, as such, duplicating another seat number that is already been entered into the system. If the UID is associated only with the seat number, there could be a possibility of a duplicate. If it is a new UID, the program proceeds to a function block 716 to determine if there is a duplicate in the database due to the input of a wrong seat number or such. This is the local database or the verification database. Program then proceeds to a decision block 718 to determine if it is unique and, if not, it rejects and, if so, it proceeds to a function block 720 to increment a payment counter. This payment counter information is stored in the verification database with a timestamp for the particular increment, as indicated by a block 722, and then the program flows to a block 724 in order to accrue the value and into a block 726 in order to transfer value.

Figure 8:
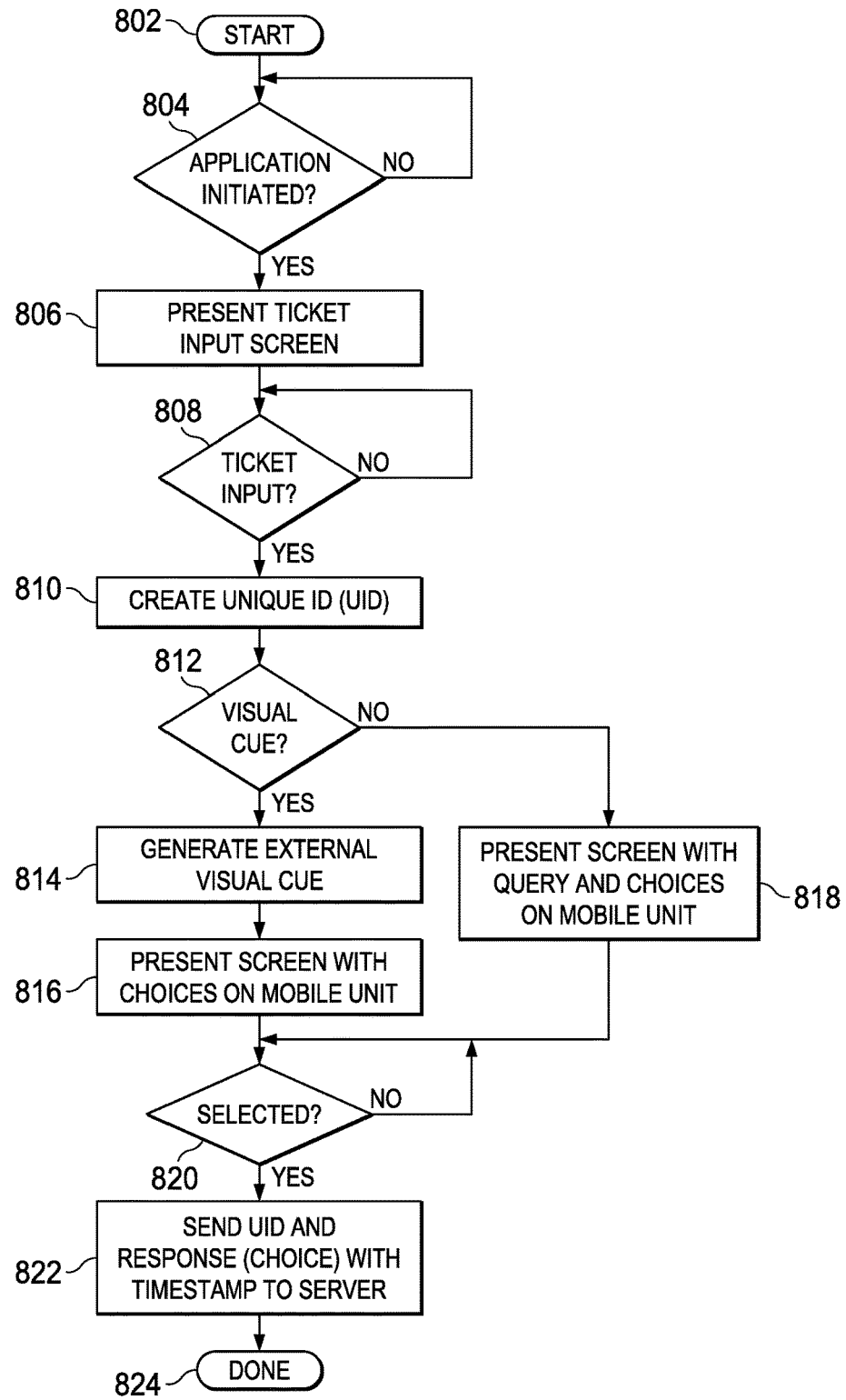
FIG. 8 illustrates a flowchart depicting the overall operation of creating the unique ID.

Referring now to FIG. 8, there is illustrated a flowchart depicting the operation at the MU 110, which is initiated at a block 802 and proceeds to a decision block 804 in order to determine if the application on the MU 110 has been initiated. If so, the program flows to a block 806 to present the ticket input screen to the individual 202. The program then flows to a decision block 808 to determine if the ticket information has been input. As noted hereinabove, that input is basically the section, row, and seat information that is typically on the ticket. However, any information that is unique to the ticket can be provided as input information. One advantage, however, of having the actual "physical" location of an individual is in a situation where in a prize is delivered to that individual as a result of some response. It may be that query is to require the individual to continually "tap" their response key at a rapid rate and for a long duration of time and the individuals that exceed a particular threshold will be awarded, for example, a T-shirt. This can then be delivered to their seat.

After the information on the ticket has been acknowledged as having been input, the program flows to a block 810 in order to create the unique ID (UID) on the device itself. This UID, as described hereinabove, is basically the information regarding the section, row and seat information associated with the ticket, in one example. This is created on the device and stored on the device as a local value. The program then flows to a decision block 812 in order to determine if the next step, the requirement that a response be provided, is to be provided by a visual cue. The visual cue could be a sign at the gate that indicates to the individual that they are to initiate their application on their device and then depress "1" for an indication of the Male gender and, for indication of the Female gender, depress "2" when the display of the potential or available response buttons is displayed to the individual. Of course, the display will only be displayed after the operation is initiated. This is the process that is associated with the "Y" path which flows to a function block 814 to generate external visual cue, either in real time or as a fixed display, and then the program flows to the function block 816 to present the screen or display with the various choices on the user's device. If, alternatively, no visual cue is provided externally, the user is presented on their device with a screen that provides a choice with a query, such as "select your gender" with only two choices provided, "1" for the gender Male and "2" for the gender Female, as indicated by block 818. Once user has selected one of these two, then the application will shift into the full response mode and a full-screen of all available responses will be displayed, as will be described hereinbelow.

The program then proceeds to a decision block 822 to determine if the selection has occurred, and, if so, the program proceeds to a function block 822 in order to send the created UID and that the response code (RID) along with a timestamp to the server and in the program proceeds to Done block 824.

Figure 9:
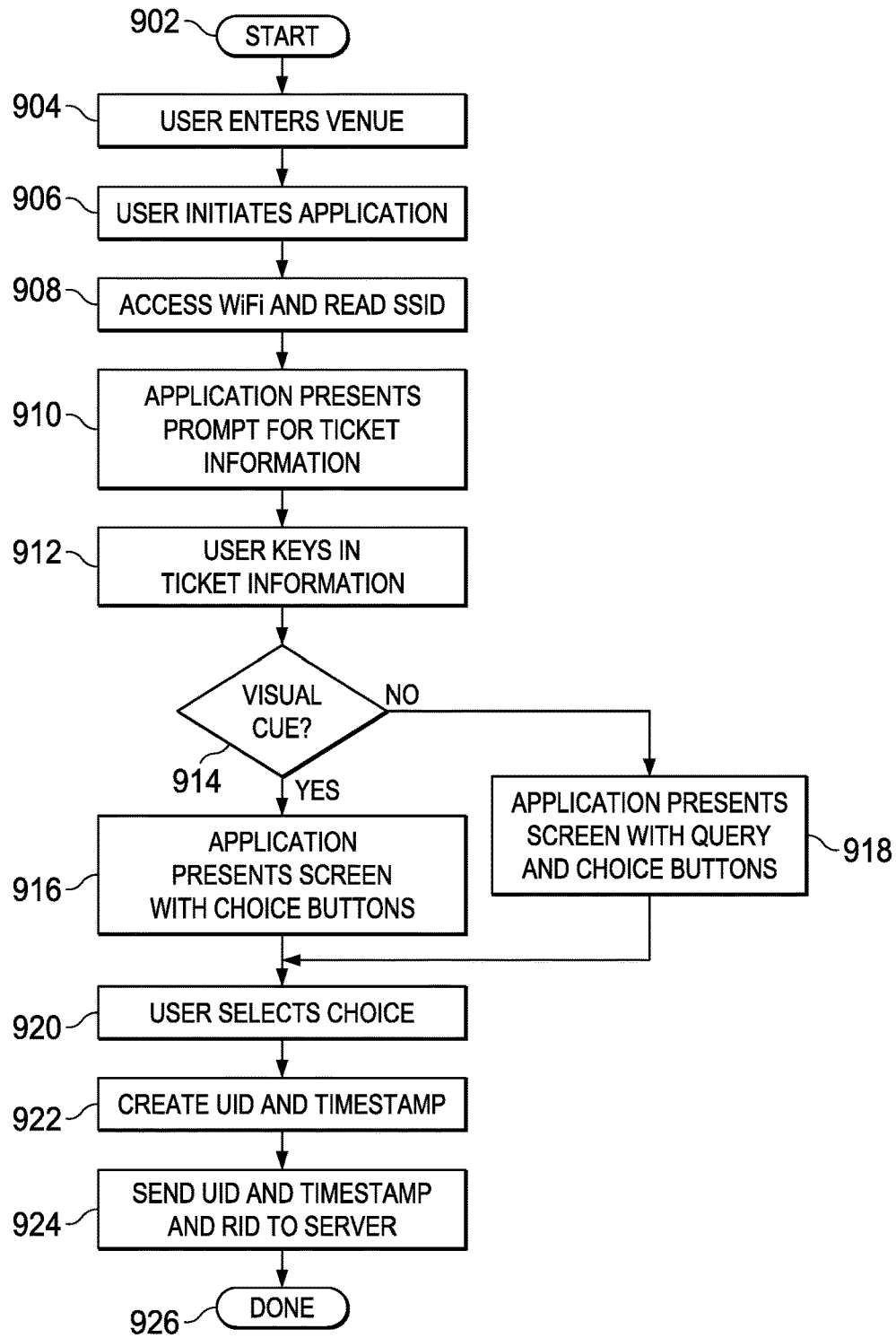
FIG. 9 illustrates a flowchart depicting the operation of creating the unique ID at the user's device.

Referring now to FIG. 9, there is illustrated a flowchart depicting the overall operation of the user entering the venue and the overall operation. The program is initiated at a block 902 and then proceeds to a block 904 wherein the user enters the venue. Once the user enters a venue, the user then initiates the application, as indicated by block 906, which, as described hereinabove, can be initiated by the user, or some external device such as a scanner or gate beacon or the such can be utilized to automatically activate the application upon passing a gate. When the application is initiated, it will access the network and determine the SSID or some similar identification information associated with the network from the network, as indicated by block 908. The application will present to the user a prompt for ticket information, as indicated by block 910. The program then flows to block 912 wherein the user will key in the ticket information. However, alternatively, there could be provided the ability of the user's device to actually scan the ticket with the camera which will allow the camera to extract unique information there from. The unique information could be, in the one disclosed embodiment, the section, row, and seat information associated with the ticket or could be some unique code on the ticket. As long as this information is unique as to all other individuals bearing a ticket, this will facilitate the operation of the overall disclosed embodiments. Once the ticket information has been input, this allows the unique UID to be created with that information. The program then flows to a decision block 914 in order to determine if there is a visual cue. If there is a visual cue, the application will present the user with choice in block 916 providing choice buttons associated with a particular visual cue that are necessary in order to respond to the visual cue. If no visual cue is presented externally, the program will flow to a block 918 to present the user with a screen having both a query and the choice buttons associated there with. Once the choice has been made, as indicated by a block 920, the program flows to a function block to 922 in order to create the UID with a timestamp and then sends the UID and the timestamp in association with the RID to the server, as indicated by block 924. It should be noted that each available choice will have some code associated there with. As will be noted here below, there are a limited number of available choice buttons that will be provided to user. These will typically be limited to 40. Thus, a five-bit code is all that is required in order to support this number of available choices. Thus, the RID will be a code from 1-40 in binary form. This is a relatively small amount of information to be provided in a transmission. The program will flow to a "Done" block 926.

Figure 10A:
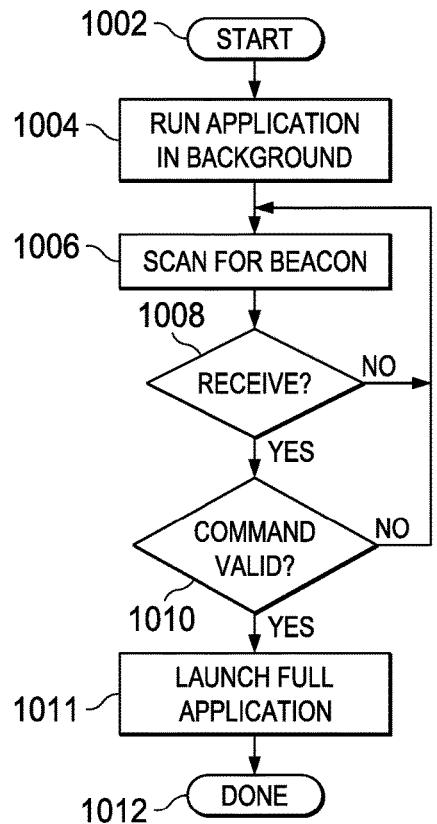
FIGS. 10A and 10B illustrate flowcharts for launching the application based on a presence determination at the gate of the entrance.
Figure 10B:
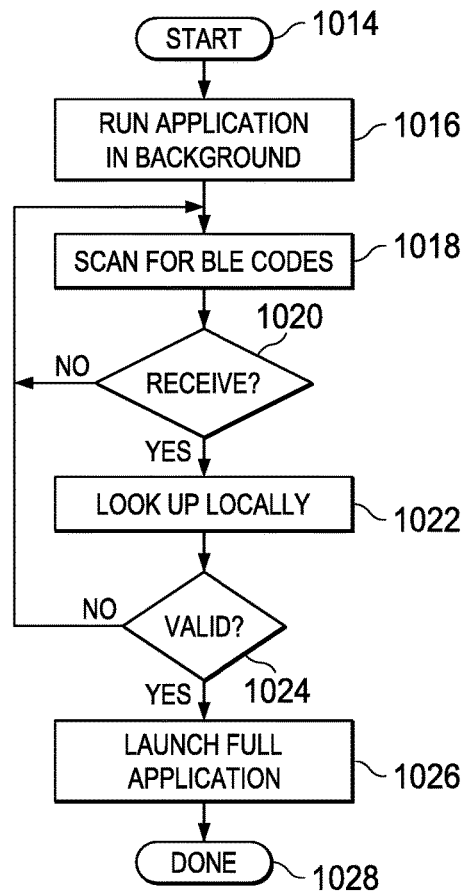

Referring now to FIGS. 10A and 10B, there are illustrated flowcharts depicting the operation of presence recognition operation for determining when a device, an MU 110, is passing through a gate. Referring specifically to FIG. 10A, the program is initiated at a block 1002 and then proceeds to a block 1004 to run the application in the background. In this mode, the full application is not running but, rather, a background application that performs a "sniffing" operation for known signals on one of the multiple radios that may exist within the device. For example, some devices will have a cellular transceiver interfacing with the cell network, and 802.15.4 radio for interfacing with Wi-Fi, a Bluetooth transmitter and maybe a Zigbee transmitter. Additionally, a thread transmitter may also be provided for interfacing with these types of devices. This background application merely looks for the presence of one of these transmitting devices external to the device in order to read its identifying information. This is unique to that device and can be, through a lookup table locally on the device, utilized to take some action such as launching the full application.

The program proceeds to a function block 1006 in order to scan for, in this example, a beacon. A beacon is typically at a transmitting device that not only has a unique ID but also transmits data along with its transmission. This is a one-way transmission and does not require any type of handshake in order to receive the information. Some technologies, such as Bluetooth, do require "hearing" in order to receive information from the transmitting device. The program then proceeds to a decision block 1008 in order to determine if any beacon information has been received. If so, the program flows to a decision block 1010 to determine if any information received from the beacon, such as a command, is a valid command which can be operated on by the background program or application. If not, the program flows back to the input of function block 1006. If the command is valid, the program flows to a function block 1011 in order to launch the full application and then to a "Done" block 1012.

Referring now to FIG. 10B, there is illustrated a flowchart depicting the use of a BLE transmitter. The BLE transmitter is a device that can not only send a unique identifier but also transmit information without requiring "pairing." Program is initiated at a block 1014 and then proceeds to a block 1016 in order to run a background application for the sniffing operation. The program then flows to a function block 1018 in order to scan for BLE codes, i.e., the unique identifier. The program flows to a decision block 1020 to determine if such has been received and, if not, back to the input of function block 1018. Once received, the program flows to a function block 1022 in order to lookup the code locally. If the code, stored in a local database, is valid, this indicates, via a decision block 1024, that the code is a recognizable code, i.e., one that is associated with the overall operation of the system. If so, the program flows to a function block 1026 in order to launch the full application and then to a "Done" block 1028.

With the automatic recognition of an external transmitter with a small local transmission range disposed at an entrance gate, all that is required for an application to be launched is just a recognition of the presence of a particular device within the transmission range of a beacon or similar type transmitting device. This, of course, only initiates the application. There is still a requirement that the individual viewing the screen, which is typically achieved by some type of audible tone or prompt, is to provide some type of response. As noted hereinabove, that response may be a response to a query actually output by the device, which indicates that at least the individual is looking at their phone and interfacing with the application. It could be that the response is in response to viewing some type of visual cue local to the gate. This visual cue could be a "fixed" visual cue or it could be a time varying visual cue. With a time varying visual cue, the timescale that is provided on the response that is sent can be utilized to verify that this response was activated at the gate as opposed to somewhere else. Of course, that necessitates that, not only does the unique ID have a timestamp associated with it at the time it was created, but also that the response to the visual cue be timestamped.

Figure 11:
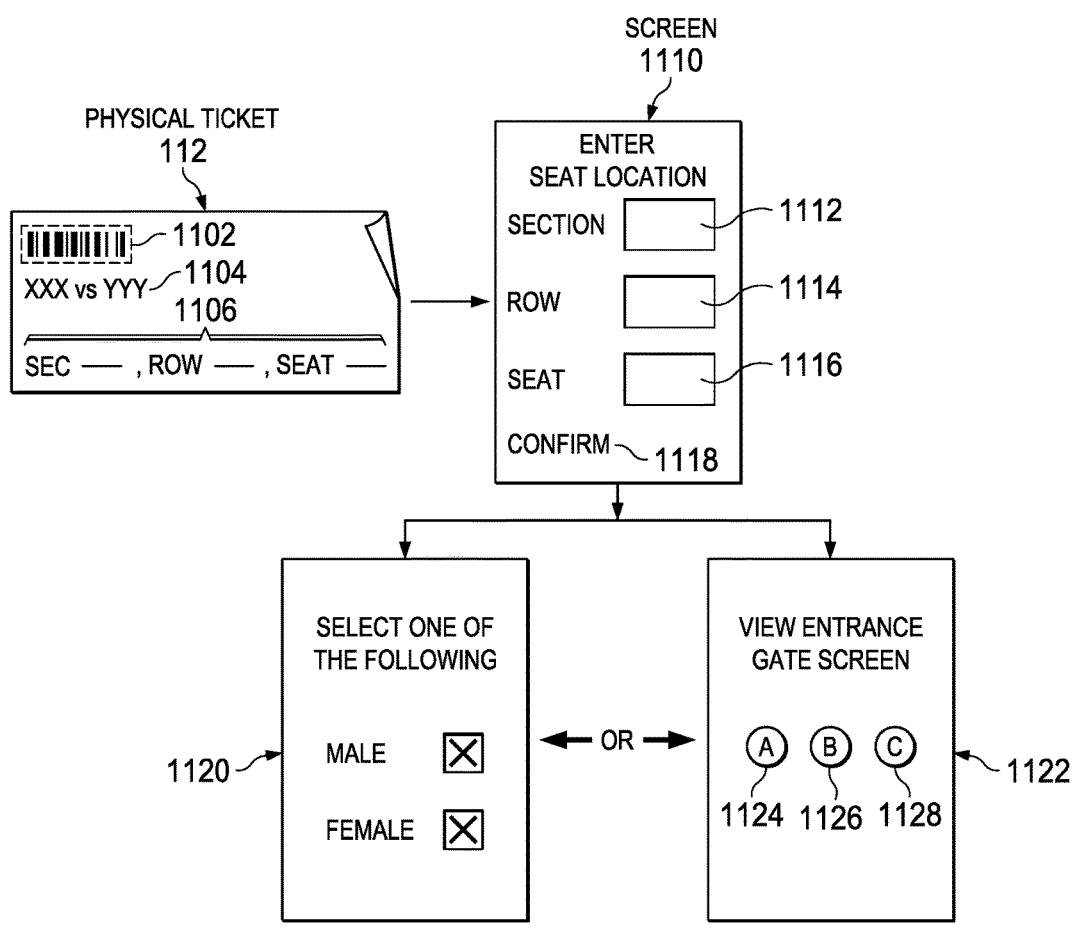
FIG. 11 illustrates a diagrammatic view of the screen interface with the user for entering the ticket information and creating the unique ID.

Referring now to FIG. 11, there is illustrated a diagrammatic view of the initial screen display to the user of the MU 110. As described above, there is provided a ticket 112 that has associated therewith multiple fields. There is provided with some type of unique barcode 1102, information about the event 1104 and also the seat and row information in a field of 1106. In the disclosed embodiment, the section, row and seat information is what is input. The screen provided is represented by a reference numeral 1110 and displays a text prompt to the user to enter the information regarding the section, the row and the seat in fields 1112, 1114 and 1116, respectively.

Once the user enters this and selects a "Confirm" field 1118, then this information is utilized to create the unique ID as described hereinabove. Then one of two events will happen. The first is that a screen 1120 will be displayed that basically provides a query requesting the selection of one of two choices, in this example, either a Male or a Female gender. By selecting one of these two, a response can be generated that actually provides information to the database as to the gender of the individual. Interestingly enough, as will be described hereinbelow, this provides to the messengers information regarding the gender of each unique ID (UID) that is in the system. However, studies suggest that a certain percentage of the individuals will make a mistake on their entry for whatever reason in a certain number of individuals will actually put the wrong answer in. Thus, what will be indicated to the messengers is that statistically this person is one gender or the other, but this is not a 100% indication.

The other aspect of it will be the presentation of a screen 1122 which prompts the user to view some type of screen that is proximate to the entrance gate. The screen is utilized for the purpose of providing the first query which is required in order to actually create the entry into the database of the UID for that particular device. There is presented in this screen 1122 various response fields, in this example, 3 response fields, 1124, 1126 and 1128. In this example, there would be provided a viewable screen that provides some type of query requiring the selection of one of three selections as the response. These responses, in addition to allowing registration of the UID in the database, also provide some statistical information about a person associated with that UID.

Figure 11B:
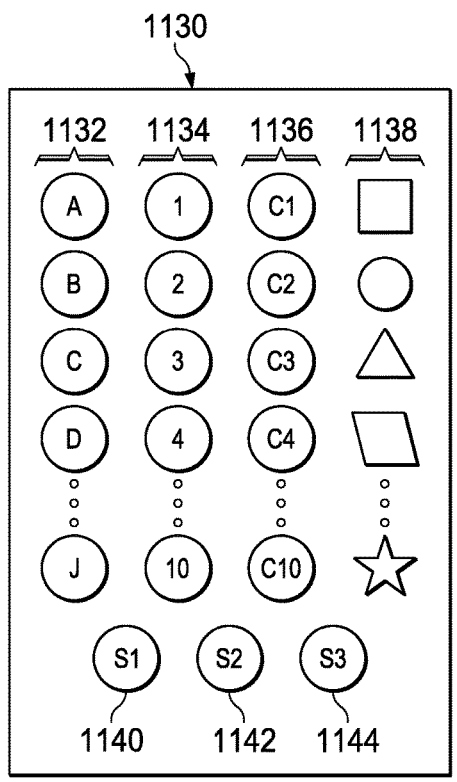
FIG. 11B illustrates a screen view illustrating the fixed selection of possible response buttons provided to a user.

Referring now to FIG. 11B, there is illustrated a depiction of an actual screen that is provided after registration of the UID for providing responses to various queries. This screen is represented by reference numeral 1130. This screen 1130 provides a fixed number of displayed response codes. There are provided a first column 1132 of output alphabetical characters, the first 10 characters of the alphabet from A through J. There is provided a second column 1134 for the first ten numerical characters from 1 through 10. There is provided in a third column 1136 the first 10 of the primary colors, each color represented in a circular button. There are provided in a fourth column 1138 ten basic shapes such as a square, a circle, a triangle, etc. Thus, there are provided 40 fixed characters that will always be provided on the screen. None of these characters is dedicated to any particular response to any particular character. When building a query, designer of that query actually maps a particular response key to the database and the definition of a desired response, as will be described hereinbelow. All that is necessary is to provide a simple code for each one of these buttons. Thus, only a five-bit code is required to provide the code for each of the buttons. For example, it may be that the first query has two responses that are presented, "A" and "B." In the database, it may be that this particular query determines that the people answering the query with a "A" response have a likelihood of being 60% Male and the people answering the query with a "B" response have a likelihood of being 60% Female. First, the fact that they answered with either response indicates that there looking at the screen and this is important information to have. A further refinement of the response can be provided by mapping a particular response to certain statistical records. This will be described in more detail herein below.

There are also provided three response buttons 1140, 1142 and 1144, respectively, that are not responses that can be mapped into the database outside of the MU 110. These buttons 1140-1144 are provided for another function, and the function is to allow interface with the internal application in response to a visual cue, which will be described hereinbelow.

Figure 12:
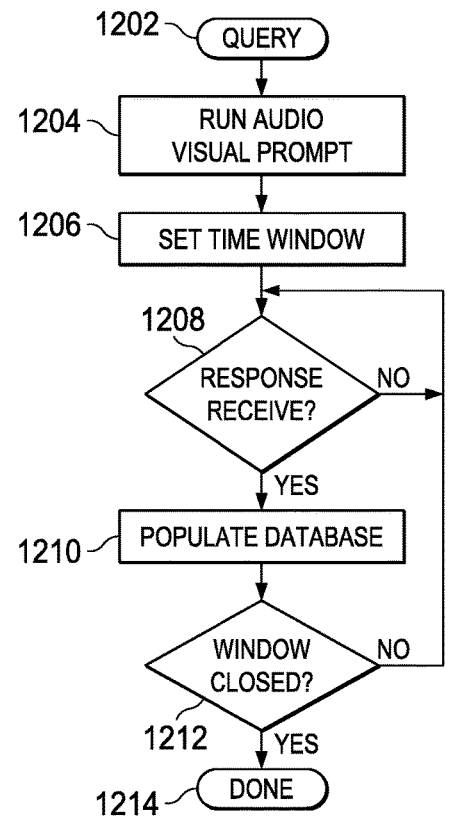
FIG. 12 illustrates a flowchart depicting the query operation for generating a query for viewing by the user.

Referring now to FIG. 12, there is illustrated a flowchart depicting the operation of running a query at a top level. This program is initiated at a block 1202 and proceeds to a block 1204 in order to run the audio or visual prompt. The program flows to a function block 1206 in order to set the time window within which a response is to be received for that particular query. The program then flows to a decision block 1208 to determine if any responses have been received and, if so, then to a function block 1210 in order to populate the database with a response, which just indicates that this particular MU 110 via its UID is actually associated with a person looking at the prompt. The program then flows to a decision block 1212 to determine if the time window has closed for receiving responses. If not, the program will continue to loop back to the input of the decision block 1208 until the time window is closed for that particular query, at which time the operation is terminated at a "Done" block 1214.

Figure 13:
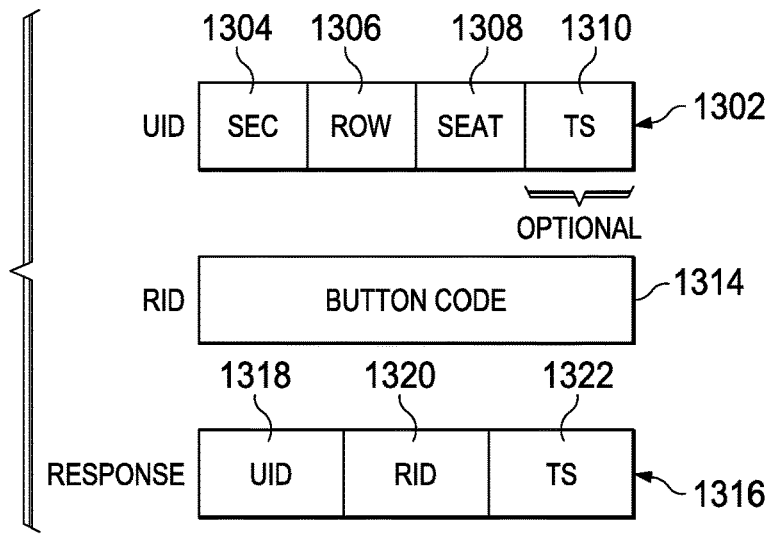
FIG. 13 illustrates the data structure of information assembled at and transmitted by the Mobile Unit.

Referring now to FIG. 13, there is illustrated a diagrammatic view of the various data structures generated by the MU 110 during registration and operation. In a first data structure 1302, there is illustrated the various data fields for the UID. They are defined as a first field 1304 associated with the section, a second field 1306 associated with the row and a third field 1308 associated with the seat. A fourth section 1310, an optional section, is associated with a timestamp that can be utilized at the time of the creation of the UID to uniquely define it in the event that somebody else actually this enters their seat number, for example. This is not a timestamp that is used for identification of the time at which the UID is transmitted but, rather, just additional information to make the UID more unique. Of course, it could also be utilized for the purpose of determining the time in which the UID was created. This particular data structure requires very little data bandwidth to transmit such, as the information contained in there is minimal.

For the second data structure, a data structure 1314 is provided for the button code for the response, which, as noted above, is the response ID (RID). This is a five bit code. The actual response that is sent is illustrated by a data structure 1316, which is comprised of a first data field 1318 having associated therewith the UID, a second data field 1320 associated with the RID, a third data field 1322 associated with a timestamp, TS. This field 1322 is actually the timestamp that is generated when the response is actually created as compared to the timestamp infield 1310 that further defines the UID as unique. Overall, this response data structure 1316 is all that is required to be transmitted in response to seeing a visual cue. There is no two-way communication that is required between the server and the MU 110, thus reducing the overhead load on the network traffic. Thus, for example, if the response data structure 1316 required three bytes of data, 10,000 participants viewing a visual cue and responding thereto would only transmit 30 Kbytes data within the window. If that window defined by the query was open for just one second, there would be required a minimum bandwidth of 30 Kbytes/sec, which is well below the lowest bandwidth Wi-Fi connection to any network. Thus, if one of the responses was to see how many times any individual associated with a UID could "tap" a particular response button, it would still be difficult, with the human response time, to exceed any practical bandwidth limit in a network. It is a minimization of overhead and the production of the actual data that is required to provide information to an messenger. Again, what is provided by the response button is both an indication of "eyes on the screen" and also some back end statistical data.

Figure 14:
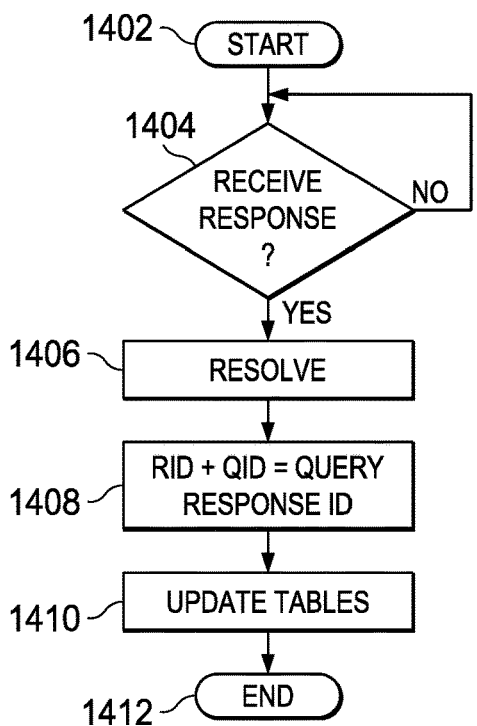
FIG. 14 illustrates a flowchart for a server receiving a response.

Referring now to FIG. 14, there is illustrated a flowchart for the server receiving the response, which is initiated at a block 1402 and proceeds to decision block 1404 in order to determine if a response has been received. When received, the program flows to a function block 1406 in order to resolve the particular response. What has been received at this point is a response having a UID, and an RID and a timestamp. What is resolved is, knowing the time window, the presence of a unique code which is a combination of the RID and QID (query ID), is indicated by function block 1408. This combination, as will be described hereinbelow, is a unique ID that can be utilized for back end statistical analysis. The UID is also resolved and is utilized to indicate that a particular UID has responded (noting that any time that response is referred to as being responded by UID, this also means that it is being responded by MU 110). If the query, for example, just wanted to know how many individuals are looking at the screen in response to a particular query, any response received, whether it be multiple responses or a single response, during the time window associated with the query will provide an indication, for for all received UIDs, of the number of individuals that paid attention to the query, and all that is required to resolve this particular query into any useful information is the UID. By looking at the combination of the unique RID plus QID, further information can be determined to resolution associated with other tables mapped to this particular query and response. The program will then flow to a function block 1410 in order to update various tables and into and "End" block 1412.

Figure 15:
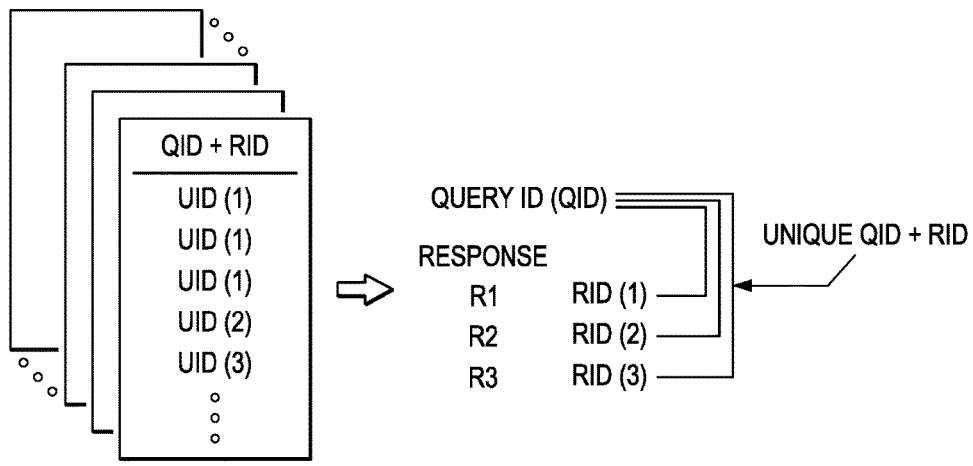
FIGS. 15-18 illustrate diagrammatic views of the various records that are generated and populated in the local database.

Referring now to FIGS. 15-18, there are illustrated diagrammatic views of how the tables are generated for various combinations of RIDs for a particular query ID (QID). For example, for a given query, there may be three responses provided, R(1), R (2) and R(3). It may be that the query presented to the individual is the choice of responses "A," "B," and "C." These particular response codes will be mapped to some type of information associated with that response. For that response, i.e., for the first response in association with a particular QID, QID+R (1), this combination being a unique ID that defines a unique object or table within the database for this combination. Thus, within this particular table associated with that unique ID, the particular UIDs that responded as such can be contained therein and each of these UIDs will provide pointer back to the actual UID record associated with that UID. FIG. 15 illustrates these particular tables.

Figure 16:
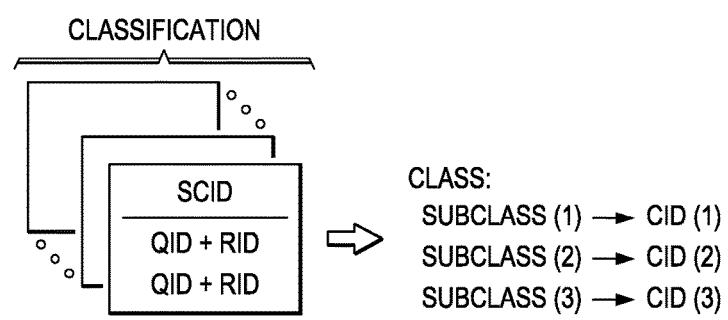

In FIG. 16, there is illustrated a further refinement of the information. As will be described hereinbelow, queries can be provided with information associated with classifications. For example, there may be a classification of "gender." This would have the sub classification, at its highest level, of male or female. Classification would have a classification ID of CID and the sub classification would have a unique ID of SCID. For example, take the example of gender. This can be so classified into possibly ten different analytical "bins." The system could be designed such that a prior knowledge of a particular generated query could be resolved into ten different percentage classifications, one wherein the gender is classified as follows:

| |
| --- |
| 10% F/90% M |
| 20% F/80% M |
| 30% F/70% M |
| 40% F/60% M |
| 50% F/50% M |
| 60% F/40% M |
| 70% F/30% M |
| 80% F/20% M |
| 90% F/10% M |

Figure 17:
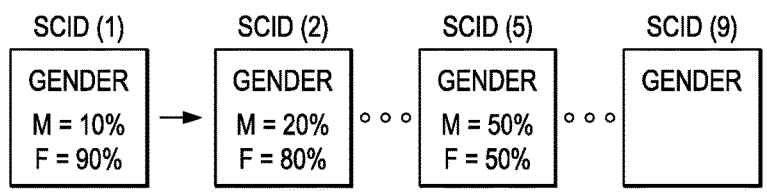
Figure 18:
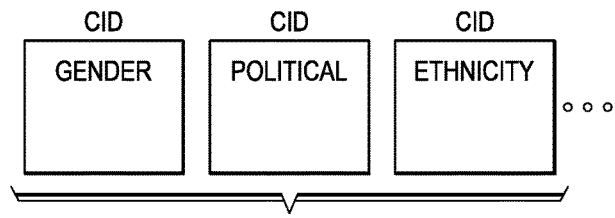

Thus, a particular response can actually be mapped to one of these statistical bins. This would thus require that the designer of the query understand that when a particular individual responds with the particular response, this will indicate to the database that, for example, 80% of the respondents are female. Each of these particular sub classifications can be mapped all the way back to the UID and the QID+RID unique code. This is illustrated in FIG. 17. The actual CID is illustrated in FIG. 18, indicating that there can be one CID for gender, one for political affiliations, one for ethnicity, etc. By utilizing prior information known to the designer of the query, each response can be mapped to multiple different classifications and sub classifications, such that just the response provided by any MU 110 can be resolved into information regarding the particular individual that responded to such. Certain information can be determined as to their gender, as to the political affiliation or as to their ethnicity and other such information.

Figure 19:
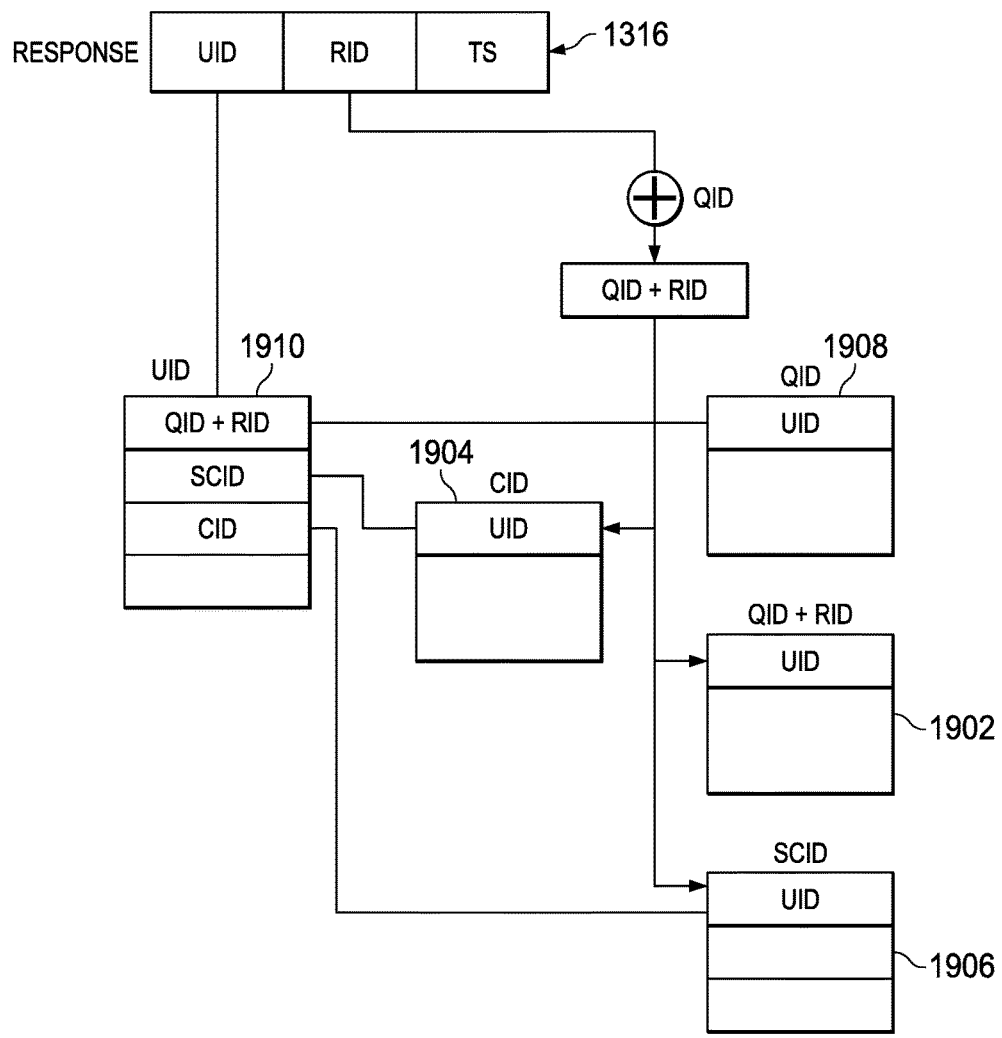
FIG. 19 illustrates a diagrammatic view of the overall relationship between multiple records and unique IDs in the system.

Referring now to FIG. 19, there is illustrated an additional diagrammatic view of how the mapping occurs. The additional response data structure 1316 is resolved such that the UID will define a UID data record or object that is to be updated with the various information provided by the analysis and the mapping of the responses. The resolving technique defines, with the response and the query in which the response was received, the unique ID for the QID+RID denoted in a table or object associated therewith. This is a table 1902, which is updated with the particular UID that responded with that particular response code. This QID+RID unique code is mapped to a CID table 1904 to place a pointer to the UID therein. This also points to an SCID table 1906 such that the UID can be placed therein. There's additionally a QID table 1908 that has the particular UID associated with this response placed therein. Thus, by looking at any one of the tables associated with the UID table, all of the UIDs that were associated with a particular response for the QID will have a reflection of the number of UIDs that responded as such. If, for example, one wanted to know how many UIDs responded to just the gender question where either response indicates some information about gender, one need only look at the CID table 1904 associated with that particular response, i.e., the one to which the QID+RID unique code was mapped to. If one wanted to look at how many respondents replied to the particular query, all that is required is to look at the QID table 1908 and this will give a total of all of the UIDs that responded to the query. There is knowledge, of course, as to how many total UIDs are in the system or are present at the event. If, for example, at halftime of a basketball game, any query was presented to the attendees and a response resulted in a 40% response, this would indicate to the messengers that 40% of the attendees were viewing the screen. Some information can be gleaned from this information. However, this provides an actual real time indication to the messengers of the fact that they were able to have 40% of the attendees with "eyes on the screen."

Figure 20:
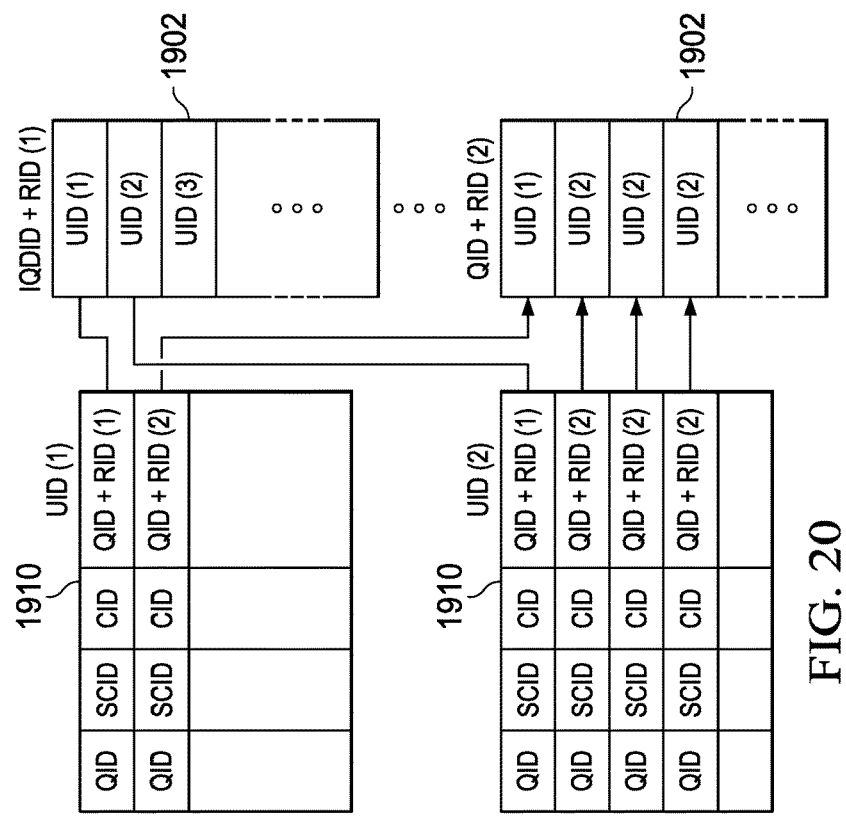
FIG. 20 illustrates a detail of the records illustrated in FIG. 19.

Partly referring now to FIG. 20, there is illustrated a more detailed diagrammatic view of the mapping operation. It can be seen that, for each UID in table 1910 that each UID has associated therewith a QID, an SCID, a CID and a QID+RID. There is shown the mapping to the table 1902 which shows multiple UIDs mapped thereto. There are illustrated two UID tables flanking 1910 Thereto. These tables also mapped to a second QID+RID table 1902.

Figure 21:
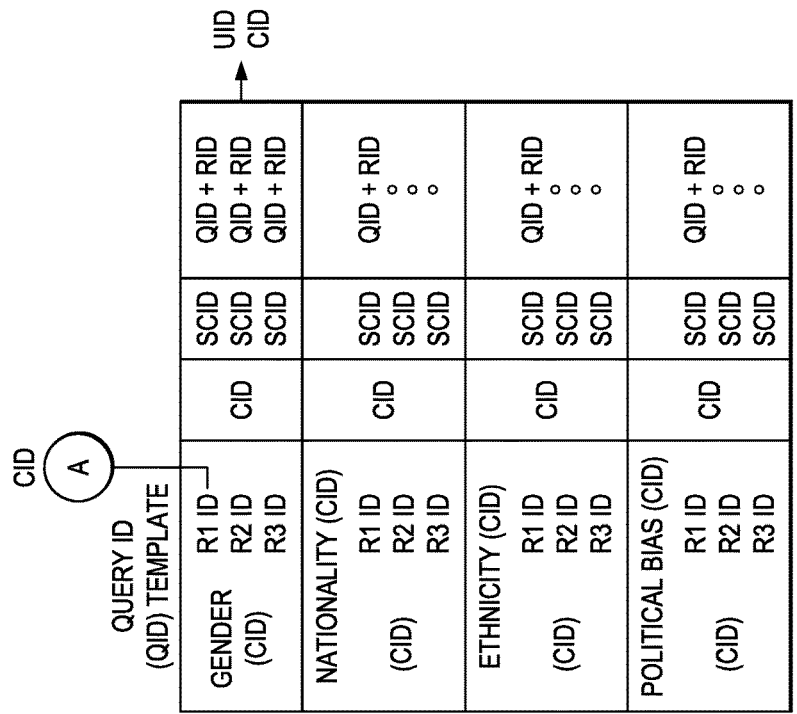
FIG. 21 illustrates a diagrammatic view of the template utilized for creating a query.

Referring now to FIG. 21, there is illustrated a diagrammatic view of an overall template for creating a query. This template provides the ability to map any particular classification and sub classification with any response. For example, illustrated in the template are four classifications, gender, nationality, ethnicity and political bias. Each of these may be selected as somehow associated with a particular query. The designer of the query will then be provided with the ability of providing any number of response buttons in their queries. Each of these response buttons just needs to be mapped to a particular sub classification ID, SCID, in order to give it meaning. Thus, the gender has a CID, to which the particular query is mapped for a particular query. This will be CID gender ID. There may be, as noted hereinabove, nine sub classifications. Each of the response buttons can be mapped to one of the sub classifications. It is illustrated that the response R1 ID is associated with the RID to the particular map button, for example, the "A" button. This will be mapped to the particular unique QID+RID code for that combination of the particular QID for the query being designed and the RID associated with the "A" button. This will be generated as a particular object in the system or record for that unique ID. This would be mapped to a particular SCID. It is asserted to keep in mind that this particular SCID is a predefined SCID, such that it can be utilized to collect data from multiple queries. It is not associated with just this particular query only but the particular QID is associated with query and the particular mapping of the RID to a particular button for that query in the form of the unique ID, QID+RID. It is noted that the first RID, that associated with the R1 ID associated with the "A" button will exist for each of the particular classifications, i.e., for the nationality CID, the ethnicity CID and the political bias CID. Thus, what will happen is that, upon providing a response via the "A" button for that particular query, this particular UID will be mapped into each of the SCIDs to which that response button is mapped. By looking at the QID table, the total number of UIDs responding thereto will be known. By looking at an SCID table, all of the responses over all queries will be known. With respect to gender, for example, if there were nine different bins associated with nine different SCIDs, a bell curve could be generated from all of the data that is received for the multiple queries indicating the general gender makeup of the crowd. This is all derived from just simple responses received from multiple MUs 110 transmitting a minimal amount of data responses for a query to a server.

Referring back again to FIG. 11B, there are provided 40 fixed characters that will always be provided on the screen. All that is necessary is to provide a simple code for each one of these buttons. Thus, only a five-bit code is required to provide the code for each of the buttons. For example, it may be that the first query has two responses that are presented, "A" and "B." In the database, it may be that this particular query determines that the people answering the query with a "A" response have a likelihood of being 60% Male and the people answering the query with a "B" response have a likelihood of being 60% Female. A further refinement of the response can be provided by mapping a particular response to certain statistical records. Each of the responses may have statistical information associated therewith. In this way, each response may have an SCID associated with that particular response in the given time window. Again, the "A" response may have associated with it the gender SCID corresponding to a 0.6/0.4 Male/Female percentage classification. This SCID association with the response may only last for the duration of a particular live event, and may only be relevant to that live event. So, at a live event on a different date, any SCIDs associated with the responses may be newly formed at that particular live event and are thus unique to that particular live event. However, it will be understood that statistical information may be carried over from other live events if the desired statistical data warranted such.

It may also be that the statistical data associated with responses can be shared across a series of concurrent live events. For instance, the SCID corresponding to a 0.6/0.4 Male/Female percentage classification in association with the "A" response may be shared across four different live events taking place on the same night and around the same time. In this embodiment, it may be that the four events all ask a particular question at the same time based on a pre-defined time window for the question. This question asked at all four of the events may also have the "A" response as having the same SCID associated with it so that the different audiences can be evaluated using the same statistical associations. This may be useful when polling audiences at different types of events. If an "A" response is expected to be answered 60% by males, it can be measured against differing audiences in order to determine if that assumption holds true, taking some variation into account. For instance, if the question is asked at a sporting event and 58% of the responses are from males, but when asked at a concert the "A" response is chosen by a population of only 35% males, this provides useful information for particular types of venues.

The visual cue 108 may provide for any arrangement of any of the 40 characters. In some embodiments, the characters used might be in a logical order ("1-2-3", "A-B-C", etc.), or they might be arranged in a random, or seemingly random, order. In some embodiments, the responses displayed on the visual cue 108 may only be used once at a particular live event. For instance, at a live event, if the particular questions asked have used all characters from 1-10 and A-J, it may start using color or symbols exclusively, as 1-10 and A-J have already been used earlier in the event. This allows for certain statistical data to be associated only with particular response characters. However, in other embodiments, a particular question may require certain characters for that question, and thus those characters would always appear with that question.

As provided herein, the 40 fixed characters on the mobile unit screen allows for users of the mobile unit to simply press or tap the particular character that is associated with their desired response. Doing so will cause the response to be transmitted to the local central office 120, along with the timestamp and other information to be transmitted. This thus allows for a one-click user experience. In some embodiments, from the user's perspective, users will only see the characters presented. No text or other information pertaining to the query being displayed on the display cue 108 would be displayed on the mobile units. Thus, each of the mobile units acts as a response system only, encompassing only that aspect of the system. The mobile unit response system would not perform any other function besides accepting a user's response and transmitting that response to the local central office 120.

Figure 22:
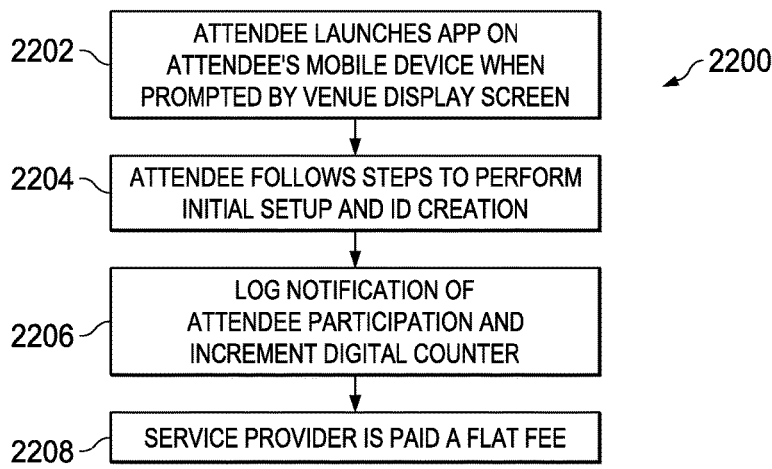
FIG. 22 illustrates a flowchart for a process of tracking attendee participation.

Referring now to FIG. 22, there is illustrated a flowchart of one embodiment of a process for tracking attendee participation at a live event 2200. The process begins at step 2202 when an attendee or user passes through the gate or launches the application on the attendee's mobile unit. The application may be a standalone application, or part of another application's functionality. If part of another application's functionality, such as an official Major League Baseball app, there may be an extra section or tab of the application that the attendee may select to begin using the functionality provided for by the present invention. At step 2204, the attendee follows steps to perform the initial setup and ID creation process as provided herein. This may occur when a user answers an initial query, in addition to providing the user's seat number. This provides for an indication that the attendee is ready and willing to participate in the polling, games, or other activities provided at the venue 102.

At step 2206, upon completion of the initial setup and ID creation process at step 2204, the participation of the attendee is logged. To keep track of the number of attendee's that have chosen to participate, a digital counter may be incremented as well to indicate that another attendee has used the application to participate. In some embodiments, a log might not be kept and only a digital counter used, or in other embodiments only a log would be kept, as desired by the parties involved. The log and/or counter may be saved either permanently or only initially by the local central office 120, and the data would be later transferred to the central remote office 126. This provides a unique advantage over more traditional polling, statistics, or advertising systems because the present invention allows for a verified viewer. In traditional methods, such as an ad banner or ad video at a live event, for example, it is unknown how many people paid attention to the ad. The present invention allows for an exact number of verified viewers or participators to be tracked.

Upon completion of the initial setup and ID creation process and step 2206, at step 2208, a service provider is paid a flat fee for the use of the service. The service provider may be the owner of the central remote office 126, the developer of the application, either developing the standalone app or developing the functionality for the official partner app, or any combination thereof. The service provider would receive the flat fee as compensation for providing the services described herein to the venue 102. The flat fee may be for any value. In some embodiments, the fee may be a low value, such as $5.00, which may be low enough to attract live event venue customers or live entertainment organizations to use the service, while allowing for the revenue stream for the service provider to be substantial if there is high attendee participation. The flat fee would be charged to the live event venue or live entertainment organization for each attendee at a live event that completes step 2204. Preferably, the flat fee would only be paid once per live event per attendee that completes step 2204. This means that the fee would not be paid again when an attendee who has already completed step 2204 participates again during the same live event by answering other polls, participates in games, or other activities. However, other embodiments may allow for a fee to be charged each time an attendee participates at a live event. For example, if 20 polling questions are asked at a live event, the flat fee would be charged for the same attendee 20 times if that attendee participates in every question.

Referring now to FIG. 23, there is illustrated a diagrammatic view of an operation of the current system for facilitating the purchase of merchandise from outside vendors outside of the overall polling/statistical collection system disclosed hereinabove. As noted hereinabove, the Mobile Unit 110 can be any type of device for facilitating communication with the hotspot 116 or wireless interface 116. However, in most cases, the MU 110 is a smart phone that is registered with a provider that provides a data plan for that particular device. This utilizes a separate radio on a separate antenna 2302 for interfacing with a cell tower 2304 or any other type of data interface. This cell tower is interfaced with a service provider 2306, with which the individual 202 and the device 110 is a registered. Thus, the service provider 2306 will have, due to the fact that the MU 110 is registered with the service provider 2306, information regarding payment option such as credit card and address information with respect to the actual individual 202, in addition to other information about the individual 202. As noted hereinabove, the local CO 120 has no information regarding the MU 110 other than what is provided via inputting the ticket information and running the application. No information is provided with respect to unique information about the particular MU 110 and none is necessary.

In this particular embodiment, the screen 108 displays information to the individual 202 which, for polling operation, elicits some type of response from the individual 202 via the MU 110. In this embodiment, however, what is displayed to the individual 202 for viewing is an offer for merchandise from an outside vendor, the definition of outside vendor meaning a vendor or a party that is outside of current system, i.e., it is not associated with the local CO 120. The vendor could be a merchant that sold goods online or actually be a merchant that was within the confines of the local event within the venue 102. The user is prompted to use one of selection buttons 1140-1144, of which selection buttons 1140 is illustrated in FIG. 23 on the device screen of MU 110. The advertisement might state "the following goods offered for sale at a significant discount of X %-want to take advantage of this offer, please select S1 within the next 10 minutes on your FEVR application." The user or individual 202 would then have 10 minutes, in this example, within which to make the selection. The selection merely requires them to press the button 1140. What would that happen is that a second screen 2308 would be presented on the MU 110 to the individual 202 to complete the transaction external of the local CO 120 and any collection of data or statistics. Everything after this point is unknown to the local CO 120 and whoever controls such.

With this offer screen 2308, the data link is routed through to the service provider and then to the Internet 2310 to provide a link to a vendor 2312. However, the entire offer could be facilitated internal to the MU 110. The primary issue is that information is required to be input to the offer screen 2308 in order to provide information, if needed. It could be that only a single items is being offered with no requirement to input a size or color, etc. In this case, all that is necessary is to push the button 1140 and the transaction is completed with the vendor 2312. However, if additional information is required, the offer screen 2208 allows the individual 202 to interface with the vendor 2312 in order to provide such information. What then occurs is that service provider interfaces with the vendor 2312 in accordance with a prearranged transactional agreement to actually bill the individual 202 through their contractual relationship. This can be facilitated due to the fact that the service provider 2306 has all the information necessary to just provide this payment on the individual's monthly statement.

Although the local CO 120 could provide this query/advertisement/offer from the local database, it also could be retrieved from a content provider 2316 via the Internet 2310 when needed. This allows the content provider 2316, in one example, to actually live stream the advertisement. The main point is that the advertisement is, 1) presented to the individual 202 with predetermined selection button associated there with and, 2) that a time window is provided.

Figure 24:
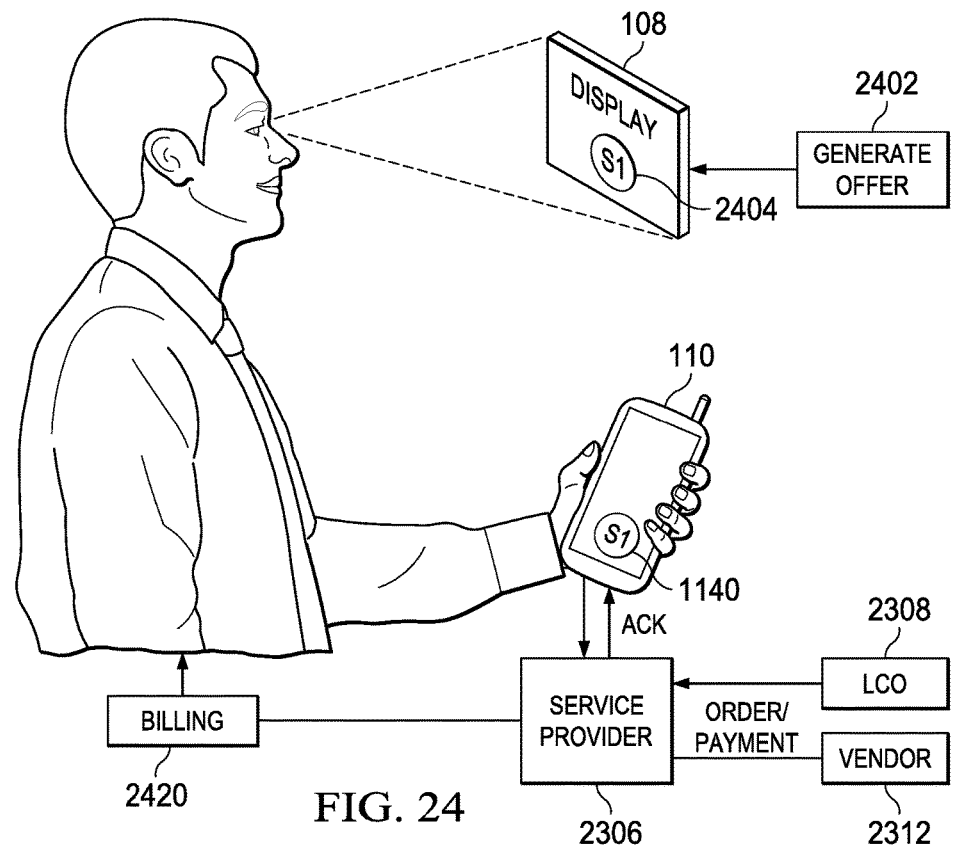
FIG. 24 illustrates a diagrammatic view of the overall system for facilitating the embodiment of FIG. 23.

Referring now to FIG. 24, there is illustrated by diagrammatic view of the overall system flow for facilitating the presentation of the offer and the completion of the transaction, including the billing. A block 2402 represents the generation of the offer which is sent to the display 108 with a selection field 2404 displayed that their one. The MU 110 displays the advertising addition to the selection buttons 1140, in this example, which is then, in accordance with the above noted description, sent to provider 2306. All that is really necessary to send to the provider is, at the minimum, the selection button in addition to some type of location information. With this information, it is possible to allow the service provider or even the vendor to determine which promotional advertisement is associated with and also with you venue 102 it is associated with. To facilitate this, some kind of location information is provided via a block 2408. Since there is no two-way communication with the local CO 120, the information that the MU 110 has is GPS information, SSID information of the wireless hotspots, and a ticket number. The ticket number, if it is in the form of a seat number, section number, and room number, may not be unique to any particular system, as multiple venues might share the same seat number. However, it may be that there is a unique ticket number that is unique across all venues, and this may actually define the location. If not, then GPS information could be provided to define the location of the MU 110 at the time of the generated response. This provides the actual physical location of the MU 110, and this just needs to be correlated with a known physical location of a particular venue. Thus, this promotional advertisement or offer might be displayed at multiple venues throughout the country. For example, on any given weekend, there may be multiple football games sponsored by the NFL®, and the promotional offer or advertisement, since it may only be presented during timeouts, halftime events, etc., would not be synchronized across multiple games and multiple channels. In this event, the vendor would have to know the physical location of the event in order to determine which venue this was associated with in order to verify information. Additionally, a particular vendor or program operating outside of the local CO 120 would have to be aware of the time in which it was presented. Thus, the local CO 120 would have to inform the vendor of the time in which the promotional advertisement was actually displayed, and this could be coordinated with the generation of this response via the button 1140.

Thus, the service provider 2306 would receive both the information recording the response that was sent, i.e., an indication that the button S1 was pressed, the location information, and also the time information in the form of a timestamp. This information is then routed to the vendor 2312. The vendor 2312 has a contractual relationship with the service provider 2306 in order to allow the service provider 2206 to bill the individual 202 through the contractual relationship it has therewith. This is represented by a block 2420.

Figure 25:
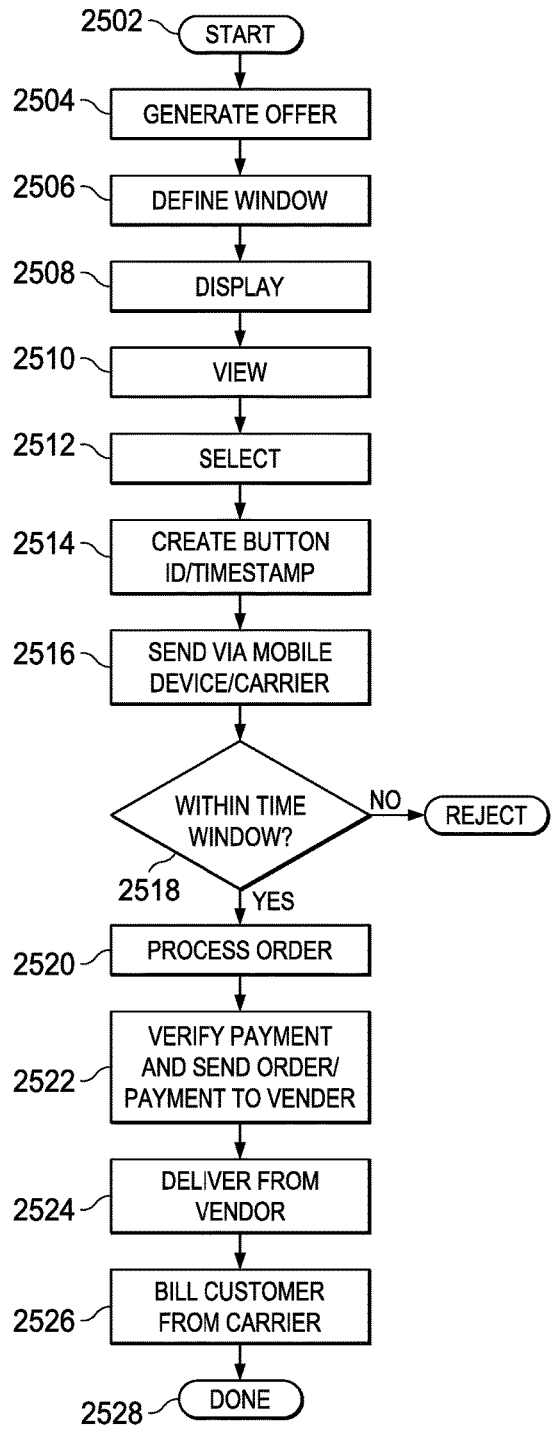
FIG. 25 illustrates a flowchart for the overall operation of the system of FIG. 23.

Referring now to FIG. 25, there is illustrated a flowchart for the overall operation of the merchandising feature area. This is initiated at a block 2502 and then proceeds to a block 2504 or in order to generate the offer. This requires the definition of a time window, as indicated by block 2506. This is then displayed, as indicated by a block 2508, with the appropriate response button that must be selected in order to take advantage of this particular promotional offer. The program then flows to block 2510 wherein the individual 202 views the offer, and a selection is made, as indicated by block 2512. At this point, a button ID with a timestamp is created, this button ID not being for the purpose of the polling or statistical operation of the local CO 120. It is merely provided in order to encode within the button ID the information about the button unique to the application, i.e., in this case it would encode the underlying code for the button 1140. This is then combined with a timestamp and sent via the overriding offer application, which is associated with the screen 2308, to the provider 2306 in order to interface with the vendor 2312 or to just send the information to vendor 2312. This is indicated at a block 2514. The program then flows to block 2516, wherein this is sent via the MU 110 to the carrier and then to the 2312. At this time, a determination must be made as to whether a timestamp associated there with, in addition to location information, indicates that the selection was made within the time window, this indicated by decision block 2518. If not, this is rejected. If so, then the overall order is processed, as indicated by a function block 2520. This process includes verifying payment and then sending order/payment to the vendor, as indicated by block 2522. The vendor will then deliver the product as indicated by block 2524, and the customer is billed by the provider, as indicated by block 2526. The program then proceeds to a Done block 2528.

Figure 26:
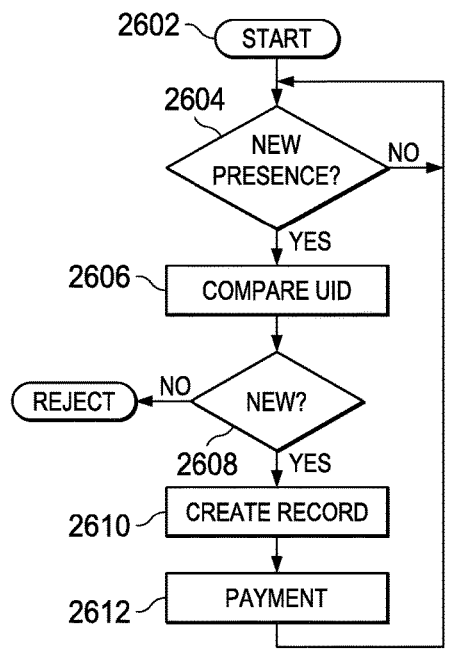
FIG. 26 illustrates a flowchart for ensuring that only a single seat is associated with a unique ID.

Referring now to FIG. 26, there is illustrated a flowchart depicting the operation of ensuring that only a single UID is associated with a single seat. The reason for this is that, from an integrity standpoint, an advertiser wants to have statistics that cannot be manipulated. One issue might be that another entity could manipulate the statistics by entering other UIDs into the system due to the fact that the timestamp makes it more unique. By requiring each UID to have a unique seat number, the situation wherein a second application has the wrong seat number entered therein will result in a rejection. Even if first UID assigned to that seat number is incorrect, UID will be rejected when the individual 202 with the correct ticket numbers tries to enter in their seat number. Since it had already been incorrectly entered and a UID registered with that seat number, the new one will be rejected. This will be an error, but it will be tolerated. The important thing is that an advertiser or somebody interested in statistics about the crowd can be ensured that, for a venue having associated therewith 10,000 tickets, there will be no more than 10,000 UIDs generated. Even if only 8000 attendees registered their UIDs, the advertiser can be assured that these are in fact associated with the "eyes" that they desire to be directed at their particular advertisements, etc.

The program is initiated at a block 2602 and then proceeds to decision block 2604 to determine if there is a new presence, i.e., a new MU 110 is entered at the event boundaries, and a ticket has been utilized in order to enter the unique information from the ticket and create the UID. UID is sent to the system, the local CO 120 and compared to the already existing UIDs, as indicated by block 2606. The program then flows to a decision block 2608 to determine if this newly received UID is unique to the system. If not, this indicates that it is a duplicate for some reason, and it is rejected. If so, the program flows to a function block 2610 New Record, as described hereinabove and then to a block 2612 in order to register payment, as described hereinabove.

Figure 27:
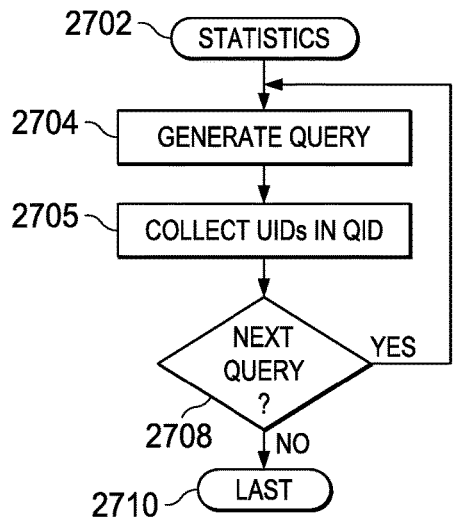
FIG. 27 illustrates a flowchart for analyzing and collecting statistics via the crowd-based response input.

FIG. 27 illustrates a flowchart depicting the overall operation of collecting statistics via all of the responses received in the crowd-based response system, which is initiated at a block 2702. The program then flows to a function block 2704 in order to generate the query. As noted hereinabove, the query is actually designed such that it has embedded therein statistical information that can be derived from a particular response. For example, press "1" for female and "2" for male. This particular key, i.e., that for the "1," is for that query during that time and is statistically related to the gender female. Of course, studies of individuals responding to that question may indicate that the 80% will actually be female. Thus, a statistical certainty of 80% can be associated with that particular "1" button for that particular query during that particular time window. That will accordingly be mapped to an SCID for that particular statistical certainty of female. It may be at another query was designed such that the button "C" was mapped to that SCID and, for that query in that time window, the button "C" is associated with the statistical certainty of 80% female. After generation of the query, the various UIDs responding thereto, as indicated by a block 2705, will be collected and the various data records updated. As noted hereinabove, a particular response can be associated with multiple SCIDs for a given button.

After all of the UIDs are collected and mapped to QIDs, CIDs, and SCIDs, the program flows to a decision block 2708 in order to determine if another query is in the queue. If so, the program backs around to the input of the block 2708, and, if not, the program flows to a block 2710 indicating that this is a last query.

Figure 28:
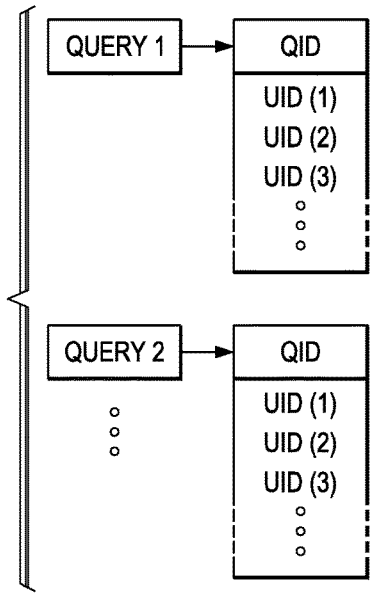
FIG. 28 illustrates a diagrammatic view of the relationship between the query and the UID.

Referring now to FIG. 28, there is illustrated a diagrammatic view of how a query is mapped to a QID, for example. When the query is output, as noted hereinabove, a time window is defined which is uniquely associated with that query. The response is resolved down to the UID, the timestamp and the RID. In the QID, all of the UIDs responding will be collected. Thus, all that is necessary is to look at the QID, which is unique as to a time window. For example, if there were two queries that were basically identical, and they were generated at different times, they would actually have a different QID, as each is unique with respect to its time window. It may be that a particular individual associated with an MU 110 presses the button more than once. This would provide the same UID in the particular QID record more than once. During the analysis, this can be discriminated. If it was desirable to see how many unique UIDs responded to a particular query to see how many people's "eyes on the screen" there were, then all that would be necessary was to determine the number of unique UIDs that responded. If, on the other hand, it was desirable to see how many times a response was provided to a particular query, the QID for that query be analyzed for the total responses including multiple responses from associated UID. This is illustrated in FIG. 23 in the form of two different queries associated with two different QIDs.

Figure 29:
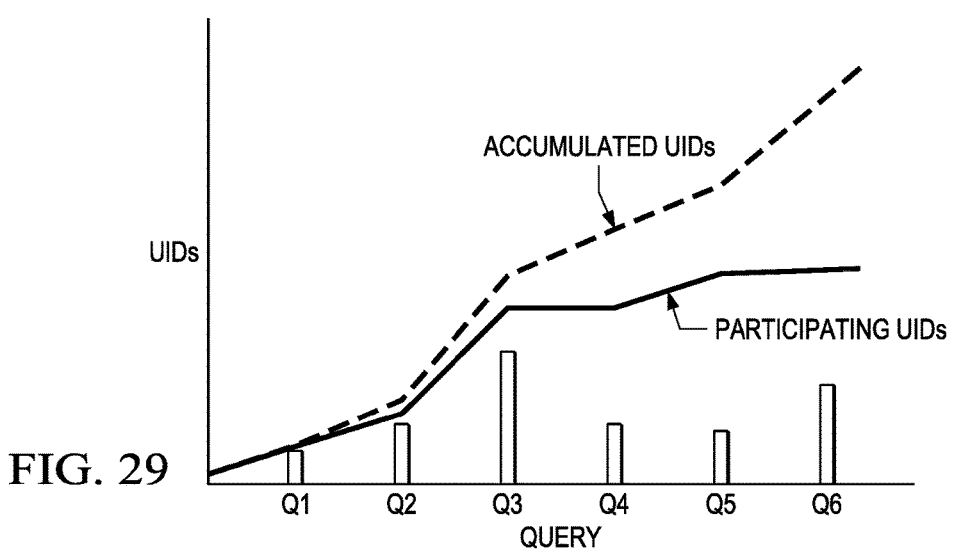
FIG. 29 illustrates the overall response that can be collected of that particular query.

Referring now to FIG. 29, there is illustrated a diagrammatic view of an example of an analysis with respect to these queries that are presented in each query. They can be seen from this graph that initially, the first query had a low number of responses and, as the event wore on, certain queries have higher level of responses as opposed to other queries. These are total responses to a particular given query. The first bar chart illustrates the total number of responses for a given query. An additional analysis can accumulate the total number of responses by accumulating UIDs over the time of the event. Additionally, an analysis can be performed to determine the actual participating UIDs. It may be that certain MUs 110 participate in the response-based operation more than others. There could be, for example, 30,000 attendees, of which 10,000 are registered with an associated UID. By knowing the number of total registered MUs 110, a determination can be made as to what percentage at any given time is actually participating, and also an analysis can be made as to the distribution of participation by the registered users. There may be a certain portion that responds to every query, a certain portion that only responds to 50% of queries, a certain portion that responds only 25%, and a portion that never responds. This can be important information for an advertiser/promoter. Additionally, since the seat number is known from the UID itself, as this is embedded information therein, it is possible for the system to actually map responses to certain areas of the live event. For example, suppose that the event were a baseball game. It is well-known that seats behind home plate are the most expensive seats, and the bleachers are the least expensive seats. It may be that certain queries are responded to more heavily by attendees in the bleacher seats as opposed to those in the behind home plate seats. A statistical certainty may actually be placed upon a particular seat with respect to income, for example. Thus, if it is determined that at certain times during the event that more responses are being received from UIDs associated with behind home plate seats, it is possible to actually tailor the queries during those times for those particular attendees. The analysis can be performed real-time to actually change the subject matter of the queries that are presented.

Figure 30:
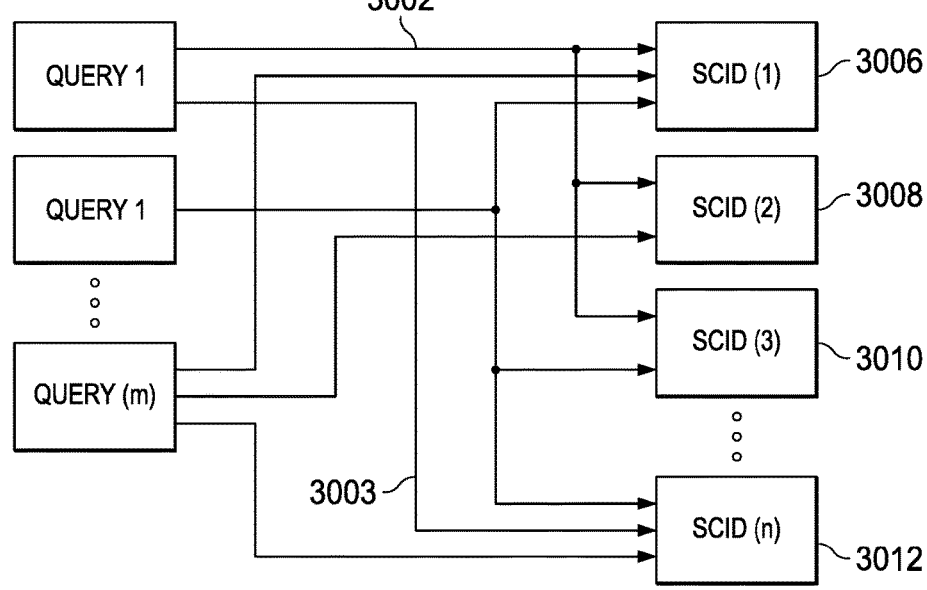
FIG. 30 illustrates a diagrammatic view of the mapping of queries to SCIDs.

Referring now to FIG. 30, there is illustrated a simplified diagram of the mapping of a query to an SCID. Each query, the QID and the CID, can be mapped to a particular SCID. This is defined in the design of the particular query. The SCID is associated with a statistical certainty such that any choice can be associated with any SCID. As noted hereinabove, a query is defined with anywhere from one to multiple choices, each choice associated with a particular button. That button will be associated with one or more SCIDs. These, again, are predetermined statistical certainties that are defined in the context of the particular query. Illustrated are multiple queries. The first query, query 1, has two choices, a choice 3002 and a choice 3003, meaning that there are two buttons associated with that query to allow the user to make two choices. It is noted that a choice may also require the pressing of multiple buttons and not just a single button. Thus, the combination of buttons would constitute a choice. The first choice 3002 is associated with an SCID 3006, an SCID 3008 and an SCID 3010. Each of these SIDs 3006-3010 have a different statistical certainty associated with a different classification or CID, such as gender, political affiliation, ethnicity, etc. The second choice 3003 is associated with an SID 3012, this being a different statistical certainty for a different classification. There is provided a second query, query 2, that is illustrated as having a choice, a single choice, that will be associated with the SCID 3006, the SCID 3010 and the SCID 3012. A last query, query (m), has three separate choices, one associated with SOD 3006, one associated with SCID 3008, and one associated with SCID 3012. This association is, again, defined in the design and the generation of the query. By having some knowledge of the particular query in the context thereof, a designer of the query can determine statistical relationships between that question, the response elicited and the statistical certainty from that response. Again, the example of just selecting one of two choices, one for female and one for male, will be easy to design, as it will be provided an SCID for male and an SCID for female. If there were a query asking if you are an out-of-town visitor, that would be a statistical certainty for a nonresident. A query for information regarding "your country of origin" could provide five responses via five separate choice buttons for Europe, Asia, South America or Canada, and these four choices would provide a statistical certainty for four different SCIDs, each associated with one of those choices. In this query, for example, each button that is provided at that time for that query has a defined statistical relationship as a result of being associated with a particular SCID, that statistical relationship defined by the properties of that associated SCID.

Figure 31:
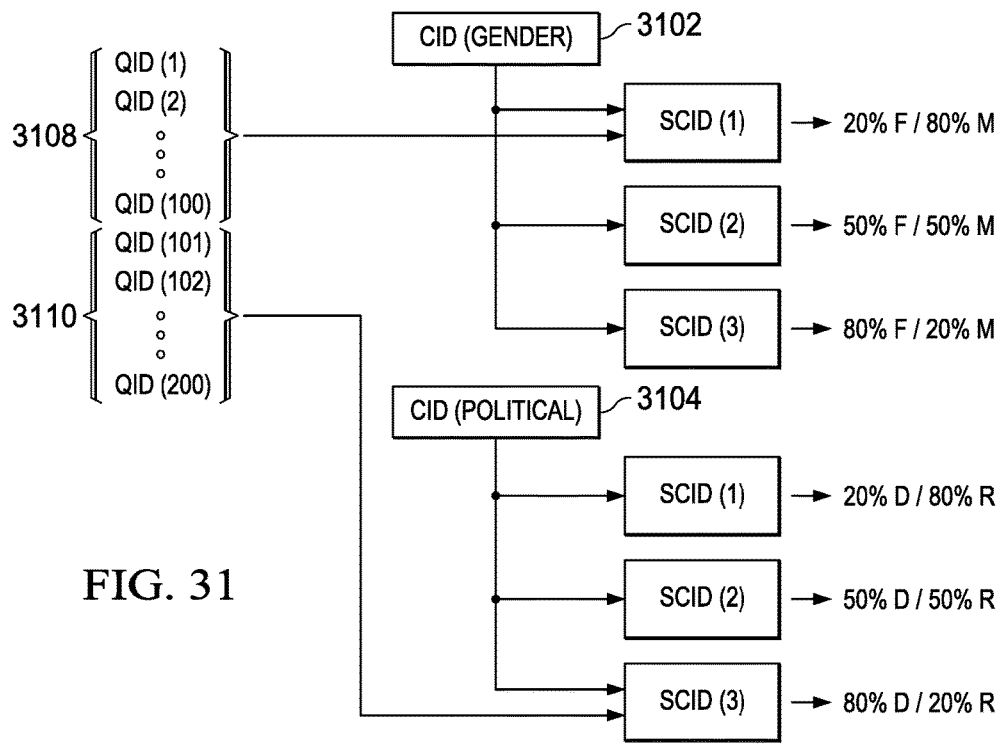
FIG. 31 illustrates a detailed example of a mapping of various QIDs to SCIDs.

Referring now to FIG. 31, there is illustrated a diagrammatic view of one example of the design of a collection of statistical data. In this example, there are provided two CIDs 3102 and 3104, the CID 3102 associated with gender, and the CID 3104 associated with political affiliation. There are associated with the CID 3102 three different SCIDs, one for a ratio of 20% female/80% male, one for 50% female/50% male, and one for a ratio 80% female and 20% female. The CID 3104 is associated with three SCIDs, one for 20% Democrat/80% Republican, 50% Democrat/50% Republican, and 80% Democrat/20% Republican. The designer can define for a particular query which statistical relationship is applicable and select the closest SCID that has embedded therein the statistical certainty. Thereafter, for any given query, each query or number of queries can be associated with that particular SCID. For example, there is a group 3108 of QIDs that are associated with the SCID having a ratio of 20% female/80% male. There is another group of QIDs 3110 having in Association with the SCID for 80% Democrat and 20% Republican. It may be that certain QID in group 3108 are also QID in group 3110. Just the mere response to the QID and, of course, the particular response button associated therewith, it being noted that there may only be a single response, will result in UID making that response being populated into the record for a particular SCID. When analyzing a particular SCID over multiple queries, a determination can be made as to how many unique UIDs responded thereto or the total number of responses. This of course must account for multiple taps and the such. This can be handled in the software response for any query such that not all responses from a single MU 110 are recorded-only a single recording of a response during a given time window will be recorded.

Figure 32:
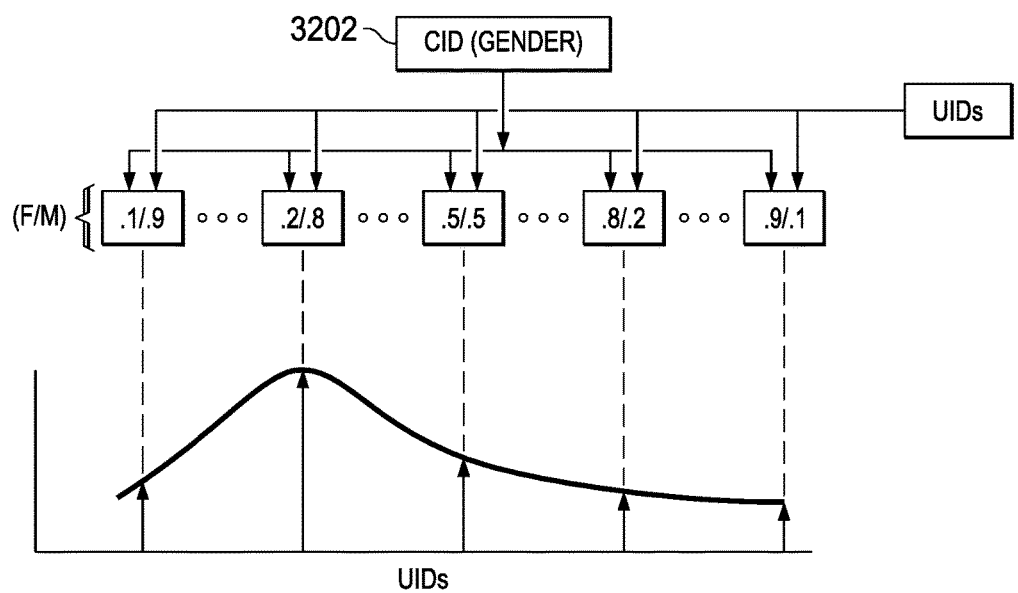
FIG. 32 illustrates a diagrammatic view of one particular statistical spread over multiple queries presented throughout an event at a live performance within a given venue.

Referring now to FIG. 32, there is illustrated a diagrammatic view of the analysis of one group of SCID associated with the gender CID 3202. There are provided eight SCIDs associated with the gender CID 3202, ranging from 0.1/0.9 through 0.9/0.1 as a ratio of female/male. This is a binning process wherein UIDs responding thereto will be binned therein for all queries. Of course, each SCID is mapped to a particular QID such that any QID can be analyzed for the particular SCIDs that are associated therewith. In the chart, it is illustrated that a distribution of binned UIDs are illustrated, it being noted that there are more females than males in the overall responders. This graph does not show or illustrate the number of queries that were responded to; rather, it illustrates the binning operation of the actual responses that, through the design of the queries.

Figure 33:
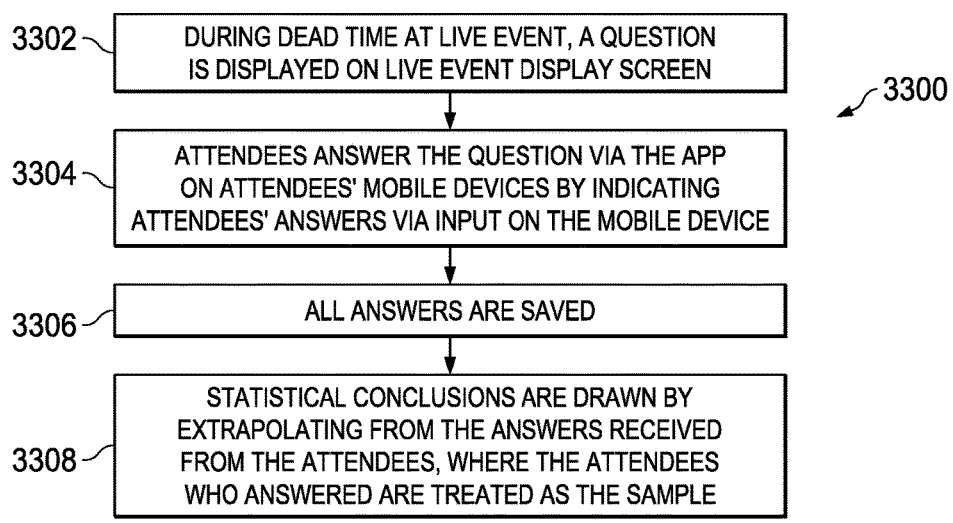
FIG. 33 illustrates a flowchart depicting one embodiment of a process for extrapolating from statistical data gathered from mobile devices at a live event.

Referring now to FIG. 33, there is illustrated a flowchart depicting one embodiment of a process for extrapolating from statistical data gathered from mobile devices at a live event 3300. The process begins at step 3302 where, during dead time at the live event, a polling question is displayed on a venue display screen. The displayed question may be on a large variety of topics, such as consumer preferences and political questions. For instance, a question may ask "what type of car do you drive?", with options listed for "compact car," "full-size car," "truck," "SUV," and "other." The user would select their answer by pressing a button on the screen of the mobile device that corresponds to the option presented on the venue display screen 108. On the other hand, a question such as "are you in favor of gun control?" with the options "yes," "no," and "undecided" presented. It will be appreciated that statistical data may also be gathered from activities other than polling questions.

Similarly, questions to assess merchantability may also be presented on the venue display screen. Merchantability for the purposes of the present invention includes gauging whether consumers would buy or endorse a particular product. For example, a question may be presented that asks "would you buy Pepsi or Coke?" or "would you buy a Chevy?". The question may be accompanied by other media, such as showing an ad for Pepsi following by an ad for Coca Cola, and then displaying the question. In another example, a live concert event may ask the audience, after the first two bands have played and while the headlining act is setting up, which of the first two opening bands the audience prefers, or for which of the two bands the audience would buy a record. Similarly, this may be done by playing music videos of bands unrelated to those playing at the concert, followed by a question regarding whether the audience would by an album for the bands, and for which one. In yet another example, a band at a concert may ask the audience to listen to a few melody selections, which the band would play live for the audience, and then present the audience with a question regarding which of the melodies most resonates with the audience. This would provide useful data for the band or record label in determining what types of melodies the general audience is most attracted to, and then base future songs on that preference. It will be understood that these are just a few examples, and the same concepts could be applied to all live events and within all industries.

At step 3306, all answers from attendees who participated in step 3304 is saved, either to the local central office 120 or the central remote office 126. At step 3308, statistical conclusions are drawn by extrapolating from the answers received from the attendees. The attendees are essentially serving as the sample for the statistical analysis. However, unlike most studies or focus groups, where you have a small sample size and extrapolation is performed based on that small sample, a live event such as a sports or music event can potentially have tens of thousands of people, or even more. Thus, this provides for more accurate conclusions to be drawn. Further, the data is collected from people who may already be interested in the subject-matter. For instance, an audience at a concert that is being asked for their preferences in music are exactly the type of people a record label wants to hear from; the people who pay to attend concerts. Ordinary focus groups often lack the core or target audience, and thus conclusions drawn from such data can lead to erroneous results. The results of the statistical conclusion may be displayed at the live event for entertainment purposes wherein people can measure their response against what the most popular response was, for example. The results may also only be viewed or analyzed by interested parties.

This process also allows for statistical conclusions to be based on the type of audience, or on a population generally, depending on the desired use of the data. For example, data collected from a live baseball game where the question "what type of car do you drive?" might be applied to baseball fans. So, if a majority of fans selected "truck" as their answer, a conclusion could be drawn that baseball fans are more likely to buy trucks than other types of vehicles. Similarly, if the same question is asked at an opera house, and a majority of the audience selected "full-size car," a conclusion could be drawn that opera fans are more likely to by full-size cars than other types of cars.

In addition, this process allows for attendees to measure themselves against other attendees in some embodiments. After an attendee has answered a question, the results may be compiled and re-displayed for the audience to view how their response measures against the audience as a whole. It will be appreciated that this has many applications. For instance, if a majority of the women in the audience answered a question a particular way, while a majority of the men in the same audience answered a question in a different way, this may be compiled and re-displayed for the audience. This allows for the audience to see how gender affected the results, and can measure their answer against the majority opinions. This creates an interest in answering the question, as there may be a natural curiosity to see how one's answer measures up to the results. The same method could be applied to merchantability questions, such as re-displaying the results of the question "would you buy Pepsi or Coke?" so that an audience member can see how his or her answer measures against the results. For instance, if someone chose the response option for "Coke," and the results are re-displayed to show that 90% of those who answered chose "Pepsi," the person who chose "Coke" can see that they are in the minority.

This system may also be extended to questions that elicit more emotional responses. These types of questions would relate to how people feel about a particular topic. For instance, the question might state "how do you feel about the government?" or "how do you feel about the neighborhood you live in?" with appropriate responses ranging from positive to negative to even fearful answers. The statistics regarding these answers would then be displayed to the users. This process may also be enveloped in a game. For instance, it might ask one section of the crowd to press one response key as fast as they can, while another section presses a different response key. The results would then be displayed, showing how the sections compared.

The displayed results may be in a variety of forms, bar graphs, pie charts, percentage, ratios, or any other visual representation of data.

Figure 34:
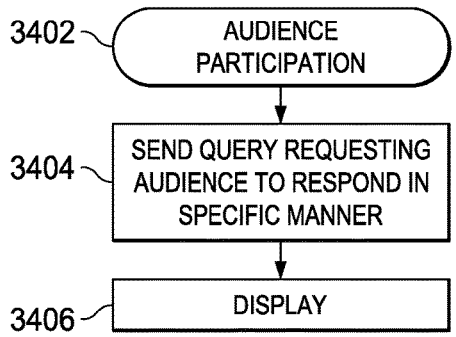
FIG. 34 illustrates an overall flowchart of the audience participation function.

Referring now to FIG. 34, there is illustrated a flowchart depicting the overall audience participation concept, which is initiated at a block 3402. Program then proceeds to a block 3404 to send the query or the prompt requesting audience participation in the form of a response in a specific manner. The program then flows to a function block 3406 to display the results. These results are real time results.

Figure 35:
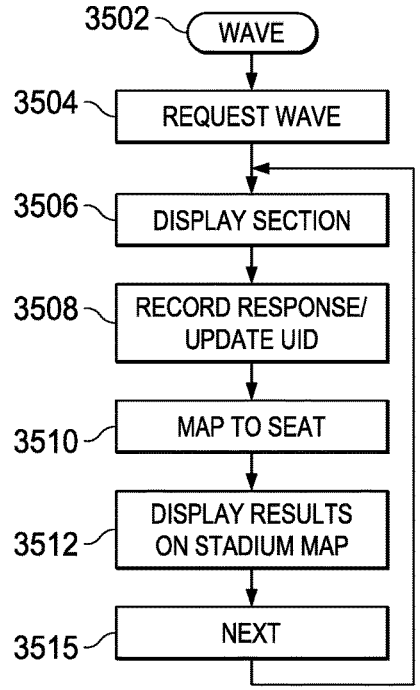
FIG. 35 illustrates a flowchart for the wave example of audience participation.

Referring now to FIG. 35, there is illustrated a flowchart for one example, that of the Wave. This is initiated at a block 3502 and then proceeds to a block 3504 to phrase the prompt or request on the display 108 as a request for the Wave. The program then flows to a function block 3506 to display a particular section. The program then flows to a block 3508 in order to record the response and update the UID. Since every response is in the form of the QID for that particular query, just by looking at a particular QID, the QIDs populating such can be determined. For this application, only a single "tap" of the key will be accepted. If, for some reason, an individual taps the key multiple times, this would actually be recorded in the QID during that appropriate time window as a valid input. This might be used for some statistical analysis, but for the purpose of this application, all that is necessary is to know how many UIDs have been recorded in that QID record. Each of these UIDs can then be mapped to seats, as indicated by a function block 3510. This is facilitated by the fact that these physical location is actually provided as a part of the UID. This can be utilized for such things as delivering prizes, for example, but in this situation, all that is required is to map the seat number onto the display. It may be that UIDs for other sections also responded, and these may or may not be displayed. The results displayed are illustrated in a function block 3512. The program then flows to block 3515 in order to select the next section and then back to the input of function block 3506. As each section is displayed, the results are then displayed in real time. Since this is real time, the time window can be very short period. Thus, after the time period has expired for particular section, no more UIDs for that section will be recorded. Thus, the time window is basically a "wide-open" time window that is only for the purpose of displaying results. When the section number is up there, the time window is open only for that section and those associated UIDs. Alternatively, all UIDs can be displayed that respond, and all that is necessary is to continually display a prompt that moved from section to section and then display the results of the MUs 110 that responded via their associated UID.

Figure 36:
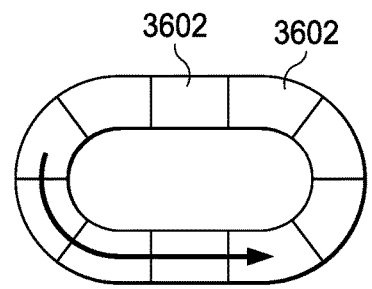
FIG. 36 illustrates a diagrammatic view of the display for the wave response.

Referring now to FIG. 36, there is illustrated a diagrammatic view of the overall display of the venue, illustrating a plurality of sections 3602. As the UIDs are collected, the particular section can either be completely eliminated or the shade associated with that particular section increases a function of the number of UIDs that respond. This allows the actual individuals to view the response and asked to participate more. Additionally, by analyzing the number of UIDs associated with that particular QID, it will provide to the analyst information regarding which sections have people that are actually more participatory than others, among other information.

Figure 37:
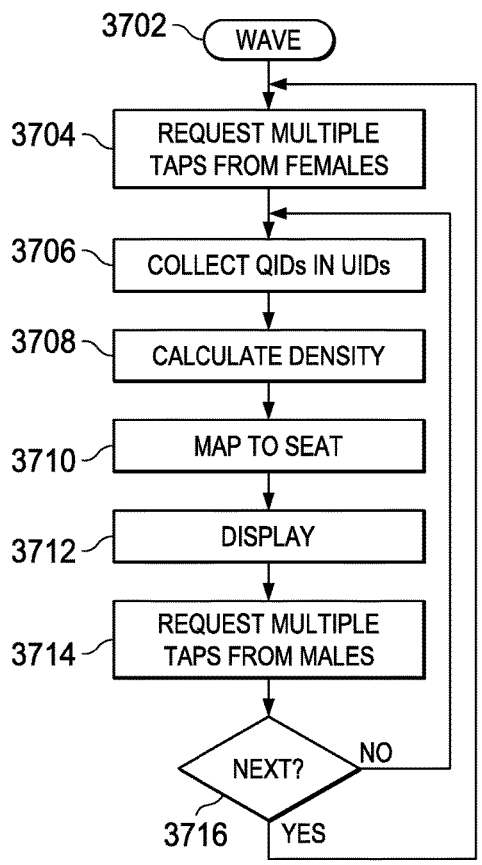
FIG. 37 illustrates a flowchart for the noise example of audience participation.

Referring now to FIG. 37, there is illustrated a flowchart for the "noise" interactive operation. This is initiated at a block 3702 and proceeds to a block 3704 in order to request multiple taps from females, in one example. The program then flows to a function block 3706 in order to collect in the QID for that query/prompt all of the UIDs responding thereto. This particular query might also have an SCID that is associated with gender. Suppose, for example, that the button that they requested to be pushed for this particular operation was the "A" button. At this point in time, that particular button is statistically linked to an SCID that has been predetermined to have a certain statistical relationship to the individual pressing a button being a female. As noted hereinabove, that is probably not 100%. It may be 90% due to the fact that certain people did not read the prompt correctly or they do not care. In any event, an SCID for 10% male/90% female could be associated with that particular button.

At this point, the overall density for the responses in total just looking at the QID can be determined, as indicated by a block 3708. The program then flows to a function block 3710 to map this to the seats in the venue 102 and then to a block 3712 to display the results. It could be that the more "taps" that a particular MU 110 is associated with, the higher the density for that particular seat will be. An average of the overall density in a particular region about all the seats can be determined or the actual seat itself can be made brighter, for example, due to the density of taps associated there with.

A new query is then generated requesting multiple taps from males, as indicated by block 3714. Again, this is a QID that is unique as opposed to the QID for requesting multiple taps from females. The program then flows to a decision block 3716 to determine if this is to go back around to collect the UIDs for this QID and, if so, the program flows to the block 3706 to collect UIDs for this particular QID associated with this particular query/prompt. This continues until it's finished and then, at the decision block 3716, it flips back over to the input of function block 3704 to request the multiple taps from the females in the associated query therefore. Each of these queries associated with that particular QID has a time window associated therewith, of course, as this makes a QID. Thus, for this purpose, a second QID could be generated each time a new query is generated, or the program could merely create the same QID with a different time window. However, for analysts, it will be desirable to have a separate QID for each time window such that, for example, if there were 10 requests for females to respond and 10 request for males to respond, there would actually be 20 QIDs created in the system. These would all be queued up for output at a particular time. Overall, this could actually be an automatic operation.

Figure 38:
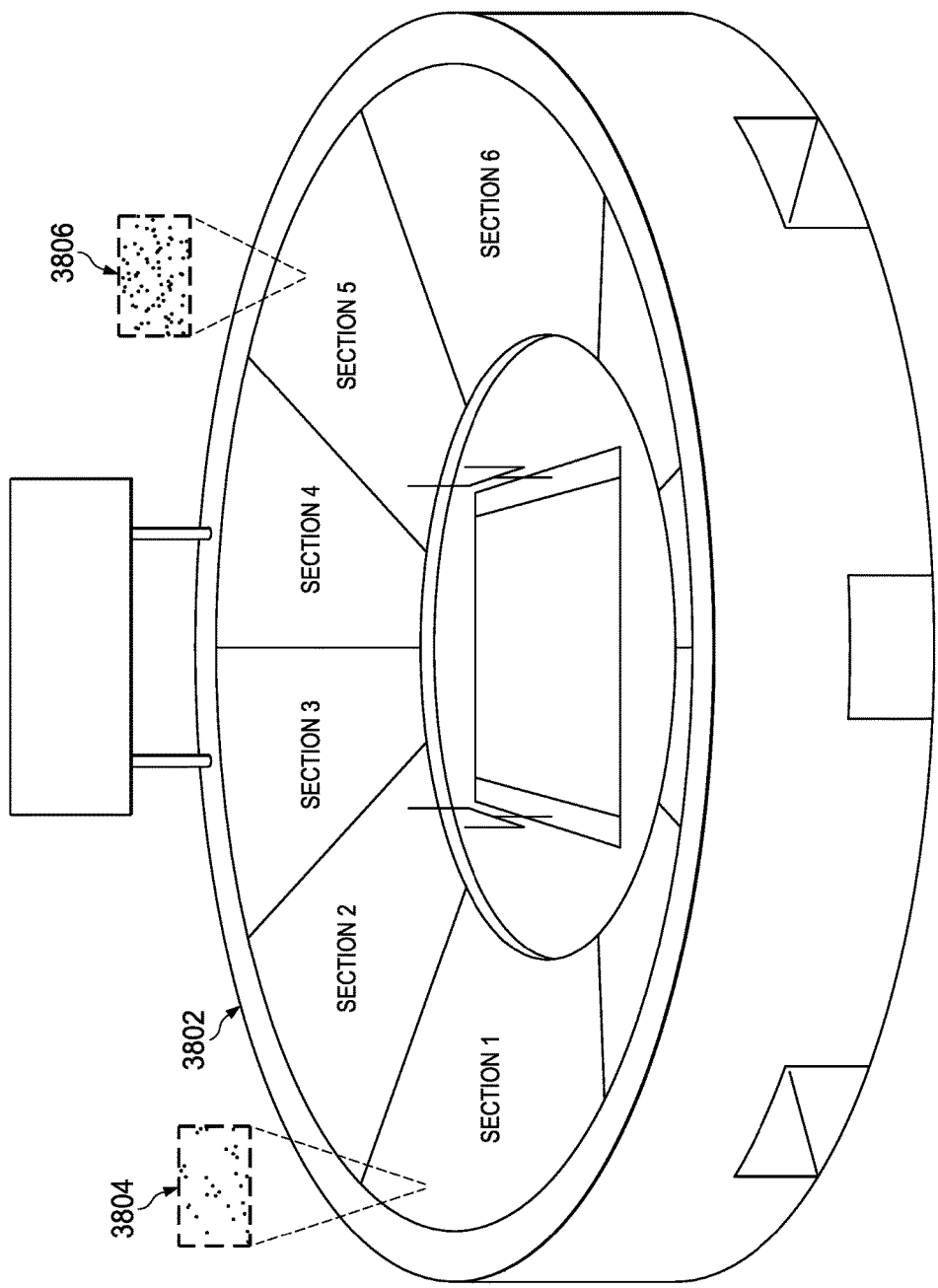
FIG. 38 illustrates a diagrammatic view of the display for the noise audience participation response.

Referring now to FIG. 38, there is illustrated a diagrammatic view of a venue display 3802 displaying various sections. There are illustrated in two detailed section views 3804 and 3806 two sections. In the sections, there are provided density distributions for the responses. As noted hereinabove, this could actually be a heavy shading. However, with knowledge of the UIDs and their seat location, any type of display operation can be provided.

Figure 39:
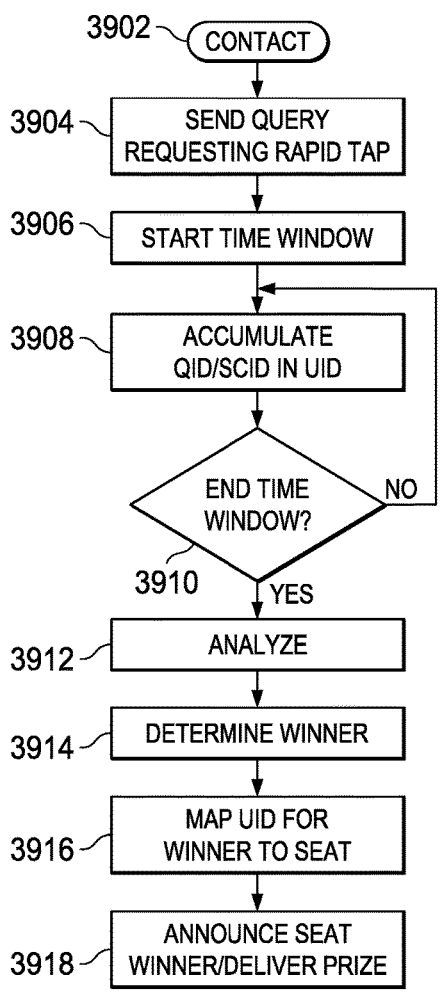
FIG. 39 illustrates a flowchart for the operation of running a contest.

Referring now to FIG. 39, there is illustrated a flowchart for a contest. This is initiated at a block 3902 and then proceeds to a block 3904 to generate and send a query requesting a rapid tap with some type of incentive for doing such. For example, the incentive could be that a promotional T-shirt will be given to the individual or individuals that could tap the fastest on their MU 110. Program then proceeds to a block 3906 in order to start a time window for the overall promotion and then to a function block 3908 to accumulate the various information in the QID and in the SCID, in addition to accumulating such in the UID. At this point, all of the database is updated in the various records. If all that was desired was to determine which MU 110 had the most taps, it would only be necessary to determine how many times the QID for that particular query was updated by the UID, which is reflected in the pointer back to the UID, as a UID record has a record of each QID that it responded to. If a time window were 10 seconds, a countdown timer on the prompting display might show the countdown, but the time window would not necessarily be exactly synchronized to that countdown timer. At the end of time, the number of times that the QID was responded to by a particular UID can be determined and that particular seat number declared a winner. The end of the time window is indicated by a decision block 3910, at which time an analysis is made of the data at a block 3912 and in the winner determined at a block 3914. At this point, the actual UID can be mapped for the winner to the seat, as indicated by block 3916 and then some type of announcement of that result indicated at a block 3918. The result could be that a promotional T-shirt is delivered to multiple seats surpassing a threshold, delivered to a single seat, or an announcement made that for a particular seat, the presentation of your ticket, would allow the individual to collect their prize at later time. In addition, it could be that a raffle was provided of an automobile, for example. That automobile could be advertised as one that would be given away at the end of the event, and based upon responses the automobile manufacture would provide this promotion and utilize the number of taps to place individuals into the raffle, or they could just merely be a response that places them in there. This response would be for the purpose of, for example, collecting statistics from the particular crowd. This would allow a large number of seats, take, for example, 8000 responders out of the 10,000 attendee event to be placed into the raffle. This would be an incentive for people to pay attention to the screen and, further, it would actually encourage people to actually activate their applications and enter crowd based response system.

In the event that MU 110 is not entered into the crowd based response system due to the fact that they did not register, it is possible to allow them to register. This would be a prompt that would actually ask people to turn on their application and respond to a particular response request in a certain manner, as entering whether they are male or female, i.e., pressing button "D" or "B." the preferable way, of course, is to register when they enter the stadium. The reason for this is that, at this time, registration would require another payment, and this payment may be entered at the middle of the overall event. This might be treated different by the overall financial arrangement with the event planners.

Figure 40:
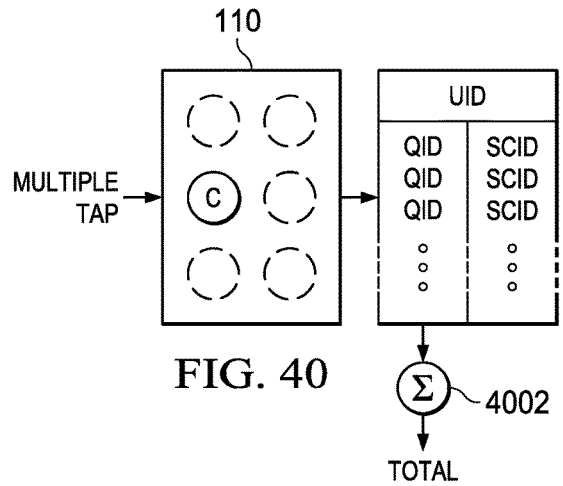
FIG. 40 illustrates a diagrammatic view of populating the UID record for a particular mobile unit.

Referring now to the FIG. 40, there is illustrated a diagrammatic view of the overall "tapping" response. The MU 110 is illustrated as having one button that is the focus of the particular query or promotional offer, this requesting the individual 202 to select this particular button, in this case, the "C" button. This will result in the particular UID for that particular MU 110 to collect both QID occurrences and SCID occurrences. Again, this particular request could be for females to tap, and the SCID for that would be different than a request requesting all males to respond. Any one of these can be summed, as indicated by a block 4002, in order to provide a total, in one example. As noted hereinabove, any type of analysis can be made upon this particular UID. Here, the issue is to determine how many times a particular UID has been associated with a QID within the time window of the QID.

Figure 41:
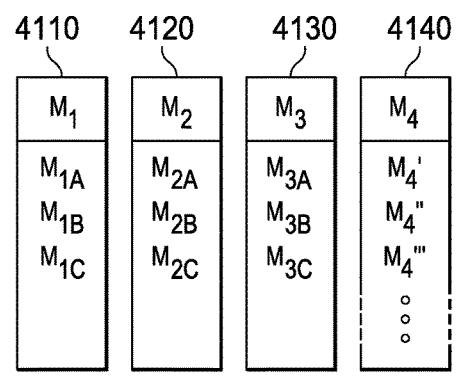
FIG. 41 illustrates sets of media messages which can be presented.

Referring now to FIG. 41, there is illustrated a diagrammatic view of sets of media messages that can be presented to event attendees. Each set of media messages has several different versions of a media message associated with it. Media messages are information presented to the event attendees in the form of audio, video, or still image messages. A media message can be either recorded or live. As an example, a first media message set 4110, referred to for ease of readability as M1, might be a set of advertisements for vehicles. This set might be comprised of message M1A, an advertisement for a motorcycle, message M1B, an advertisement for a truck, and message M1C, an advertisement for a sports car. A second media message set 4120, which will be referred to as M2, might be a set of descriptions of prizes that can be won in fan contest at the event. This set could be comprised of video message M2A, a description of a an autographed T-shirt from a sports team captain, video message M2B, a description of a piece of sporting equipment used by a professional athlete, and video message M2C, a description of a pair of free tickets to a future event at the event venue. A third media message set 4130, referred to as M3, could be a set of short video segments from various upcoming movies or television shows. A fourth media message set 4140 (M4) is provided to illustrate that the number of media messages in a set of media messages will be different in other embodiments. Some embodiments contemplated will have media message sets with only one message, while other embodiments will have media message sets with up to hundreds of messages. Although specific embodiments have been provided as examples, a media message can take the form of any message, including advertisements, announcements, news updates, entertaining interludes between parts of the event, or even political messages. In some embodiments, sets of messages can have multiple types and formats of messages. For example, in one embodiment a message set will include a video advertisement message and an audio news update message. In some embodiments, for each set of messages, which specific message is presented is based on the statistical make-up or preferences of the event attendees or even just the participating users. One way of selecting the specific media message to present is by analyzing the statistical data of responses to queries, as is described herein below.

Figure 42:
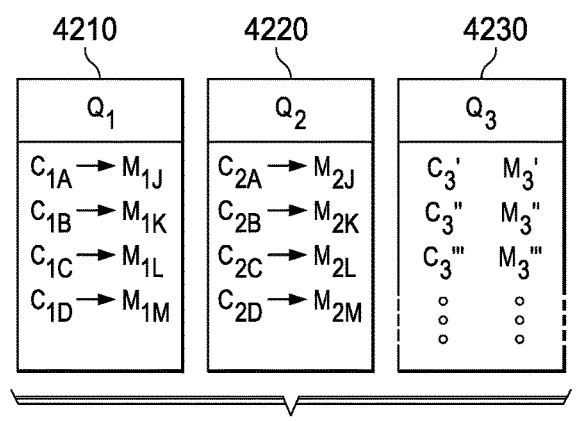
FIG. 42 illustrates sets of queries that can be presented.

Referring to FIG. 42, there is illustrated a diagrammatic view of queries, each with multiple associated query response statistical conditions and messages corresponding to those response statistical conditions. The specific message that is presented after a query is determined by which of the query response conditions is met. For example, query 4210, referred to as Q1, has associated response statistical conditions C1A, C1B, C1C, and C1D, each corresponding to a media message, M1J, M1K, M1L, and M1M, respectively, which is presented to the attendees if the corresponding condition is met. Similarly, query 4220, referred to as Q2, has associated response statistical conditions C2A, C2B, C2C, and C2D, each corresponding to a media message, M2J, M2K, M2J, and M2M, respectively, which is presented if the corresponding condition is met. Note that for query Q2, two of the conditions, C2A and C2C, have the same corresponding media message, M2A. This is to illustrate that in some embodiments, each condition need not have a unique message, and that multiple conditions have the same corresponding media message. Query 4230, referred to as Q3, is presented to demonstrate that the number of conditions and corresponding media messages associated with a query varies in other embodiments. Although the examples presented have four conditions with corresponding media messages, other contemplated embodiments have queries with only one condition and media message, while other embodiments have as many as hundreds of conditions and media messages. It should also be noted that in some embodiments, some conditions will result in multiple messages being presented. In some embodiments, multiple response conditions being met will result in multiple media messages being presented.

Figure 43:
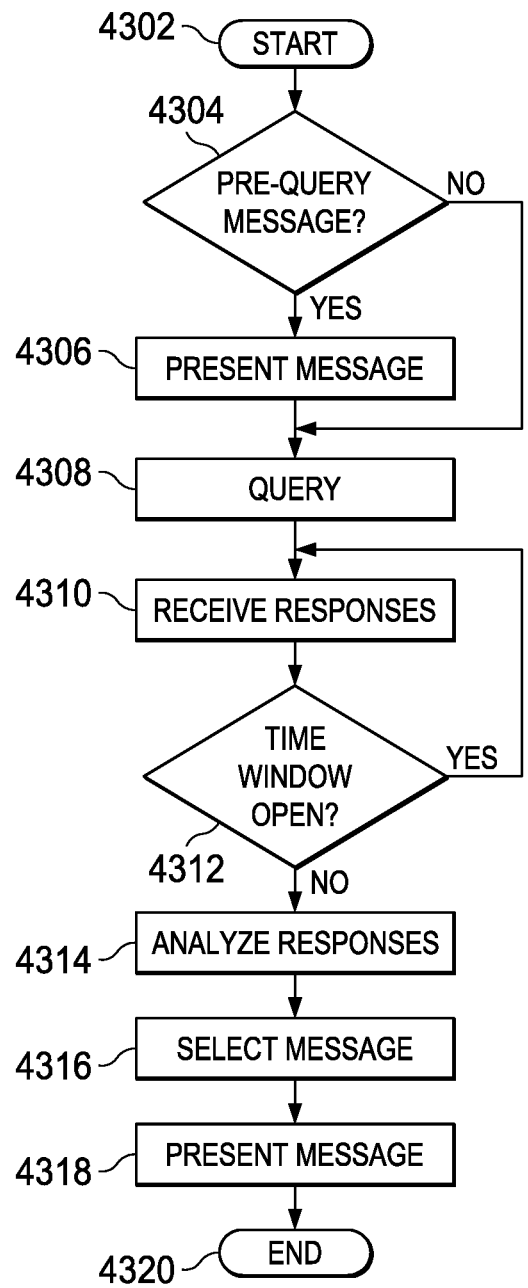
FIG. 43 illustrates a flowchart showing how queries and media messages are chosen and presented.

The process of analyzing the statistical data of responses to a query to select a media message is described herein. UID information and query responses can be used to influence subsequent media messages presented to the attendees of the live event. Referring to FIG. 43, there is illustrated a flowchart depicting the operation of selecting a media message based on the input of event attendees in response to a query. The process starts with start block 4302 and proceeds to decision block 4304 which decides if a media message will be presented before the query. If no pre-query message is to be presented, the process moves to function block 3008, where a query is presented to the event attendees. If a media message is to be presented before the query, the process proceeds to function block 4306, where the media message is presented, then to function block 4308, where a query is presented to the attendees. After the query is presented, the process goes to function block 4310, which receives responses from the MUs 110. Next, a decision block 4312 determines if the time window for responses is still open. If so, the process loops back to block 4310 to continue receiving additional responses. If the window is closed, the operation proceeds to block 4314, where the responses are analyzed associated with UID data. Next, function block 4316 applies the statistical response data and previously known statistical UID information to selection criteria and chooses the next media message to be presented. The program then proceeds to function block 4318 where the selected media message is presented to the event attendees. The program moves to block 4320 and ends.

Figure 44:
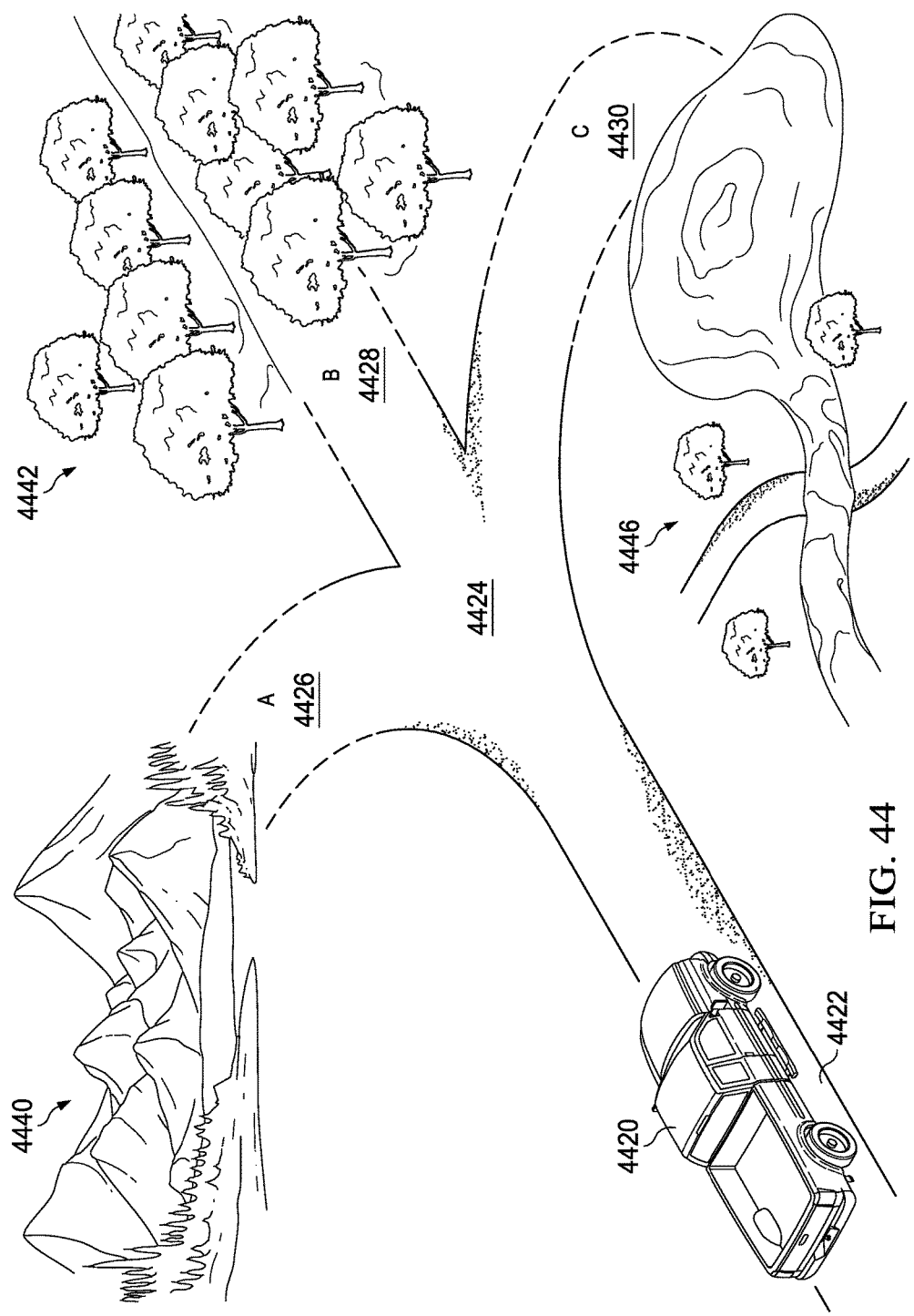
FIG. 44 illustrates the first part of an embodiment which uses a media message as a commercial for a truck.
Figure 45:
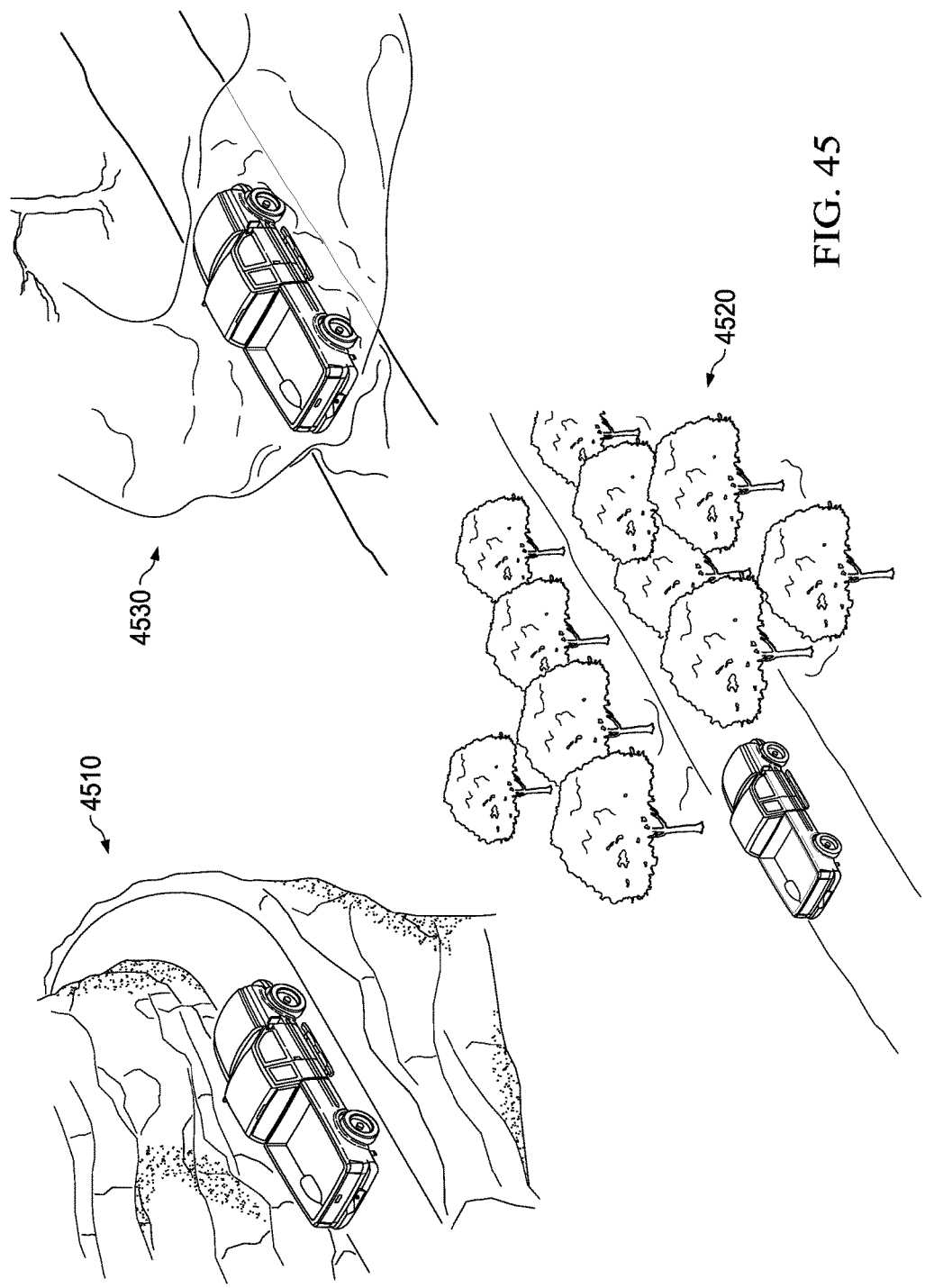
FIG. 45 illustrates the second part of an embodiment which uses a media message in the form of a commercial for a truck.

FIGS. 44 and 45 depict an example of how responses from MUs 110 to queries can be used to influence subsequent media messages. Referring to FIG. 44, there is illustrated an image representing an example of video media message to be presented to attendees of a live event. In other embodiments, the media message is a public announcement, an advertisement, a news update, a political message, or an entertaining interlude. The media message can be either audio, visual, or video. In this example, however, the image represents the first part of a video advertisement for a pickup truck. This first part of the advertisement shows a truck 4420 driving down a road 4422 until it arrives to and stops at a point 4424 where the road splits into three different paths. Each of the paths leads to a different type of driving destination. Path 4426, Path "A," leads to driving destination 4440 which includes a trail in the mountains. Path 4428, Path "B," leads to driving destination 4442 which includes a trail in the forest. Path 4430, Path "C," leads to driving destination 4446 which includes a trail in a valley with a river and a lake. At this point, the first part of the advertisement concludes with a message that informs the attendees that they can help decide where the truck will go next by choosing which path the truck will take. A query is then presented which prompts the attendees to use their MUs 110 to make a selection indicating their preferred path for the truck to take. For instance, the query might say, "Which adventure do YOU want to tackle during halftime?" The query would prompt the event attendees to select "A" on their mobile devices if they want to see the truck go down Path A and drive through the mountains, "B" if they want the truck to go down Path B and drive through the forest, or "C" if they want to see the truck take Path C drive through the valley with the river and lake.

Referring to FIG. 45 and continuing with the example of the truck advertisement, the second part of the advertisement video is presented after the time window for response queries has ended. The second part of the advertisement will be one of three video messages. The first video message, demonstrated herein with example image 4510, shows the truck driving through the mountains. The second video message, demonstrated herein with example image 4520, shows the truck driving through the forest. The third video message, demonstrated herein with example image 4530, shows the truck driving through the valley with the river. Which video message is played will depend on statistical data from the query responses. For example, if, in responding to where they would like to see the truck go next, more UIDs choose "A," indicating the user would like to see the truck drive through the mountain path, than "B" or "C," then the video message showing the truck driving through the mountains would be presented as the second part of the truck advertisement. In this manner, the event attendees "have a say" in what messages are presented to them.

The example depicted in FIGS. 44 and 45 represent an embodiment of the disclosure. As previously noted, other embodiments will have media messages that are video, audio, or visual in nature, or even combinations of the three, and will include live and pre-recorded messages. Some embodiments will have media messages presented before the query, while other embodiments will not. The truck advertisement described is only one type of content. The media messages in other embodiments include public announcements, news updates, instant replays, video or audio feed from events at other locations, advertisements, event announcements, or any other notification or message useful to event attendees. Also, the response conditions leading to each media message will not be as readily apparent to the event attendees in some embodiments as in the presented example of the truck advertisement. In some embodiments, the event attendees will not know how their query responses will affect the subsequent media message or messages. Some embodiments will not present a query as simple as "which message would you like to see?" but will nonetheless base post-query media messages on statistical information from the query responses. In some embodiments, the mobile users will not even know that their responses to queries affect the choice of the subsequent media message or messages.

The selection of which message to present after query responses have been received and analyzed can be based on various kinds of statistical data. The media message selection could be based solely on which choice received the most "votes" from the users, or the message selection could be based other statistical information gathered from the responses. Since demographic information can be associated with UIDs, an advertiser or media partner might choose to present a message based on the responses from UIDs associated with a certain demographic, such as a certain gender or household income. Continuing with the example of the pickup truck advertisement, the manufacturer of the truck in the advertisement might be especially interested in a particular segment of the event attendee population, such as males, and might focus on the responses from the UIDs associated with male users. For example, if 60% of responding UIDs indicated "C," the valley with the river, as the preferred destination for the truck, but 70% of responding UIDs statistically associated with males indicated "A," the mountain trail, as the preferred destination, the video represented by image 4510 showing the truck driving through the mountains might be presented as the second part of the advertisement if the truck manufacturer is particularly interested in keeping the attention of male event attendees.

Figure 46:
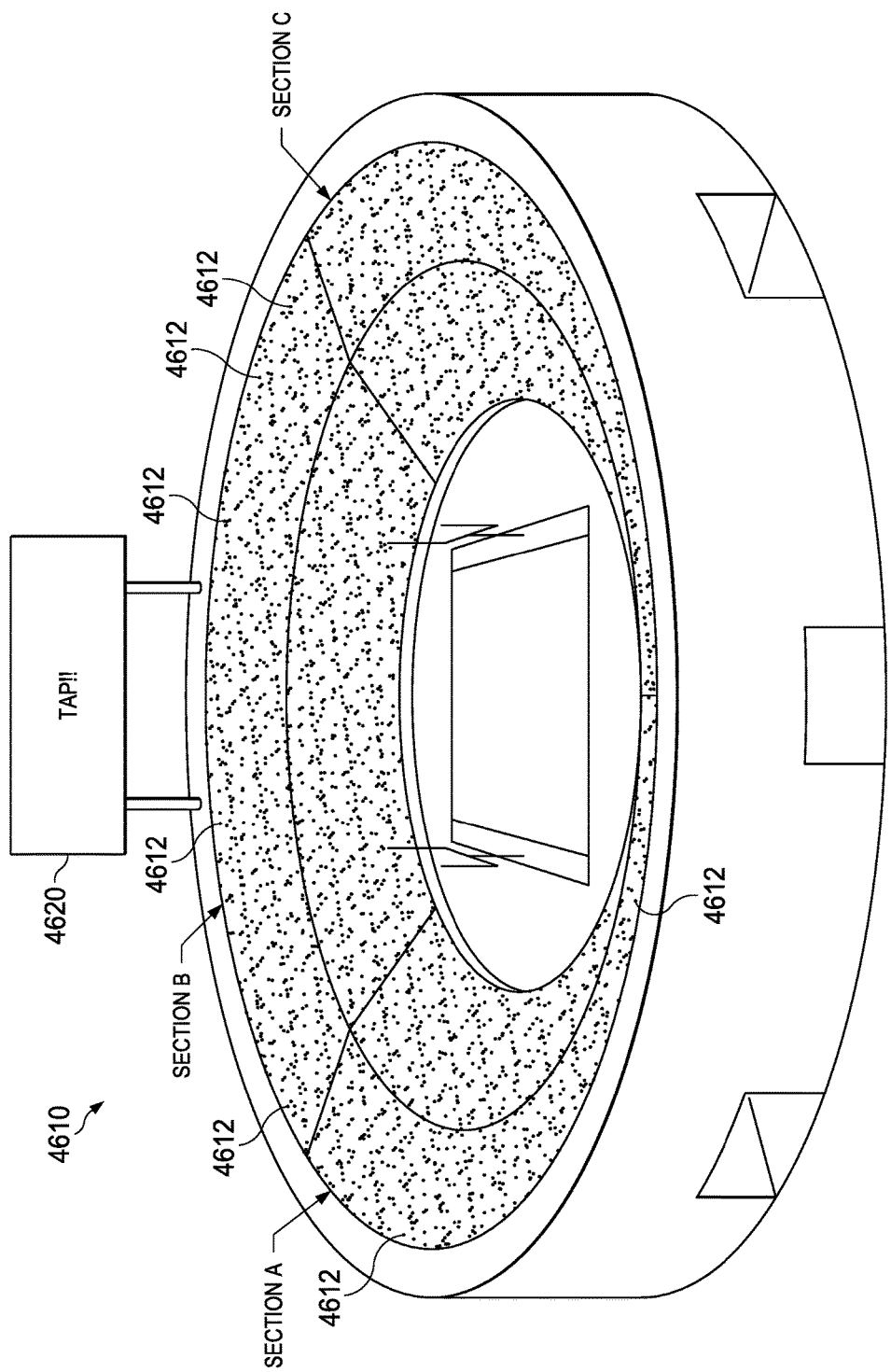
FIG. 46 illustrates a stadium with attendees who respond to queries with taps to their mobile devices.

In another embodiment of the disclosure, the query presented to the venue attendees prompts users to input a response into their mobile units as a way to determine which portions of the venue have the most attendees paying attention to the queries and multimedia messages. Referring now to FIG. 46, there is illustrated a sports stadium 4610 with venue attendees 4612. (In other embodiments, the venue will be a concert hall. In yet other embodiments, the venue will be a theater.) The seating of stadium 4610 is divided into multiple seating sections, labeled "Section A," Section B," and "Section C." Stadium 4610 includes a large display 4620 which can be seen by the event attendees. The display presents a message to the event attendees prompting them to respond with some kind of input into their MUs 110, such as by tapping rapidly a "button" on an application running on their MUs 110. The message prompt will be displayed for a predetermined time window, for example, fifteen seconds. The system records the number of tap responses for each UID. Since each UID can be associated with a seat location in the event venue, the system can determine which seating section had the most tap responses during the time window. Which seating section had the most taps will affect the subsequent media message that is presented to the event attendees. In some embodiments, the section with the most taps will see a message indicating each attendee in that section wins a prize. In other embodiments, the message might simply indicate which section produced the most taps. In some embodiments, seating sections in sporting events are divided based on which team the attendees support. For example, one seating section could be comprised mostly of "home team" fans, while another seating section is comprised mostly of "away team" fans. In some of these embodiments, the post-query message will be a message related to the sports team favored by the seating section with the most taps.

In other embodiments, the taps are not sorted by seating section, but are sorted by some other type of information, such as demographic information associated with the UIDs. For example, some embodiments the taps are categorized by male or female UIDs. In other embodiments, they are categorized by age range. In other embodiments, they are categorized by the team or player the attendees' support, regardless of where the attendees' seats are.

In a variation of the embodiment illustrated in FIG. 46, event attendees tap their MUs 110 in response to a query that takes the form of a game. Event attendees (and thus their UIDs) are divided into groups as teams (for the purposes of the tapping game). The number of teams can be anywhere from only a single team to several dozen teams. A visual or audio query message then prompts attendees to "tap" their MUs 110 as many times as they can during a predetermined time window. Once the time window has expired, a media message communicates to the attendees how many total taps were performed by the UIDs associated with each team. In some embodiments, the process will be repeated, with multiple prompts and time windows for tapping. At the end of each time window, a media message will communicate the number of taps per team for the latest time window, as well as the cumulative number of taps for each team during all of the time windows during the event. The game can be presented in several ways. In some embodiments, it will take the form of a virtual race taking place on a video screen over several time windows. Each team has an associated horse, person, dog, colored dot, or any other object or animal typically involved in a race. The more taps each team accumulates during each time window, the farther down the "track" that team's racer will travel at the end of the time window. Each race could last only one time window, or a race could span several time windows, with each time window representing a "leg" of the race and being accounted for in the "leg" during the next time window.

Figure 47:
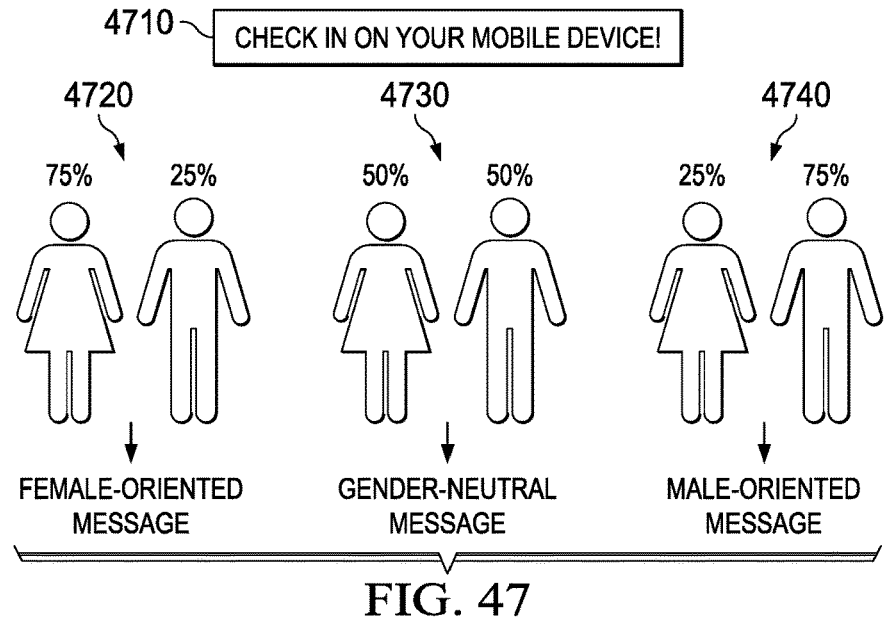
FIG. 47 illustrates the embodiment of users checking-in on the mobile devices.

Referring to FIG. 47, there is illustrated an example embodiment which displays a message based on the gender make-up of the event attendees that respond to a query to "check-in" with their MUs 110. Query 4710 is a message that is presented to the event attendees, in either an audio or visual format. Query 4710 prompts event attendees 202 to "check-in" using the application on their MUs 110. This query is presented any time that the event proprietors wish to know the demographic make-up of the attendees paying attention to the queries and multimedia messages. In some embodiments, the query will prompt to attendees to "check in" to be entered into a contest. The system will allow attendees to "check in" during a predetermined time window following the presentation of query 4710. Once the time window has expired, the system will determine, based on information associated with the UIDs that "checked-in," the demographic make-up of the respondents. The message presented after the time window has expired depends on the analysis of the demographic make-up of the attendees that responded. In the example embodiment presented, the system determines the gender make-up of the attendees "checking-in." The post-query message presented is at least partially determined by this gender make-up. Situation 4720 illustrates that if a significant majority of the attendees checking in are female, a female-oriented message is presented. Situation 4730 illustrates that if the numbers of males and females checking in is roughly equal, or not significantly weighted one way or the other, a gender neutral message is presented. Similarly, situation 4740 illustrates that if the number of males checking is significantly greater than the number of females "checking-in," a male-oriented message is presented.

In different embodiments, different demographics will be analyzed. For example, in some embodiments, the check-ins will be categorized by the age of the user associated with a particular MU 110. In other embodiments, the check-ins will be categorized by geographic locations of the attendees' homes. In other embodiments, the check-ins will be categorized based on sports team affiliations.

Figure 48:
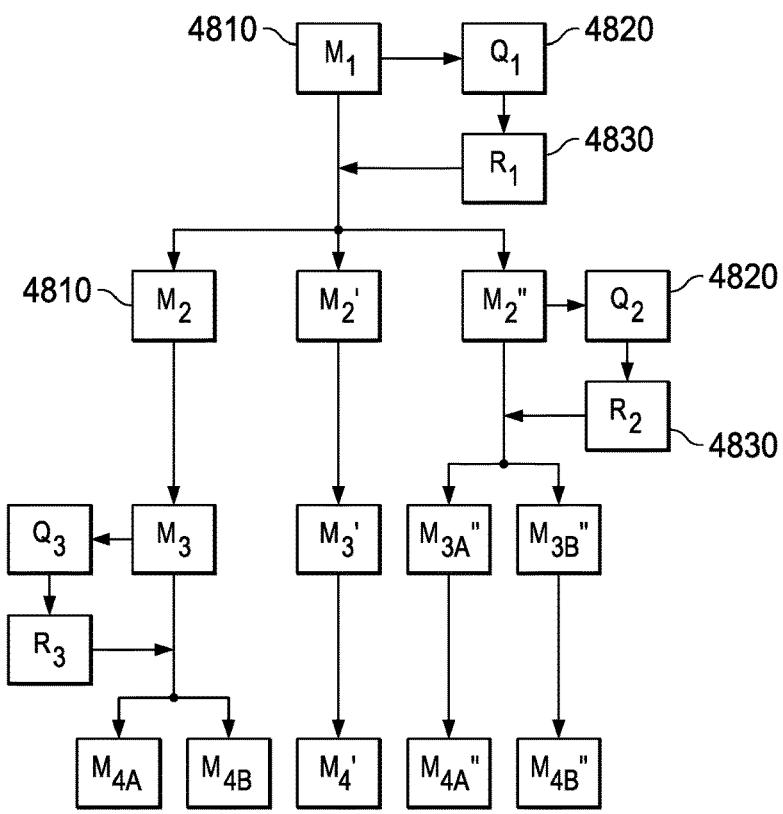
FIG. 48 illustrates a branching decision tree of queries and media messages.

Referring now to FIG. 48, there is illustrated a diagram of the way in which an embodiment of the system uses queries and responses to determine which media message to present next. Illustrated in the diagram are several media messages 4810. In some embodiments, these messages are in video form, while in other embodiments, the messages are in audio form. Also illustrated are several queries 4820, which are also either audio or video in form. Finally, sets 4830 of responses to queries 4820 are illustrated. These sets 4830 of responses are responses from event attendees and are inputs into MUs 110. The system starts by presenting media message M1. After media message M1 is presented, query Q1 is presented to the event attendees, prompting the attendees to input a response into their MUs 110. After receiving the responses that make up the set R1 of responses, the system analyzes R1. Next, a second media message 4810 is presented. The media message will be M2, M2', or M2". Which media message is presented is based at least in part on the analysis of R1. After the second media message is presented, the system presents third media message, or if M2" was the second media message presented, presents query Q2 to the event attendees, prompting responses that will form set R2. The third media message will be M3 (if M2 was previously presented), M3' (if M2' was previously presented), or either M3A" or M3B" (if M2" was previously presented). If M2" had been the second message presented, then the analysis of R2, the set of responses to query Q2, will be a factor in determining which one of M3A" and M3B" is presented. Finally, a last media message will be presented. If M3' was previously presented, M4' will be presented. If M3A" was presented, M4A" will be presented, and if M3B" was previously presented, M4B" will be presented. If, however, M3 was the previously presented message, then either M4A or M4B will be the next message. After M3 is presented, query Q3 will be presented to the event attendees, prompting responses that will form set R3 of responses. The analysis of R3 by the system will factor into which one of M4A or M4B will be presented to the audience.

The example embodiment shown in FIG. 48 illustrate the aspect of the disclosure whereby the messages being presented to event attendees can "branch" onto different possible paths based on user responses to queries. This branching can allow for a "story" to be told through the messages, with the direction of the "story" being at least partially controlled by the event attendees (or the statistics associated therewith) as they respond to the various queries. In some embodiments, the "story" is an entertaining narrative, while in other embodiments, it is a series of related advertisements. In some embodiments, the event attendees are informed that their query responses affect which messages will be presented next, while in other embodiments, the event attendees are not informed of this. The specific number of media messages presented, as well as the number of queries will vary in different embodiments. Some embodiments have a query and a response analysis after every message. Other embodiments only have queries presented after certain messages. In some embodiments, the selection of a post-query message will be based solely on the statistical information from the responses. In other embodiments, the post-query message will also be based on other previously gathered statistical data about the UIDs.

Figure 49:
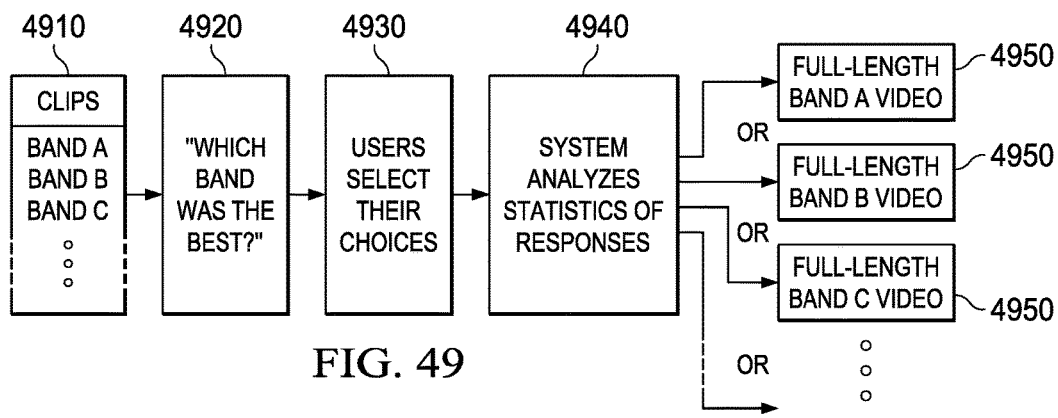
FIG. 49 illustrates the selection of a full-length music video based on selection from short video clips.

Referring to FIG. 49, there is illustrated an embodiment whereby the event attendees influence the choice of a music video to be presented. In this embodiment, a media message represented by block 4910 in the form of short video clips is presented to the audience. The message comprises of short clips of music videos, each clip being of a song performed by a different band or group. Next, a query 4920 is presented to the event attendees prompting them to select which band or group they thought was the best or the most entertaining. At block 4930, the event attendees user their MUs 110 to select their choice for which band or group performed the best. Next, at block 4940, the system compiles and analyzes the responses of the attendees and generates statistical information about the responses. In some embodiments, this information will include previously obtained demographic data about the responding UIDs. Following analysis of the responses, a media message in the form of the full-length version 4950 of one of the music video clips will be presented to the attendees. Which full-length version 4950 will be presented is at least partially influenced by the statistics of the responses to the query 4920. In some embodiments, the video clip that received the most "votes" from responding attendees will have its full-length version presented as the post-query media message. In other embodiments, the choice of which full-length video to present will be determined by which clip receives the most "votes" from a specific demographic, such as a particular gender, age group, nationality, or income level.

Figure 50:
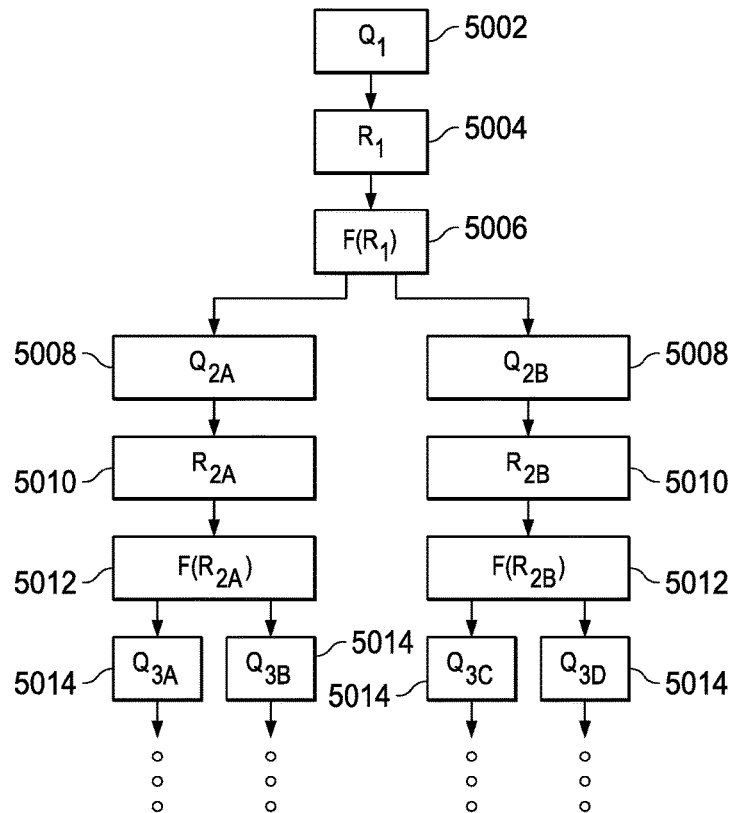
FIG. 50 illustrates how the analysis of queries responses are used to select the next query.

In some embodiments, responses to queries will affect the choice of subsequent queries to present to event attendees. Turning to FIG. 50, there is illustrated a diagram showing how the available queries to be presented are organized into selection "trees." Query 5002 (Q1) represents the first query in the query tree to be presented to the event attendees. After attendees submit responses making up response set 5004 (R1), the system analyzed the responses to R1 using an algorithm tailored for analyzing responses to Q1. The results 5006 of this algorithm are a function of R1 (represented by F(R1)). The next query presented to the event attendees will be one of the queries 5008, either Q2A or Q3A. The selection of which of these queries will be presented, and which "branch" of the query "tree" to travel, is at least in part determined by F(R1). The process continues again, where either Q2A or Q2B is presented to the audience. Q2A or Q2B will then be followed by one of the responses 5010 R2A or R2B, respectively. The response set that is obtained will then be analyzed by another function, with the results of this function represented by blocks 5012. The process continues, branching into different paths to one of queries 5014 as the queries and responses help determine which subsequent queries to present. In some embodiments, there will be multiple queries at every "level" of the tree. In some embodiments, not every query will have the ability to branch off to multiple subsequent query paths. In some embodiments, one or more of the queries will have more than two possible paths to branch to, while in other embodiments, queries with multiple paths will only have two possible paths.

Figure 51:
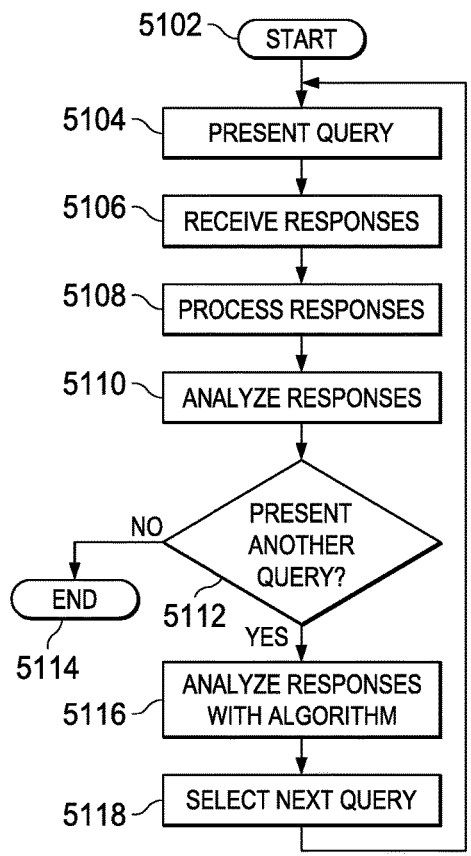
FIG. 51 illustrates a flowchart showing the process by which a query is selected.

Turning to FIG. 51, there is illustrated a flowchart showing the process of using the analysis of query responses to select the next query to be presented. The process starts with Start block 5102 and flows to function block 5104, where a query is presented to the event attendees, prompting a response. The process moves to block 5106, where the attendee responses are received by the system, then to block 5108, where the responses are processed and stored by the system. Next, at block 5110, the responses are analyzed for statistical information. Next, at decision block 5112, if there are no more queries to be presented, the process ends at End block 5114. If, however, more queries are to be presented, the process moves to block 5116, where the responses to the previous query are analyzed with an algorithm tailored to that query. Next, the process flows to block 5118, where the results of the analysis from block 5116 are used to select the next query to be presented. Finally, the process closes the loop to 5104 and presents the newly selected query.

Figure 52:
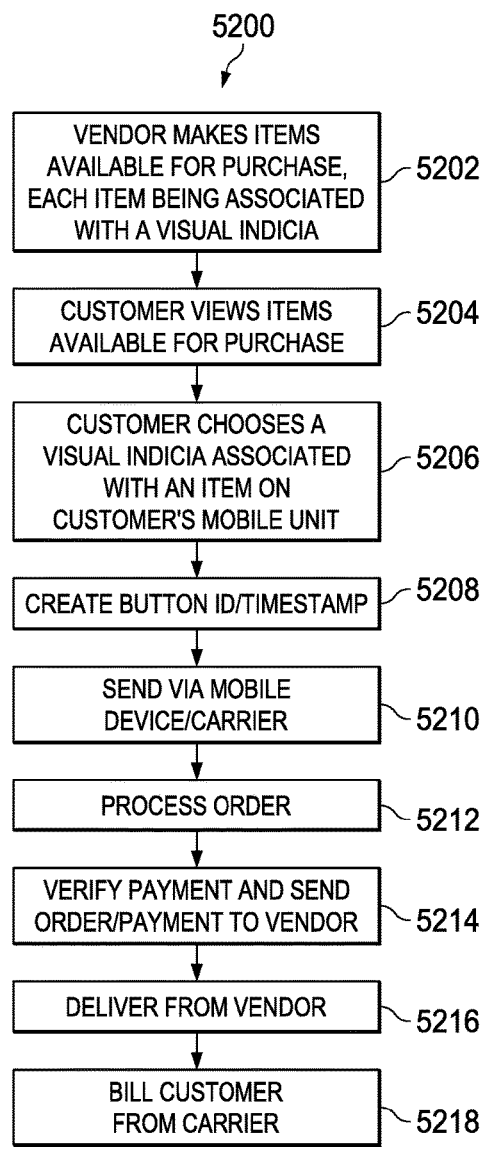
FIG. 52 illustrates a flowchart depicting another embodiment for an operation of a merchandising feature area.

Referring now to FIG. 52, there is illustrated a flowchart depicting another embodiment for the operation of the merchandising feature area method 5200. The method 5200 begins at step 5202 where a vendor makes items available for purchase, the items being associated with visual indicia. For instance, one item might be associated with the letter "A," one item might be associated with the number "5," one item might be associated with a triangle symbol, and so on. It will be understood that the vendor could be any type of vendor that sells goods, such as retail stores, direct sales salesmen, vendors that sell items on the internet, vendors that sell items on television, or any other type of vendor. At step 5204, a customer views the available items. At step 5206, the customer chooses one of the items to purchase by selecting on the customer's mobile unit the specific visual indicia among the displayed group of visual indicia associated with the item the customer wishes to purchase.

At this point, a button ID with a timestamp is created. It is provided in order to encode within the button ID the information about the button unique to the application, i.e., a unique button code. This is then combined with a timestamp and sent via the overriding offer application, which is associated with the screen 2308, to the provider 2306 in order to interface with the vendor 2312 or to just send the information to vendor 2312. This is indicated at a block 5208. The program then flows to block 5210, wherein this is sent via the MU 110 to the carrier and then to the vendor 2312. At step 5212, the overall order is processed. This process includes verifying payment and then sending order/payment to the vendor, as indicated by block 5214. The vendor will then deliver the product as indicated by block 5216, and the customer is billed by the provider, as indicated by block 5218.

Figure 53:
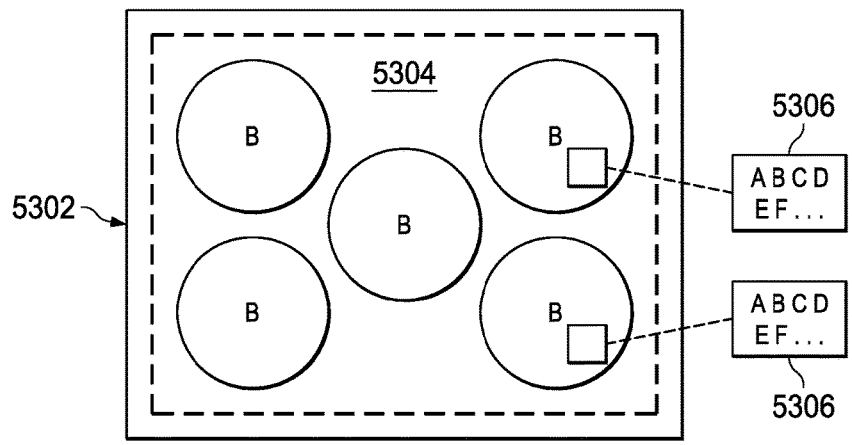
FIG. 53 illustrates a diagrammatic view of one embodiment of a system for providing items to be sold based on visual indicia within the range of a beacon.

Referring now to FIG. 53, there is illustrated a diagrammatic view of one embodiment of a system for providing items to be sold based on visual indicia within the range of a beacon. There is shown a sales area 5302. This may be the confines of a retail location, the confines of a home where direct sales are taking place, or any other location where goods may be sold. Within the sales area 5302, there are a plurality of beacon areas 5304. The plurality of beacon areas 5304 may be achieved using various forms of wireless networks or other configurations. For example, the plurality of beacon areas 5304 may be WIFI networks, Bluetooth networks, BLE networks, Zigbee networks, Thread networks, wireless mesh networks, achieved with geo-fencing, or any other method of creating a beacon area that a customer may use to connect to all of these non-overlapping networks. Within the plurality of beacon areas 5304 may be a plurality of items for sale 5306. Each item of the plurality of items for sale 5306 is marked with a particular visual indicia that is unique from the visual indicia used to mark the other items within the plurality of items 5306. For example, if a t-shirt is marked with the visual indicia of "A" within one beacon area, there would be no other item within that same beacon area marked with the visual indicia of "A." However, another item within a different beacon area may be marked with the same visual indicia. For example, if a t-shirt is marked with the visual indicia of "A" within one beacon area, a pair of shoes that is within another beacon area may also be marked with the visual indicia of "A." Thus, the beacon area represents proximity to the goods.

Figure 54:
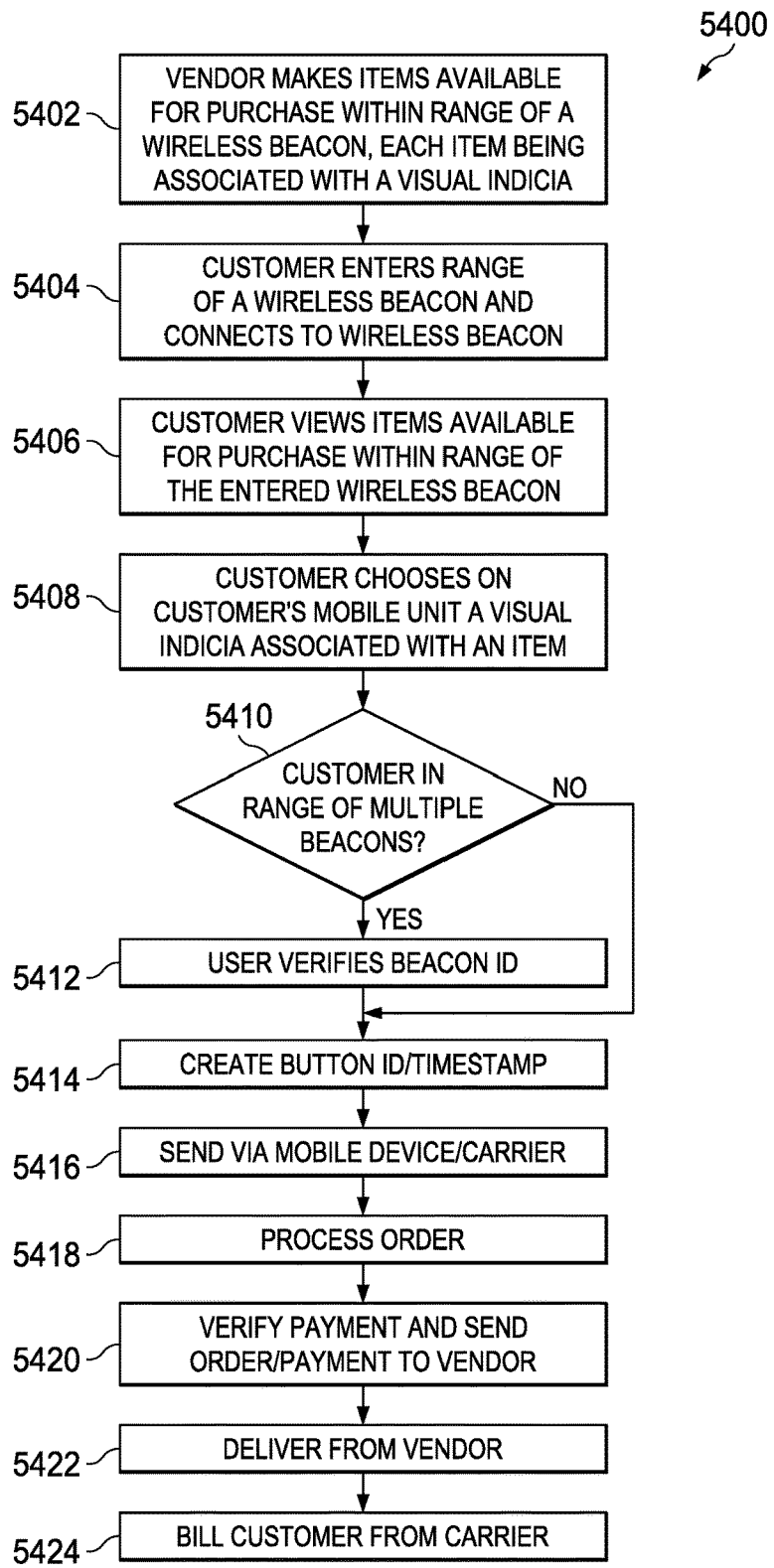
FIG. 54 illustrates a flowchart depicting one embodiment of a method for purchasing items to be sold based on visual indicia within the range of a beacon.

Referring now to FIG. 54, there is illustrated a flowchart depicting one embodiment of a method 5400 for purchasing items to be sold based on visual indicia within the range of a beacon. The method 5400 begins at step 5402 where a vendor makes items available for purchase, with the items being within a range of a wireless beacon and the items being associated with visual indicia. For instance, one item might be associated with the letter "A," one item might be associated with the number "5," one item might be associated with a triangle symbol, and so on. It will be understood that the vendor could be any type of vendor that sells goods, such as retail stores, direct sales salesmen, vendors that sell items on the internet, vendors that sell items on television, or any other type of vendor. At step 5404, a customer enters the range of a wireless beacon and connects to the wireless beacon in the manner appropriate for the particular beacon type or just receives a signal from the beacon. This connection may be achieved automatically, or the customer may have to manually connect to the beacon. At step 5406, a customer views the available items. At step 5408, the customer chooses one of the items to purchase by selecting on the customer's mobile unit the visual indicia associated with the item the customer wishes to purchase. At decision block 5410, the system determines if the customer is within range of multiple beacons. This may occur if there are overlapping beacon areas. If so, the process moves to step 5412 where the user is prompted to verify his beacon ID. The customer may know which beacon he is connected to based on the name of the organization he is shopping with, or if the organization has multiple beacon areas, the particular physical area within the beacon area may have signage that is marked with the beacon ID so that the customer knows which beacon area he currently is within. The process then moves to step 5414. If at decision block

5410 it is established that the customer is not within range of multiple beacon areas, the process also moves to step 5414.

At this point, a button ID with a timestamp is created. It is provided in order to encode within the button ID the information about the button unique to the application. This is then combined with a timestamp and sent via the overriding offer application to a service provider/mobile carrier in order to interface with the vendor selling the items to be sold or to just send the information to vendor. This is indicated at step 5414. The program then flows to block 5416, wherein this is sent via the MU 110 to the carrier and then to the vendor. At step 5418, the overall order is processed. This process includes verifying payment and then sending order/payment to the vendor, as indicated by block 5420. The vendor will then deliver the product as indicated by block 5422, and the customer is billed by the provider, as indicated by block 5424. The product may be shipped to the customer, or the vendor may simply hand the item to the customer if the customer is at a vendor location, to satisfy step 5422.

Overall, the use of a beacon for determining proximity to a particular location can be achieved by disposing a very small device such as BLE device or a Zigbee device proximate to the appropriate goods. This can be a very low powered beacon that just emits, in one embodiment, and identifying a signal which is basically a wireless broadcast containing the unique ID of the particular beacon. This beacon could be more powerful which would allow it to transmit not only its unique ID but also information associated with that unique ID. Thus, when a user with a portable device running proprietary application comes into proximity to the beacon, i.e., the transmit range of beacon, it will have an appropriate radio associated with that beacon contained internal thereto. This radio will constantly scan the area for signals associated with a particular type of beacon. However, other types of devices might use the same technology and transmit their IDs. Thus, when a scan is complete and, for example, multiple unique IDs are retrieved, it may be possible that additional information associated with the ID can allow one to distinguish this particular beacon as being associated with the operation of the application. Alternatively, a lookup table can be provided for determining if a particular unique ID is associated with the application.

When a match is found, this indicates that the beacon is associated with the goods. All that is required is for the mobile unit to transmit information regarding the unique ID associated with the button pressed and the beacon ID (or information associated with the beacon) back to a central office for processing. As described hereinabove, that processing can be performed at the mobile carrier or at a separate site. It is important, however, that the mobile carrier is accessed because the mobile carrier contains the billing information and the mobile carrier is the vehicle by which the billing is carried out. Thus, the information could be sent to the mobile carrier which is then relayed to the store associated with that unique ID and then the vendor confirms the existence of the product that is ready for shipping and coordinates with the carrier to confirm that the carrier will bill the customer for the goods, at which time the confirmation by the carrier of the billing will result in the vendor being authorized to send the goods to the customer via a mailing address associated with customer account number or, alternatively, the vendor could be authorized to actually transfer possession of the goods at the location.

An alternate operation, the entire operation could be triggered by the mobile unit coming into proximity with the beacon. When the beacon is standing and a recognition of the unique ID indicates that it is associated with the application, the full application is launched and the above process carried out.

Figure 55:
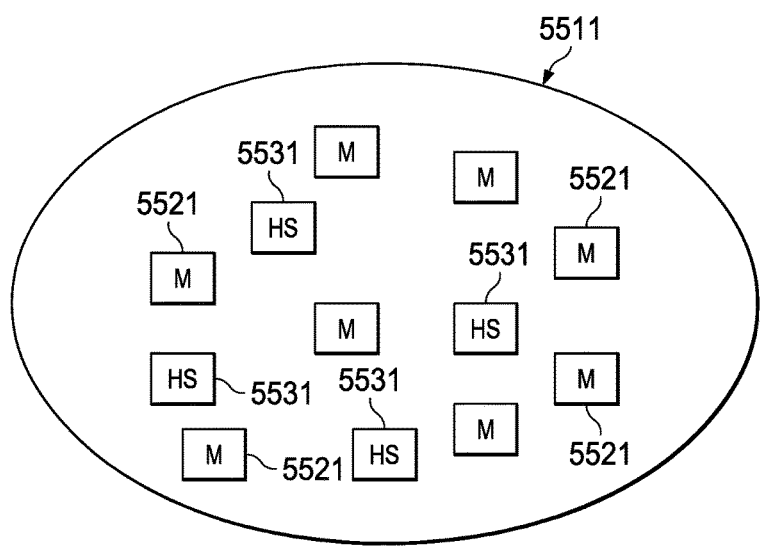
FIG. 55 illustrates a stadium with several mesh networks.

In some embodiments, the mobile units 110 are part of and transmit their responses through one or more mesh networks. Referring now to FIG. 55, there is illustrated an overhead view of venue in the form of a stadium 5511. In some embodiments, the venue is instead a theater, while in others the venue is a concert hall. Inside the stadium 5511 are a plurality of mesh networks 5521. The mobile units within the stadium connect to and join one of the mesh networks 5521. Since the coverage area of each of the mesh networks is limited, several mesh networks are present in the stadium to ensure that no matter where a mobile unit is in the stadium, there is a high likelihood that a mesh network will be available and in range so that the mobile unit can connect to it. Each mesh network is connected to external networks via hotspots 5531. The hotspots 5531 facilitate communication between each mesh network 5521 and whichever external networks the hotspots are connected to, including the LCO 120 and any intermediary networks between the LCO and the hotspots.

Figure 56:
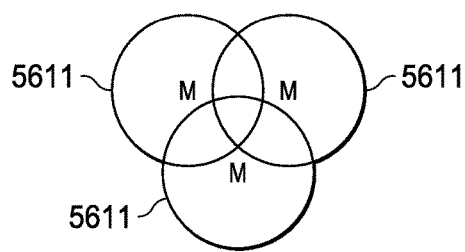
FIG. 56 illustrates several overlapping mesh networks.

Referring now to FIG. 56, there is illustrated a plurality of mesh networks 5611 within the stadium 5511 illustrated in FIG. 55. To maximize the chance that any given mobile unit will be in range of and will be able to connect to a mesh network, the mesh networks will have coverage areas that overlap with each other as shown FIG. 56. Ideally, any time a mobile unit exits the coverage area of one mesh network, it will already have entered the coverage area of another mesh network. That way, when a mobile unit moves outside the range of the mesh network it is a part of and leaves that network, it will simply join a mesh network with a coverage area that overlapped the mesh network it left. This will maximize the ability of mobile units to stay connected to mesh networks and minimize the areas of the stadium 5511 where mobile units will not be able to connect to any mesh network.

Figure 57:
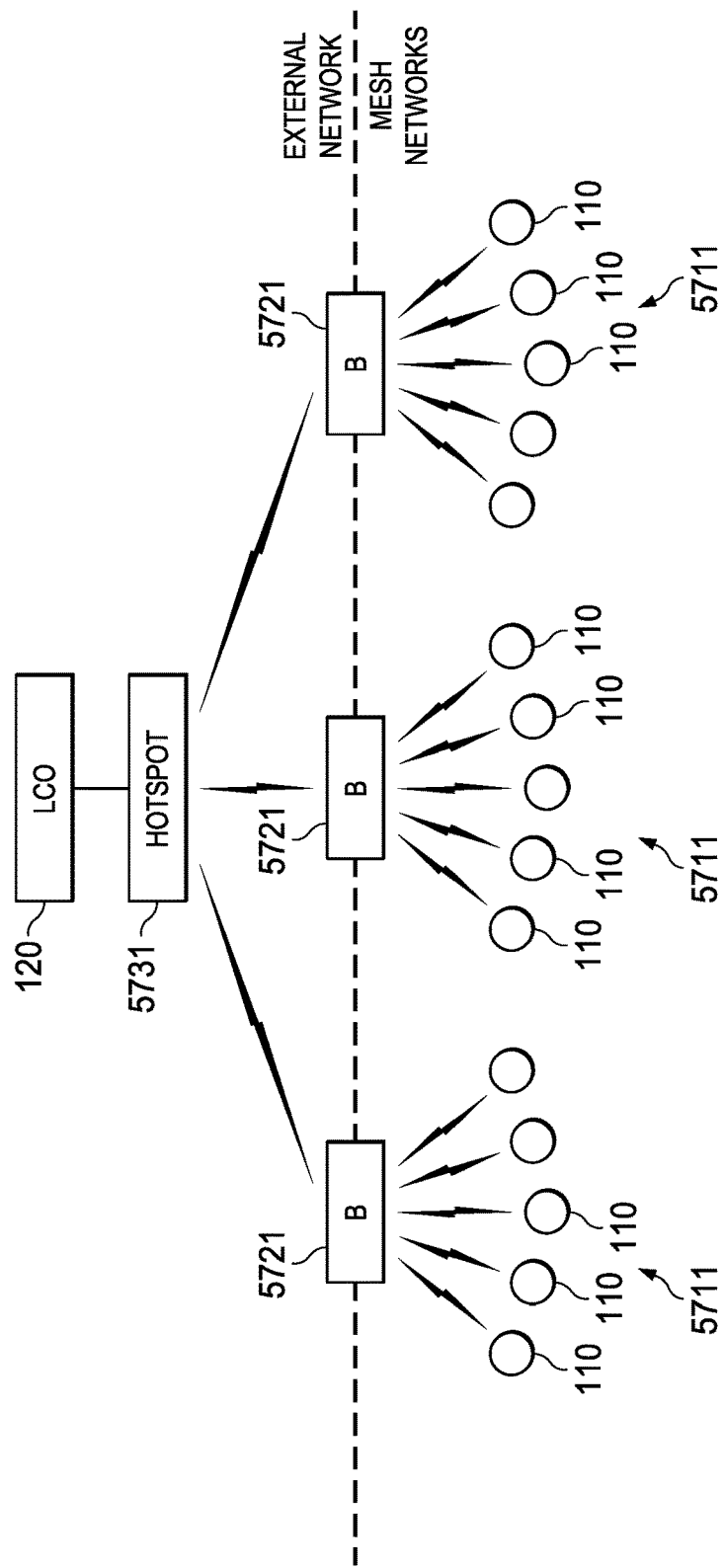
FIG. 57 illustrates several mesh networks connected to external networks via a hotspot.

Referring now to FIG. 57, there is illustrated a more detailed diagram of several mesh networks and a hotspot as would exist in the stadium 5511 in FIG. 55. Each mesh network 5711 is comprised of multiple mobile units 110 and a bridge device 5721. The mobile units 110 are connected to the bridge device 5721 either directly or via other devices in the mesh network. The function of the bridge devices 5721 is to connect each mesh network, and the devices on each mesh network, to external networks. In some embodiments, the bridge device is connected to external networks wirelessly, while in some embodiments, the bridge device is connected via Ethernet or another wired connection. In the embodiment illustrated in FIG. 57, all of the bridge devices are connected to at least one associated hotspot 5731, there being a plurality of hotspots 5731 disposed throughout the venue. The hotspot 5731 is, in turn, connected to LCO 120 and any intermediary networks between LCO 120 and the hotspot 5731.

As a user walks around the venue, the may leave the receive range of the bridge device 5731 it is associated with. This will require entering a new mesh network when it is within range of a bridge device 5731 for that network. Since only about 256 devices can be on a mesh network, the device will have to find a network with a free spot with its locale.

Figure 58:
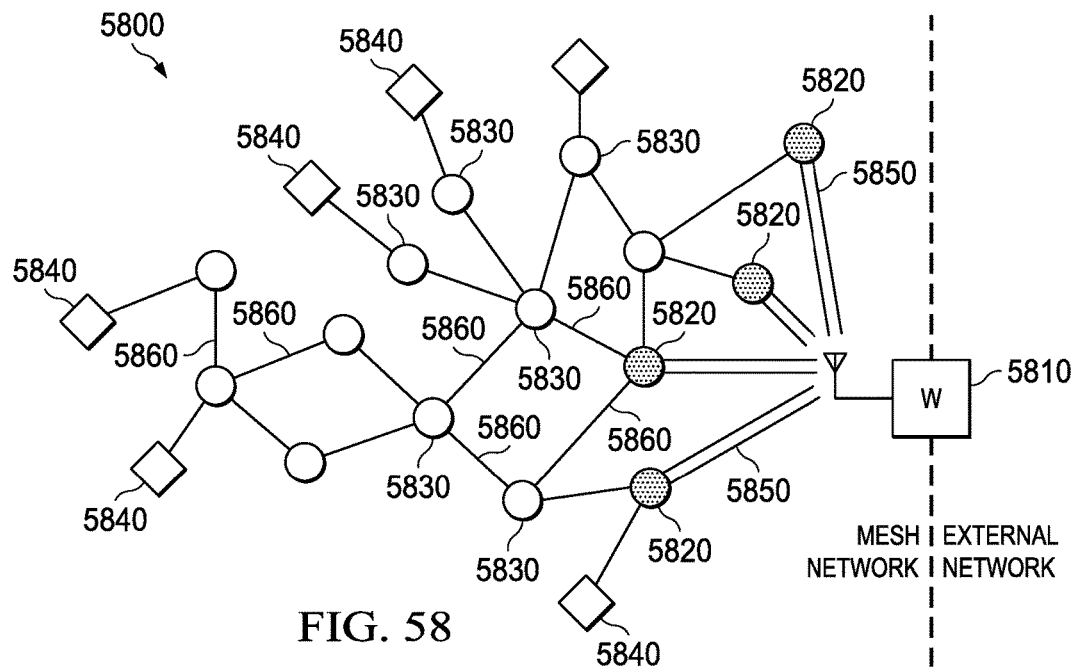
FIG. 58 illustrates an embodiment using a mesh network.

Referring now to FIG. 58, there is illustrated a diagram of an embodiment of the disclosure which uses a mesh network 5800—for example, Thread or Zigbee—to connect the mobile units to bridge devices which receives query responses from the mobile units. These bridge devices then forward the mobile unit responses out of the mesh network to external networks. One or more bridge device 5810 is directly connected (wirelessly) to a certain mobile unit or mobile units near the bridge device 5810. The bridge device 5810 is also connected to an external network and acts as a bridge between the mesh network and the external network. In some embodiments, the bridge device or devices are connected directly to local central office (LCO) 120. In other embodiments, however, there is another device which relays information from the bridge device 5810 to the LCO 120. The mobile units connected directly to the bridge device are represented as mobile units 5820. Double lines represent direct connections 5850 between mobile units 5820 and bridge device 5810. The mobile units 5820 maintain wireless connections 5850 with the bridge device(s) 5810. Mobile units 5820 transmit information to bridge device 5810, but also receive information from other mobile units in the network and relay that information to bridge device 5810. Some mobile units are not connected to bridge device 5810, but are instead connected to other mobile units, including mobile units 5820 that are themselves connected to bridge device 5810. These are mobile units 5830. Mobile-units-to-mobile-unit network connections 5860 are represented by single lines connecting mobile units. Mobile units 5830 not only transmit information to receive information from other mobile units and transmit information to other mobile units. Finally, some mobile units are only connected to other mobile units in the network and only transmit information to other mobile units. These are mobile units 5840. The mesh network 5800 is comprised of the mobile units and the bridge device(s) 5810. The mesh network 5800 allows multiple mobile units to create a network among themselves which includes the bridge device 5810. Not all mobile units need to be connected directly to or transmitting information directly to the bridge device 5810. Instead, the mobile units 5820, 5830, 5840 form a "mesh" of connections which link all of the mobile units together within a single mesh network that is defined by a finite limited number of network members. As long as each mobile unit is within communication range with at least one other mobile unit in its network, or anything else on the mesh network, each mobile unit can transmit information to another mobile unit or device on the network, which will then transmit the information to another mobile unit or device on the network. The information is transmitted from unit to unit until the information is received by a mobile unit or device on the network that is directly connected to the bridge device. That mobile unit then transmits the information to the bridge device 5510, which then transmits the information out of the mesh network to an external network.

Also, mobile units can be connected to multiple other mobile units within the mesh network. Consequently, if for some reason a mobile unit leaves the network (the mobile unit is turned off, turns off the application, etc.) any mobile units connected to it can still maintain communication with bridge device 5810 via the other mobile units within the network to which they are connected. Mobile units can enter or leave the mesh network at any time. Mobile units can also change what function they serve within the mobile network. For example, a mobile unit might start out connected directly to bridge device 5810 as a mobile unit 5820. If, however, the mobile unit moves far enough away from the bridge device 5810, or for any other reason the connection between the mobile unit and the bridge device 5810 degrades, the mobile unit might disconnect from the bridge device 5810 and become a mobile unit 5830 within the mesh network. Similarly, a mobile unit 5840 might pick up new connections to mobile units entering the mesh network, making the former mobile unit 5840 (which only transmitted information) a mobile unit 5830 (which receives information from some mobile units and transmits information to other unit). The ability of the mobile units to change roles within the network at any time adds to the network's robustness.

Figure 59:
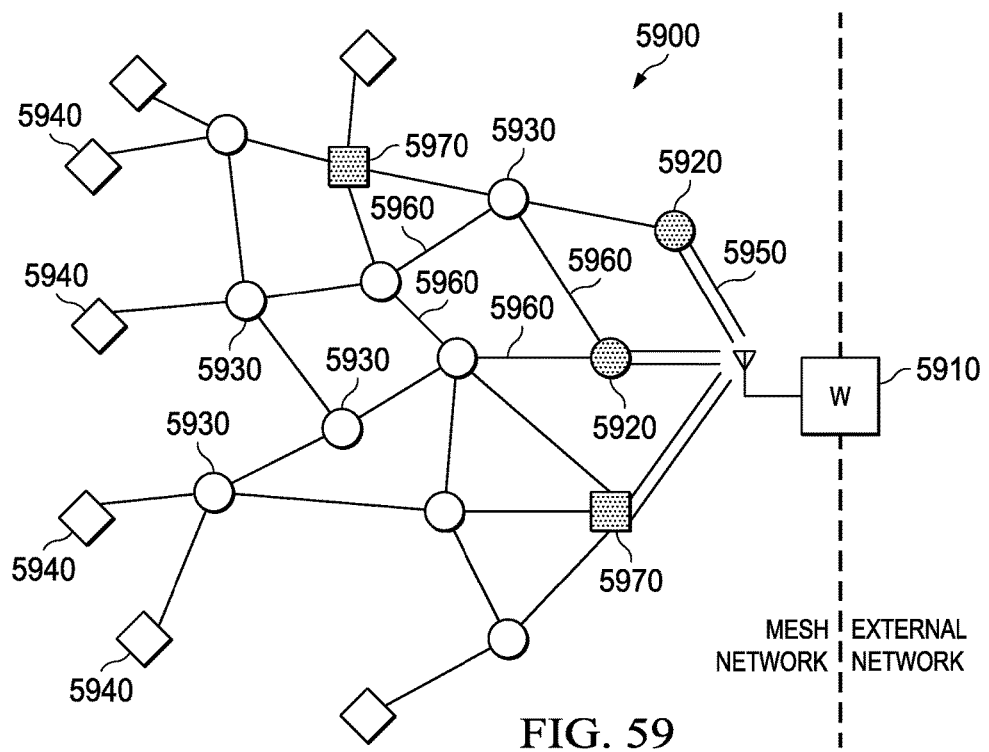
FIG. 59 illustrates another embodiment using a mesh network.

Turning to FIG. 59, there is illustrated another embodiment using a mesh network. In this embodiment, like that shown in FIG. 59, the mesh network 5900 includes at least one bridge device 5910 (in some embodiments, connected directly to LCO 120, in others connected to LCO 120 via another device), mobile units 5920 connected directly to bridge device 5910 (via connections 5950), mobile units 5930 which receive and transmit information to and from other mobile units within the network (via connections 5960), and mobile units 5940 which only transmit information to other mobile units. This embodiment, however, also includes wireless relay stations 5970. The wireless relay stations 5970 are part of the mesh network 5970 and fill in any "gaps" in the network that might be caused by the absence of a mobile unit in the area. A relay station 5970 is a member of the network 5970 and can be connected to the bridge device 5910, to nearby mobile units 5920, 5930, 5940, to other relay stations 5970, or to any combination of the three. The relay stations 5970 do not act as mobile units by providing responses to queries, rather, they simply relay information from mobile units through the network until the information reaches the bridge device 5910. In this way, the mesh network 5900 will not be adversely affected by a lack of mobile units in a particular physical location within the event venue. Even if a particular mobile unit is not within communication range of either the bridge device 5910 or another mobile unit in the network, the mobile unit can still communicate with the network if it is within communication range of a relay station 5970 that is part of the network.

The devices on each embodiment of a mesh network presented communicate via radio frequency using the IEEE 802.15.4 communication standard. The mesh networks use internet protocol version 6 (IPv6) for routing device-to-device communication. Therefore, the mobile units and wireless relay stations each have unique IPv6 addresses, enabling the routers within the mesh network to route information between the devices. The mesh network is comprised of devices acting in four different roles: routers, router-eligible end devices (REEDs), border routers, and end devices. Routers provide routing services to network devices. Routers both receive and transmit information to and from other devices on the mesh network. They also allow (or deny) new devices to join the mesh network. End devices communicate with the network through network routers, but do not forward messages from other devices. Router-eligible end devices (REEDs) are devices which have the ability to act as network routers if needed, but generally act as end devices. Finally, border routers are provide all of the functionality of normal routers, but they also provide connectivity from the 802.15.4 mesh network to another network, such as a Wi-Fi network or an Ethernet network. Each mesh network disclosed has devices serving as border routers and either end devices or REEDs. Some mesh network embodiments will also comprise devises filing the roles of normal routers, end devices, or both.

In the embodiment shown in FIG. 58, mobile units 5820, 5830, 5840 all act as REEDs. This is because they can perform routing services and forward messages within the mesh network if needed, but typically will only transmit messages to other routing devices. In some embodiments, bridge device 5810 acts as a border router, as it performs routing services within the network, but also routs messages, usually in the form of query responses, from the mesh network to the local central office 120, either directly or via external intermediary networks. The wireless relay stations 5970 shown in FIG. 59 act as routers within the mesh network, since they do not generate their own response messages, but function only to forward response messages from mobile units in the network through the network on to the wireless receiving station 5910.

For a mobile unit to participate in the mesh network, it must first join the mesh network by proceeding through either two or three phases: discovery (not always required), commissioning, and attaching. During the first phase, discovery, the mobile unit (the joining device) discovers the mesh network and establishes contact with a device within the mesh network acting as a router (or border router or REED). To do this, the mobile unit scans for network channels and sends out a beacon request on each channel. The mesh network, when it is accepting new devices into the network, will respond with a beacon message comprising the network Service Set Identifier (SSID) and a permit joining beacon. The mobile unit, upon receiving the permit joining beacon, has now discovered the mesh network. The mobile unit then uses Message Link Establishment (MIL) messages to detect, establish communication, and configure a secure radio link with a nearby router with which it can perform the next step, commissioning. The mesh networks in the embodiments presented herein are secure networks. Because of this, new devices cannot join the network until they are granted access by the mesh network in the phase called "commissioning." It should be noted that if a mobile unit already has commissioning information, it does not have to go through the discovery phase. Commissioning can be accomplished on the mesh network via two different methods. With the first method, the out-of-band method, commissioning information is configured on the mobile unit directly. This allows the mobile unit to join the mesh network as soon as it is introduced to the network. With the second method, a commissioning session set up between the mobile unit and an application on another device securely delivers commissioning information to the mobile unit, at which point the mobile unit is allowed to join the mesh network. In some embodiments, the mobile unit will be required deliver a passcode to the mesh network (or an external device controlling which devices may join the network) before commissioning information will be furnished to the mobile unit. In some embodiments, this passcode will be furnished to the event attendees by the event venue. The final phase of joining the mesh network is "attaching." During "attaching," a mobile unit which has commissioning information contacts a router already on the mesh network, exchanges link configuration information, and finally joins the mesh network.

As described above herein, the network containing the mobile units can be a mesh network. In these embodiments, devices on the network can forward messages for other devices. In some embodiments, mobile units can forward messages to other devices on the network, including other mobile units. In other embodiments, only dedicated relay stations can forward messages from other devices on the mesh network. If the connection between devices acting as routers or between a mobile unit sending a message to a router becomes unreliable, then the mesh network will forward the message through another router in the network. A device routing table is maintained by one of the routers on the mesh network to make sure that all routers have up-to-date information on possible message paths for the other routers in the network. Included in the information regarding message paths is the "cost" of routing information from each router device to every other router device in the network. The better the quality of the link between a device on the network and a neighboring device is (measured by Received Signal Strength Indicator, or RSSI), the lower the "cost" of transferring messages one way or the other between the devices is. Each routing device calculates the "cost" of messages to and from its neighbor and provides this information to the mesh network. The cost of sending a message from one router to another in the network is therefore the sum of the costs of sending a message over each link on the path from one router to the other router. The costs of delivering messages within the network are updated on a regular basis, so the devices within the network always have up-to-date information on which path is the most efficient path on which to send a message.

Figure 60:
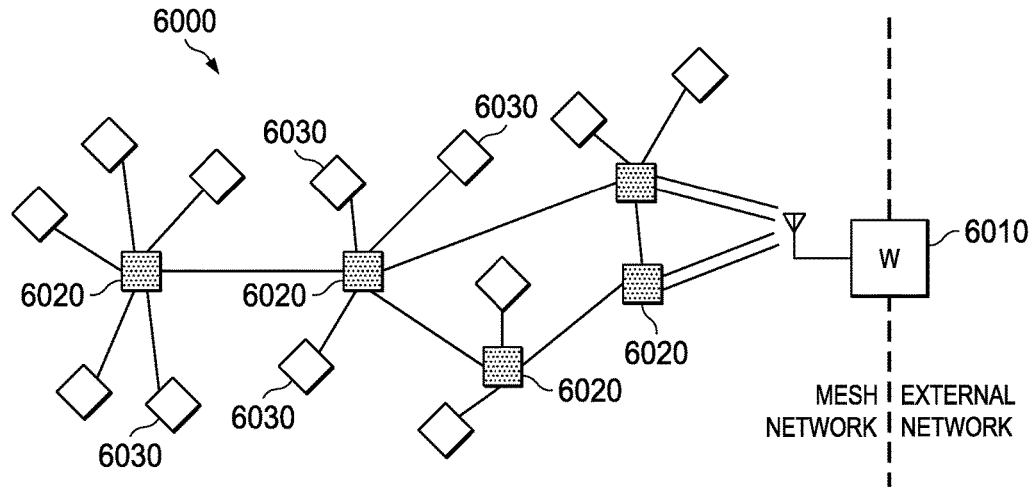
FIG. 60 illustrates yet another embodiment using a mesh network.

FIG. 60 illustrates another embodiment using a mesh network 6000. In this embodiment, the mesh network comprises a bridge device 6010, network relay stations 6020, and mobile units 6030. In this embodiment, mobile units 6030 act only as end units within the mesh network 6000. They do not forward messages from other devices on the mesh network. Rather, they only send response messages to relay stations 6020. In this embodiment, the relay stations 6020 act as routers and within the network. Their function is to forward messages from mobile units 6030 on the network to other relay stations 6020 on their way to the bridge device 6010. They can also facilitate the joining of new mobile units to the mesh network. The mobile units 6030 are connected to the relay stations 6020 within the network, which are then connected to other relay stations within the network. Some relay stations 6020 are connected directly to bridge device 6010. The bridge device 6010 functions as a border router, connecting directly to networks external to mesh network 6000.

In some embodiments, the event venue will have multiple mesh networks active simultaneously in different areas of the venue. In these embodiments, the coverage areas of at least some of the mesh networks will overlap with each other. If a mobile unit moves out of range of one network, the mobile unit will be able to automatically join a different mesh network.

Figure 61:
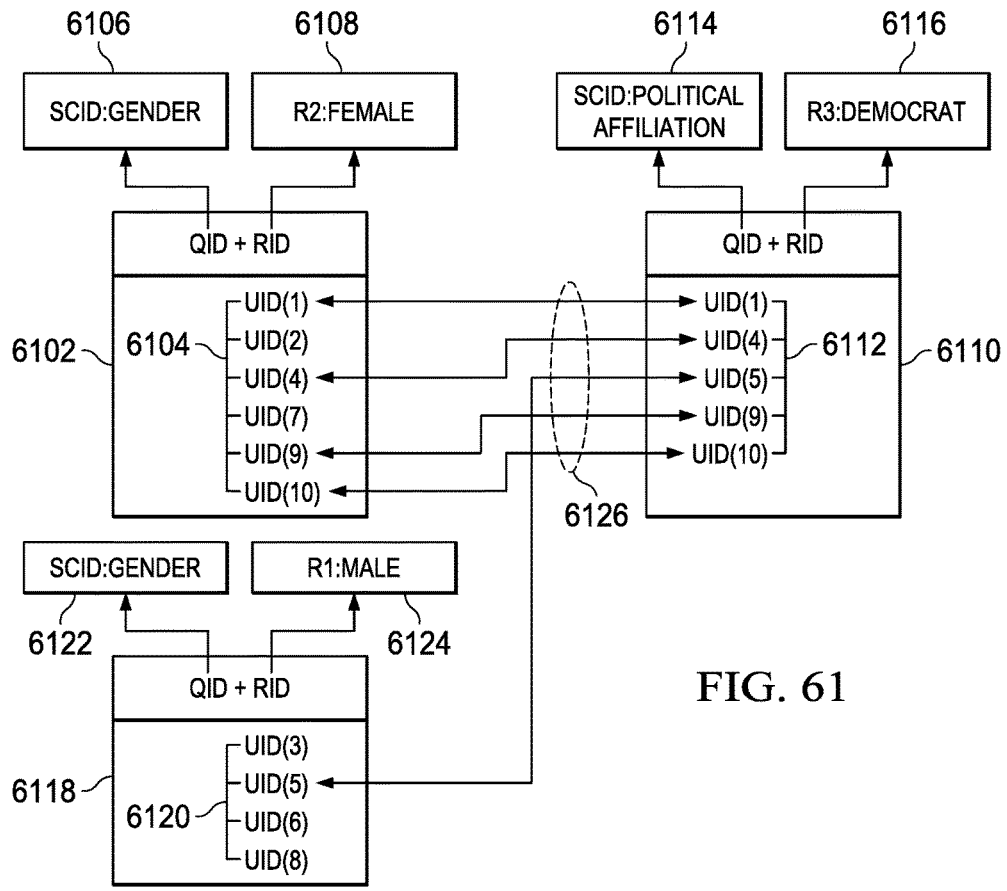
FIG. 61 illustrates a diagrammatic view of one embodiment a relational database trending determination model.

Referring now to FIG. 61, there is illustrated a diagrammatic view of one embodiment a relational database trending determination model. There is illustrated a first QID+RID record 6102 containing a first plurality of UIDs 6104. Each of the first plurality of UIDs 6104 is a UID identifying a particular individual who answered the question and provided the response associated with the first QID+RID record 6102. This is illustrated by showing a link to an SCID 6106 associated with the question, linked from the QID of the first QID+RID record 6102. Similarly, the response associated with the question is shown by a link to the answer 6108 associated with the RID of the first QID+RID record 6102. With respect to the first QID+RID record 6102, the associated SCID 2806 is "Gender," denoting that the question is one asking for the gender of the responders. The associated answer 6108 is "R2: Female," which denotes that the associated answer 6108 is the second answer choice for the associated question, with that answer choice being the "female" option.

There is further illustrated a second QID+RID record 6110 containing a second plurality of UIDs 6112. Each of the second plurality of UIDs 6112 is a UID identifying a particular individual who answered the question and provided the response associated with the second QID+RID record 6110. This is illustrated by showing a link to an SCID 6114 associated with the question, linked from the QID of the second QID+RID record 6110. Similarly, the response associated with the question is shown by a link to the answer 6116 associated with the RID of the second QID+RID record 6110. With respect to the second QID+RID record 6110, the associated SCID 6114 is "Political Affiliation," denoting that the question is one asking for the political affiliation of the responders. The associated answer 6116 is "R3: Democrat," which denotes that the associated answer 6116 is the third answer choice for the associated question, with that answer choice being the "democrat" option.

There is further illustrated a third QID+RID record 6118 containing a third plurality of UIDs 6120. Each of the third plurality of UIDs 6120 is a UID identifying a particular individual who answered the question and provided the response associated with the third QID+RID record 6118. This is illustrated by showing a link to an SCID 6122 associated with the question, linked from the QID of the third QID+RID record 6118. Similarly, the response associated with the question is shown by a link to the answer 6124 associated with the RID of the third QID+RID record 6118. With respect to the third QID+RID record 6118, the associated SCID 6122 is "Gender," denoting that the question is one asking for the gender of the responders. The associated answer 6124 is "R1: Male," which denotes that the associated answer 6124 is the first answer choice for the associated question, with that answer choice being the "male" option.

There is further illustrated in FIG. 61 a plurality of associations 6126 between UIDs and the QID+RID records. There is shown that UID(1), UID(4), UID(9), and UID(10) are each within both the first QID+RID record 6102 and the second QID+RID record 6110. This means that the individuals represented by UID(1), UID(4), UID(9), and UID(10) answered a gender query as "female" and also answered a political affiliation query as "democrat." Further, it can be seen that UID(5) answered the gender question as "male" and the political affiliation question as "democrat." This arrangement allows for analytics to be run on particular groups, thus forming a social measurement matrix. For example, the illustration in FIG. 61 shows that, out of the six respondents who answered "female" for the gender question, four of them also stated that they affiliate themselves with the democratic party. This means that approximately 67% of the female respondents identify with the democratic party. It can also be seen that, of those who responded "democrat," 80% were female. It can also be seen that only one out of 4 males answered the political affiliation question as "democrat," meaning that only 25% of the male respondents identify with the democratic party.

It will be understood that some female or male respondents may not have answered, but the analytics or queries used to pull the stored data from the database may be tailored to check whether UIDs that answered the first question chose one of the responses for the political affiliation question. For example, the first QID+RID record 6102 consisting of female respondents has UID(1), UID(2), UID (4), UID(7), UID(9), and UID(10) answering as being "female." However, UID(2) and UID (7) are not shown as answering "democrat" for the second QID+RID record 6110. If UID(2) did not answer this particular question at all, while UID(7) chose the "republican" option, this could be taken into account when determining the results. For example, the results could instead state that 80% of the females identified as "democrat," be simply removing UID (2) from the pool and relying on a total female population of five instead of six. Alternatively, the results could read as 67% of the females identified as "democrat," 16.5% identified as "republican," and 16.5% as "undecided" to account for the one female who did not respond. It will be understood that these percentages are approximations and are merely illustrative. They do not represent definitely how the system would round the percentages. It will also be understood that the database may be configured in any way to allow for these association or similar associations. It will further be understood that these concepts could be applied to any demographic group and any form of question, as well as multiple demographics groups and multiple questions. It will also be appreciated that the numbers used in FIG. 61 are small numbers for demonstration purposes. The number of respondents could be an unlimited number.

Referring now to FIG. 62, there is illustrated one embodiment of an example database report 6202 retrieved from the database in which query and response data is stored. There is shown a title bar 6204 stating a given name of the report. This name may be auto-generated or manually entered by the person running the report. There is further shown a plurality of query parameter columns 6206, labeled as "Query P1," "Query P2," and "Query P3" for this example. In the last column is a results row 6208. Each of the plurality of query parameter fields 6206 lists various query parameters that were run against the database, with each row of the report representing one full search.

For instance, a first row 6210 shown in FIG. 62 shows that a QID+RID for a gender questions with the answer of "female" was searched as parameter 1, a QID+RID for a political affiliation question with the answer of "democrat" was searched as parameter 2, and a timestamp was searched as parameter 3. The "xx:xx" of the timestamp designates a wildcard, meaning any time of day is acceptable. Thus, the timestamp searched in this example limits the search to a particular day, but not a particular time. It will be understood that the system could use any other method of introducing wildcard characters. This provided a result of 67%, meaning 67% of female respondents also responded with "democrat." A second row 6212 shows a similar query where the search provides the percentage of respondents that affiliate with democrat who also are female, on a particular date (2015 Oct. 30), with the result being 80%. A third row 6214 provides yet another example where the search consists of a asking for the percentage of females who answered democrat, but without limiting the search by a timestamp, resulting in a result of 75%. A final example is shown in a fourth row 6216, where the search is for females who chose Pepsi as their soft drink of choice, with a result of 14.5%. Thus, this system allow for social measurements to be taken, as well as statistical extrapolation performed, as desired by the users of the system. It will be understood that the example report shown in FIG. 62 is but one example. Other formats may be achieved depending on the format of the report desired. Additionally, results may be in multiple forms other than a percentage, such as raw numbers of respondents.

Referring now to FIG. 63, there is illustrated a flowchart depicting one embodiment of a report generation method 6300. The method 6300 begins at step 6302 where an individual authorized to use the system runs a query or a series of queries against the database. These queries may have multiple parameters to allow the results to be narrowly tailored to the data the authorized individual desires. At step 6304, the database performs the entered query or series of queries. At step 6306, the system outputs a report listing the results of the query or series of queries. The report may be similar to that shown in FIG. 62, or may be in other formats as well, as desired.

Referring now to FIG. 64, there is illustrated one embodiment of an example seasonal database report 6402 retrieved from the database in which query and response data is stored. There is shown a title bar 6404 stating a given name of the report. This name may be auto-generated or manually entered by the person running the report. There is further shown a plurality of query parameter columns 6406, labeled as "Query P1," "Query P2," and "Query P3" for this example. In the last column is a results column 3108. Each of the plurality of query parameter fields 6406 lists various query parameters that were run against the database, with each row of the report representing one full search.

For instance, a first row 6410 shown in FIG. 64 shows that a QID+RID for a gender question with the answer of "male" was searched as parameter 1, a QID+RID for a political affiliation question with the answer of "republican" was searched as parameter 2, and a seasonal timestamp range was searched as parameter 3. The seasonal timestamp range shown in the first row 6410 is 2015-04-05 to 2015-11-02 (Apr. 5, 2015 to Nov. 2, 2015). This particular timestamp range corresponds to the major league baseball (MLB) season in 2015. This provided a result of 65%, meaning 65% of male respondents also responded with "republican" during the 2015 MLB season. A second row 6412 shows a similar query where the search provides the percentage of respondents that affiliate with republican who also are male. The seasonal timestamp range for the second row 6412 is listed as "2015 MLB Season." This demonstrates that particular seasons may be designated as with unique identifiers which can be entered instead of requiring the user to know and enter a specific date range for a particular season. The result of this query is shown to be 78%. A final example is shown in a third row 6414 provides yet another example where the search is for males who chose Coca Cola as their soft drink of choice, by using the seasonal timestamp range of "2015 MLB Regular Season," resulting in a result of 45%. This means that the timestamp range is that of the MLB regular season, not including any postseason dates.

Thus, this system allow for social measurements to be taken based on seasons, as well as statistical extrapolation performed, as desired by the users of the system. It will be understood that the example report shown in FIG. 64 is but one example. Other formats may be achieved depending on the format of the report desired. Additionally, results may be in multiple forms other than a percentage, such as raw numbers of respondents. Further, the seasonal reporting could be applied to any type of season, such as weather seasons, football, basketball, hockey, or other sports seasons, band touring seasons, Broadway musical seasons, or any other defined season.

Referring now to FIG. 65, there is illustrated a flowchart depicting one embodiment of a seasonal report generation method 6500. The method 6500 begins at step 6502 where an individual authorized to use the system prepares a query or a series of queries to run against the database. These queries may have multiple parameters to allow the results to be narrowly tailored to the data the authorized individual desires. At step 6504, the authorized individual enters in season or seasons, such as those described above, in order to limit the returned results to responses submitted during the particular season or seasons. At step 6506, the database performs the entered query or series of queries. At step 6508, the system outputs a report listing the results of the query or series of queries. The report may be similar to that shown in FIGS. 62 and 64, or may be in other formats as well, as desired.

In the overall operation, a particular venue is initiated with a group of attendees, of which a portion of those attendees may participate in answering queries. Initially, the only knowledge that can be determined is that there are a number of potential respondents. When the first query is posed, this can provide some information as to the makeup of respondents and, subsequently, the attendees in the venue. As more questions are asked, more information can be determined about the group as a whole with respect to the makeup thereof. This is to be compared with a polling system, wherein questions are asked of a random group or a group with a known makeup and it is the answers to these questions that provide a general trend. However, the makeup is fixed, i.e., for example, the group may be known to the 50% associated with one political party and 50% associated with a second political party and the responses of the specific affiliates or any political party are analyzed against each other. By comparison, the analysis of the group or the trend that the group may have, i.e., political leanings, is a function of the makeup of that group, which is defined by the responses to a particular query. As questions are asked, it can be determined what type of trend is present within a particular group of individuals. For example, a number of conservative questions could be posed to the group and a response analyzed to determine whether that group trends toward the conservative or the liberal side. Another group of questions could be posed to the group and a determination made as to whether that particular group trended to high income tastes or to low income tastes. Thus, the trends of the group are a function of the responses of the group to a particular set of queries and, as these queries are made, the trends will change, and because the particular makeup of the group will change. This change in the makeup of the group is due to the number of responses that are provided, which is a direct function of the number of "eyeballs" that are glued to the communication medium through which the queries are made. The responses are a direct indication of how many people are actually listing to the queries. As more and more people are listening to the queries, the trends will be seen to change, due to the fact that the makeup has changed. It is important to note that the "makeup" is associated with the portion of the overall attendees that are actually responding.

Figure 66:
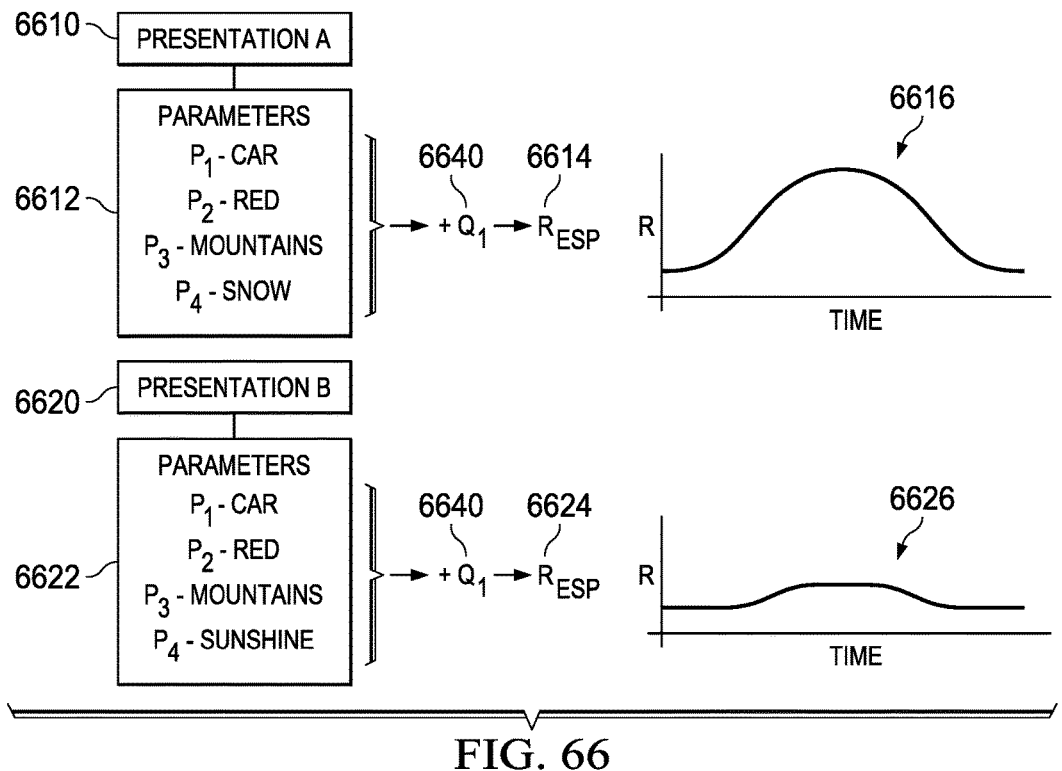
FIG. 66 illustrates representations of multiple presentations and the responses received from post-presentation queries.

In some embodiments, analysis of responses to queries is used to determine which query or media message characteristics are more likely to trigger responses from event attendees. Turning to FIG. 66, there are illustrated representations of two presentations, presentation 6610 (Presentation A) and presentation 6620 (Presentation B). In this example, both presentations are video advertisements for motor vehicles. Each presentation is characterized by a set of parameters (6612 for Presentation A, 6622 for Presentation B) which describe details of the presentation. Each set of parameters indicates the type of motor vehicle in the presentation, the color of the motor vehicle, the environment the vehicle is in, and the weather portrayed in the presentation. Of course, each presentation can be parametized by any number of parameters as elements. The presence or absence of fireworks, for example, could be distinguish one presentation from another. Each presentation is associated with a query 6640 which be presented to the event attendees following the presentation. Query 6640 is the same query for Presentation A and Presentation B. Each presentation also has a response set (6614 for Presentation A and 6624 for Presentation B) comprising of the responses by mobile unit users to the queries associated with the respective presentations. Finally, response graphs 6616 and 6626 plot the magnitude of the number of responses in sets 6614 and 6624 respectively to the queries presented after their respective presentations over time. By analyzing the information regarding how changing the parameters affects the number of responses given by event attendees, it can be determined which characteristics of a presentation are most likely to encourage active responses from the attendees. The presentations could be presented at the same venue at different times or at different venues.

Figure 67:
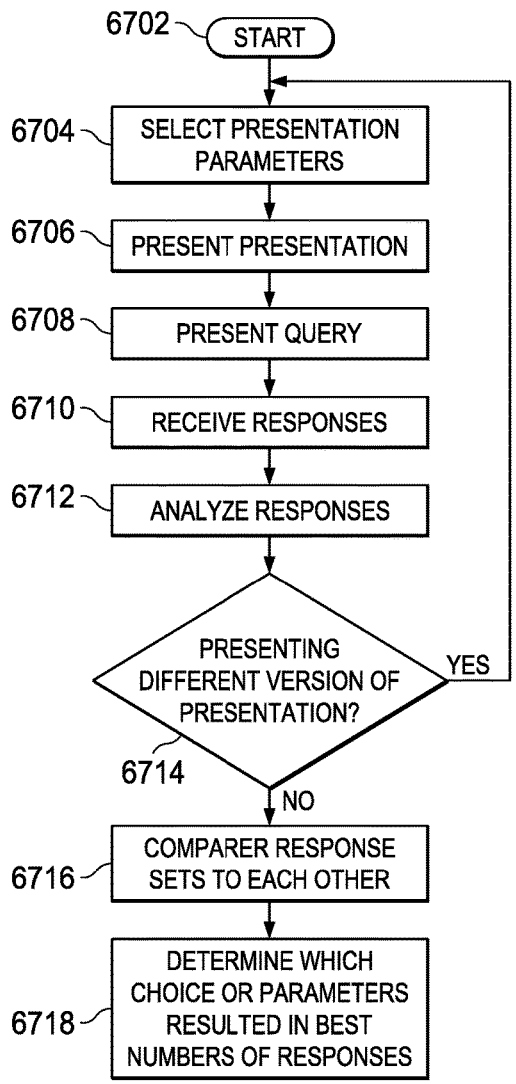
FIG. 67 illustrates a flowchart showing the process of determining lifestyle triggers for presentations.

Turning to FIG. 67, there is illustrated a flow chart showing the process by which parameters are analyzed to determine the best lifestyle triggers. The process starts with Start block 6702 and moves to function block 6704. At this point, the parameters for a presentation to be presented are chosen. One or more of these parameters will be varied in the future, or if the process has already occurred, is varied as compared to a previous time the presentation was shown. Next, the process moves to function block 6706, where the presentation is presented to the event attendees. The process flows to function block 6708, where a query prompting a response is presented to the audience. Next, the process moves to block 6710, where query responses are received by the system. At block 6712, the responses are analyzed, with particular focus on the magnitude of the number of responses at a given point in real time for the presentation most previously shown. At this point, the process moves to decision block 6714. Here, a decision is made as to whether or not another presentation will be shown. If so, the process loops back to block 6704, where parameters are again selected, this time varying at least one of the parameters as compared to the most recent presentation shown. If no more presentations are to be presented, then the process moves from block 6714 to block 6716, where the responses to queries presented after each presentation are compared to each other, with a particular focus on the number of responses received after each post-presentation query. Finally, the process moves to block 6718, there the results of block 6716 are analyzed to determine which parameter choices result in the highest magnitude of query responses and are therefore the best lifestyle triggers for event attendees.

Some embodiments of the disclosure will vary only one parameter, while other embodiments will vary multiple parameters. In some embodiments, one of the parameters varied is the time at which the presentation is presented to the event audience. In some embodiments, the presentation will be an advertisement. In other embodiments, the presentation will be an informative message. In other embodiments, the presentation will be an entertaining interlude. In some embodiments, the query presented will be in the form of a question. In some embodiments, the query will prompt attendees to vote for their preferred choice of something. In some embodiments, a parameter changed will be the music accompanying the presentation. In other embodiments, a parameter changed will be the length of the presentation or even the tempo thereof (slow or fast). In some embodiments, a parameter changed will be the age of an actor or actress in the presentation. In some embodiments, a parameter changed will be the ethnicity of an actor or actress in the presentation. In some embodiments, a parameter changed will be the gender of an actor or actress in the presentation. In some embodiments, parameters will be changed multiple times during a single event and presented to the same event audience.

Figure 68:
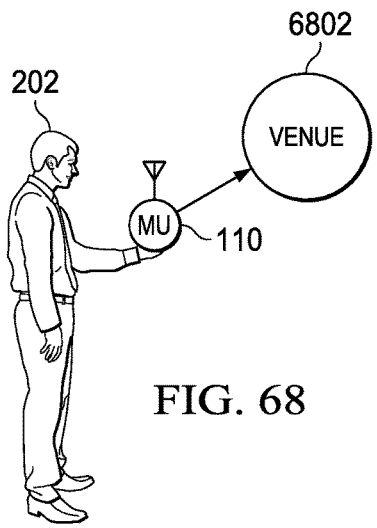
FIG. 68 illustrates a diagrammatic view of one embodiment of recognizing an individual entering a geo-fenced venue.

Referring now to FIG. 68, there is illustrated a diagrammatic view of one embodiment of recognizing an individual 202 entering a geo-fenced venue. There is shown an individual 202 in possession of a mobile unit 110. The venue has a geofence 6802 established that has a defined radius around the venue. Preferably, the radius of the geofence would not exceed the physical boundaries of the venue by much, if at all, so that individuals who are close enough to the venue, but still outside the venue, are not recognized as entering the venue. The precise GPS coordinates defining the geofence may be established ahead of time. A mobile application saved on the mobile unit 110, such as the mobile application described hereinabove, may have saved within the application a series of geofence boundary coordinates, enabling the mobile application to recognize when it has entered into such a boundary. As the individual 202 passes over the geofence boundary, the mobile unit 110 searches for its current GPS location. The mobile application on the mobile unit 110 then recognizes it is within the geofence for the particular venue, triggering the application to activate. Upon activation of the mobile application, the individual 202 can be presented with a screen to begin the rest of the processes described hereinabove.

Figure 69:
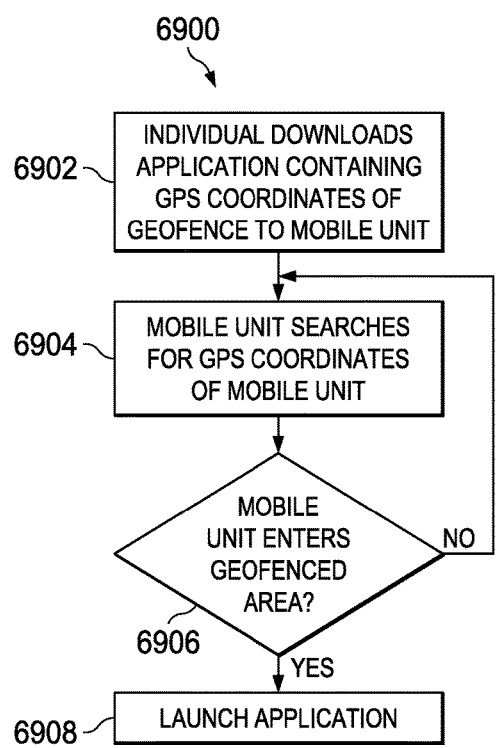
FIG. 69 illustrates a flowchart depicting one embodiment of a geo-fencing application trigger process.

Referring now to FIG. 69, there is illustrated a flowchart depicting one embodiment of a geo-fencing application trigger process 6900. The process 6900 begins at step 6902, where an individual downloads a mobile application containing the GPS coordinates defining a geofence or multiple geofences. At step 6904, the mobile unit searches for the current GPS coordinates of the mobile unit. At decision block 6906, it is determining if the mobile unit is within the geo-fenced area defined by the downloaded GPS coordinates of the geofence. If the mobile unit is not within the geo-fenced area, the process moves back to step 6904 to search again for the coordinates of the mobile unit. If, at decision block 6906, the mobile unit is determined to be within the geo-fenced area, the process moves to step 6908. At step 6908, the mobile application is launched. Once the mobile application is launched, the individual can be presented with a screen to begin the rest of the processes described hereinabove.

In general, a geo-fenced area can be defined by a fixed set of coordinates that define the boundary or by a single central GPS coordinate that just defines the venue. In the first example, this would require the mobile unit to compare its GPS coordinates with the set of boundary coordinates to determine if it is within that boundary. However, since user must answer the ticket number as part of the process, all that is required is to launch the application and know the general area and this can be achieved by using the latter example with a single GPS coordinate. Thus, when the mobile unit of the user is within a predetermined range of any of a group of defined single GPS coordinates, each associated with a different venue, then the application will be launched. This additional information can, in an alternative embodiment, be utilized to augment the unique code that is generated. The unique code, as described above, was defined as being a combination of the information from the ticket, i.e., the seat location and the timestamp, but this also could include the central GPS coordinate for that venue, thus defining the venue in the unique code associated with that particular mobile unit.

In some embodiments, the venue at which the collection of statistical data occurs is the Super Bowl. The Super Bowl is the annual championship game of the National Football League (NFL), a professional American football league. Being the championship for one of the most popular professional sports leagues in the United States, the Super Bowl regularly enjoys exceptionally high television ratings when compared to most other programs and sporting events. Since the Super Bowl is the championship game of the NFL, attending the Super Bowl in person can be very expensive. It is reported that the highest face value ticket for the 2015 Super Bowl was approximately $1,900. In fact, it is reported that, for the 2015 Super Bowl, the average price for a ticket on the second-hand market was reportedly over $4,000.

Because of the high price of tickets to attend the Super Bowl as compared to tickets for other sports or entertainment events, the demographics of the attendees most Super Bowl games are different than the demographics of attendees to regular-season NLF games, or even other post-season NFL games. Super Bowl attendees tend to be wealthier and better educated than the attendees of regular-season NFL games. For the Super Bowl game that took place in 2007, the average visitor had a household income of over $200,000 per year. Wealthy individuals are a highly coveted target of advertisements, political messages, and other types of media messages. Because of this, any audience with a high concentration of high-income individuals is an audience that advertisers and other parties wishing to deliver messages will want to reach.

Advertisers not only desire to deliver their messages to high-income audiences, they often desire information about the individuals in these audiences, including their buying habits, political preferences, gender make-up, ethnic make-up, ages, hobbies and even other sports interests. This means that such statistical information gathered from a high-income audience like the Super Bowl is very valuable. Thus, in some embodiments, the statistical information gathering will take place at a venue in which an American football game event is being played, and where the average household income of the event attendees is over $200,000 per year. In general, a particular venue for a particular event will have associated therewith a particular set of demographics and attendee profiles, and these will be duplicative between events.

In one Super Bowl, the ethnic make-up of the attendees was as follows: 73.7% white, 13.5% black, 8.5% Hispanic, 3.7% Asian, and 0.5% other. Most Super Bowl games will likely have a similar ethnic make-up. Whites will likely make up 70%-80% of the attendees, blacks will likely make up 10%-20% of the attendees, Hispanics will likely make up 5%-15% of the attendees, and Asians will likely make up 2%-10% of the attendees. Attendees to the Super Bowl may also generally not live close to the venue the Super Bowl is being held. For example, in one Super Bowl, only about 25% of attendees lived near the venue, while around 75% of attendees did not, calculated from 799 valid cases.

TABLE 1

STATES OF RESIDENCE OF VISTORS TO A SUPER BOWL

| | |
|---|---|
| Maryland | 25-35% |
| California | 21-31% |
| Texas | 7.5-15% |
| Louisiana | 7-15% |
| Florida | 3-10% |
| Other | 30-40% |

TABLE 2

INTERNATIONAL VISITORS TO A SUPER BOWL

| | |
|---|---|
| Canada | 10-20 |
| Mexico | 10-20 |

TABLE 2-continued

INTERNATIONAL VISITORS TO A SUPER BOWL

| | |
|---|---|
| Australia | 1-10 |
| Brazil | 1-10 |
| England | 1-10 |
| Mexico | 1-10 |

TABLE 3

PERCENTAGE OF PEOPLE STAYING OVER NIGHT AT A SUPER BOWL

| | |
|---|---|
| Yes | 70-80% |
| No | 25-35% |

TABLE 4

OVERNIGHT VS. DAYTRIPPER A SUPER BOWL

| Daytripper | Overnighter |
|---|---|
| 25%-35% | 65-75% |

TABLE 5

NUMBER OF NIGHTS STAYED IN VENUE'S CITY

| | |
|---|---|
| One Night | 3-10% |
| Two Night | 15-25% |
| Three Night | 25-35% |
| Four Night | 30-40% |
| Five Nights or More | 20-30% |
| Average # of Nights | 3.6 |
| Median # of Nights | 4.0 |

TABLE 6

TYPE OF LODGING USED BY VISTORS TO A SUPER BOWL

| | |
|---|---|
| Hotel | 70-80% |
| Friends or Relatives | 15-25% |
| Private Home Rental | 2-5% |
| RV | 2-5% |
| Bed and Breakfast | 1-5% |
| Other | 0.5-2% |

TABLE 7

NUMBER OF HOTEL ROOMS USED BY VISTORS TO A SUPER BOWL

| | |
|---|---|
| One Room | 75-85% |
| Two Rooms | 15-25% |
| Three Rooms | 3-8% |
| Four Rooms or More | 4-10% |
| Average # of Rooms | 1.7 |

TABLE 8

TRANSPORTATION USED BY VISITORS TO THE SUPER BOWL

| | |
|---|---|
| Airplane | 60-70% |
| Personal Vehicle | 30-40% |
| Other | 5-10% |

TABLE 9

PRIMARY PURPOSE OF VISIT TO VENUE LOCATION

| | |
|---|---|
| Super Bowl | 95-99% |
| Other Vacation/Pleasure | 1-5% |
| Business/Convention | 0.1-2% |
| Other | 1-3% |

TABLE 10

AVERAGE INDIVIDUAL DAILY EXPENDITURES OF SUPER BOWL VISITORS

| Overnight Visitor | Regular Day-Tripper | Other Day-Tripper | National Football League and its Entitties |
|---|---|---|---|
| $575 | $680 | $402 | $718 |

TABLE 11

PARTICIPATION BY ATTENDEES IN SUPER BOWL ACTIVITIES

| | |
|---|---|
| Sunday - Super Bowl Game | 70-80% |
| Saturday - NFL Experience | 30-40% |
| Saturday - Super Bowl Boulevard | 25-35% |
| Sunday - Super Bowl Boulevard | 18-25% |
| Friday - Super Bowl Boulevard | 15-25% |
| Thursday - NFL Experience | 12-20% |
| Friday - NFL Experience | 10-20% |
| Wednesday - NFL Experience | 10-20% |
| Thursday - Super Bowl Boulevard | 5-10% |
| Sunday - NFL Experience | 3-8% |
| Tuesday - Media Day | 2-6% |
| Saturday - Super Saturday of Service | 0.5%-2% |

TABLE 12

NUMBER OF PEOPLE IN PARTIES OF SUPER BOWL ATTENDEES

| | |
|---|---|
| One person | 0%-10% |
| Two people | 40%-60% |
| Three people | 10%-20% |
| Four people | 10%-20% |
| Five people | 5%-15% |
| Six people | 0%-10% |
| Seven people or more | 0%-10% |

TABLE 13

SUPER BOWL ATTENDEES WITH CHILDREN IN THEIR PARTIES

| | |
|---|---|
| No children | 55%-65% |
| One child | 15%-25% |
| Two children | 10%-20% |
| Three children | 0%-10% |
| Four children | 0%-10% |
| Five children or more | 0%-10% |

TABLE 14

ANNUAL INCOME OF SUPER BOWL ATTENDEES

| | |
|---|---|
| Less than $25,000 | 0%-10% |
| $25,000-$49,000 | 0%-10% |
| $50,000-$74,000 | 5%-15% |
| $75,000-$99,000 | 10%-20% |
| $100,000-$149,000 | 15%-25% |
| $150,000-$199,000 | 10%-20% |
| $200,000 and above | 15%-25% |

TABLE 15

ETHNICITY OF SUPER BOWL ATTENDEES

| | |
|---|---|
| White | 65%-80% |
| Black | 10%-20% |
| Hispanic | 5%-15% |
| Asian | 1%-10% |
| Other | 0%-10% |

TABLE 16

GENDER OF SUPER BOWL ATTENDEES

| | |
|---|---|
| Male | 60%-70% |
| Female | 30%-40% |

TABLE 17

AGE OF SUPER BOWL ATTENDEES

| | |
|---|---|
| 18-24 years old | 5%-10% |
| 25-34 years old | 20%-30% |
| 35-49 years old | 35%-45% |
| 50-64 years old | 20%-30% |
| Older than 65 years | 5%-10% |

Figure 70:
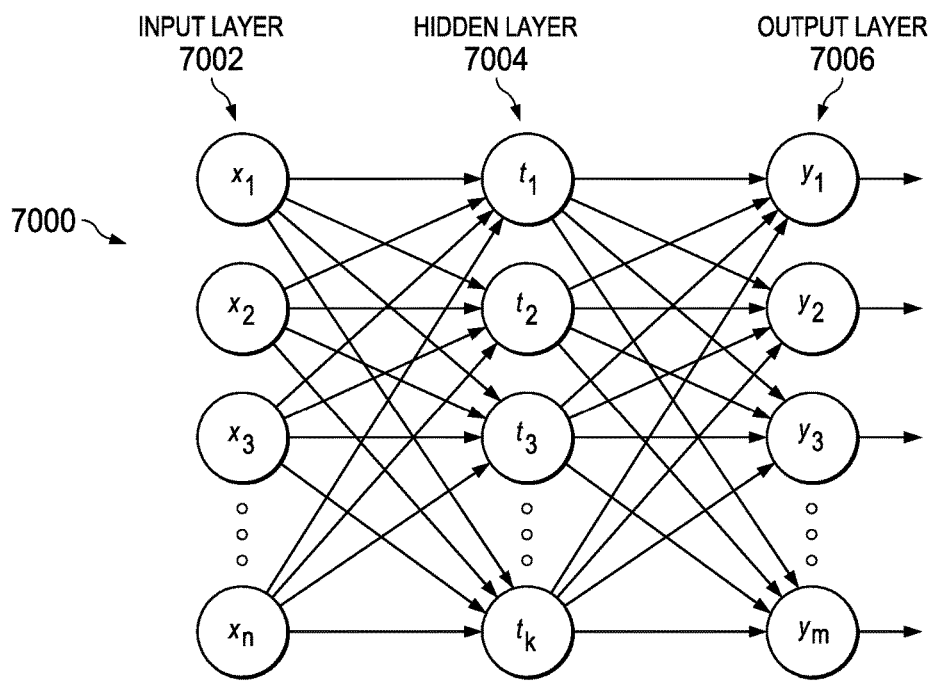
FIG. 70 illustrates a diagrammatic view of one embodiment of a Predictive Consumer Trends Engine neural network.

Referring now to FIG. 70, there is illustrated a diagrammatic view of one embodiment of a Predictive Consumer Trends Engine neural network 7000. Neural networks are non-parametric methods used for pattern recognition and optimization. They are able to generate an output based on a weighted sum of inputs, which is then passed through an activation function. Typically, the activation function determines the output by summing the inputs multiplied by the weights. A basic activation function is that of $y=f(\rho wx)$, where x is the vector of inputs, w is the vector of weights, $f(.)$ is the activation function, and y is the output vector. It will be understood by those skilled in the art that variations on the activation function may be used or represented in other ways, such as the activation function:

$$a = \sum_{i=0}^{i=n} W_i X_i.$$

Yet another activation function is the softmax activation function, which is generally used for probabilities. The softmax function is:

$$f(x) = \frac{e^x}{\Sigma e^x}.$$

The inputs, weights, and outputs may be organized within a multilayer perceptron (MLP), wherein there is an input layer, one or more hidden layers, and an output layer. As shown in the network 7000, a plurality of inputs 7002 reside in the input layer, a plurality of neurons 7004 (the weights) reside in the hidden layer or layers, and a plurality of outputs 7006 reside in the output layer. It will be appreciated that the neural network 7000 may contain any number of inputs, neurons, and outputs, from 1 to n. Thus, this creates a feedforward network. A feedforward network, as shown in FIG. 70, is called such because the inputs in the input layer feed into each of the neurons in the hidden layer or layers, which in turn feed into each of the outputs in the output layer, with each output in the output layer providing a result. It will be understood by those skilled in the art that the neural network would then be trained in order for the neural network to become more accurate. Various training methods exist, such as supervised learning where random weights are fed into the neural network and adjusted accordingly, back-propagation methods, or other methods. Further, a bias might be introduced to avoid problems associated with a threshold value as the neural network evolves. Activation functions are applied to the weighted sum of the inputs to generate a certain outcome. Neural networks typically take a non-linear form. Consequently, sigmoid functions are often preferred for their continuous character. Various sigmoid functions may be used, such as $$\left(f(x) = \frac{1}{1+e^{-x}}\right) \text{ or } y = \frac{1}{1+e^{-a/p}}$$

where a is the activation into the neuron and p is a number which controls the shape of the curve, where p is usually set to 1.0. The learning may then include several training cycles, such as passing through the model a set of m input-output pairs $(x^d, t^d)$, $d=1, \ldots m$, which form the training sample, and adjusting the weights to decrease the value of the deviations of the model outputs, $y^d$, from the target values, $t^d$. The weights may be set to small random values initially. The input pattern may then be applied and propagated through the network until a certain output is generated for the hidden layer. An equation such as $h_j^d = f(net_j^d) = f(\Sigma_k w_{jk} x_k^d)$, where $d=1, \ldots, m$ is the number of input-output pairs available in the training set, $h_j^d$ is the output of the hidden unit j, $net_j^d$ is the input of the hidden node j, $x_k^d$ is the input node k, $w_{jk}$ is the weight hive to input k for hidden node j, and $f(.)$ is the activation function used in the hidden layer.

The outputs of the hidden layer, $h_j^d$, are then used as entries for the output layer. Weighted and summed up, they are passed through an activation function to produce the final output: $y_i^d = g(net_i^d) = g(\Sigma_j w_{ij} h_j^d) = g(\Sigma_j w_{ij} \cdot f(\Sigma_k w_{jk} x_k^d))$, where $y_i^d$ is the exit value of the output unit i, $net_i^d$ is the input of the output node i, $w_{ij}$ is the weight given to the hidden node j for the output node i, and $g(.)$ is the activation function used in the output layer. The way the weights are modified to meet the desired results defines the training algorithm and is essentially an optimization problem. When the activation functions are differentiable, the error back-propagation algorithm may be a good approach in progressing towards the minimum of the error function, $E(w)$. The form of the function may be: $E(w) = \frac{1}{2} \Sigma_{d=1}^m (t^d - y^d)^2$. For two output nodes ($I = \{1, 2\}$), the error becomes: $E(w) = \frac{1}{2} \Sigma_{d=1}^m \Sigma_{i=1}^2 (t_i^d - g(\Sigma_j w_{ij} \cdot f(\Sigma_k w_{jk} x_k^d)))^2$. The errors are then passed back through the network using the gradient, by calculating the contribution of each hidden node and deriving the adjustments needed to generate an output that is closer to the target value. For the hidden to output, the gradient is computed, such as $$\Delta w_{ij} = -\eta \frac{\partial E}{\partial w_{ij}} = \eta \sum_{d:=1}^m (t_i^d - y_i^d) g'(net_i^d) \cdot (h_j^d).$$

For the input to hidden connections, the gradient may also be computed, such as:

$$\Delta w_{ij} = -\eta \frac{\partial E}{\partial \mu} =$$
$$-\eta \Sigma_{d=1}^m \frac{\partial E}{\partial h_j^d} \cdot \frac{\partial h_j^d}{\partial w_{ij}} = \eta \sum_{d=1}^m \eta \sum_{i=1}^2 (t_i^d - y_i^d) g'(net_i^d) \cdot w_{ij} \cdot f'(net_j^d) \cdot (x_k^d).$$

In calculating these gradients, n is the learning rate which controls the size of the step in each cycle, $g'(.)$ is the first order derivate of function $g(.)$, $f'(.)$ is the first order derivate of function $f(.)$. The new weights can then be adjusted taking also into account the modification from the previous cycle, this method being called backpropagation with momentum rate. This parameter is used to speed up the convergence process in flat regions, or to diminish the jumps in regions of high fluctuations, by adding a fraction of the previous weight change, using, such as:

$$\Delta w(n+1) = -\eta \frac{\partial}{\partial w} + \alpha \Delta w(n).$$

It will be understood by those skilled in the art that neural networks can be set up and trained in various ways and that the above description is illustrative of but one method. It will be appreciated that the neural network may be organized in any way to allow for the functionality disclosed herein.

It will be understood by those skilled in the art that the data to be used as inputs according to the system described herein consists largely of nominal values, e.g., gender={male, female}, ethnicity={white, Asian, Latino, African American}, and so on. Non-numeric data such as this makes creating a neural network more challenging, as neural networks can typically only process numeric inputs and provide numeric outputs. However, there are ways of utilizing nominal values in neural networks. One method is to assign each category within a variable a numeric value. For example, if the variable is "gender" then male=1 and female=2. This method works well for variables that have a binary result like "gender." However, this method causes a neural network to not perform as well if there are variables with more than two categories, such as ethnicity={white, Asian, Latino, African American}. When such is the case, it is typically more beneficial to apply ratings to the variables or to the categories based on known information. For instance, if the question to be determined from the data is whether consumers are trending towards purchasing a Ford truck, and past data has been accumulated indicating that gender plays a large role in the decision to purchase a Ford truck, the gender variable input may been given a weight of 0.95 for example (on a scale from 0 to 1). Similarly, this concept could be applied to categories within a variable. If, for instance, past data indicates that the male gender has a strong correlation with purchasing a Ford truck, while females do not, then, for instance, the inputs could be set to male=0.95 and female=0.05. This concept could be applied to any other variable or category. This known data may play an important role in training the neural network because, given that certain relationships may already be known based on past data accumulated, such as from responses to queries, the neural network may be fed inputs with the weights being adjusted until the output or outputs resemble the expected output or outputs.

Referring now to FIG. 71, there is illustrated a diagrammatic view of another embodiment of a Predictive Consumer Trends Engine neural network 7100. There exists in the input layer four inputs 7102, in the hidden layer two neurons 7104, and an output 7106 in the output layer. This serves as an example of one way the Predictive Consumer Trends Engine may be organized to provide for consumer trends to be predicted. This embodiment envisions a single output, which may be in the form of a binary result, percentages, or other results. For instance, if one would like to predict how people of a certain demographic feels about purchasing a Ford truck, the four inputs 7102 could be tailored to specific demographics, such as gender, ethnicity, income level, and so on, with a single output. The single output may be a binary answer (yes/n or 0/1) or it could be a percentage indicating the likelihood that the given demographics would choose to purchase a Ford truck.

Additionally, the embodiment shown in FIG. 71 is based on one method of determining the number of neurons to be used in the neural network. Although there could be any number of hidden layers, typically ranging from one to three, it will be appreciated by those skilled in the art that a single hidden layer can estimate differentiable functions, provided there are enough hidden units. A higher number of hidden layers also increases processing time and the amount of adjustments needed during neural network training. One method of determining the number of needed neurons in the hidden layer is represented by: $N_h = \sqrt{N_i \cdot N_o}$, where $N_h$ is the number of hidden nodes, $N_i$ is the number of input nodes, and $N_o$ is the number of output nodes. Thus, as shown in FIG. 71, since there are four inputs and one output, the number of neurons is $N_h = \sqrt{4 \cdot 1} = \sqrt{4} = 2$. Thus, there are two neurons in the neural network of FIG. 71. It will be appreciated that the number of neurons will change depending on the number of inputs and outputs. Further, the method for determining the number of neurons may also be different, as this is but one example.

Referring now to FIG. 72, there is illustrated a diagrammatic view of one embodiment of a Predictive Consumer Trends Engine 7200. The Engine 7200 is illustrated in a manner that is indicative of how an end user would utilize the fully-trained engine 7200. That is, the end user may only be concerned with the inputs being fed into the engine 7200 and the output generated, with the inner-workings of the hidden layer being unimportant to the end user. There is illustrated a plurality of inputs 7202 being fed into a trained predictive engine 7204, with an output 7206 being generated by the trained predictive engine 7204. The inputs fed into the trained predictive engine 7204 may, as described above, be numerical values representing a plurality of consumer demographic categories, with each category represented by a numerical rating given to the category before-hand due to known information. For instance, if it is to be determined by the predictive engine 7204 the likelihood of a consumer purchasing tickets to a National Football League ("NFL") game, the male gender might have a rating of 0.90, while female has a rating of 0.10. This format could be used for every known or used demographic category. For instance, an income level between $15,000 and $30,000 might have a rating of 0.08, an income level between $50,000 and $100,000 might have a rating of 0.15, and an income level between $100,000 and $250,000 might have a rating of 0.75. It will be appreciated by one skilled in the art that the number of categories can be any number.

It will also be appreciated by one skilled in the art that the end user, if supplying inputs with only the known and previously applied ratings, may only generate a known output. That is, the output 7206 would be a result that should already be known since the data would represent the present-day and current ratings that indicate how the categories affect the result to be reached. However, if the end user wishes to predict future consumer trends, the end user may change the previously applied ratings by how demographic changes might change the ratings. For example, if there is a suspicion that the male population may experience a substantial increase in the coming years, the end user may adjust the male rating to have even more of an impact on whether consumers will buy tickets to an NFL game, such as increasing the rating to 0.95. Thus, this allows the predictive engine to make predictions on future trends based on past data and changes in the market. The plurality of inputs 7202 may also include raw numbers, so that, in addition to ratings for categories, other categories that could be represented by raw numbers, such as the number of males in the United States or any other locale.

Referring now to FIG. 73, there is illustrated a flowchart depicting one embodiment of a predictive consumer trends engine method 7300. The method 7300 starts at step 7302, where a consumer trend to be predicted is determined. The trend may be anything, from preferred grocery store to whether consumers will purchase Latin music recordings. The method then moves to step 7304, where there is provided a plurality of inputs having known qualities based on past data. The plurality of inputs may be the demographic categories as described hereinabove. The categories would have associated numerical data based on past and current trends. At step 7306, a predictive consumer engine trained on the past and current data is provided. At step 7308, the plurality of inputs is adjusted in order to provide for a change in the past and current trends data. For example, if it is known that a certain ethnicity is growing in the United States, the input for this ethnicity could be altered to reflect that change. At step 7310, the plurality of inputs, now adjusted, is fed into the trained predictive consumer engine. The process then ends at step 7312, where the engine generates an output that is the prediction of the consumer trend.

Figure 74:
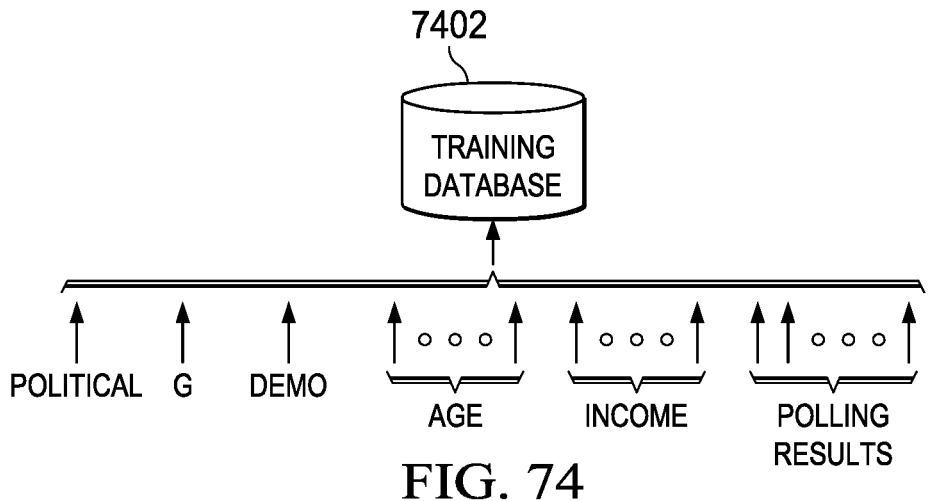
FIG. 74 illustrates a diagrammatic view of one embodiment of a training database.

Referring now to FIG. 74, there is illustrated a diagrammatic view of a training database 7402. The training database is a repository of collected data relating to the various inputs that can be derived from the generated database of the present system, as described hereinabove. For example, results can be collected from individuals regarding such things as their political affiliation, their gender, their demographics, their age and their income, the age and income being divided into different brackets. For example, the age of an individual could be bracketed as 18-25, 26-35, 36-45, etc. and income could be bracketed $0-$40,000, $41,000-$60,000, $61,000-$100,000, etc. There will also be a set of polling data and the results of that polling data that will be associated with each individual, this comprising a first data set. As a number of individuals are interviewed with the various polling questions, new data sets are created and stored in the database 7402. The polling question could simply be their preference of cars, i.e., Ford, Chevrolet, Mercedes, etc., with one selected for a particular individual. Once the entire training database has been created, a trend will exist within the data with respect to the makeup of a particular political affiliation with respect to all of information collected from the individuals. This polling data could also be directed to such things as the type of cars people like, the types of vacations they like, etc. Any type of polling question could be provided which answer can be associated with that individual to define a data set for that individual.

Figure 75:
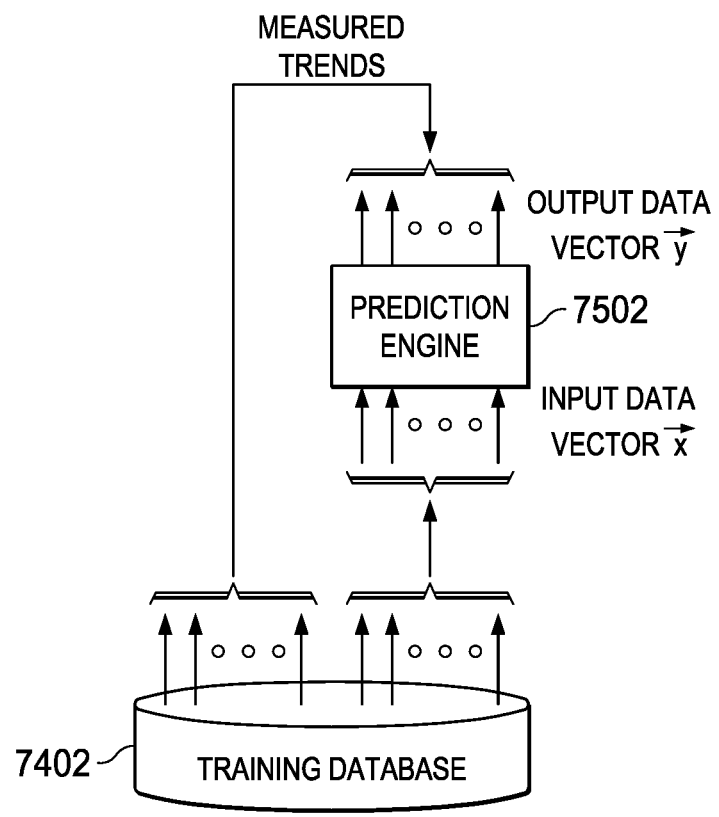
FIG. 75 illustrates a diagrammatic view of a predictive engine being trained with information in a training database.

Referring now to FIG. 75, there is illustrated a diagrammatic view of a predictive engine 7502 being trained with the information in the training database 7402. The predictive engine will have a plurality of inputs defined as an input data vector and a plurality of outputs of defining the output data vector. The predictive engine 7502 two provides a representation of the input data map therethrough to provide an output data. Thus, if the predictive engine 7502 were trained for the polling question "type of car you purchased in the last year," each data set would be input to the output of the predictive engine 7502, for a neural network example, and back propagation utilized to train the predictive engine 7502 for all the data sets in the training database 7402. This would provide a representation of the trends embodied within the training database 7402. Once trained, all of the weights in the predictive engine 7502 (assuming this is a neural network) provide a trained predictive engine.

Figure 76:
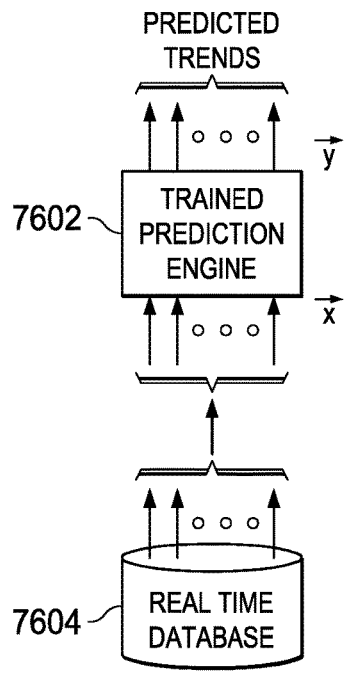
FIG. 76 illustrates a diagrammatic view of a trained predictive engine.

Referring now to FIG. 76, there is illustrated a diagrammatic view of a trained predictive engine 7602, which is the predictive engine 7502 after training. In this mode, a real-time database 7604 is utilized, which contains currently collected data that has not been associated with any polling data. For example, if the individuals upon which data was collected in the database 7604 had never had any information associated with what type of car they purchased in the last year or any type of information regarding what type of car they would prefer, the input collected on the individuals to be input to the trained predictive engine 7602 may be any predicted trend as to that particular result provided. Of course, it should be remembered that trained predictive engine 7602 will only output predictions as to what it was trained on. Thus, if the predictive engine 7502 described hereinabove with respect to FIG. 75 was only trained on type of car, that would be all that was represented by the train predictive engine 7602. However, during the training procedure, other polling results could be utilized in the training to provide multiple vector outputs. This, again, could be anything such as lifestyles, vacation trends, etc. that could be utilized as a trend of a particular population.

The embodiments of the systems and methods described herein and may be utilized by live event organizations and venues for their own purposes on a local level, such as running reports, analytics, or predicting trends, as described herein. As described with respect to FIG. 1, there may be a local CO 120 associated with a venue 102. The local CO 120 may have a computer or other device connected with a local database 122, the local database 122 storing all query and response data for the venue. In some embodiments, the local database 122 stores all query and response data during a live event, and only transmits this data to the central remote office 126 after the conclusion of the live event. However, the local database 122 would still have stored a copy of all of this data. Thus, this creates an opportunity for the venues, or organizations associated with the venues, to use this data for their own purposes. The entities that would have access to this data may be the company that owns the venue (real estate) itself, sports teams who are own or are affiliated with the venue, sports organizations affiliated with the teams that play at the venue, or any other entity that has a stake in the operation of the venue, depending on how the rights are agreed upon. For example, the Dallas Cowboys football stadium might allow access to the data to both the Dallas Cowboys organization and the NFL. However, they would only have access to data specific to this venue (or other venues under the organization's umbrella) that is saved on the local database 122. These organizations would not have access to all data accumulated on the central database 128, as the data on the central database 128 may include data from other venues owned by other organizations. For example, the NFL may not have access to the MLB data. Thus there is provided an incentive to these organizations to use the product that will provide the features disclosed herein, as the data will be useful to these organizations in studying their own fan base, while still providing all data from all venues to the entity owning the central remote office 126.

Figure 77:
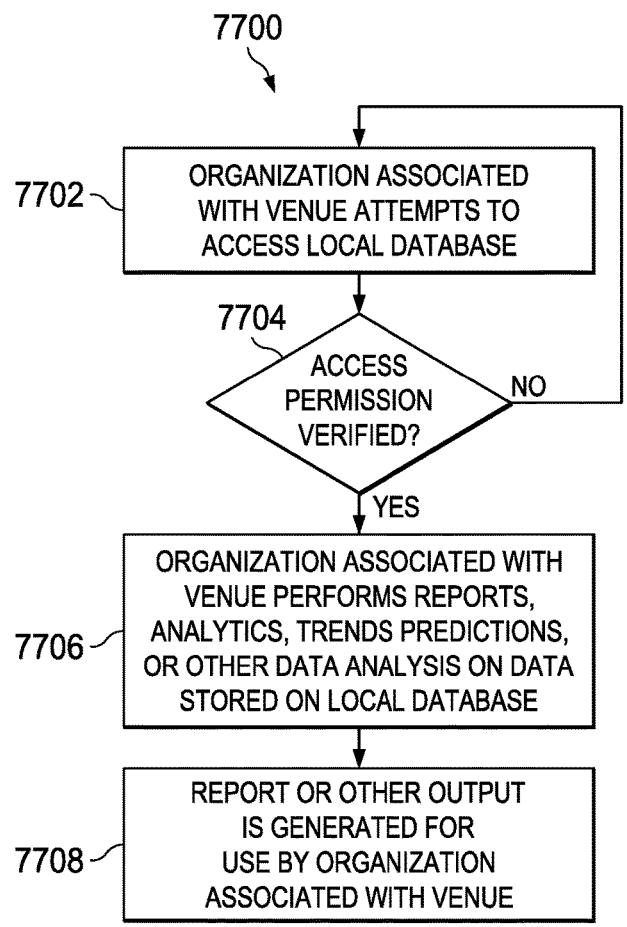
FIG. 77 illustrates a flowchart depicting one embodiment of a social analytics generation utilizing local servers method.

Referring now to FIG. 77, there is illustrated a flowchart depicting one embodiment of a social analytics generation utilizing local servers method 7700. The method 7700 starts at step 7702 wherein an organization associated with a venue attempts to access a local database associated with the venue. This local database may be the local database 122 as shown in FIG. 1, or it may be any other database the organization is using for storage of data gathered from live events. At decision block 7704 it is determined whether the attempt by the organization associated with the venue is a verified access. If it is not, the method moves back to step 7702, where another attempt to access the local database may be made. If it is verified, the method moves to step 7706. At step 7706, the organization associated with the venue performs reports, analytics, trends predictions, or other data analysis, such as that described herein, on the data stored on the local database. At step 7708, a report or other output is generated for use by the organization associated with the venue. It will be appreciated that this allows the organization associated with the venue a unique way of tracking attendees to the venue in a way that other audience tracking systems, such as that provided by Nielson, do not provide. This is because the systems and methods disclosed herein allow for tracking of guaranteed viewers. Other audience tracking systems, such as that provided by Nielson, only record a small number of the overall audience and extrapolate from there. However, the systems and methods disclosed herein allow typically require the participation of audience members, e.g., if a query is being responded to, the exact number of responses can be tracked as well as data accumulated on those whose responses are being recorded. This provides a much more detailed and narrow focus on audience analytics to be achieved that other services do not provide.

Figure 78A:
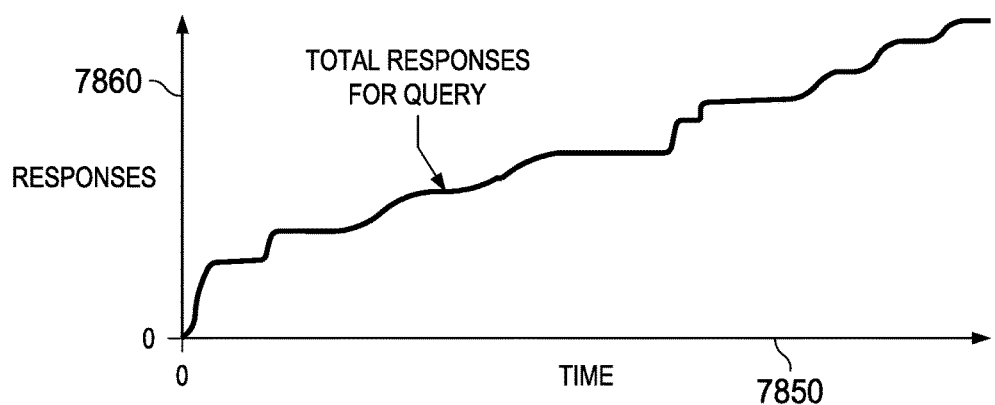
FIGS. 78A-78D illustrate graphs depicting the number of responses as a function of time.
Figure 78B:
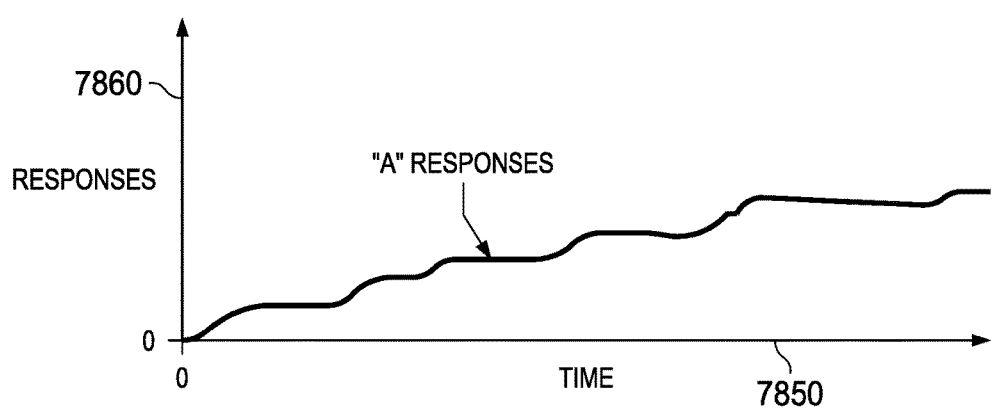
Figure 78C:
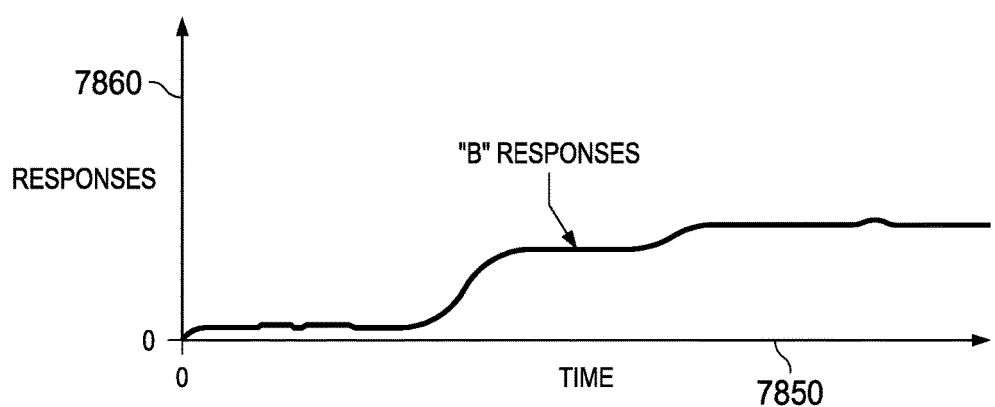
Figure 78D:
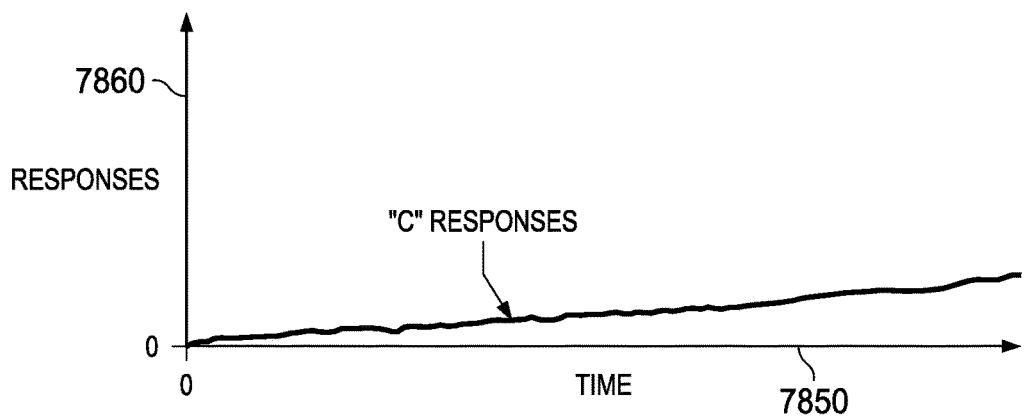

Turning to FIGS. 78A-78D, in some embodiments, responses to queries are analyzed in real-time, as opposed to analyzing responses only after the time window to respond to a query has closed. Doing so allows each response to be time-tagged as to when it was either created or received, rather than analyzing the final results of a query, wherein the responses as a while would only be time-tagged to the window or query. In FIG. 78, there are illustrated a number of graphs, FIGS. 78A, 78B, 78C, and 78D. These graphs depict the number of responses to a query received since the beginning of the query's time window as a function of time of generation or receipt. The horizontal axis 7850 of each graph is the "time" axis, and depicts the time that has elapsed since the beginning of the time window for a particular query, with the elapsed time increasing in the positive direction of the axis. The vertical axis 7860 of each graph depicts the accumulated number of responses received for a query during its time window. In the example depicted in FIG. 78, the query in question has three possible responses, represented by "A," "B," or "C." Each graph of FIG. 78 depicts a different set of responses. The graph of FIG. 78A labeled "TOTAL RESPONSES FOR QUERY" depicts the total accumulated number of responses received for that query up to a given period of time, while FIG. 78B depicts only the number of respondents responding with choice "A," FIG. 78C depicts only "B" responses, and FIG. 78D depicts only "C" responses.

"Real-time data" refers to the concept that information regarding responses to a query can be viewed and analyzed during and before the closing of the time window. The information is updated at some predetermined frequency, which varies by embodiment. For example, in some embodiments, information regarding responses is updated once every second. In other embodiments, the information is updated every five seconds. In some embodiments, the update rate can vary throughout the time window. "Real-time data" also refers to the concept that historical data can be viewed as a function of the time at which responses are created/received. In some embodiments, real-time data is saved and can be viewed and analyzed after the closing of a query's time window. Real-time data is useful, not only because it not only allows for analysis of the final, post-time-window information regarding responses, but also because it allows for the analysis of when responses are generated/submitted. This information is useful in situations, for example, when a query is presented which is related to a video message that plays during the time window for responses to the query. Knowing when and how users respond to the query will help determine how the video, and which parts of the video, have the greatest effect on the responding tendencies of attendees.

The number of responses received up to a given point can be measured in various ways. For example, in some embodiments, the total number of responses is measured as an accumulated number. In other embodiments, the number of responses for each response choice is measured, i.e., for the response A, B, or C. In some embodiments, responses are measured as grouped by demographic, location within the event venue, or some other identifying information. For example, the total number of females responding could be measured as a function of time, or the total number of people in the age range of 28-35 who have responded could be measured as a function of time.

Figure 79A:
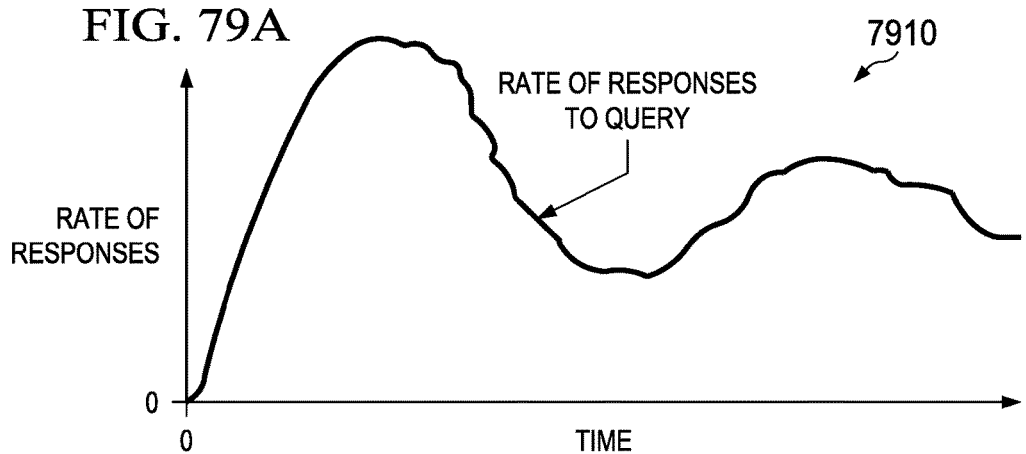
FIGS. 79A-79D illustrate graphs depicting response rates as a function of time.
Figure 79B:
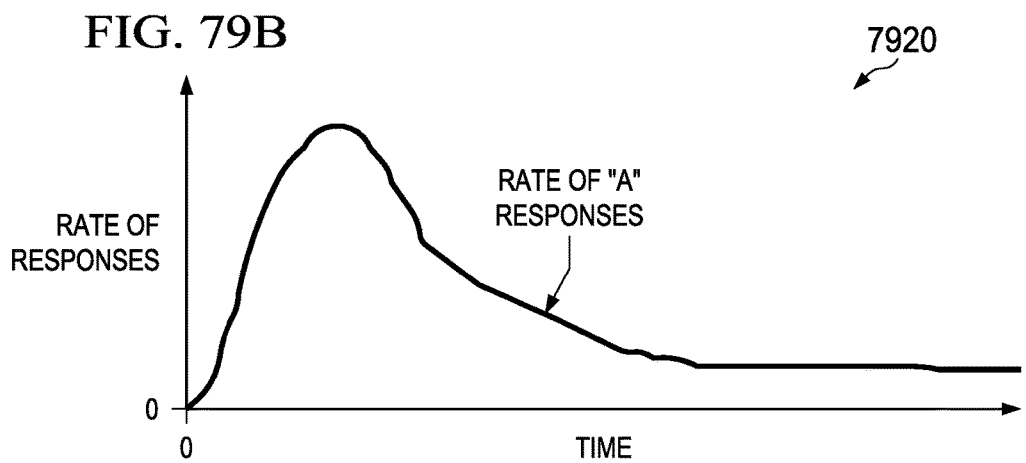
Figure 79C:
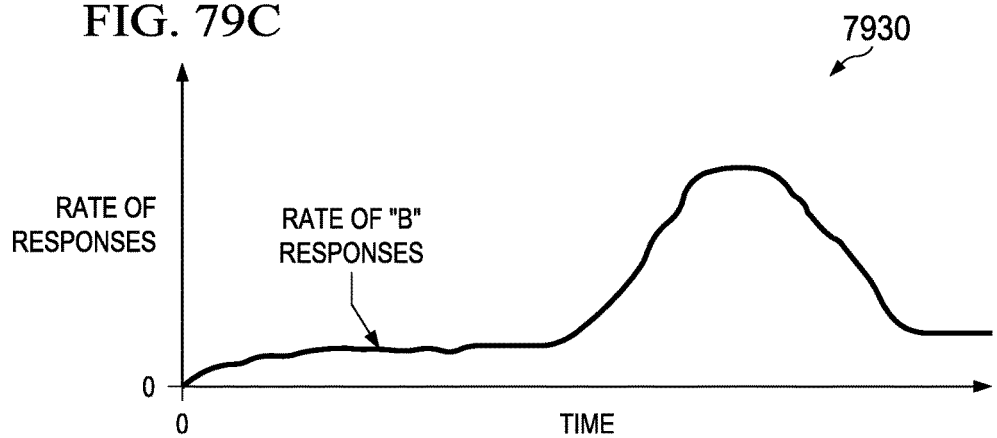
Figure 79D:
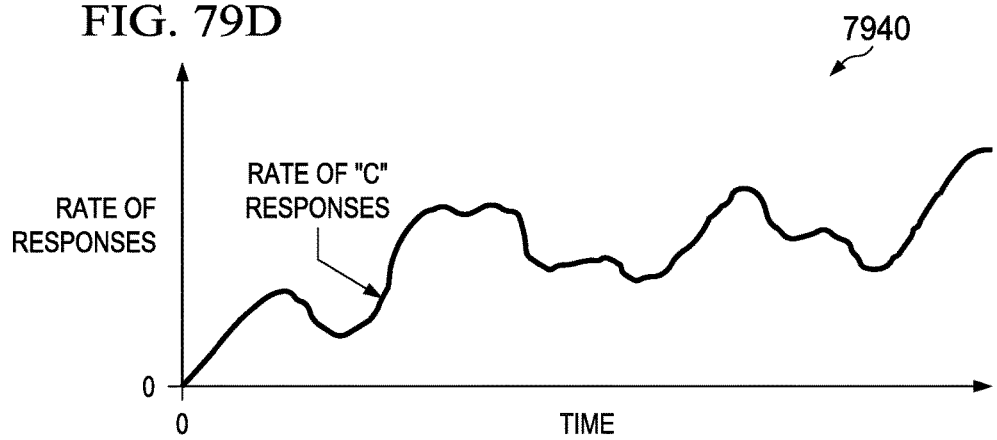
Figure 80A:
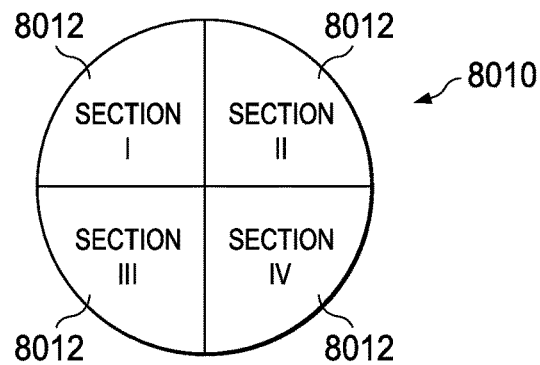
FIGS. 80A-80E illustrate graphs of response rates grouped by mobile unit user location.
Figure 80B:
Figure 80C:
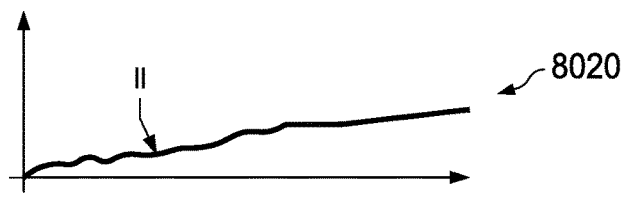
Figure 80D:
Figure 80E:
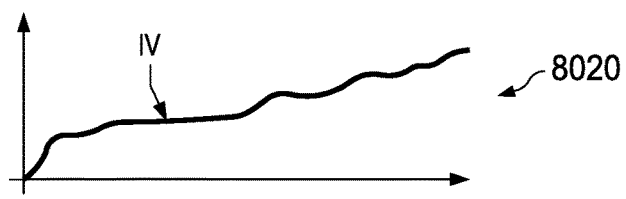

Turning to FIGS. 79A-79D, there are illustrated examples of how response rates (in number of responses generated/submitted) can be analyzed. In some embodiments, the rate at which responses to queries are received is analyzed in real-time. In these embodiments, the rate at which responses are received is analyzed as a function of time. In FIG. 79, there are illustrated several example graphs FIGS. 79A, 79B, 79C, and 79D depicting the rate of responses to a query. In each of these graphs, the horizontal axis represents the time that has elapsed since the beginning of a query time window, while the vertical axis represents the rate of responses being received. In some embodiments, such as that depicted in FIGS. 79B-D, the rates of responses are grouped by the type of response. For example FIG. 79A represents the rate of all of the responses to the query received, while FIG. 79B represents the rate of responses selecting "A" that are received, FIG. 79C represents the rate of responses selecting "B" that are received, and FIG. 79D represents the rate of responses selecting "C" that are received. The information presented in these graphs allows the determination of which part of the time window had the highest rate of responses. For example, in some embodiments, a video message plays during the query time window. Knowing which part of the video message elicited the highest rate of responses at a particular point in time—in total, by response choice, or among various demographic groups—would prove useful for gathering information on what viewers respond to.

As with the real-time analysis of the number of responses, the rate of responses can be measured in various ways. In some embodiments, the rate of total responses is measured, while in some embodiments, the rate of each response choice is measured. In some embodiments, the rate of response is measured by demographic group or location within the event venue.

Referring to FIGS. 80A-E, there is illustrated the real-time measurement of responses by location. In some embodiments, real-time measurements of response numbers or rate of response are measured for multiple locations within the event venue. The measurements for each location can then be compared against each other and against the measurements for the entire venue. In FIG. 80, there is illustrated a diagram of an overhead view of a stadium 8010. In this example, the stadium is divided into four sections 8012, Sections I, II, III, and IV. Also illustrated in FIG. 80 are four graphs 8020. Each graph corresponds with a section of the stadium and depicts the real-time measurements of the rate of responses in the section. For example, the graph of FIG. 80B labeled "I" depicts the rate of responses from Section I in the stadium as a function of time, the graph of FIG. 80C labeled "II" depicts the rate of responses from Section II in the stadium as a function of time, the graph of FIG. 80D labeled "III" depicts the rate of responses from Section III in the stadium as a function of time, and the graph of FIG. 80E labeled "IV" depicts the rate of responses from Section IV in the stadium as a function of time. In some embodiments, the responses are grouped according to where the user's seat is located, and any responses submitted by users while not in their seats are outliers. Gathering real-time data grouped by respondents' locations allows the system operator or venue operator to understand how attendees' locations affect their response choices or whether or not they respond at all. If, for example, Section I of the stadium 8010 has a large video screen on which video messages are played, then a low response rate from Section I might indicate that the attendees in Section I are too close to the video screen to see the video message. As another example, if a video message prompting attendee responses and viewable only by Section II is presented with a corresponding audio message heard by the entire stadium, then comparing the real-time responses of Section II with the rest of the stadium will allow the venue operators to understand the differences in how audio and video messages, and what parts within each message, prompt attendees to respond to queries.

Figure 81A:
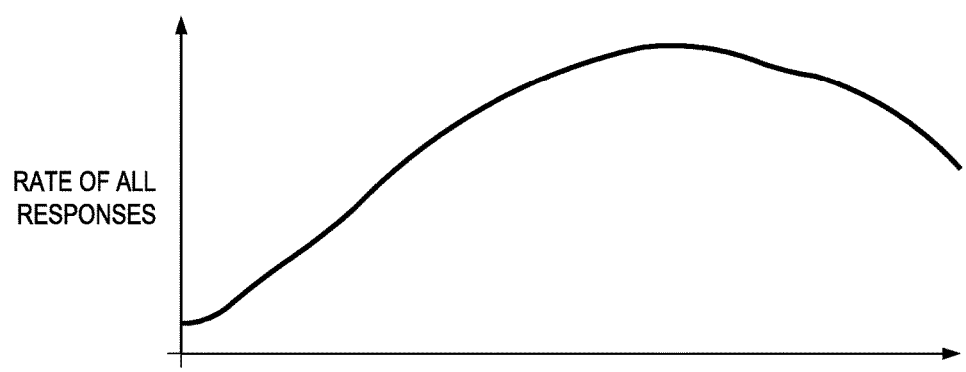
FIGS. 81A-81D illustrate how response rates can be grouped by demographic.
Figure 81B:
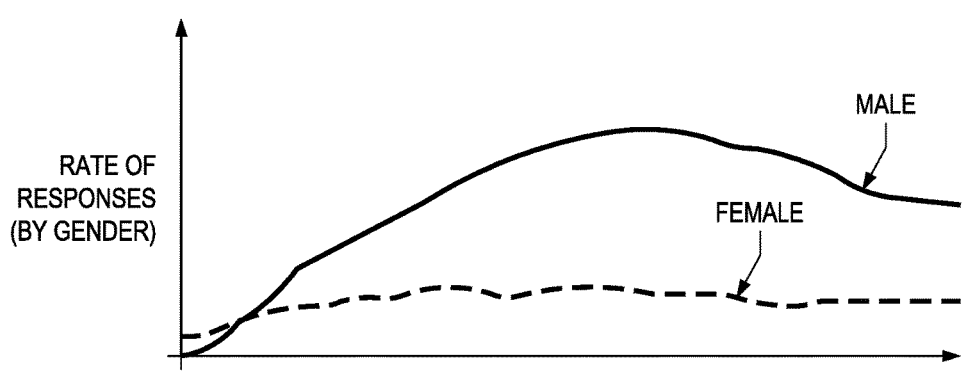
Figure 81C:
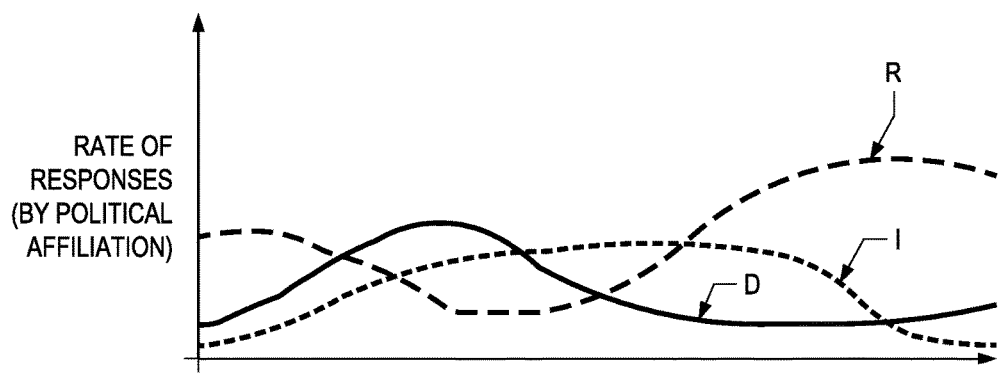
Figure 81D:
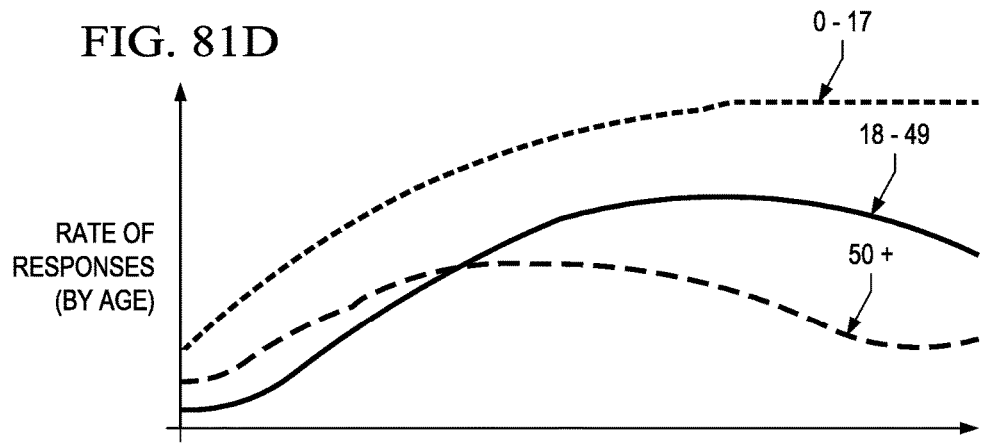

Referring to FIG. 81A-D, there are illustrated examples of how real-time measurements can be grouped by demographic group. FIG. 81A depicts the rate of responses to a query as a function of time. The other graphs, FIGS. 81B-D, depict the rate of responses, but each of FIGS. 81B-D depicts the real-time data broken down by the categories of a certain demographic class. Attendees are broken down into demographic groups on the basis of previously gathered user information. For example, FIG. 81B depicts the rate of responses broken down by gender. One line on FIG. 81B depicts the rate of responses by users likely to be males, and the other line depicts the rate of responses by users likely to be females. Similarly, FIG. 81C depicts rate of responses, except that graph FIG. 81C is broken down by likely political affiliation, with one line for Republicans, one line for Democrats, and one line for independents. Lastly, FIG. 81D is an example of a graph depicting the rate of responses as a function of time, but broken down by the likely age of the responding users. Like the embodiments which break down the rate of responses by the choice of response, the embodiments depicted in FIG. 81A-D allow system operators and venue operators to better understand what parts of messages resonate best with a particular demographic group. Other embodiments will have similar graphs breaking down users by other demographics, including income level, race or ethnicity, preferred sports team, or any other demographic useful to advertisers or those seeking information about consumers. In some embodiments, each demographic will be plotted on the same graph axes, while in other embodiments, each group will have its own set of axes.

Figure 82:
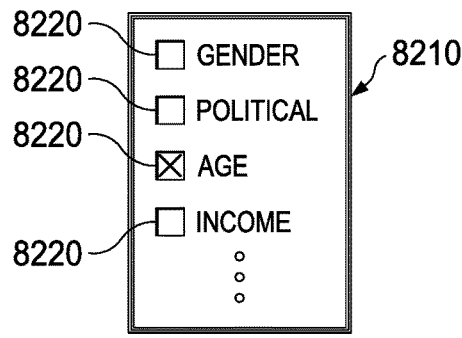
FIG. 82 illustrates a screen for selecting how to group statistics by demographic.

Turning to FIG. 82, there is illustrated an example of a screen for selecting how to view real-time data regarding responses and rates of responses. In some embodiments, system operators will be able to select if and how real-time data is broken down by demographics when it is presented. Menu 8210 is a graphical menu that would appear on the screen of a computer, mobile phone, or any other device a system operator would use to analyze real-time data. This menu has several check-boxes 8220, each associated with a certain demographic class, such as gender, political affiliation, age, etc. By selecting a check-box, the system administrator causes the system to present real-time measurement data broken down by the demographic associated with that check-box. In the example depicted in FIG. 82, the check-box associated with age is selected, meaning that real-time measurement data would be presented in a form that shows the measurements as a function of time for various age groups, in a manner similar to the graph of FIG. 81D. If none of the boxes are selected, then only the information for all respondents as a whole is presented. In some embodiments, the selection of which demographic class to group responses by can be changed while the time window for query responses is still open, thus changing what demographics are presented even before all of the data has been collected for the time window. In some embodiments, the selections will also include response choices, such that real-time data can be viewed for each response choice. In some embodiments, after a time window has ended, historical data can still be viewed as a function of time.

Figure 83:
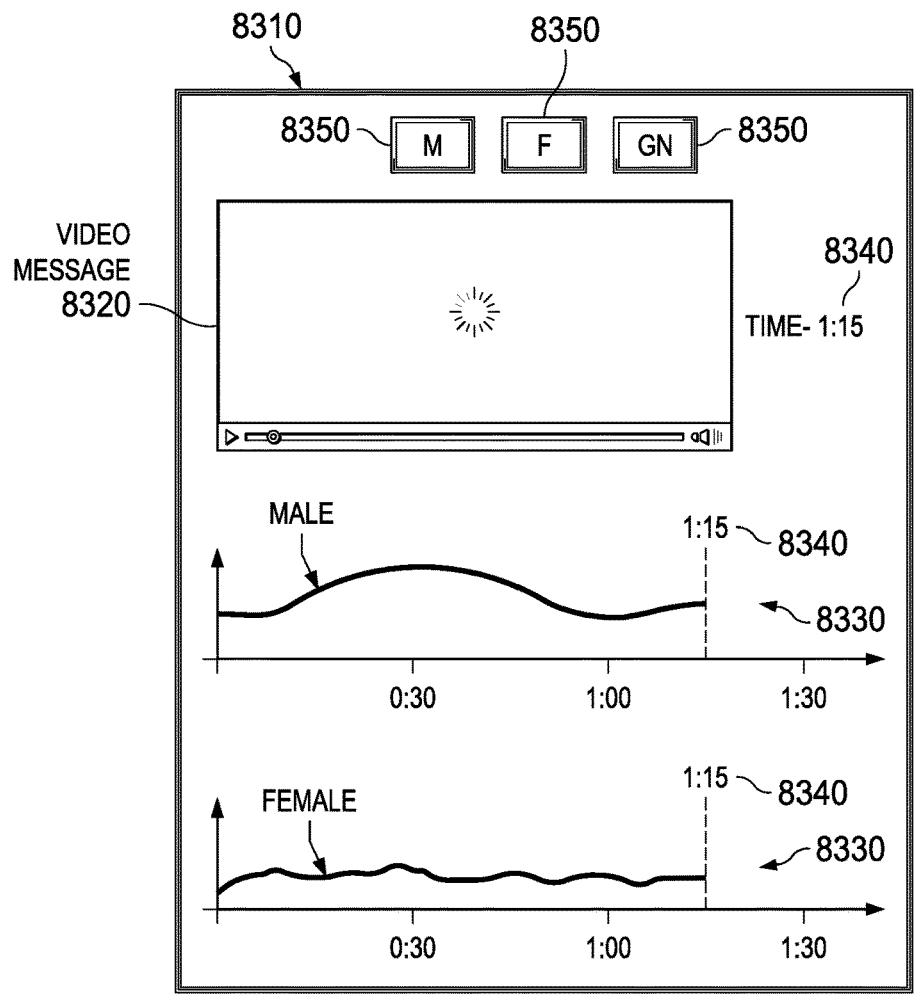
FIG. 83 illustrates a screen for viewing real-time measurements.

Turning to FIG. 83, there is illustrated an embodiment in which system operator uses real-time measurements to select a subsequent media message. Depicted in FIG. 83 is display 8310, which, in some embodiments, is what is displayed on the screen of a computer, mobile device, or any other device that could be used by a system operator. In this example, a query is presented that corresponds with a video message which plays during the time window for query responses. Video message 8320 is an area of the display which plays the same video message that is presented to the event attendees. In some embodiments, the video message 8320 is presented simultaneously with the message played to event attendees, while in others, the video message is played after the time window for responses has ended. Graphs 8330 show real-time measurement data as a function of time, and in some embodiments, as in the one depicted in FIG. 83, the graphs show real-time measurements broken down by demographic. Other embodiments will have graphs broken into groups by response choice. In FIG. 83, the graphs 8330 show the rate of response broken down by gender. In some embodiments, the data is populated on graphs 8330 at the same rate as the video message 8320 plays. In this way, the system operator sees exactly what part of the video message corresponds with a particular point in the real-time data. Time indicators 8340 display the time within the video and the time for which real-time data is being populated in the graphs 8330. In some embodiments, the same display 8310 as depicted in FIG. 83 also includes selection options 8350. These selection options allow the system operator to choose the next media message to be presented. The system operator can use the real-time measurement information to help decide which message is the best one to be played next. In the example of FIG. 83, there are three options 8350, one for a male-oriented message, one for a female-oriented message, and one for a gender-neutral message. By evaluating the real-time measurements, the operator can determine which of the three options is best. Selecting one of the options 8350 will cause the message corresponding to that option to be presented at some later time. In other embodiments, other selection options will be presented. In some embodiments, the options are all for different subclasses of a demographic classification, such as gender, age, income level, political affiliation, or sports team preference. In other embodiments, the selection options will be for messages feature different products or services.

In addition to viewing data in real-time, some embodiments allow data to be presented back to audiences in real-time. For example, if a query is presented to attendees at a live event, then the results can be presented to the attendees on a video screen while the response time window is still open. The results on the video screen can be continuously updated throughout the time window as more real-time measurements are collected. This allows attendees to view how their responses compare to other attendees. In some embodiments, the real-time measurements are automatically presented back to attendees, while in others embodiments, the measurements are only presented when the system operator chooses to do so. In some embodiments, historical real-time measurements are presented back to the audience after a time window has ended.

Figures 84, 85:
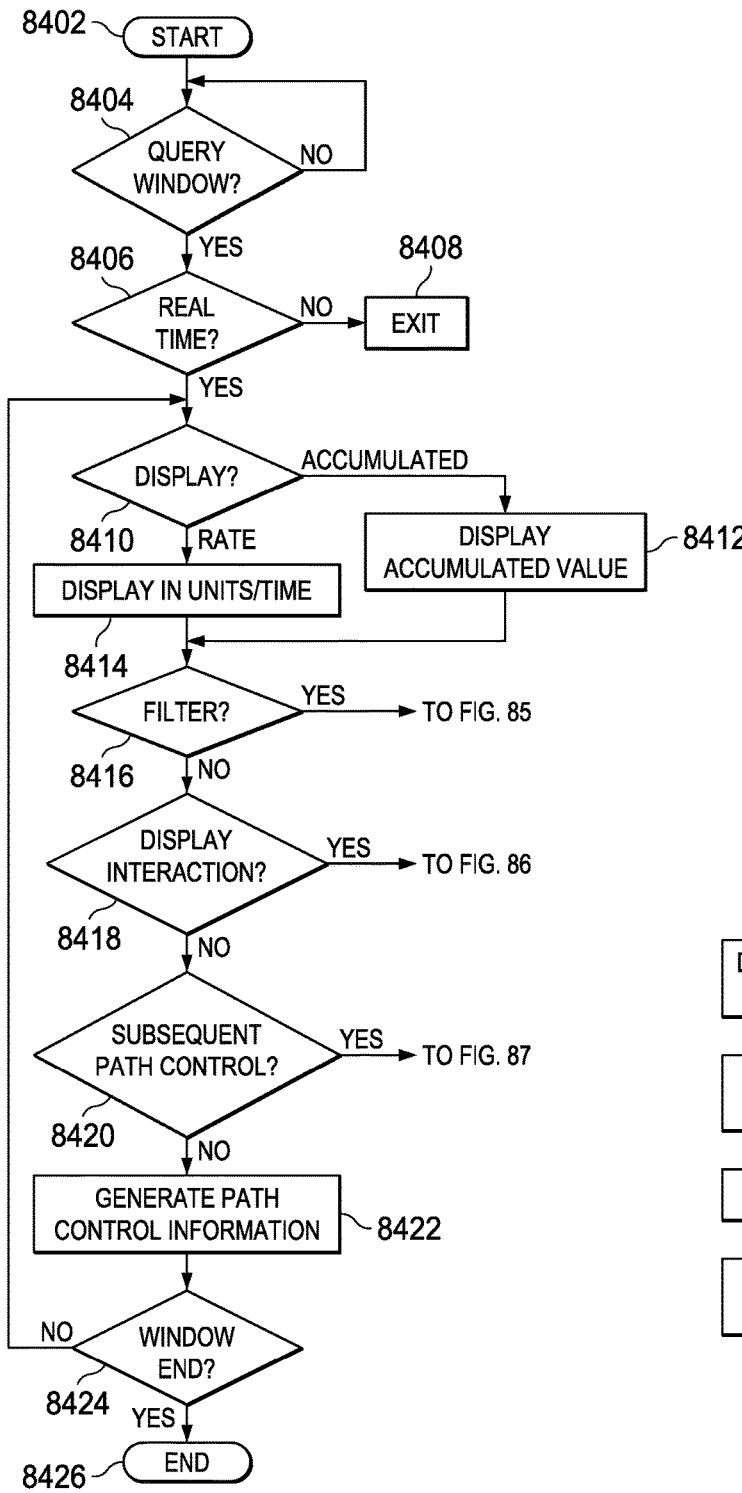
FIG. 84 illustrates a flowchart for an embodiment which uses real-time measurements.
FIG. 85 illustrates a flowchart for an embodiment which uses a filter process.
Figure 86:
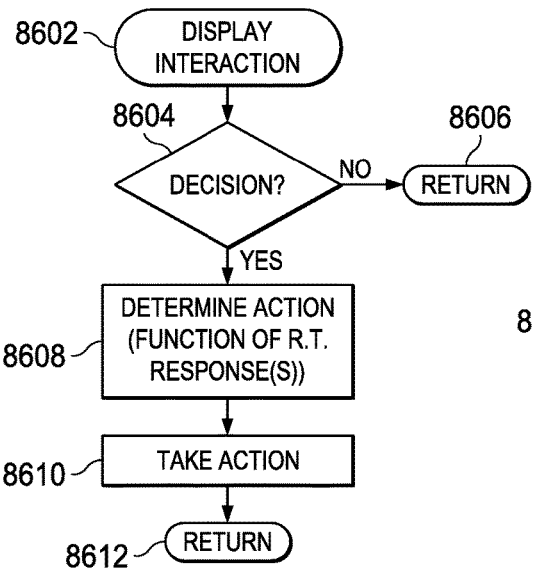
FIG. 86 illustrates a flowchart for an embodiment of the display interaction process step depicted in the flowchart of FIG. 84.
Figure 87:
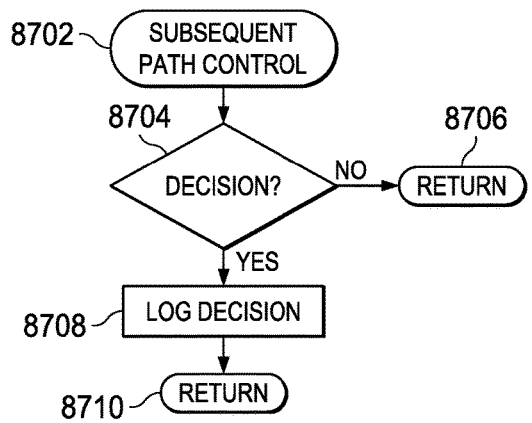
FIG. 87 illustrates a flowchart for an embodiment of the subsequent path control function step depicted in FIG. 84.

Turning to FIG. 84, there is illustrated a flowchart detailing the process that occurs during the use of a program such as the one described and depicted in FIG. 83. The process starts with Start block 8402 and proceeds to decision block 8404. If the query time window is not open, the process loops back to just before decision block 8404. If the query time window is open, the process flows to decision block 8406. If real-time measurement data is not being collected, the process ends at block 8408. If real-time measurement data is being collected, the process flows to decision block 8410. At decision block 8410, if the desired data to be viewed is the accumulated number of responses, the process moves to block 8412, where the accumulated number of responses is displayed. If, at block 8410, the desired data is response rate data, the process moves to block 8414, where the response rate measurement data is displayed as the number of responses per a unit of time. After the process moves past either block 8412 or 8414, the process flows to decision block 8416. At this point, the user decides if he/she wants to filter the real-time measurement data. If so, then the filtering process takes place as depicted in FIG. 85 (described hereinbelow). Once the filtering process is finished, or if the user chooses not to view filtered data, the process flows to decision block 8418, where the user decides whether or not to engage in display interaction. If so, the display interaction process takes place, as depicted in FIG. 86 and described hereinbelow. Once that process is finished, or if the user decides not to engage in display interaction, the process flows to decision block 8420. Here, the user has a chance to control the subsequent path of the messages. If the user decides to do so, the subsequent path control process takes places as depicted in FIG. 87 (described herein below). Once the path control process has finished, or if the user decides not to control the subsequent message path, the process moves to function block 8422. At block 8422, the system generates subsequent message path control information based on the information, if any, that resulted from the subsequent path control process of FIG. 87. Next, the process flows to decision block 8424, where, if the query response time window has not ended, the process loops back to before decision block 8410. If the time window has ended, the process flows to block 8426, where the process ends.

Turning to FIG. 85, there is illustrated a flowchart depicting the filter process that occurs in FIG. 84. If, in decision block 8416, the user decides to view filtered data, the process moves to block 8502, where the filtering process begins. The process then moves to function block 8504, where the system displays the possible filter options that can be selected. Next, the process flows to function block 8506, where the user selects the desired filter options. The process then flows to function block 8508, where the selected filter options are applied to the real-time data. At function block 8510, the user selects the desired display mode for viewing the real-time data. Finally, the process flows to return block 8512, where the process flows back to block 8418 from FIG. 84.

Turning to FIG. 86, there is illustrated a flowchart depicting the display interaction process. The process starts when (and if) the user decides to begin the process at block 8418 of FIG. 84. The process moves from block 8418 to block 8602 and then to decision block 8604. At decision block 3604, the user decides whether or not to change some aspect of the displayed video message. If the user decides not to, the process flows to return block 8606 and back to block 8420 of FIG. 84. If the user decides to interact with the message, the process moves to function block 8608, where the user decides which action to take related to modifying the message. Next, the process moves to function block 8610, where the modifications are applied, and finally to return block 8612, where the process returns to FIG. 84 to decision block 8420.

Turning to FIG. 87, there is illustrated a flowchart depicting the subsequent path control function that occurs if the user decides to take control of the message path in decision block 8420 from FIG. 84. In that case, the process flows from decision block 8420 to start block 8702 and on to decision block 8704. Here, the user has a chance to decide whether or not to affect the message path. If the user decides not to make any subsequent message path decisions, the process flows to return block 8706 and on to block 8422 in FIG. 84. If, at block 8704, the user chooses a subsequent message path, the process flows to block 8708, where the decision is logged for later reference and use. Finally, the process moves to return block 8710 and back to function block 8422 from FIG. 84.

Figure 88:
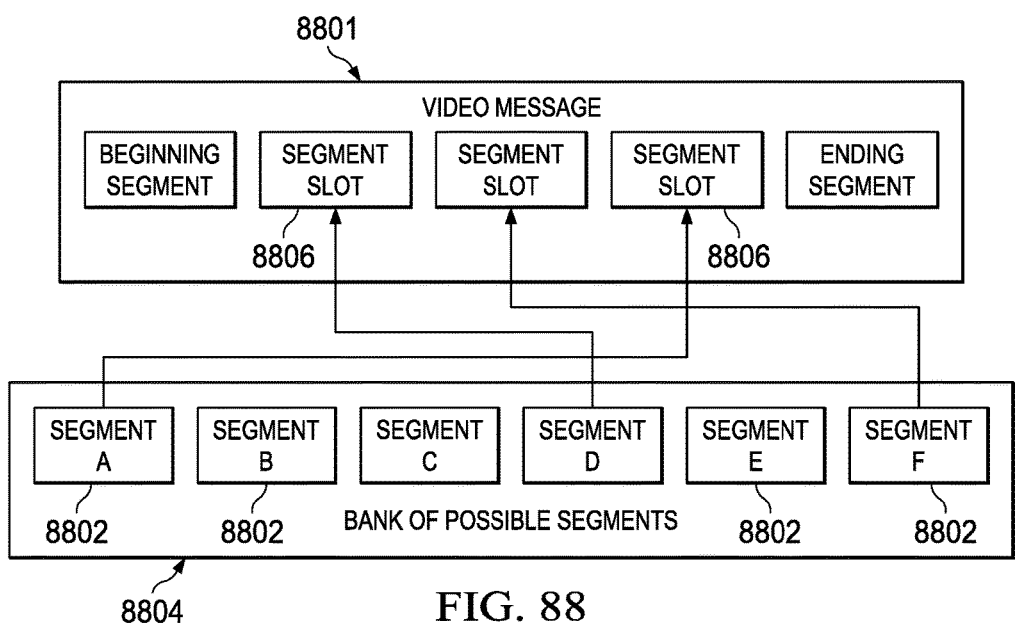
FIG. 88 illustrates an embodiment in which a system operator interacts with the displayed video message in order to vary the presented video message.

Turning to FIG. 88, there is illustrated a diagram of how, in some embodiments, the system operator can interact with the displayed video message such that the video message being displayed to the audience can be varied while the video message is actually being presented. In these embodiments, the video message 8801 being presented to audience is comprised of several different interchangeable video segments 8802 that are presented one after the other. These segments 8802 are drawn from a segment bank 8804 which is comprised of all of the possible video segments 8802 that can be used to make the video message 8801. Each of these segments is played during a "segment slot" 8806, which is a period of time which is to be filled with one of the video segments 8802 from the segment bank 8804. In the example depicted in FIG. 88, there are three segment slots 8806 (plus a Beginning Segment and an Ending Segment) in the video message 8801. The segment bank 8804 contains six segments 8802, Segment A-Segment F. The first segment slot 8806 is filled with Segment D, the second segment slot 8806 is filled with Segment F, and the third segment slot 8806 is filled with Segment A. Thus, playing the video message 8801 in FIG. 88 would result in playing the Beginning Segment, followed by Segment D, then Segment F, then Segment A, and finally the Ending Segment. Since each video segment 8802 is different in some way, some segments 8802 will be preferable depending for certain attendee demographic targets or attendee interests. In some embodiments, the system operator chooses which segments 8802 will fill each segment slot 8804 of the video message 8801 and actually makes the decision of which segments 8802 to use during each segment slot 8804 while the video message 8801 is playing. In these embodiments, system operator uses real-time data being presented while the video message 8801 is being played to choose which video segment 8802 to use to fill the next segment slot 8806. For example, demographic data might show that most attendees are women, prompting the system operator to choose a female-oriented message segment 8802 for the first segment slot 8806. While that segment 8802 is playing, the system operator can use real-time measurement data being compiled from responses to determine which segment 8802 from segment bank 8804 will be best to fill the second segment slot 8806. In this manner, the system operator can use real-time measurement data to create video segments that are customized to take advantage of the most up-to-date attendee information available.

The process described above and depicted in FIG. 88 uses different video segments to build a full-length video message. However, system operators can use real-time information to dynamically create videos in other ways. In other embodiments, the system operator does not combine segments to create a video, but changes things about a video message, such as the color of the background of the video message, the music being played with the video message, or length of the video message.

Figure 89:
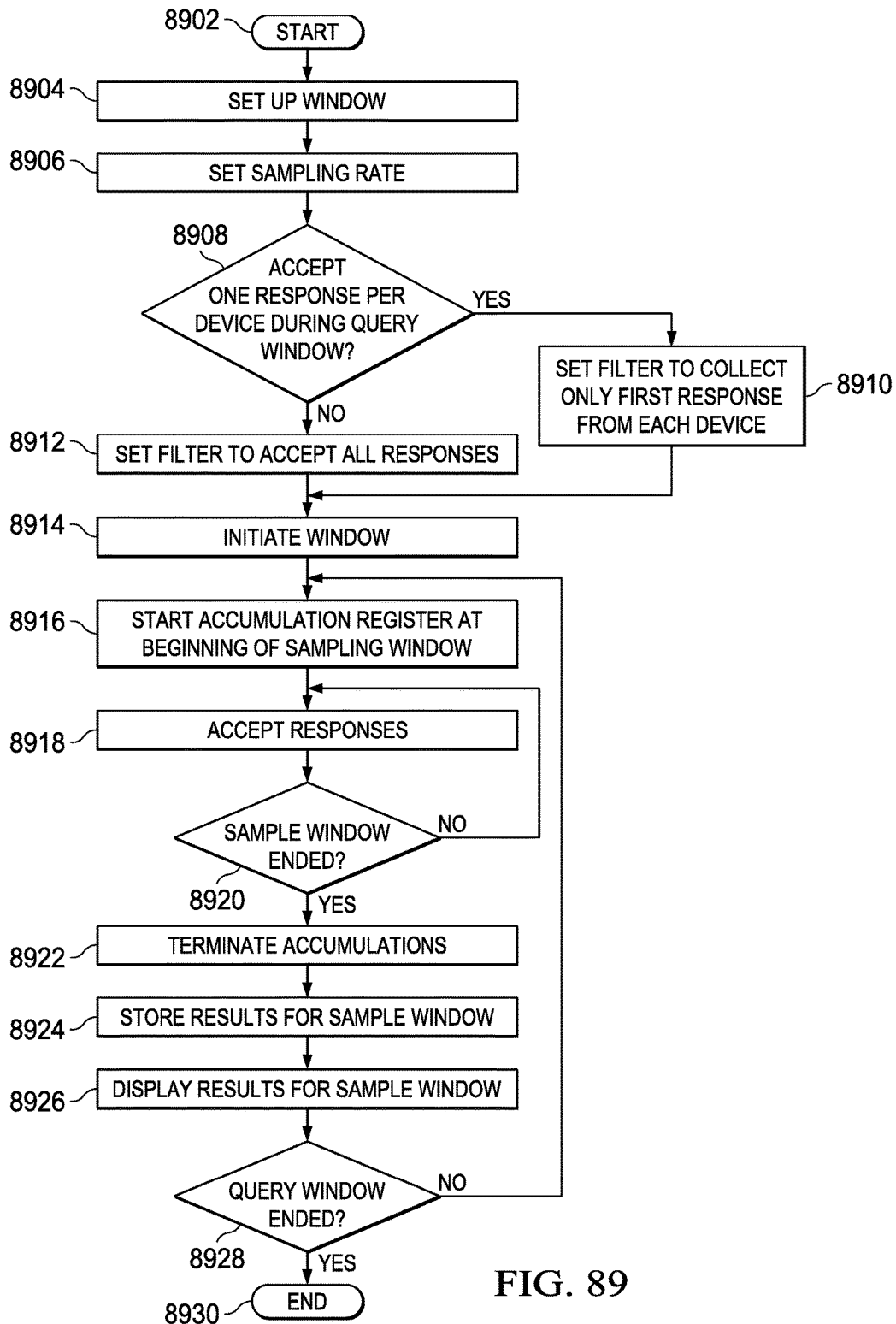
FIG. 89 illustrates a flowchart for an embodiment in which responses are accumulated and displayed as part of a sample window within a query response window.

Turning to FIG. 89, there is illustrated a flowchart depicting how, in some embodiments, responses are accumulated and displayed as part of a sample window within a query response window. The process starts with start block 8902 and moves to function block 8904, where the query response time window is configured and set up. Next, the process moves to function block 8906, where the sampling rate for the query time window is set. This determines how long each sample window will last. The process then flows to decision block 8908, where a decision is made whether or not to accept all responses, or only to accept each device's first response during the query response time window. If the system is only to accept each device's first response, the process flows to function block 8910, where a filter is set up to accept only one response from each device during the time window. The process then flows to function block 8914. If, at decision block 8908, all responses are to be accepted, the process moves to function block 8914, which sets the filter to accept all responses from each device. Next, the process moves to block 8914. At function block 8914, the query response window is initiated. Next, at function block 8916, the accumulation register for a sample window starts, which will begin counting the responses. Next, the process flows to function block 8918, where the system begins accepting responses from attendees. The process flows to decision block 8920, where, if the sample window has not ended, the process loops back to function block 8918 to continue accepting responses. If the sample window has ended, the process moves to function block 8922, where the system stops accumulating responses for that sample window. The process moves to function block 8924, where the system stores the results of the accumulated data for the sample window. Here, the results for the just-ended sample window are stored as an object in an object-oriented database. For example, the object can store information related to such things as the sample number, the response selections and numbers, the related query, and the time of the sample window or the time duration of the sample window. Storing the information in an object-oriented database allows the information to be linked to information contained in other objects in the database. The process then moves to function block 8926, where results for the sample window data are displayed. Next, the process moves to decision block 8928, where, if the query window has not ended, the process loops back to function block 8916 to begin an accumulation register for a new sample window. If, at block 8928, the query response window has ended, the process goes to block 8930, where the process ends.

Turning to FIG. 90, there is illustrated an example of a relational database correlating queries with response time windows. Table 9000 has two columns, column 9002, which lists queries, and column 9004, which lists time windows. The table shows, for each query 9006 presented to the event attendees, the beginning and ending times 9008 of the time window during which received responses will be associated with that query. For example, query Q2 has a response time window of T3-T4. This means that all responses from MUs 110 received after time T3, but before time T4, will be associated with query Q2 and will be presumed to be responses to query Q2. If a response is received outside of the time widow from T3-T4, it will not be associated with query Q2, even if the user of the MU 110 that submitted the response actually intended the response to be to query Q2. Some embodiments will have only one time window per query. Other embodiments will have multiple time windows for at least one of the queries. In some embodiments, the time windows will all be the same length of time. In other embodiments, at least some of the time windows will be of different lengths of time.

Turning to FIG. 91, there is illustrated a graph 9100 which demonstrates an example of how UID responses are marked with time stamps and associated with specific queries. Horizontal axis 9102 indicates time during a venue event, with time increasing from the left end of the axis to the right end of the axis. Vertical axis 9104 indicates which UID a mobile unit's 110 response is associated with. Graph markers 9106 indicate a response from a mobile unit 110. A graph marker's 9106 horizontal location indicates the time at which the response was submitted, while the graph marker's vertical location indicates which UID submitted the response. Horizontal bars 9108 indicate the time during which the time window for a specific query is open. Each bar is labeled (Q1, Q2, Q3, or Q4) to indicate which query the time window is for. The time markers 9110 are times at which time windows for query responses begin and end. In the example shown in FIG. 91, the time window to respond to query Q1 starts at time T1 and ends at time T2. Since all responses are time-stamped, any responses received from MUs 110 during this time will indicate they were submitted between time T1 and time T2. All four UIDs—UID(1), UID(2), UID(3), and UID(4)—each submitted one response during the time window beginning with T1 and ending with T2. This means that each UID will have one response associated with query Q1. Note that UID(3) also submitted a response 9106a during the time between T2 and T3. Since the time between T2 and T3 does not fall into the time window for any query responses, that response submitted by UID(3) will not be associated with any query. Two UIDs, UID(1) and UID(2), submitted responses (9106b and 9106c, respectively) between times T3 and T4, which is the time window for responses to query Q2, meaning that these responses will be associated with query Q2. Since no responses from UID(3) or UID(4) were submitted between times T3 and T4, no responses from UID(3) or UID(4) will be associated with query Q2. For query Q3, three responses were submitted: 9106d by UID(2), and 9106e and 9106f by UID(3). Response 9106d will be logged as a response from UID(2) to query Q3. However, because both responses 9106e and 9106f were submitted by the same UID, UID(4), during the same time window (the time window for Q3), the situation is created where both responses 9106e and 9106f will be associated with query Q4. Different embodiments will treat this situation in different ways. In some embodiments, the first response received from a UID during a time window for a query response will be the only response from that UID ultimately correlated with that particular query. In other embodiments, the last response received will be the only response correlated with the query. In other embodiments, if more than one response is received from a UID during a single time window, more than one of the responses will ultimately stay associated with the query for that time window and analyzed for statistical information. The specific number of queries, responses, and UIDs in FIG. 91 are only examples, as are the time window lengths.

In some embodiments of the disclosure, there are times during the live event that do not fall within the time window for any query response. In other embodiments, any time between the start of the first time window and the end of the last time window falls within one time window or another. In some embodiments, only one response per UID per time window is analyzed as part of statistical information gathering. In other embodiments, multiple responses per UID per time window are analyzed as part of the statistical information gathering.

Turning to FIG. 92, there is illustrated a diagram of a table 9202, which represents an example of a relational database relating queries and query responses to the meanings of query responses. In the first column of table 9200, there are listed the queries 9202 that are to be presented to venue attendees. In the second through fifth columns, there are listed in the first row the different responses 9204 that can be submitted by the mobile units 110 to the queries 9202. In this example, the responses can be "A", "B," "C," or "D." Finally, in the columns under each response possibility are listed meanings 9206 of each response when it is associated with a particular query. For example, the meaning of a response of "C" to query Q3 is stored in R3C. Continuing with this example, if query Q3 states, "What is your favorite pizza topping? A) Pepperoni, B) Cheese, C) Anchovies, or D) Mushrooms," then R3C would have a meaning of "Anchovies." Using this information, it can be determined that a response of "C" to Q3 indicates that the user selected "Anchovies" as the response to the query "What is your favorite pizza topping?" The embodiment shown in FIG. 92 is simply an example. Some embodiments will have more than four possible responses for each query. Some will have fewer than four. In some embodiments, not all queries will have the same number of response possibilities. In some embodiments, the response choices will be alphanumeric characters. In other embodiments, the choices will be different shapes. In other embodiments, the choices will be icons of various colors. Some embodiments will have response meanings that are combinations of response choices.

In some embodiments, not only are responses to queries collected during the event, but statistical information relating to the responses is also compiled during the event. In some of these embodiments, this statistical information can be displayed to the event attendees. In some embodiments, the statistical information regarding responses is automatically presented back to the event audience, while in other embodiments, the decision to present this information to the event audience is made by an individual or computer program after the information is gathered and analyzed.

In some embodiments of the disclosure, the information correlating queries with response time windows is stored in the same database as the information correlating query responses with the meanings of the responses. In other embodiments, the time correlation information is stored in a database that is different than the database storing the response meaning information. In some embodiments, all of the relational database information is stored locally at the event location, such that no information from an external internet is required to relate query responses to response time windows and response meanings.

In some embodiments, responses from mobile units include information related to the event venue from which the responding UID is located. In some embodiments of these, this information utilized a relational database which correlates the location information with an event venue.

Figure 93:
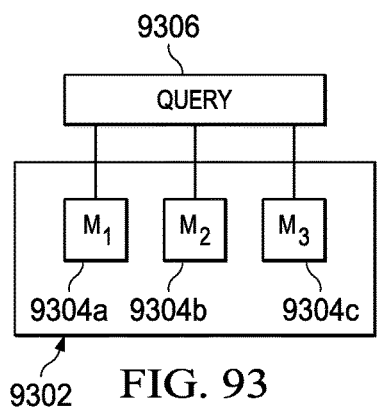
FIG. 93 illustrates a set of media messages for a potential decision tree.

Turning to FIG. 93, there is illustrated a diagram of a set 9302 of several media messages 9304. In this example, each message in the set is a commercial for a different kind of automobile, with each message being one that can be presented after the query has been presented to the audience and the query responses have been analyzed. Message 9304a (M1) is a commercial for a sports car, message 9304b (M2) is a commercial for a luxury sedan, and message 9304c (M3) is a commercial for a minivan. Which of these messages will be presented to the audience is determined by the process described hereinabove. The messages in this set are not simply random commercials that have been lumped together, however. The messages are linked to each other by a common relationship to a query 9306. Their relationship to query 9306 is such that the statistical information gathered from responses to query 9306 will help determine which one of M1, M2, or M3 will be presented to attendees. Each of these commercials is produced by the media provider with the intent of being part of a set of commercials for different kinds of automobiles, with each commercial to be presented when certain conditions are met. This new production standard, where each of the messages in the set is pre-produced with the specific purpose of being part of a set of messages from which a specific message will be presented, enables media providers to make the best use of their resources by efficiently producing a set of messages with multiple demographics or other groupings in mind.

Staying with the example in FIG. 93, the automobile manufacturer has three demographics that it wishes to reach: single men, married men, and retired men. Keeping this in mind, the automobile manufacturer produces the three media messages—M1, M2, and M3—with each message being purposely produced to appeal to one of the demographics in mind. Thus, no matter which demographic—single men, married men, or retired me—turns out to be most highly represented when the automobile manufacturer has a chance to present one of its commercials, it will have a commercial ready to present to the audience that appeals to the most desirable demographic target. One of the important aspects of these embodiments is that messages are not produced in isolation, but are produced with the intent of being part of a set or sets. In some embodiments, additional messages will be produced and added to a set after an initial set of messages is produced, but an important aspect of these embodiments is that the messages are produced with the purpose of being "linked" to a query, demographic, etc. In this example, the manufacturer has three demographics it is targeting, and thus creates a commercial targeting each demographic.

In some embodiments, the message set is not related to a specific query or set of responses, but is related to a set of demographic criteria. For example, in a slightly different embodiment, the set of messages illustrated in FIG. 93, rather than being linked to a specific query, is linked to a set of possible demographic make-ups of the male attendees. Even if the automobile manufacturer does not know how it will determine the demographic make-up of male attendees, it knows that different groups of males respond differently to different types of messages and therefor creates different commercials directed at each group. In an embodiment such as this, a media provider produces a set of media messages for a set of circumstances related to information regarding a certain demographic classification or set of interests. In these embodiments, the sets of messages are created without regard to a query that might later be associated with them, or without regard how the statistical information used to determine which message to be presented will be acquired. Rather, the messages are produced knowing as little as which different groups of attendees the message provider wishes to reach.

Figure 94:
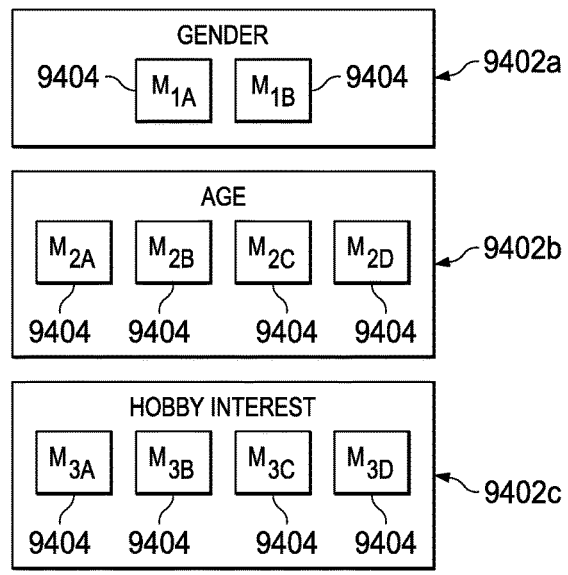
FIG. 94 illustrates multiple sets of media messages for a potential decision tree.

Turning to FIG. 94, this concept is illustrated in another example. Shown in FIG. 94 are several sets 9402 of messages 9404. Each set 9402 is of messages 9404 which are each tailored to a particular group of potential viewers with a demographic or interest category. For example, set 9402a is a set of messages that are tailored to viewers of different genders, with MIA being a message 9404 or advertisement targeting males, and M2A being a message 9404 targeting females. Set 9402b is of messages which are tailored to attendees of different ages, while set 9402c is a set of messages each tailored to a different hobby interest. Each set of messages is produced together, as a set, by the media provider. The media provider may not even know whether or not any one particular message will be presented, but the messages have been produced as a set, so that when, and if, the conditions occur for a particular message to be especially desirable, it is already available and ready to present.

In some embodiments, in which a message set is related to a query, the query is produced before the message set is produced. In other embodiments, sets of messages are produced before specific queries are produced for the message sets.

Figure 95A:
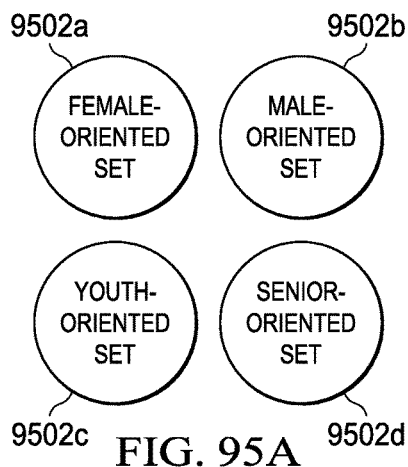
FIGS. 95A and 95B illustrate sets of media messages targeting particular groups of viewers.

Turning to FIG. 95A, there is illustrated an example of multiple sets 9502 of media messages from a media provider. Each media message is a message that can be presented to event attendees. The messages are divided into different sets, each set being messages that are designed to appeal to a certain demographic. In this example, there are four sets of messages. Set 9502*a* is a set of messages designed to appeal to female audience members. Set 9502*b* is a set of messages designed to appeal to male audience members. Set 9502*c* is designed to appeal to younger viewers, and Set 9502*d* is designed to appeal to older viewers. For example, if the media provider providing these sets of messages is an automobile manufacturer, each set of messages could be different sets of advertisements featuring different types of vehicles produced by that manufacturer, with each vehicle being promoted to a particular gender or age group. In some embodiments, the subjects of the media messages will be same for each set, with the individual messages in each set tailored to a specific demographic. In other embodiments, different message sets will feature different products or services altogether, with the products or services being ones that are typically marketed to members of that set's target demographic.

Figure 95B:
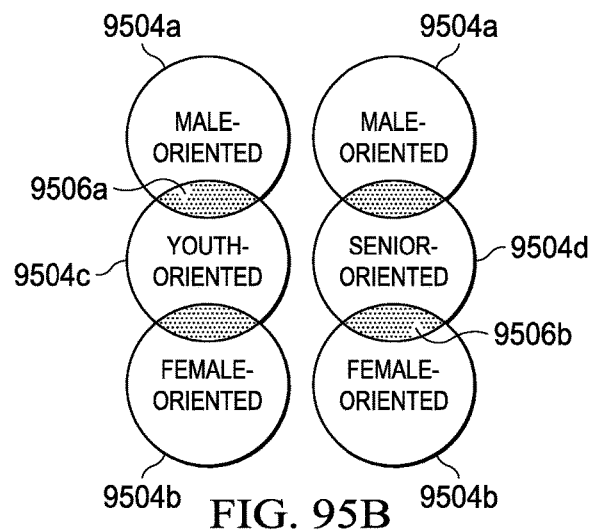

In some embodiments, media message sets 9504 contain messages that are tailored to multiple target demographics. The benefit of these types of messages is that when more information regarding the event attendees that are actively responding with their MUs 110 is available, more targeted messages can be presented and with greater effect. Turning to FIG. 95B, there are illustrated examples of several sets of media messages, each with a target demographic, similar to those in FIG. 95A. In this example, sets 9504*a* are sets of messages designed to appeal to male audience members. Sets 9504*b* are sets of messages designed to appeal to female audience members. Set 9504*c* is designed to appeal to younger viewers, and Set 9504*d* is designed to appeal to older viewers. Unlike the message sets 9502 in FIG. 95A, the message sets 9504 of FIG. 95B overlap with other message sets 9504. These overlapping regions 9506 of the sets indicate that some of the messages in each set are the same messages as those in the overlapping set and are designed to appeal to both overlapping set demographics. For example, region 9506*a* is formed by the overlapping regions of the male-oriented set 9504*a* and the youth-oriented set 9504*c*. This means that some of the messages in each of these sets are designed to appeal to both male and young event attendees. Similarly, region 9506*b* indicates that at least some of the media messages are designed to appeal to older female audience members. Staying with this example, if query response information indicates that a significant portion of responding attendees are young males, then the system operator or the operating computer program can select a message to present which appeals to both males and younger viewers. This allows the media provider to get the most benefit out of each of their messages by providing messages which target multiple demographics at the same time.

The demographics shown in FIGS. 95A and 95B are only examples. In some embodiments, messages are tailored to gender, while in others, the messages are tailored for age. In other embodiments, the messages are tailored to ethnicity. In other embodiments, the messages are tailored to income level. In other embodiments, messages are tailored to geographic location of the viewers' residences. Some embodiments will have messages that are tailored to only a single demographic classification, while other embodiments will have messages tailored for multiple demographic classifications. In some embodiments, rather than having sets of messages tailored to specific demographics, the sets will be of messages tailored to specific consumer interests or political proclivities.

Figure 96A:
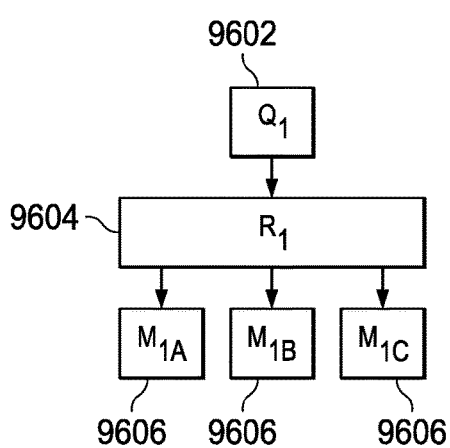
FIGS. 96A-96C illustrate the process of selecting media messages based on data gathered from responses to queries.

Turning to FIG. 96, there are illustrated diagrams showing how media messages are selected based on information from query responses. Illustrated are representations of media messages, such as advertisements. Starting with FIG. 96A, there is illustrated a representation of a query 9602 which is presented to the event attendees. The attendees respond with responses, the statistical analysis of which makes up response data 9604. In this example, a media provider has supplied three messages 9606 which could be presented to attendees. Each one of these messages is tailored to appeal to a different demographic. Which message is presented will depend on the analysis of response data 9604. For example, if message 9606 M1A is designed to appeal to males, M1B to females, and M1C to high income viewers, then an analysis of response data 9604 which shows a high proportion of wealthy individuals are responding would result in message M1C being presented. Each message could be a variation of the same overall message, or each message could be totally different from the other two messages. In some embodiments, additional queries and additional messages will be presented after one of the messages 9606. In this manner, information related to the interests and opinions of event attendees is refined multiple times so that more precisely targeted messages can be delivered.

Figure 96B:
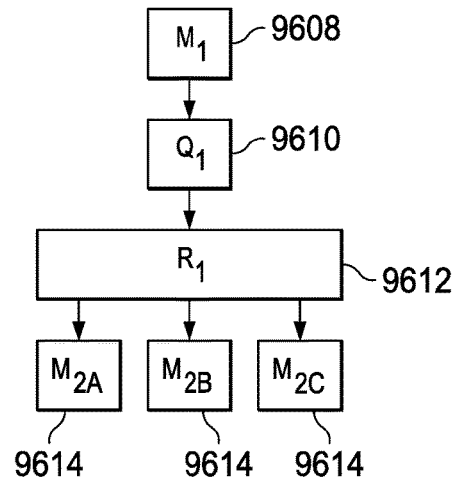

A variation of the embodiment is shown in FIG. 96B. This embodiment is similar to the embodiment shown in FIG. 96A, except that in FIG. 96B, a message is presented to the event attendees prior to the query being presented. In this embodiment, a message 9608 is presented, followed by a query 9610. In some embodiments, the query Q1 is related to the message M1. After query Q1 is presented, the event attendees respond through their MUs 110 with responses which make up response data 9612, or R1. Like in the embodiment shown in FIG. 96A, which message 9614 from the group of M2A, M2B, and M2C is next presented depends on the analysis of R1. Each message could be tailored to a specific demographic, or each message could be designed to appeal to viewers with particular interests. For example, if message 9608 M1 is a commercial for a pickup truck, then query Q1 could be a question about whether or not that product appeals to attendees. If M2A is a commercial for an auto parts website, and M2B and M2C are advertisements for a cooking-interest television channel and a brand of office furniture respectively, then an analysis of R1, response data 9612, showing that the truck commercial rated favorably with a large portion of responding attendees would result in M2A, the commercial for the auto parts website, being presented. The benefit of an embodiment such as illustrated in FIG. 96B is that queries can be designed to determine how audiences react to a previously-presented query.

Figure 96C:
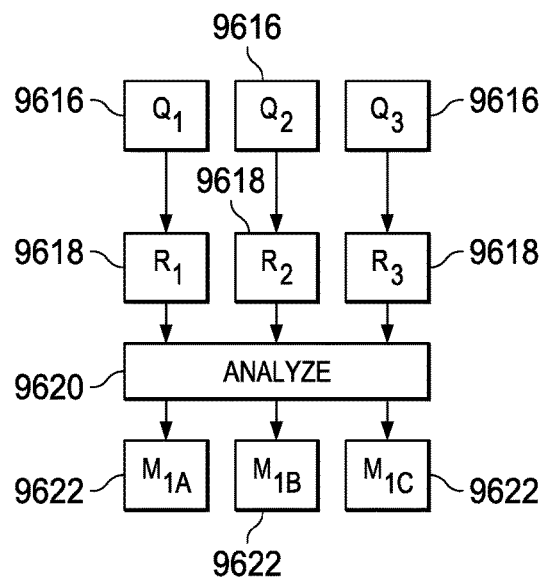

In some embodiments, such as is shown in FIG. 96C, multiple queries 9616 are presented and multiple response sets 9618 are collected. In these embodiments, the multiple response sets are combined and analyzed together (represented by block 9620) to determine demographic or interest information about the responding users. Based on the analysis of the combined response sets 9616, the best message from a set of messages 9622 provided by a media provider is presented to the audience. The selection of which message 9622 will be shown is the result of the analysis of all of the response sets from the queries 9616. In this way, information from multiple queries about event attendees' opinions and interests is acquired and factored into the decision of which message to present. One benefit of these embodiments is that since multiple queries are presented and multiple response sets received before the media message is presented, the message 9622 that is presented can be more effectively targeted to the particular attendees currently in the venue than a message targeted based on only one query and response set.

In some embodiments, the process of presenting queries and then selecting media messages to present based on responses to those queries does not occur within event venues. In some of these embodiments, the media messages are presented during television programs, radio programs, websites, or on internet-based webcasts. In some embodiments, the queries are presented via the same format as the media messages, while in other embodiments, the queries are presented in different formats, or via formats such as websites, text messages, "blog" sites (such as Facebook, Twitter, or Snapchat), through mobile device apps, or through "smart devices" such as internet-connected TVs or set-top boxes. In some embodiments, the same kinds of platforms (text messages, websites, microblogs, etc.) are also used for respondents to submit responses. The format of the query does not have to be the same format as the query response, however. Virtually any format that allows for a unique ID to be associated with a user or device serves as an appropriate format for query responses.

Different embodiments will use different mechanisms to actually make the selection of media message to present next. In some embodiments, the selection is made automatically by a computer within the event venue running a program with sets of algorithms which can analyze query response data, possibly in combination with demographic or other identifying information from responding users. The computer then chooses the next message to present to the attendees. In other embodiments, a human system operator makes the selection. In some of these embodiments, the system operator makes the selection based on a predetermined set of conditions related to query response data, while in some embodiments, the system operator makes the decision at least partly based on his or her own judgement as to which message would be the best to present.

Figure 97:
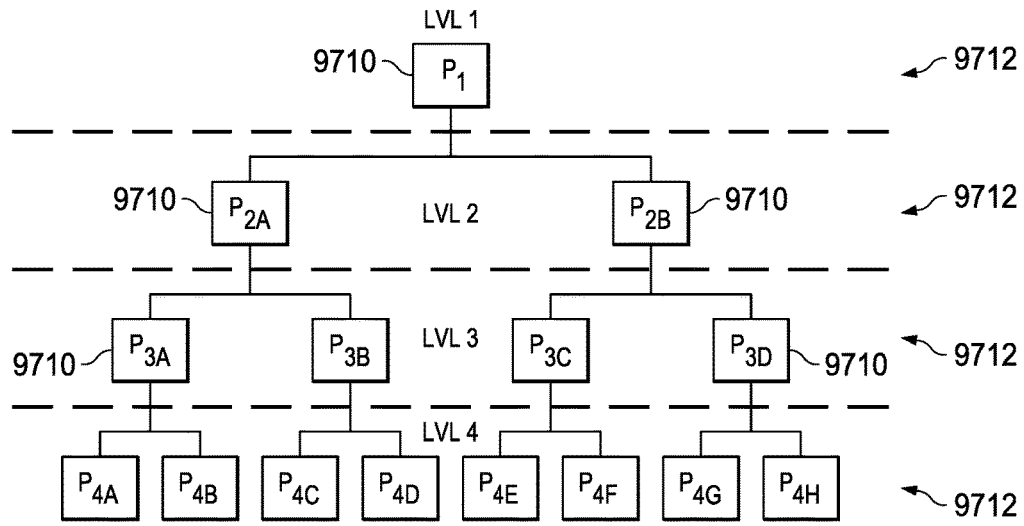
FIG. 97 illustrates a plurality of presentations arranged in a hierarchy.

Turning to FIG. 97, there is illustrated an example of some embodiments in which statistical information is used to determine the most desired product features and to create media based on these features. In FIG. 97, there are illustrated representations of a number of presentations 9710. Each presentation 9710 presents a product or service with a set of features or attributes related to that product or service. The presentations 9710 are arranged in a hierarchical format such that each presentation 9710 is at a certain hierarchical level 9712 and branches off from a presentation one level 9712 above. For example, presentation 9710 labeled P1 is at the top level 9712 ("LVL 1") of the hierarchy and branches off to presentations labeled P2A and P2B, which are both one level 9712 ("LVL 2") below level 9712 LVL 1. All of the product features included in a presentation 9710 are also included in the presentation one level 9712 below, however, each presentation 9710 will have at least one feature changed or not included in the presentation with which it is associated one level 9712 higher. Thus, both presentations 9710 in LVL 2 have the features of presentation P1, as well as an additional feature for each. The products or services shown in presentations 9710 labeled P3C and P3D are one level 9712 below LVL 2 will have all of the features of the product shown in the presentation P2B. However, the product or service presented in P3C will have an additional feature or features not included in the product of presentation P2B. Similarly, the product or service shown in P3D will have all of the features of the product shown in P2B, as well as at least one additional feature. As an example, if presentation P1 shows a new car, presentation P2A could show the same car with the added feature of a sunroof, while P2B would show the same car as in P1, but with the added feature of a premium stereo system. Thus, a presentation 9710 at the bottom level 9712 will have all of the features of the related presentations 9710 in all of the higher levels 9712. Presentation P4G, for example, will have a product or service with all of the features of the products or services in presentations 9710 P1, P2B, and P3D, as well as an additional feature not included in the higher levels 9712.

In some embodiments, the features added to the lower levels 9712 will be variations of the same feature. For example, if P1 is a presentation showing an advertisement for a credit card, P2A and P2B could each show different kinds of benefits enjoyed by card members, such as "cash back" in P2A and airline miles in P2B. In some embodiments, the product or service shown in a presentation 9710 will not have an additional feature as compared to the product in the associated presentation 9710 one level 9712 higher, but will instead hold that feature constant, while a product in a presentation 9710 at the same level 9712 and also associated with the same presentation 9710 one level 9712 higher will have a variation of that product. For example, the presentation P3B might show a red product. P4C and P4D, both branching off of P3B, would show for the same product, except that while P4C would show the same red product, P4D would show a green version of the product. This allows variations in features which are simply intrinsic to the nature of the product or service being presented. The types of products, product features, services, and service features described in these embodiments are only examples. In some embodiments, the added feature shown in a presentation will actually be lack of or the removal of something that existed in the associated presentation one level higher.

In some embodiments, the feature that is changed in the presentation 9710 is not a feature of the product or service, but is instead a feature or aspect of the presentation 9710 itself, such as the choice of music, or the time length of the message. For example, in some embodiments, the feature added to the presentations 9710 a level 9712 below a presentation will be a voiceover narration. In another embodiment, the feature varied will be the weather present in a scene depicted in the presentation 9710. In another embodiment, the feature changed will be the addition of a celebrity actor or actress.

By varying features of products and services in presentations or of the presentations themselves, the best combinations of features for presentations and products can be determined. This, in turn, will allow for the most popular and in-demand presentations and products to be produced.

Figure 98:
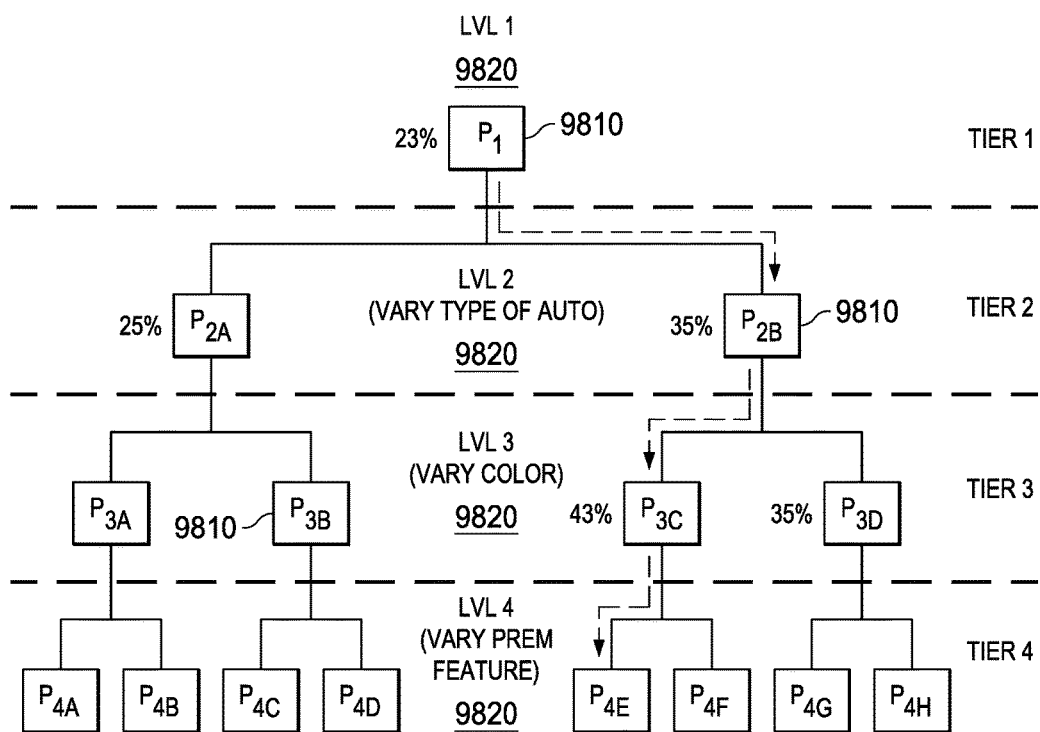
FIG. 98 illustrates an example of determining a desired product feature by using a hierarchy of presentations.

Turning now to FIG. 98, there are illustrated representations of several presentations 9810 arranged in a hierarchical format in different levels 9820, such as were illustrated in FIG. 97. In practice, to determine what features (of either products or presentations) are most appealing to viewers, all of the presentations with features being compared would be presented to audiences (not necessarily the same audience). After a presentation 9810 is shown to an audience, the positive reaction to the presentation is measured via some type of query and set of responses. The positive reactions of presentations 9810 branching from the same presentation one level 9820 higher are then compared, and the presentation with the more positive reaction is selected as the "path" of the hierarchy on which to advance, with the feature (either of the product or of the presentation itself) integrated into presentations which branch from it in every level 9820 further down the hierarchy. In other words, every presentation that branches from a "parent" presentation will have all of the features included in the "parent" presentation, along with a feature added at each additional hierarchical level 9820. In this way, the product or presentation becomes more and more refined and tuned to what elicits a favorable reaction from viewers of the presentation.

Turning again to FIG. 98, an example embodiment is given. The presentation 9810 labeled P1 is a presentation for brand of automobile and is at the first hierarchical level 9820, labeled LVL 1. P1 is presented to an audience, and a query is used to determine the positive reaction to P1. In this example, when shown to an audience of event attendees, P1 elicits a positive response from 23% of the attendees. The feature to be added at the next level 9820, LVL 2, is adding a specific type of car (from the brand shown in P1) to the presentation 9820. Moving one level 9820 down from P1 to LVL 2, P2A and P2B are presentations for a mini-van and a sports car, respectively. In this example, P2A receives a 25% positive response from an audience query (25% of all of the respondents responded positively), while P2B receives a 35% positive response. Since the sports car of P2B received the higher positive response than the mini-van of P2A, the subsequent presentations shown, starting with those from the next level 9820 (LVL 3), will be from P2B's "branch" of the hierarchy.

The next presentations shown, at LVL 3, will vary the color of the sports car shown in P2B. P3C shows a blue sports car, while P3D shows a green sports car. In this example, P2B also showed a sports car that was green. As explained above herein, this is consistent with other embodiments, as color is an intrinsic feature of automobiles, and keeping constant an intrinsic feature for a level 9820 of presentations 9810 still gives an indication of what version of the feature (in this case, color) the event attendees prefer. After P2A and P2B are shown, the next presentations from the preferred branch (in this case, P2B's branch) are shown. In this example, P3C, the blue sports car, garnered a 43% positive reaction from queries after being shown to an audience, while P3D, the green sports car, again garnered a 35% positive reaction. The blue sports car of P3C being favored over the green sports car of P4D, the presentation hierarchy path moves to the next level 9820 down from P3C to P4E and P4F, each of which adds a luxury feature to the blue sports car of P3C. In this example, P4E adds a premium stereo system to the blue sports car, while P4F adds a sunroof. After both presentations 9810 are shown to the event attendees, P4E receives a 74% positive response from a query, while P4F receives a 52% positive response, meaning that the audience prefers a stereo system to a sunroof. With this information, the generators of the media messages learn that, for the automobile manufacturer shown in presentation P1, the vehicle most favored by consumers is likely a blue sports car with a premium sound system.

By following the process described herein above and illustrated in FIG. 97, with an example of an embodiment described in FIG. 98, producers of media messages will be able to determine what features of products, services, and presentations receive the most favorable responses and are thus most appealing to consumers. Once media producers have this information regarding consumer preferences, they can begin to create new media presentations or media campaigns which include or place emphasis on the features most desired by consumers.

Figure 99:
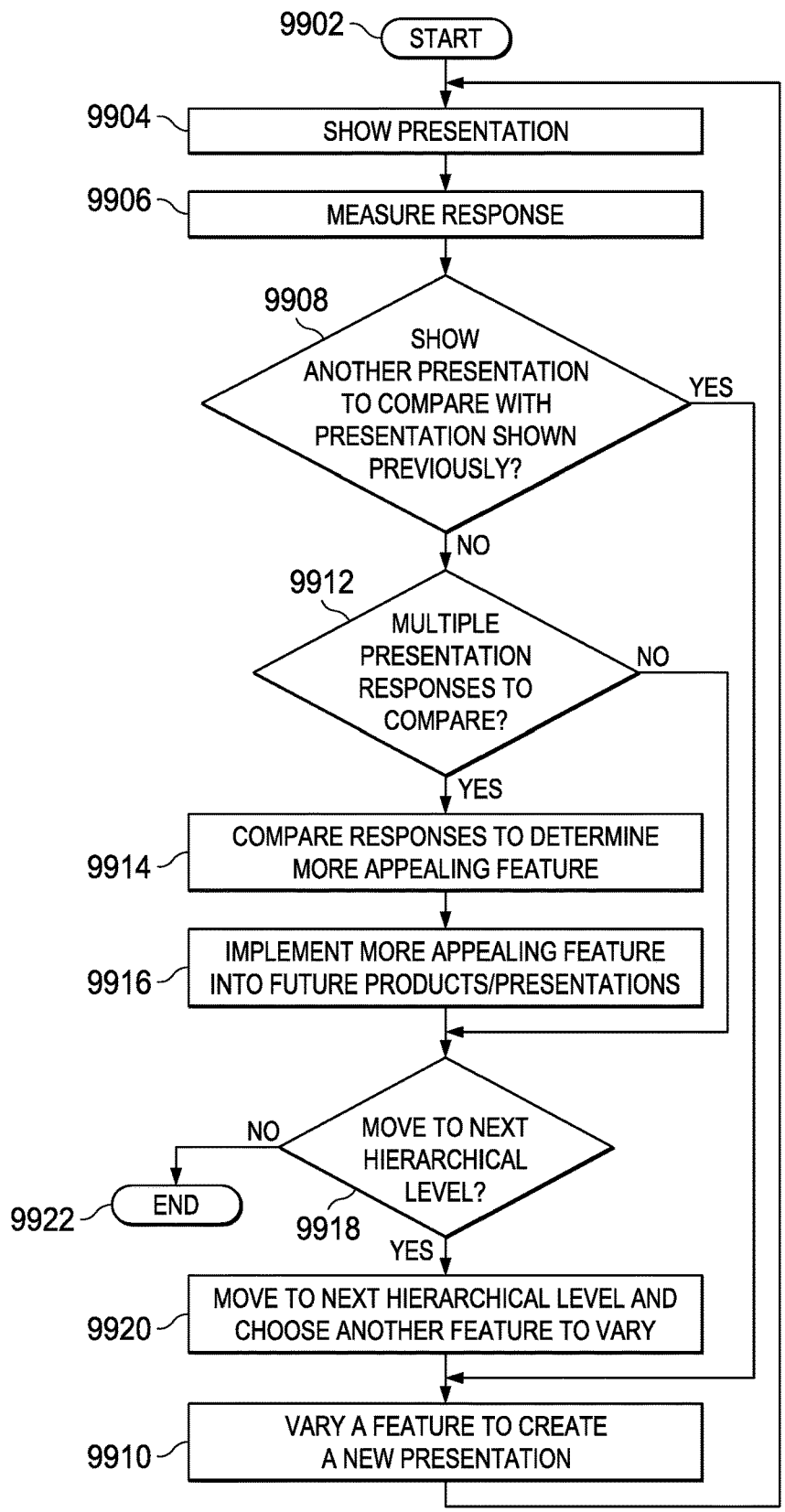
FIG. 99 illustrates a flowchart showing the process of determining desired product features and creating media having the same.

Turning now to FIG. 99, there is illustrated a flowchart detailing the process of producing media based on the most desired product features. The process starts with Start block 9902 and moves to function block 9904, where a presentation with a product or service is shown to event attendees. The process then moves to block 9906, where the attendees' positive response to the presentation is measured. This can be measured via responses to queries or by the share of attendees that respond at all. The process flows to decision block 9908. If another presentation to compare with the presentation shown in block 9904 is to be shown, the process moves to block 9910, where a feature of the presentation, or of the product/service in the presentation, is varied to create another presentation. The process then loops back to block 9904. If, in block 9908, another presentation will not be shown, the process moves to decision block 9912. Here, if there are responses to multiple presentations to compare, the process moves to function block 9914, where the responses of the various presentations at that hierarchy level are compared to determine the most appealing feature. The process moves to block 9916, where the most appealing feature of the set compared in block 9914 is implemented into future presentations. The process moves to block 9918, where it is determined whether or not there will be another hierarchical level of features to compare. If not, the process ends at block 9922. If so, the process flows to block 9920, where the system moves to the next hierarchical level of product or presentation features to vary and compare. The process flows to block 9910, where a feature is varied to create a new presentation, and again loops back to block 9904 to show the new presentation.

Figure 100:
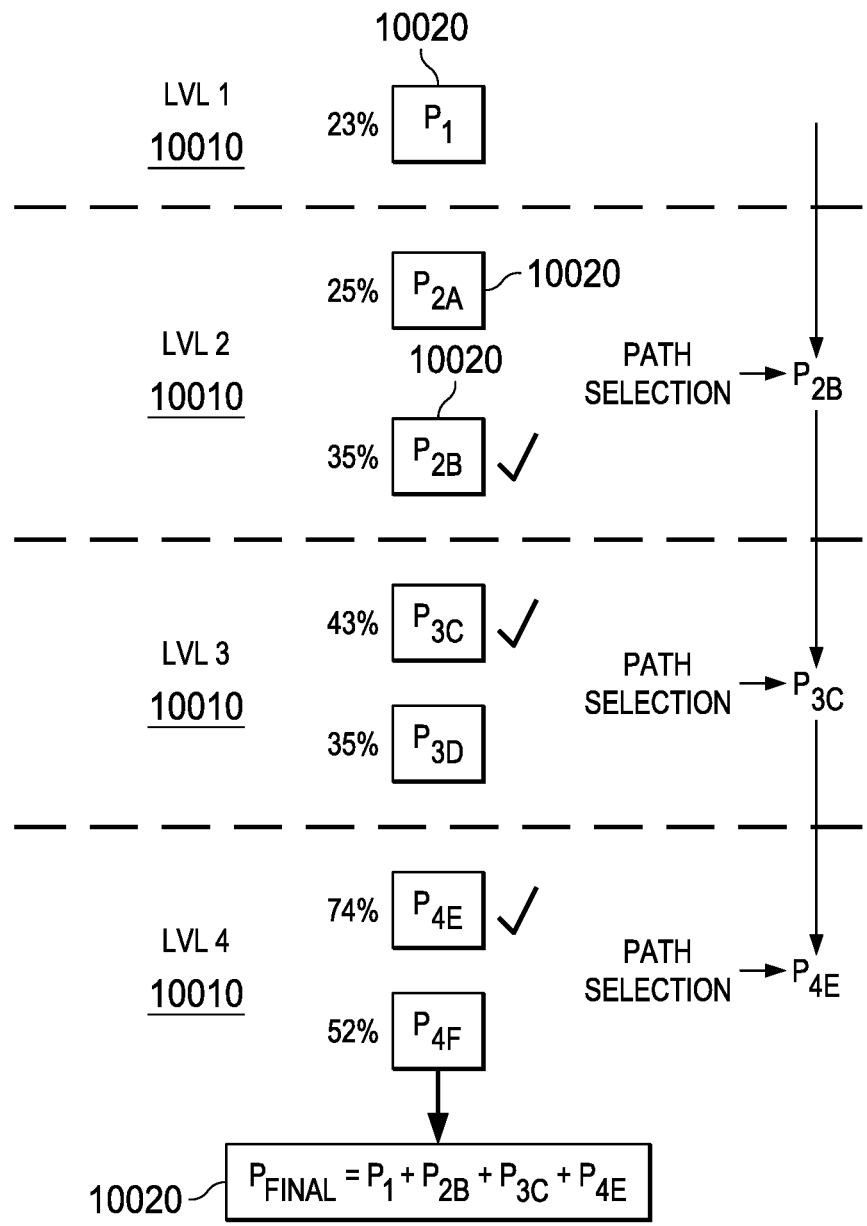
FIG. 100 illustrates another view of the embodiment depicted in FIG. 98.

Turning to FIG. 100, there is illustrated the same example shown in FIG. 98 depicted in a different way. In FIG. 100, there are several hierarchical levels 10010 populated with presentations 10020, the presentations 10020 in each level 10010 having the features of the presentations 10020 in higher hierarchical levels 10010 from which they branched (as shown in FIG. 31). Again, the process starts at the highest hierarchical level 10010, LVL 1, by showing presentation P1, a presentation 10020 for a brand of automobile. Using queries, it is determined that 23% of responding attendees have a positive reaction to P1.

Next, sometime after P1 has been shown and reaction data from the audience collected, the system moves one hierarchical level 10010 down, to LVL 2, where two more presentations 10020, P2A and P2B, are shown, wherein P2A is an advertisement for a minivan produced by the automobile brand shown in P1, and P2B is an advertisement for a sports car produced by the automobile brand shown in P1. Queries are used to determine the positive responses of the event attendees to P2A and P2B, and, in this example, P2A has a 25% positive response, while P2B has a 35% positive response. Since P2B had a higher positive response than P2A, the path down to the next hierarchical level 10010 will go through P2B, meaning that the next presentations 10020 to be shown will have the features of the sports car from P2B made by the automobile manufacturer from P1.

Sometime after P2A and P2B are shown, and audience responses show that P2B is the more preferable of the two, two more presentations 10020, P3C and P3D, from the next hierarchical level 10010, LVL 3, are shown. P3C and P3D branched off of P2B in the hierarchy, so they both show sports cars made by the same manufacturer as in P1. However, the sports car in P3C shows a blue sports car, while P3D shows a green sports car. Responses to each of these presentations are measured, showing a 43% positive reaction to the blue sports car in P3C and a 35% positive reaction to the green sports car. Since P3C had a higher positive reaction than P3D, it is determined that an advertisement with a blue sports car is preferable to an advertisement with a green car, so the path to the next hierarchical level 10010 down, LVL 4, will branch off of P3C and will feature blue sports cars.

Sometime after the determination that P3C is preferable to P3D, two more presentations 10020, P4E and P4D, will be shown. Both of these presentations are one level 10010 down from P3D in LVL 4 and branch off of P3D. Thus, they will both feature blue sports cars from the manufacturer featured in the very first presentation 10020, P1. In this example, the added feature at LVL 4 is the addition of a luxury feature to the automobile. Presentation 10020 P4E adds a premium sound system, and P4F adds a sunroof. Thus, P4E is an advertisement for a blue sports car with a premium sound system, and P4F is an advertisement for a blue sports car with a sunroof.

Sometime after the presentations 10020 of hierarchical level 10010 LVL 3 are shown and data gathered for, P4E and P4F are shown to an audience. In this example, P4E garners a 74% positive response, and P4F garners a 52% positive response, so it is determined that a premium sound system is more preferable to consumers than is a sunroof. Thus, P4E, the advertisement for a blue sports car with a premium sound system, is chosen for the path down which to travel to the next hierarchical level 10010, if one exists. In this example, however, LVL 4 is the lowest hierarchical level 10010. Therefore, the presentation 10020, $P_{FINAL}$, showing the most desired product feature is a combination of the features of presentations 10020 P1, P2B, P3C, and P4E, meaning that the most desired product feature from that automobile manufacturer is a sports car (from P2B) that is blue (from P3C) and has a premium sound system (from P4E). The automobile manufacturer can now create a marketing campaign focusing on such a vehicle, knowing that consumers have already shown that they are likely to respond favorably.

As discussed hereinabove, it should be noted that in some embodiments, all of the presentations to be shown will be shown at a single event venue to the same audience. In other embodiments, however, at least some of the presentations will be shown at a different event in the same venue, or even at different events in different venues. Thus, determining which of two presentations has a higher positive rating might involve showing the presentations to multiple audiences and compiling the results from each to obtain a final set of data which can compare the reactions to the two presentations. The same information regarding consumer preferences can be collected whether or not the presentations are shown to the same audiences or at the same venues. In these embodiments, information from multiple audiences is compiled together. For example, if multiple audiences are given the choice of choosing between P3C and P3D from FIG. 31, then the results from each audience are compiled together to get a more accurate gauge of what audience preferences really are with regards to P3C and P3D. Thus, determining which of a pair of presentations garners the higher positive reaction from consumers could take days, or even weeks, if the presentations are shown to several different audiences over a period of time, and completing the whole process of determining the most desired feature of a series of presentations could potentially take even longer, depending on how many audiences the presentations are shown to and how much information is needed to obtain an accurate measurement of what features consumers prefer.

Figure 101:
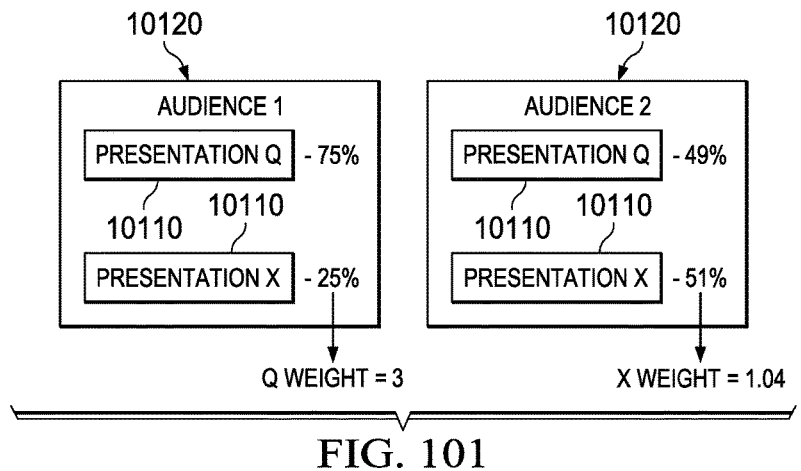
FIG. 101 and illustrates an embodiment using weights to determine the most desired product feature.

Turning to FIG. 101, there is illustrated a diagram of how, in some embodiments, rather than using percentages, "weights" are assigned to presentations, whereby when two presentations are compared, the presentation preferred by the audience is assigned a weight based on how much more preferred it was compared to the other presentation. Assigning weights is especially useful for embodiments wherein the entire process working through the presentation hierarchy occurs multiple times. Rather than simply assigning a binary answer to the question of which of two presentations was more preferred, assigning weights allows the determination of which product feature is most desired even when different venues or audiences choose different presentations as most preferable. For example, if two presentations 10110, Presentation Q and Presentation X, are being compared, they might be compared by multiple audiences 10120 (Audience 1 and Audience 2). In this example, each audience 10120 chooses which of the two presentations 10110 they prefer most. The first audience 10120, Audience 1, prefers Presentation Q, while the second audience 10120, Audience 2, prefers Presentation X. If the only knowledge available is which presentation was selected as preferred by the most audiences, then the answer would be a tie, and an accurate determination could not be made. In this example, however, the preferred presentation for each audience is assigned a weight based on how much more preferred it was than the other presentation. For Audience 1, Presentation Q was preferred over Presentation X by a 3-to-1 margin (75% to 25%). Thus, by dividing the percentage of attendees who selected Q by the percentage of attendees who selected X, Presentation Q is given a weight value of 3. For Audience 2, Presentation X was preferred over Presentation Q, but only by a 51-to-49 margin (51% to 49%). It is given a weight of 1.04 (51÷49). Therefore, even though each Presentation was preferred by the same number of audiences 10120 (1 each), Presentation Q has a much higher weight than Presentation X, and Presentation Q would be chosen as the most preferred presentation as to between Presentations Q and X.

Figure 102:
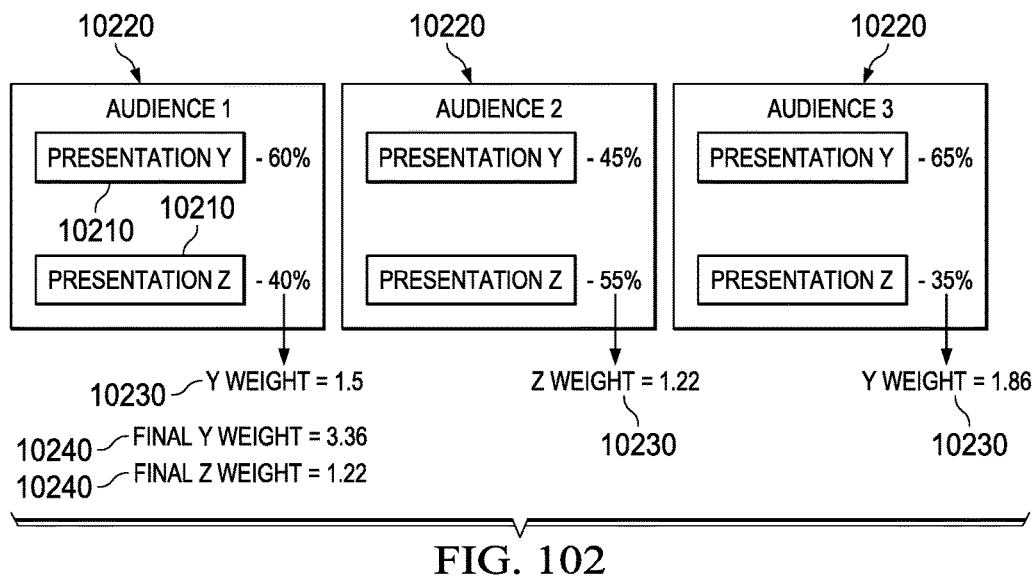
FIG. 102 illustrates an embodiment using weights to determine the most desired product feature.

Turning to FIG. 102, there is illustrated a diagram of how, in situations wherein multiple audiences are used to compare presentations, a final weight value 10240 is given to each presentation which is the sum of the weights 10230 given to it by all of the audiences queried. For example, in FIG. 102, three audiences 10220 are used to compare two presentations 10210, Presentations Y and Z, with audience members responding to queries to select which presentation 10210 they prefer. Audience 1 prefers Presentation Y over Presentation Z 60%-to-40%, giving Presentation Y a weight of 1.5. Audience 2 prefers Presentation Z over Presentation Y 55%-to-45%, giving Presentation Y a weight of 1.22. Finally, Audience 3 prefers Presentation Y over Presentation Z 65%-to-35%, giving Presentation Y a weight of 1.86. Summing the weights each presentation 10210 garnered from each audience 10220 means that Presentation Y has a final weight value 10240 of 3.36 (1.5+1.86), while Presentation Z has a weight of 1.22. Since Presentation Y has the higher final weight value 10240, it will be selected as the more preferred of the two presentations 10220. This process can be expanded to as many different venues and audiences as necessary.

In some embodiments, all responses are factored into determining the most desired product feature. In other embodiments, however, system operators might only care about a certain segment demographic of attendee, such as a particular gender, income level, age, or any other category by which attendees can be divided. In these cases, only the demographic or demographics that the system operator is targeting factors into deciding which presentation is most preferable. For example, a pickup truck manufacturer might want to create a new ad campaign targeting males between the ages of 25 and 49. When querying audience members about presentations, the truck manufacturer would only factor in responses from respondents likely to be males between 25 and 49 into determining which presentations are most preferable. Even if audience members not fitting into that demographic respond to queries, their input will not factor into the calculations, or will not factor as heavily as will the targeted demographic. As another example, if a sporting goods manufacturer is planning to create an ad campaign for baseball bats, then it might only consider the responses of audience members who responded in a previous query that baseball is their favorite sport.

Figure 103:
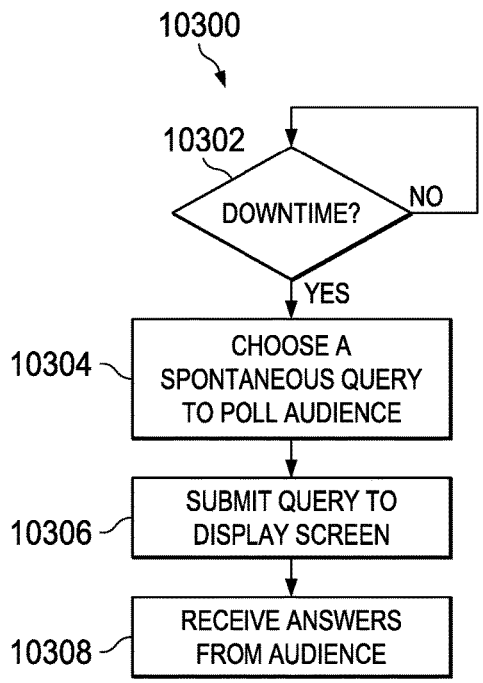
FIG. 103 illustrates a flow diagram of one embodiment of a spontaneous event polling process.

Referring now to FIG. 103, there is illustrated a flow diagram of one embodiment of a spontaneous event polling process 10300. The process 10300 begins at decision block 10302, where it is determined whether there currently is downtime at a venue. Downtime can be any lull in activity at the venue. For example, downtime may occur between plays at a sports event, between bands at a concert, or during intermission at a play. If there is not currently downtime at the venue, decision block 10302 repeats. If there is currently downtime at the venue, the process 10300 moves to step 10304 where a spontaneous query is chosen to poll the audience. It will be understood that such a query may be a question, game, video, or any other type of content displayed on a venue screen, as disclosed herein. The spontaneous query is a query that is chosen soon before the query is asked. It is not a query previously chosen to be asked at the time of the specific downtime, but, rather, would typically be chosen when there is unexpected downtime at a venue and the venue wants to keep the audience entertained or engaged. The query may be a pre-made query, chosen from a list of available queries to be used for spontaneous polls, or it may be written during or shortly before the downtime. In some embodiments, an individual operating a control booth at a venue may choose or write the query, or a query may be sent to the control booth remotely. In other embodiments, the query generation may be automated by the control booth.

Once a query is chosen, the process 10300 moves to step 10306, where the query is submitted to a display screen at the venue, in accordance with the methods described herein. At step 10308, answers from attendees who have answered the query are received at the local server.

Figure 104:
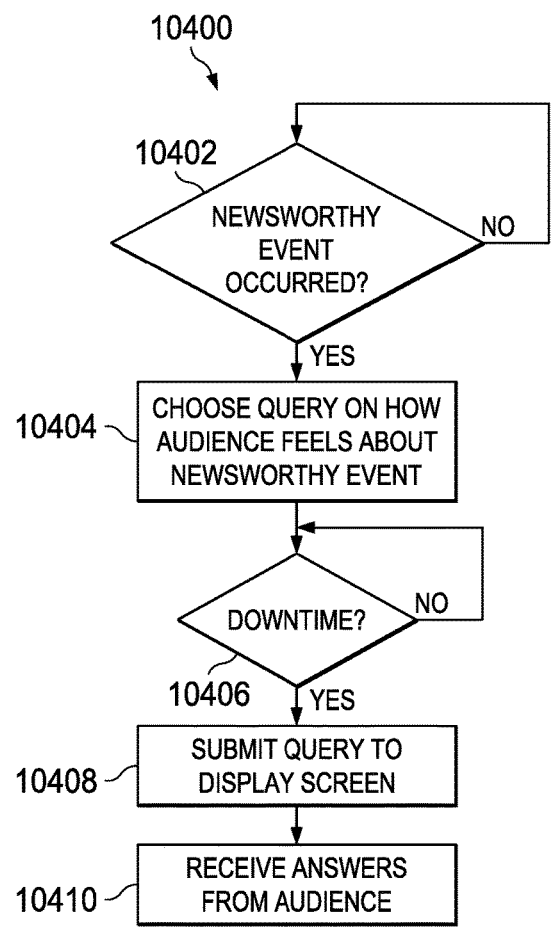
FIG. 104 illustrates a flow diagram of another embodiment of a spontaneous event polling process.

Referring now to FIG. 104, there is illustrated a flow diagram of another embodiment of a spontaneous event polling process 10400. The process 10400 begins at decision block 10402, where it is determined whether a newsworthy event has occurred. This newsworthy event may be any number of occurrences, such as a presidential candidate being elected, a crime being committed, an act of war, or a movie winning a best picture award. If a newsworthy event has not occurred, the decision block 10402 repeats. If a newsworthy event has occurred, the process 10400 moves to step 10404, where a spontaneous query is chosen to poll the audience. It will be understood that such a query may be a question, game, video, or any other type of content displayed on a venue screen, as disclosed herein. The spontaneous query is a query that is chosen soon before the query is asked. It is not a query previously chosen to be asked at the time of the specific downtime, but, rather, would typically be chosen when there is unexpected newsworthy event. The query may be a pre-made query, chosen from a list of available queries to be used for spontaneous polls, or it may be written during or shortly before the downtime. In some embodiments, an individual operating a control booth at a venue may choose or write the query, or a query may be sent to the control booth remotely. In other embodiments, the query generation may be automated by the control booth.

At decision block 10406, it is determined whether there currently is downtime at a venue. Downtime can be any lull in activity at the venue. For example, downtime may occur between plays at a sports event, between bands at a concert, or during intermission at a play. Downtime may also be created by the newsworthy event. If the newsworthy event is of great importance, the activity at the venue may be halted, creating downtime. If there is not currently downtime at the venue, decision block 10406 repeats. If there is currently downtime, the process 10400 moves to step 10408, where the query is submitted to a display screen at the venue, in accordance with the methods described herein. At step 10410, answers from attendees who have answered the query are received at the local server.

In some embodiments, the venue at which the collection of statistical data occurs is a NASCAR event. NASCAR, the National Association for Stock Car Auto Racing, is motorsports' preeminent stock-car racing organization. NASCAR sanctions over 1,500 races at over 100 tracks in 39 U.S. states and in Canada. NASCAR is also the second highest rated professional sports franchise in terms of television viewership. Because of the popularity of NASCAR races, NASCAR viewers and attendees are highly coveted as targets of advertisements, political messages, and other types of media messages. In addition, the price of tickets to NASCAR events makes it such that NASCAR attendees are typically more affluent, and therefore more desirable message targets.

NASCAR events also attract fans who tend to have more varied interests than the general population. In particular, NASCAR fans tend to be people who are interested in or "in-tune with" automotive technology and products. They also have a higher interest in driving, driving activities, and other driving motorsports, such as motorcycle racing, than do members of the general population. Many NASCAR race tracks allow fans to camp on or near the racetrack property. This aspect of NASCAR also attracts fans who are camping enthusiasts and/or recreational vehicle enthusiasts.

NASCAR races are also "continuous" events. Unlike many other sports, which have significant periods of downtime between innings, halves, quarters, time-outs, etc., NASCAR races have very little, if any, "downtime" from the beginning of the race until the race is completed. The cars are continuously driving around the track without any breaks. Given that a NASCAR race can take upwards of three hours to complete, it is unlikely that fans will be focused exclusively on the race the entire time, without ever looking at other parts of the venue, or leaving for concessions, the restroom, or simply to get up and stretch. This gives advertisers or other messengers plenty of opportunities to use race events as part of their messaging to race attendees. Instead of having to wait for breaks between innings, quarters, etc., advertisers and other messengers can present media messages to the audience at almost any time.

Because of how loud NASCAR vehicles are, many NASCAR fans wear audio headsets during the races. They use these headsets to listen to audio feeds from radio stations, or from other sources, such as broadcasts within the NASCAR racetrack, over a network within the racetrack, or even from over the internet. This creates another avenue by which fans can be reached by advertisers or other media messengers. For example, the cues which prompt the mobile users to input a response into the MU 110 could be an audio cue delivered through the audio headsets.

NASCAR events typically take place in open-air venues. In other words, NASCAR race tracks are usually relatively open environments with no ceilings or roofs above the track or stands where the attendees watch the race. Because of this, visual cues could even be delivered to event attendees by blimps, skywriting, airplanes with banners, or even unmanned aerial vehicles ("drones") carrying some type of signage such as a banner.

Advertisers not only desire to deliver their messages to high-income audiences, they often desire information about the individuals in these audiences, including their buying habits, political preferences, gender make-up, ethnic make-up, ages, hobbies and even other sports interests. This means that such statistical information gathered from a relatively high-income audiences like those at NASCAR events is very valuable. Thus, in some embodiments, the statistical information gathering will take place at a venue in which a NASCAR event takes place. In general, a particular venue for a particular event will have associated therewith a particular set of demographics and attendee profiles, and these will be duplicative between events.

TABLE 18

GENDER DISTRIBUTION OF NASCAR FAN BASE

| | |
|---|---|
| Male | 63% |
| Female | 37% |

TABLE 19

AGE DISTRIBUTION OF NASCAR FAN BASE

| | |
|---|---|
| 18-24 years old | 5%-15% |
| 25-34 years old | 15%-20% |
| 35-44 years old | 17%-23% |
| 45-54 years old | 20%-25% |
| 55-64 years old | 15%-20% |
| 65+ years old | 13%-17% |

TABLE 20

INCOME DISTRIBUTION OF NASCAR FAN BASE

| | |
|---|---|
| Under $30,000 | 18%-23% |
| $30,000-$50,000 | 23%-27% |
| $50,000-$75,000 | 17%-21% |
| $75,000-$100,000 | 13%-17% |
| $100,000+ | 18%-22% |

TABLE 21

GEOGRAPHIC DISTRIBUTION OF NASCAR FAN BASE

| | |
|---|---|
| Northeast | 13%-17% |
| Northwest | 23%-27% |
| South | 38%-42% |
| West | 18%-22% |

TABLE 22

ETHNIC MAKE-UP OF NASCAR FAN BASE

| | |
|---|---|
| White | 92-96% |
| Hispanic | 7%-11% |
| African-American | 1%-3% |

TABLE 23

VIEWS OF NASCAR FAN BASE

| | |
|---|---|
| Support gun laws that are more lenient compared to general US population | 18%-25% |
| Religious beliefs are important | 20%-30% |
| Don't mind paying extra for NASCAR products | 60%-70% |
| Purchase specific products because they are loyal to a specific NASCAR driver | 70%-75% |
| Will purchase an item because they feel like collecting memorabilia is important | 50%-55% |
| Can name every sponsor on the Top 30 cars that are racing in a given year | 30%-40% |

TABLE 24

ENGAGEMENT OF NASCAR FAN BASE TO THE SPORT

| | |
|---|---|
| Avid fans who will use Facebook to share information about NASCAR | 60%-65% |
| Own a smartphone or mobile device with a NASCAR app they use regularly | 25%-30% |
| Use the internet on a regular bases to get updates on NASCAR | 75%-80% |
| Will share at least some information about NASCAR on a social network | 90%-95% |
| Millennial fans who would recommend watching NASCAR to their friends | 80%-85% |

TABLE 25

TOPICS OF IMPORTANCE TO NASCAR FAN BASE

| | |
|---|---|
| Feel that buying a sponsor's products allows them to contribute to the sport | 50%-55% |
| Like relationships that are created through the system of corporate NASCAR sponsorship | 80%-85% |
| States the system of corporate sponsorship is very important to the existence of the sport | 90%-95% |
| Unaided sponsor awareness of businesses involved in NASCAR | 45%-50% |

TABLE 26

TYPE OF FAN OF NASCAR FAN BASE

| | |
|---|---|
| Upper Avid | 10%-15% |
| Middle Avid | 8%-12% |
| Lower Avid | 13%-17% |
| Upper Casual | 45%-50% |
| Lower Casual | 15%-20% |

TABLE 27

AGE DISTRIBUTION OF FEMALE NASCAR FAN BASE

| | |
|---|---|
| 18-24 | 10% |
| 25-34 | 16% |
| 35-44 | 18% |
| 45-54 | 21% |
| 55-64 | 17% |
| 65+ | 17% |

TABLE 28

EDUCTION OF FEMALE NASCAR FAN BASE

| | |
|---|---|
| Some college or higher | 57% |

TABLE 29

SOCIAL MEDIA USE OF FEMALE NASCAR FAN BASE

| | |
|---|---|
| Used Facebook in last month | 54% |
| Used YouTube in last month | 42% |
| Used Google+ in last month | 29% |
| Used Pinterest in last month | 23% |
| Used Twitter in last month | 22% |
| Used Instagram in last month | 14% |
| Used Vine in last month | 7% |

TABLE 30

TECHNOLOGY USE BY FEMALE NASCAR FAN BASE

| | |
|---|---|
| DVD player | 86% |
| HD TV | 62% |
| Smartphone | 61% |
| Digital camera | 59% |
| Blu-ray player | 31% |
| Tablet | 26% |
| Camcorder | 37% |
| MP3 player | 30% |
| Home theater equipment | 17% |

TABLE 31

TV CHANNELS WATCHED BY FEMALE NASCAR FAN BASE

| | |
|---|---|
| The Weather Channel | 33% |
| History | 32% |
| A&E | 29% |
| Food Network | 28% |
| HGTV | 27% |
| USA Network | 27% |
| FOX News Channel | 27% |
| TNT | 26% |
| Lifetime | 26% |
| Hallmark Channel | 25% |

TABLE 32

MAGAZINE READERSHIP BY FEMALE NASCAR FAN BASE (IN PAST 6 MONTHS)

| | |
|---|---|
| Better Homes and Gardens | 42% |
| People | 37% |
| Good Housekeeping | 32% |
| Woman's Day | 29% |
| Family Circle | 26% |
| Reader's Digest | 20% |
| Us Weekly | 20% |

TABLE 33

LEISURE ACTIVITIES OF FEMALE NASCAR FANS (PARTICIPATED)

| | |
|---|---|
| Listen to music | 74% |
| Reading books | 69% |
| Dining out (not fast food) | 69% |
| Baking for fun | 56% |
| Card games | 47% |
| Going to beach/lake | 47% |
| Cooking for fun | 46% |
| Board games | 42% |
| Gardening | 41% |
| Barbecuing | 38% |

TABLE 34

LEADING INTERNET ACTIVITIES OF FEMALE NASCAR FAN BASE

| | |
|---|---|
| E-mail | 61% |
| News/Weather | 45% |
| Banking | 40% |
| Online games | 26% |
| Shopping (gathering information) | 20% |
| Shopping (making purchase) | 19% |
| Watch TV/movies online | 14% |

TABLE 35

TRAVEL HABITS OF FEMALE NASCAR FAN BASE

| | |
|---|---|
| Traveled domestically in past year | 69% |
| Traveled internationally in past 3 years | 33% |
| Took a cruise in last 3 years | 14% |
| Stayed at a hotel domestically | 71% |
| Rented a vehicle | 30% |
| Traveled by plane domestically | 22% |

TABLE 36

RETAIL CHANNELS SHOPPED BY FEMALE NASCAR FANBASE

| | |
|---|---|
| Supermarkets | 98% |
| Drugstores | 82% |
| Mass retailers | 75% |

TABLE 36-continued

RETAIL CHANNELS SHOPPED
BY FEMALE NASCAR FANBASE

| | |
|---|---|
| Convenience stores | 58% |
| Automotive retail stores | 57% |
| Department stores | 57% |
| Strip malls | 48% |
| Home improvement stores | 38% |
| Wholesale clubs | 33% |
| Home furnishing stores | 19% |
| Office supply/computer stores | 18% |
| Sporting goods stores | 10% |

TABLE 37

ATTITUDES OF FEMALE
NASCAR FAN BASE TO
AUTOMOTIVE TECHNOLOGY

| | |
|---|---|
| "I like driving" | 63% |
| "I am interested in what goes on under the hood" | 49% |
| "I am possessive about my car" | 43% |
| "You can tell a lot about someone by the car they drive" | 30% |
| "My car should express my personality" | 29% |
| "I'd pay extra for an engine with more horsepower" | 22% |
| "I keep up on the latest advances in automotive technology" | 16% |
| "Friends and family always ask my advice on what car they should buy" | 8% |

Although the preferred embodiment has been described in detail, it should be understood that various changes, substitutions and alterations can be made therein without departing from the spirit and scope of the invention as defined by the appended claims.

What is claimed is:

1. A method for interacting with audience members in an event, which is defined as being at a physical venue location and occurring at a particular predetermined time, wherein the event has a finite number of participating attendees and an associated finite number of unique potential attendee identifiers allocated to any particular event, which UPAIs can be replicated for other events at other times in the same physical venue location or at events in other venue locations, selected from attendees of the event, each of the participating attendees having available thereto one of the UPAIs for the associated event, comprising the steps of:

creating, for each participating attendee, when the attendee is in physical proximity to the venue location associated with the event and proximate in time to the occurrence of the particular predetermined time of the event and is prompted via an external prompting source proximate in time and location to the event to enter a UPAI into a mobile wireless device (MWD), a unique ID (UID) on the MWD by the steps of:
  inputting to the MWD one of the UPAIs; and
  combining the received UPAI with a UID time stamp at the time of input of the UPAI in the MWD to provide the UID comprised of a UPAI portion and a UID time stamp portion so as to distinguish two different UIDs having a duplicate UPAI portion, resulting in a verified UID;

receiving with a server on a first wireless channel communications from the MWD of each participating attendee and having associated therewith one of the verified UIDs;

registering the verified UID of each participating attendee at the physical venue location of the event to define registered attendees;

generating at the server a visual query;

displaying on a physical display at the event the visual query, wherein the physical display is visible by at least a plurality of finite number of participating attendees and wherein the visual query relates to a plurality of visual messages;

displaying response indicators on the MWD of a plurality of the registered attendees;

inputting, by a plurality of the respective registered attendees on which the response indicators were displayed, a response via selection of one of the MWD response indicators on the respective MWD associated with the respective registered attendee;

receiving at the server from each of the responding ones of the registered attendees the selected responses to the query over the first wireless channel;

storing in a database on the server the received responses in association with the displayed query;

associating the respective received responses with the respective verified UIDs;

creating a query ID (QID) associated with the displayed query;

creating a respective response time stamp indicating the respective times at which the respective responses were received by the server;

creating a data record for the each verified UID, each verified UID data record including:
  the respective verified UID,
  the QID,
  the respective received response, and
  the respective response time stamp;

creating a data record for the QID, the QID data record including:
  the QID;
  each of the respective received responses,
  each respective verified UID, and
  each respective response time stamp;

performing statistical analysis on the QID data record;

selecting, based on the statistical analysis of the QID record, one of the visual messages from the plurality of visual messages; and displaying on the physical display at the event the selected visual message;

wherein the statistical analysis relates to the physical location of each respective MWD received from responding ones of the registered attendees associated with each respective verified UID at the time of receiving at the server each respective response from each respective verified UID.

2. The method of claim 1, wherein the event is a closed venue.

3. The method of claim 1, wherein each UPAI is a respective fixed location associated with the venue, each UPAI being associated with a different fixed location within the venue.

4. The method of claim 3, wherein each respective fixed location is a defined seat in a closed venue having a seat identifier as the location.

5. The method of claim 1, wherein registering each respective verified UID comprises:
  recognizing each respective MWD at a predetermined and fixed location within the physical location of the event; and launching an application on each respective MWD followed by the steps of prompting each participating attendee to input a UPAI into the MWD.

6. The method of claim 5, wherein recognizing each respective MWD comprises a scan of the MWD in the vicinity of the predetermined and fixed location.

7. The method of claim 1, wherein registering each respective verified UID comprises responding to a request for registration by transmitting the respective UID to a server over the first wireless channel.

8. The method of claim 1, wherein the response indicators comprise alphabetic symbols.

9. The method of claim 1, wherein the response indicators comprise numeric symbols.

10. The method of claim 1, wherein the response indicators comprise symbols of differing colors.

11. The method of claim 1, wherein receiving at the server a select response includes receiving a timestamp associated with the response.

12. The method of claim 1, wherein receiving at the server select responses includes receiving the responses within a defined time window.

13. The method of claim 1, further comprising associating each respective received response with statistical information related to an attendee classification.

14. The method of claim 1, further comprising assigning each respective verified UID to a statistical category based on the respective received response and the displayed query.

15. The method of claim 1, wherein the verified UID data record also includes statistical information that is related to an attendee classification and that is based on the received response.

16. A system for interacting with audience members in an event at a defined venue, wherein the event has a finite number of potential attendees, each of the potential attendees having available thereto a unique identifier for association therewith, the system comprising:
- a first wireless channel;
- a mobile wireless device (MWD) for each potential attendee, each respective MWD configured to display response indicators and to communicate responses over the first wireless channel;
- a unique ID (UID) created on the respective MWD, each UID comprising:
  - a unique identifier available to the respective potential attendee in association with the associated MWD for that potential attendee to define a portion of the UID; and
  - a time stamp indicating the time of creation of the respective UID on the respective MWD as a second portion of the UID;
- a registration device for interfacing the MWD with a server to allow the MWD to transmit the associated UID to the server for verification as a verified UID;
- the server configured to generate a visual query and to receive communications from each MWD over the first wireless channel, the server having:
  - a filter for filtering the received UIDs into verified UIDs, such that any UID having an identical first portion from two or more different MWDs will use the time stamp information in the associated second portion to verify only the received UID as a verified UID for the earlier received one thereof;
- a physical display for displaying at least one of a plurality of visual messages and the visual query; and
- a database, on the server, configured to store the plurality of visual messages and to store responses that are received from the MWD associated with verified UIDs and that are associated with the displayed visual query;
- wherein the server is also configured to perform a statistical analysis on the stored responses, to select, based on the statistical analysis of the stored responses, one of the plurality of visual messages from the plurality of visual messages, and to communicate the selected visual message to the physical display; and
- wherein the statistical analysis relates to the respective physical location of each respective MWD.

17. The system of claim 16, wherein the event is a closed venue.

18. The system of claim 16, wherein the MWD is also configured to communicate timestamps indicating the time at which the responses are communicated over the first wireless channel.

19. The system of claim 16, wherein each unique identifier comprises a respective fixed location associated with the venue.

20. The system of claim 19, wherein each respective fixed location comprises a defined seat in a closed venue having a seat identifier as the location.

* * * * *